(12) United States Patent
Cummins et al.

(10) Patent No.: US 12,441,711 B2
(45) Date of Patent: Oct. 14, 2025

(54) COMPOUNDS AND THEIR USE FOR TREATMENT OF HEMOGLOBINOPATHIES

(71) Applicant: Bristol-Myers Squibb Company, Princeton, NJ (US)

(72) Inventors: Thomas J. Cummins, San Diego, CA (US); Scott Arne Johnson, San Diego, CA (US); Hannah L. Powers, San Diego, CA (US); Giorgio Tamo, Biel (CH)

(73) Assignee: Bristol-Myers Squibb Company, Princeton, NJ (US)

( * ) Notice: Subject to any disclaimer, the term of this patent is extended or adjusted under 35 U.S.C. 154(b) by 0 days.

(21) Appl. No.: 19/029,638

(22) Filed: Jan. 17, 2025

(65) Prior Publication Data

US 2025/0163025 A1   May 22, 2025

Related U.S. Application Data

(63) Continuation of application No. PCT/US2023/078600, filed on Nov. 3, 2023.

(60) Provisional application No. 63/422,847, filed on Nov. 4, 2022.

(51) Int. Cl.

| | | |
|---|---|---|
| *C07D 401/14* | (2006.01) | |
| *A61K 31/454* | (2006.01) | |
| *A61K 31/4545* | (2006.01) | |
| *A61K 31/4709* | (2006.01) | |
| *A61K 45/06* | (2006.01) | |
| *C07D 401/04* | (2006.01) | |
| *C07D 405/14* | (2006.01) | |
| *C07D 413/14* | (2006.01) | |
| *C07D 417/14* | (2006.01) | |

(52) U.S. Cl.
CPC .......... *C07D 401/14* (2013.01); *A61K 31/454* (2013.01); *A61K 31/4545* (2013.01); *A61K 31/4709* (2013.01); *A61K 45/06* (2013.01); *C07D 401/04* (2013.01); *C07D 405/14* (2013.01); *C07D 413/14* (2013.01); *C07D 417/14* (2013.01)

(58) Field of Classification Search
CPC .. C07D 401/14; C07D 401/04; C07D 405/14; C07D 413/14; C07D 417/14; A61K 31/454; A61K 31/4545; A61K 31/4709; A61K 45/06

See application file for complete search history.

(56) References Cited

U.S. PATENT DOCUMENTS

| 7,973,057 B2 | 7/2011 | Greig et al. |
| 2007/0049618 A1 | 3/2007 | Muller et al. |
| 2018/0155316 A1 | 6/2018 | Ruchelman et al. |

FOREIGN PATENT DOCUMENTS

| WO | 2005055929 A2 | 6/2005 |
| WO | 2007139939 A2 | 12/2007 |
| WO | 2020006264 A1 | 1/2020 |
| WO | 2021124172 A1 | 6/2021 |
| WO | 2022195355 A1 | 9/2022 |
| WO | 2022195454 A1 | 9/2022 |
| WO | 2022254362 A1 | 12/2022 |

OTHER PUBLICATIONS https://pubchem.ncbi.nlm.nih.gov/compound/Voxelotor (Year: 2013).*
Dulmovits et al., "Pomalidomide reverses γ-globin silencing through the transcriptional reprogramming of adult hematopoietic progenitors," Blood, 2016, 127(11):1481-1492.
International Search Report and Written Opinion of PCT/US2023/078600, Mar. 14, 2024, Applicant: Bristol-Myers Squibb Company, 12 pages.
Extended European Search Report received in European Application No. 23887047.1 dated Jul. 24, 2025, 10 pages.

* cited by examiner

*Primary Examiner* — Clinton A Brooks
*Assistant Examiner* — Jerica Katlynn Wilson
(74) *Attorney, Agent, or Firm* — McNeill PLLC

(57) ABSTRACT

Disclosed herein are compounds and methods for the prevention and/or treatment of hemoglobinopathies. Also provided herein are such compounds for use in such methods. Also disclosed herein are pharmaceutical compositions comprising such compounds for use in such methods of preventing or treating hemoglobinopathies.

19 Claims, No Drawings

COMPOUNDS AND THEIR USE FOR TREATMENT OF HEMOGLOBINOPATHIES

CROSS-REFERENCE TO RELATED APPLICATIONS

This application is a continuation of International Application No. PCT/US2023/078600, filed Nov. 3, 2023, which claims priority to U.S. Provisional Application No. 63/422,847, filed on Nov. 4, 2022, each of which is incorporated by reference herein in its entirety for any purpose.

FIELD

Disclosed herein are compounds and methods for the prevention and/or treatment of hemoglobinopathies. Also provided herein are such compounds for use in such methods. Also disclosed herein are pharmaceutical compositions comprising such compounds for use in such methods of preventing or treating hemoglobinopathies.

BACKGROUND

Hemoglobin is an iron-containing metalloprotein present in red blood cells. Hemoglobin transports oxygen to various tissues throughout the body. Fetal hemoglobin (HbF) is present in fetal red blood cells and is involved the transport of oxygen from the mother to the fetus. After birth, a "fetal switch" occurs, at which point, erythroid precursors switch from producing predominantly fetal hemoglobin to making predominantly adult hemoglobin. Adult hemoglobin and fetal hemoglobin are tetramers containing two alpha- and two beta-globin subunits ($\alpha 2\beta 2$) or two alpha- and two gamma-globin subunits ($\alpha 2\gamma 2$) respectively. Fetal hemoglobin binds to oxygen more strongly than adult hemoglobin.

Hemoglobinopathies can arise, for example, when there is either abnormal adult hemoglobin expression or structural abnormalities in the adult hemoglobin protein. For example, sickle cell disease, including sickle cell anemia, arises when a person has a point mutation that occurs in the beta-globin gene, resulting in the formation of hemoglobin S (HbS), a hemoglobin composed of two normal alpha-globin chains and two beta-globin type mutated chains. The presence of HbS causes the red blood cells to have an abnormal shape, assuming a sickle form when exposed to decreased amounts of oxygen, which impedes blood flow and can lead to hemolysis. Patients with sickle cell disease suffer from a variety of symptoms including pain, anema, bacterial infections, increased risk of stroke, and reduced life expectancy.

Another example of a hemoglobinopathy is beta-thalassemia. Beta-thalassemias occur when the beta chain of hemoglobin is reduced or absent. Without treatment, patients with severe forms of beta-thalassemia can suffer from numerous health complications such as poor growth, skeletal abnormalities, and heart failure. Although beta-thalassemia patients may be treated via blood transfusions, transfusions carry the risk of iron overload and resulting complications with the spleen, liver, and heart.

Reactivation of functional HbF expression in adult hematopoietic cells has the potential of great clinical benefit in patients with hemoglobin disorders such as sickle cell disease and beta-thalassemia. Hydroxyurea is a current standard of care for sickle cell disease that works via induction of fetal hemoglobin, but it is limited by variable clinical responses, myelotoxicity and the risk of carcinogenesis. Thus, alternative, and more effective, treatments for hemoglobinopathies are needed.

SUMMARY

Provided herein are compounds of formula (I):

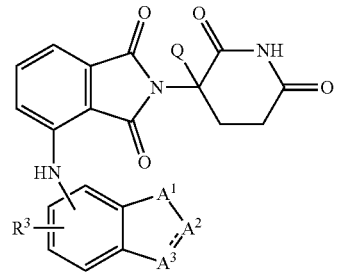

(I)

and pharmaceutically acceptable salts, tautomers, isotopologues, and stereoisomers thereof, wherein $A^1$, $A^2$, $A^3$, Q and $R^3$ are as defined herein.

Also provided herein are compounds of formula (II):

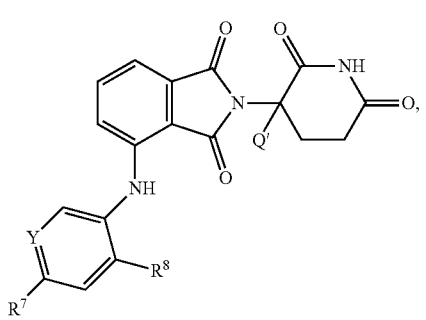

(II)

and pharmaceutically acceptable salts, tautomers, isotopologues, and stereoisomers thereof, wherein Y, Q', $R^7$, and $R^8$ are as defined herein.

Also provided herein are compounds of formula (III):

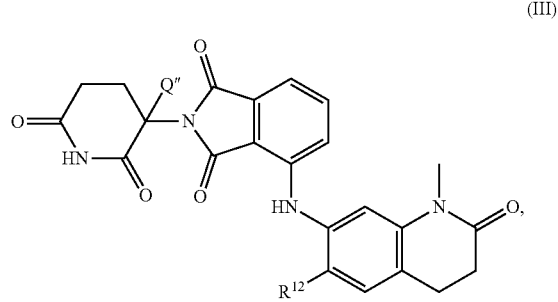

(III)

and pharmaceutically acceptable salts, tautomers, isotopologues, and stereoisomers thereof, wherein Q", and $R^{12}$ are as defined herein.

In one aspect, provided herein are compounds as described in the instant disclosure, such as, for example, a compound of formula (I), formula (I'), formula (II), formula (II'), formula (III), or a compound from Table 1.

In one aspect, provided herein are pharmaceutical compositions comprising an effective amount of a compound of formula (I), formula (I'), formula (II), formula (II'), formula (III), or a compound from Table 1, as described herein, and a pharmaceutically acceptable carrier, excipient or vehicle.

In one aspect, provided herein are methods of treating a subject having a hemoglobinopathy. In another aspect, provided herein are uses of a compound of formula (I), formula (I'), formula (II), formula (II'), formula (III), or a compound from Table 1 for treating or preventing hemoglobinopathies, comprising administering to a subject affected by a hemoglobinopathy an effective amount of a compound of formula (I), formula (I'), formula (II), formula (II'), formula (III), or a compound from Table 1 as described herein.

In certain embodiments, the methods described herein includes administering a therapeutically effective amount of a compound a compound of formula (I), formula (I'), formula (II), formula (II'), formula (III), or a compound from Table 1, or a pharmaceutically acceptable salt, tautomer, isotopologue, or stereoisomer thereof, to the subject.

In one aspect, provided herein are uses of a compound of formula (I), formula (I'), formula (II), formula (II'), formula (III), or a compound from Table 1 for treating or preventing a hemoglobinopathy, comprising administering to a subject affected by a hemoglobinopathy an effective amount of a compound of formula (I), formula (I'), formula (II), formula (II'), formula (III), or a compound from Table 1 as described herein.

In one aspect, provided herein is a compound of formula (I), formula (I'), formula (II), formula (II'), formula (III), or a compound from Table 1 for use as a medicament. In a particular embodiment, provided herein is a compound of formula (I), formula (I'), formula (II), formula (II'), formula (III), or a compound from Table 1 for use in a method for the treatment or prevention of a hemoglobinopathy, the method comprising administering to a subject an effective amount of a compound of formula (I), formula (I'), formula (II), formula (II'), formula (III), or a compound from Table 1.

In another aspect provided herein are methods for preparing a compound of formula (I), formula (I'), formula (II), formula (II'), formula (III), or a compound from Table 1 as described herein.

The present embodiments can be understood more fully by reference to the detailed description and examples, which are intended to exemplify non-limiting embodiments.

DETAILED DESCRIPTION

Definitions

As used herein, the terms "comprising" and "including" can be used interchangeably. The terms "comprising" and "including" are to be interpreted as specifying the presence of the stated features or components as referred to, but do not preclude the presence or addition of one or more features, or components, or groups thereof. Additionally, the terms "comprising" and "including" are intended to include examples encompassed by the term "consisting of". Consequently, the term "consisting of" can be used in place of the terms "comprising" and "including" to provide for more specific embodiments of the invention.

The term "consisting of" means that a subject-matter has at least 90%, 95%, 97%, 98% or 99% of the stated features or components of which it consists. In another embodiment the term "consisting of" excludes from the scope of any succeeding recitation any other features or components, excepting those that are not essential to the technical effect to be achieved.

As used herein, the term "or" is to be interpreted as an inclusive "or" meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

As used herein and unless otherwise specified, an "alkyl" group is a saturated, partially saturated, or unsaturated straight chain or branched non-cyclic hydrocarbon having from 1 to 10 carbon atoms, typically from 1 to 8 carbons or, in some embodiments, from 1 to 6, 1 to 4, or 2 to 6 or carbon atoms. Representative alkyl groups include-methyl, -ethyl, -n-propyl, -n-butyl, -n-pentyl and -n-hexyl; while saturated branched alkyls include-isopropyl, -sec-butyl, -isobutyl, -tert-butyl, -isopentyl, -neopentyl, tert-pentyl, -2-methylpentyl, -3-methylpentyl, -4-methylpentyl, -2,3-dimethylbutyl and the like. An "alkenyl" group is an alkyl group that contains one or more carbon-carbon double bonds. An "alkynyl" group is an alkyl group that contains one or more carbon-carbon triple bonds. Examples of unsaturated alkyl groups include, but are not limited to, vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, —C≡CH, —C≡C(CH$_3$), —C≡C(CH$_2$CH$_3$), —CH$_2$C≡CH, —CH$_2$C≡C(CH$_3$) and —CH$_2$C≡C(CH$_2$CH$_3$), among others. An alkyl group can be substituted or unsubstituted. When the alkyl groups described herein are said to be "substituted," they may be substituted with any substituent or substituents as those found in the exemplary compounds and embodiments disclosed herein, as well as halogen; hydroxy; alkoxy; cycloalkyloxy, aryloxy, heterocyclyloxy, heteroaryloxy, heterocycloalkyoxy, cycloalkylalkyloxy, aralkyloxy, heterocyclylalkyloxy, heteroarylalkyloxy, heterocycloalkyalkyloxy; oxo (=O); amino, alkylamino, cycloalkylamino, arylamino, heterocyclylamino, heteroarylamino, heterocycloalkylamino; imino; imido; amidino; guanidino; enamino; acylamino; sulfonylamino; urea, nitrourea; oxime; hydroxylamino; alkoxyamino; aralkoxyamino; hydrazino; hydrazido; hydrazono; azido; nitro; thio (—SH), alkylthio; =S; sulfinyl; sulfonyl; aminosulfonyl; phosphonate; phosphinyl; acyl; formyl; carboxy; ester; carbamate; amido; cyano; isocyanato; isothiocyanato; cyanato; thiocyanato; or —B(OH)$_2$. In some embodiments, one or more hydrogens, such as one, two, three, four, or five hydrogens, in an alkyl group may be replaced with halogen.

As used herein and unless otherwise specified, a "cycloalkyl" group is a saturated, or partially saturated cyclic alkyl group of from 3 to 10 carbon atoms having a single cyclic ring or multiple condensed or bridged rings which can be optionally substituted. In some embodiments, the cycloalkyl group has 3 to 8 ring members, whereas in other embodiments the number of ring carbon atoms ranges from 3 to 5, 3 to 6, or 3 to 7. Such cycloalkyl groups include, by way of example, single ring structures such as cyclopropyl, cyclobutyl, cyclopentyl, cyclohexyl, cycloheptyl, cyclooctyl, 1-methylcyclopropyl, 2-methylcyclopentyl, 2-methylcyclooctyl, and the like, or multiple or bridged ring structures such as 1-bicyclo[1.1.1]pentyl, bicyclo[2.1.1]hexyl, bicyclo[2.2.1]heptyl, bicyclo[2.2.2]octyl, adamantyl and the like. Examples of unsaturated cycloalkyl groups include cyclohexenyl, cyclopentenyl, cyclohexadienyl, butadienyl, pentadienyl, hexadienyl, among others. A cycloalkyl group can be substituted or unsubstituted. Such substituted cycloalkyl groups include, by way of example, cyclohexanol and the like.

As used herein and unless otherwise specified, an "aryl" group is an aromatic carbocyclic group of from 6 to 14 carbon atoms having a single ring (e.g., phenyl) or multiple condensed rings (e.g., naphthyl or anthryl). In some embodiments, aryl groups contain 6-14 carbons, and in others from 6 to 12 or even 6 to 10 carbon atoms in the ring portions of the groups. Particular aryl groups include phenyl, biphenyl, naphthyl and the like. An aryl group can be substituted or unsubstituted. The phrase "aryl groups" also includes groups containing fused rings, such as fused aromatic-aliphatic ring systems (e.g., indanyl, tetrahydronaphthyl, and the like).

As used herein and unless otherwise specified, a "heteroaryl" group is an aromatic ring system having one to four heteroatoms as ring atoms in a heteroaromatic ring system, wherein the remainder of the atoms are carbon atoms. In some embodiments, heteroaryl groups contain 3 to 6 ring atoms, and in others from 6 to 9 or even 6 to 10 atoms in the ring portions of the groups. Suitable heteroatoms include oxygen, sulfur and nitrogen. In certain embodiments, the heteroaryl ring system is monocyclic or bicyclic. Non-limiting examples include but are not limited to, groups such as pyrrolyl, pyrazolyl, imidazolyl, triazolyl, tetrazolyl, oxazolyl, isoxazolyl, benzisoxazolyl (e.g., benzo[d]isoxazolyl), thiazolyl, pyrolyl, pyridazinyl, pyrimidyl, pyrazinyl, thiophenyl, benzothiophenyl, furanyl, benzofuranyl, indolyl (e.g., indol-2-onyl), isoindolin-1-onyl, azaindolyl, pyrrolopyridyl (e.g., 1H-pyrrolo[2,3-b]pyridyl), indazolyl, benzimidazolyl (e.g., 1H-benzo[d]imidazolyl), azabenzimidazolyl, imidazopyridyl (e.g., 1H-imidazo[4,5-b]pyridyl), pyrazolopyridyl, triazolopyridyl, benzotriazolyl (e.g., 1H-benzo[d][1,2,3]triazolyl), benzoxazolyl (e.g., benzo[d]oxazolyl), benzothiazolyl, benzothiadiazolyl, isoxazolopyridyl, thianaphthalenyl, purinyl, xanthinyl, adeninyl, guaninyl, quinolinyl, isoquinolinyl, 3,4-dihydroisoquinolin-1(2H)-onyl, tetrahydroquinolinyl, quinoxalinyl, and quinazolinyl groups. A heteroaryl group can be substituted or unsubstituted.

As used herein and unless otherwise specified, a "heterocyclyl" is an aromatic ring system (also referred to as heteroaryl) or non-aromatic cycloalkyl (also referred to as heterocycloalkyl) in which one to four of the ring carbon atoms are independently replaced with a heteroatom. Suitable heteroatoms include oxygen, sulfur and nitrogen. In some embodiments, heterocyclyl groups include 3 to 10 ring members, whereas other such groups have 3 to 5, 3 to 6, or 3 to 8 ring members. Heterocyclyls can also be bonded to other groups at any ring atom (i.e., at any carbon atom or heteroatom of the heterocyclic ring). A heterocyclyl group can be substituted or unsubstituted. Heterocyclyl groups encompass unsaturated, partially saturated and saturated ring systems, such as, for example, imidazolyl, imidazolinyl and imidazolidinyl (e.g., imidazolidin-4-onyl or imidazolidin-2,4-dionyl) groups. The phrase heterocyclyl includes fused ring species, including those comprising fused aromatic and non-aromatic groups, such as, for example, 1- and 2-aminotetraline, benzotriazolyl (e.g., 1H-benzo[d][1,2,3]triazolyl), benzimidazolyl (e.g., 1H-benzo[d]imidazolyl), 2,3-dihydrobenzo[1,4]dioxinyl, and benzo[1,3]dioxolyl. The phrase also includes bridged polycyclic ring systems containing a heteroatom such as, but not limited to, quinuclidyl. Representative examples of a heterocyclyl group include, but are not limited to, aziridinyl, azetidinyl, azepanyl, oxetanyl, pyrrolidyl, imidazolidinyl (e.g., imidazolidin-4-onyl or imidazolidin-2,4-dionyl), pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, benzisoxazolyl (e.g., benzo[d]isoxazolyl), thiazolyl, thiazolinyl, isothiazolyl, thiadiazolyl, oxadiazolyl, piperidyl, piperazinyl (e.g., piperazin-2-onyl), morpholinyl, thiomorpholinyl, tetrahydropyranyl (e.g., tetrahydro-2H-pyranyl), tetrahydrothiopyranyl, oxathianyl, dioxyl, dithianyl, pyranyl, pyridyl, pyrimidyl, pyridazinyl, pyrazinyl, triazinyl, dihydropyridyl, dihydrodithiinyl, dihydrodithionyl, 1,4-dioxaspiro[4.5]decanyl, homopiperazinyl, quinuclidyl, indolyl (e.g., indol-2-onyl), isoindolin-1-onyl, indolinyl, isoindolyl, isoindolinyl, azaindolyl, pyrrolopyridyl (e.g, 1H-pyrrolo[2,3-b]pyridyl), indazolyl, indolizinyl, benzotriazolyl (e.g. 1H-benzo[d][1,2,3]triazolyl), benzimidazolyl (e.g., 1H-benzo[d]imidazolyl or 1H-benzo[d]imidazol-2(3H)-onyl), benzofuranyl, benzothiophenyl, benzothiazolyl, benzoxadiazolyl, benzoxazinyl, benzodithiinyl, benzoxathiinyl, benzothiazinyl, benzoxazolyl (e.g., benzo[d]oxazolyl), benzothiazolyl, benzothiadiazolyl, benzo[1,3]dioxolyl, pyrazolopyridyl (e.g., 1H-pyrazolo[3,4-b]pyridyl, 1H-pyrazolo[4,3-b]pyridyl), azabenzimidazolyl, imidazopyridyl (e.g., 1H-imidazo[4,5-b]pyridyl), triazolopyridyl, isoxazolopyridyl, purinyl, xanthinyl, adeninyl, guaninyl, quinolinyl, isoquinolinyl, 3,4-dihydroisoquinolin-1(2H)-onyl, quinolizinyl, quinoxalinyl, quinazolinyl, cinnolinyl, phthalazinyl, naphthyridinyl, pteridinyl, thianaphthalenyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, tetrahydropyrimidin-2(1H)-one and tetrahydroquinolinyl groups. Representative non-aromatic heterocyclyl groups do not include fused ring species that comprise a fused aromatic group. Examples of non-aromatic heterocyclyl groups include aziridinyl, azetidinyl, azepanyl, pyrrolidyl, imidazolidinyl (e.g., imidazolidin-4-onyl or imidazolidin-2,4-dionyl), pyrazolidinyl, thiazolidinyl, tetrahydrothiophenyl, tetrahydrofuranyl, piperidyl, piperazinyl (e.g., piperazin-2-onyl), morpholinyl, thiomorpholinyl, tetrahydropyranyl (e.g., tetrahydro-2H-pyranyl), tetrahydrothiopyranyl, oxathianyl, dithianyl, 1,4-dioxaspiro[4.5]decanyl, homopiperazinyl, quinuclidyl, or tetrahydropyrimidin-2(1H)-one. Representative substituted heterocyclyl groups may be mono-substituted or substituted more than once, such as, but not limited to, pyridyl or morpholinyl groups, which are 2-, 3-, 4-, 5-, or 6-substituted, or disubstituted with various substituents such as those listed below.

As used herein and unless otherwise specified, a "cycloalkylalkyl" group is a radical of the formula: -alkyl-cycloalkyl, wherein alkyl and cycloalkyl are defined above. Substituted cycloalkylalkyl groups may be substituted at the alkyl, the cycloalkyl, or both the alkyl and the cycloalkyl portions of the group. Representative cycloalkylalkyl groups include but are not limited to cyclopropylmethyl, cyclobutylmethyl, cyclopentylmethyl, cyclohexylmethyl, cyclopropylethyl, cyclobutylethyl, cyclopentylethyl, cyclohexylethyl, cyclopentylpropyl, cyclohexylpropyl and the like.

As used herein and unless otherwise specified, an "aralkyl" group is a radical of the formula: -alkyl-aryl, wherein alkyl and aryl are defined above. Substituted aralkyl groups may be substituted at the alkyl, the aryl, or both the alkyl and the aryl portions of the group. Representative aralkyl groups include but are not limited to benzyl and phenethyl groups and aralkyl groups wherein the aryl group is fused to a cycloalkyl group such as indan-4-yl ethyl.

As used herein and unless otherwise specified, a "heterocyclylalkyl" group is a radical of the formula: -alkyl-heterocyclyl, wherein alkyl and heterocyclyl are defined above. A "heteroarylalkyl" group is a radical of the formula: -alkyl-heteroaryl, wherein alkyl and heteroaryl are defined above. A "heterocycloalkylalkyl" group is a radical of the formula: -alkyl-heterocycloalkyl, wherein alkyl and heterocycloalkyl are defined above. Substituted heterocyclylalkyl groups may be substituted at the alkyl, the heterocyclyl, or both the alkyl and the heterocyclyl portions of the group. Representative heterocylylalkyl groups include but are not limited to morpholin-4-yl ethyl, morpholin-4-yl propyl, furan-2-yl methyl, furan-3-yl methyl, pyridin-3-yl methyl, tetrahydrofuran-2-yl ethyl, and indol-2-yl propyl.

As used herein and unless otherwise specified, a "halogen" is fluorine, chlorine, bromine or iodine.

As used herein and unless otherwise specified, a "hydroxyalkyl" group is an alkyl group as described above substituted with one or more hydroxy groups.

As used herein and unless otherwise specified, an "alkoxy" group is —O-(alkyl), wherein alkyl is defined above. An "alkylthio" group is —S-(alkyl), wherein alkyl is defined above.

As used herein and unless otherwise specified, an "alkoxyalkyl" group is -(alkyl)-O-(alkyl), wherein alkyl is defined above.

As used herein and unless otherwise specified, a "cycloalkyloxy" group is —O-(cycloalkyl), wherein cycloalkyl is defined above.

As used herein and unless otherwise specified, an "aryloxy" group is —O-(aryl), wherein aryl is defined above.

As used herein and unless otherwise specified, a "heterocyclyloxy" group is —O-(heterocyclyl), wherein heterocyclyl is defined above. A "heteroaryloxy" group is —O-(heteroaryl), wherein heteroaryl is defined above. A "heterocycloalkyloxy" group is —O-(heterocycloalkyl), wherein heterocycloalkyl is defined above.

As used herein and unless otherwise specified, an "amino" group is a radical of the formula: —NH$_2$, —NH(R$^\#$), or —N(R$^\#$)$_2$, wherein each R$^\#$ is independently an alkyl, cycloalkyl, cycloalkylalkyl, aryl, aralkyl, heterocyclyl (e.g., heteroaryl or heterocycloalkyl), or heterocyclylalkyl (e.g., heteroarylalkyl or heterocycloalkylalkyl) group defined above, each of which is independently substituted or unsubstituted.

In one embodiment, an "amino" group is an "alkylamino" group, which is a radical of the formula: —NH-alkyl or —N(alkyl)$_2$, wherein each alkyl is independently defined above. The term "cycloalkylamino", "arylamino", "heterocyclylamino", "heteroarylamino", "heterocycloalkylamino", or the like, mirrors the above description for "alkylamino" where the term "alkyl" is replaced with "cycloalkyl", "aryl", "heterocyclyl", "heteroaryl", "heterocycloalkyl", or the like, respectively.

As used herein and unless otherwise specified, a "carboxy" group is a radical of the formula: —C(O)OH.

As used herein and unless otherwise specified, an "acyl" group is a radical of the formula: —C(O)(R$^\#$) or —C(O)H, wherein R$^\#$ is defined above. A "formyl" group is a radical of the formula: —C(O)H.

As used herein and unless otherwise specified, an "amido" group is a radical of the formula: —C(O)—NH$_2$, —C(O)—NH(R$^\#$), —C(O)—N(R$^\#$)$_2$, —NH—C(O)H, —NH—C(O)—(R$^\#$), —N(R)—C(O)H, or —N(R$^\#$)—C(O)—(R$^\#$), wherein each R$^\#$ is independently defined above.

In one embodiment, an "amido" group is an "aminocarbonyl" group, which is a radical of the formula: —C(O)—NH$_2$, —C(O)—NH(R$^\#$), —C(O)—N(R$^4$)$_2$, wherein each R$^\#$ is independently defined above.

In one embodiment, an "amido" group is an "acylamino" group, which is a radical of the formula: —NH—C(O)H, —NH—C(O)—(R$^\#$), —N(R$^\#$)—C(O)H, or —N(R)—C(O)—(R$^\#$), wherein each R$^\#$ is independently defined above.

As used herein and unless otherwise specified, a "sulfonylamino" group is a radical of the formula: —NHSO$_2$(R$^\#$) or —N(R$^\#$)SO$_2$(R$^\#$), wherein each R$^\#$ is defined above.

As used herein and unless otherwise specified, an "ester" group is a radical of the formula: —C(O)—O—(R$^\#$) or —O—C(O)—(R$^\#$), wherein R$^\#$ is defined above.

In one embodiment, an "ester" group is an "alkoxycarbonyl" group, which is a radical of the formula: —C(O)—O-(alkyl), wherein alkyl is defined above. The term "cycloalkyloxycarbonyl", "aryloxycarbonyl", "heterocyclyloxycarbonyl", "heteroaryloxycarbonyl", "heterocycloalkyloxycarbonyl", or the like, mirrors the above description for "alkoxycarbonyl" where the term "alkoxy" is replaced with "cycloalkyloxy", "aryloxy", "heterocyclyloxy", "heteroaryloxy", "heterocycloalkyloxy", or the like, respectively.

As used herein and unless otherwise specified, a "carbamate" group is a radical of the formula: —O—C(O)—NH$_2$, —O—C(O)—NH(R$^\#$), —O—C(O)—N(R$^\#$)$_2$, —NH—C(O)—O—(R$^\#$), or —N(R$^\#$)—C(O)—O—(R$^\#$), wherein each R$^\#$ is independently defined above.

As used herein and unless otherwise specified, a "urea" group is a radical of the formula: —NH(CO)NH$_2$, —NHC(O)NH(R$^\#$), —NHC(O)N(R$^\#$)$_2$, —N(R$^\#$)C(O)NH$_2$, —N(R$^\#$)C(O)NH(R$^\#$), or —N(R$^\#$)C(O)N(R$^\#$)$_2$, wherein each R$^\#$ is independently defined above.

As used herein and unless otherwise specified, a "sulfinyl" group is a radical of the formula: —S(O)R$^\#$, wherein R$^\#$ is defined above.

As used herein and unless otherwise specified, a "sulfonyl" group is a radical of the formula: —S(O)$_2$R$^\#$, wherein R$^\#$ is defined above.

As used herein and unless otherwise specified, an "aminosulfonyl" group is a radical of the formula: —SO$_2$NH$_2$, —SO$_2$NH(R$^\#$), or —SO$_2$N(R$^\#$)$_2$, wherein each R$^\#$ is independently defined above.

When the groups described herein, with the exception of alkyl groups, are said to be "substituted," they may be substituted with any appropriate substituent or substituents. Illustrative examples of substituents are those found in the exemplary compounds and embodiments disclosed herein, as well as halogen; alkyl, alkenyl, alkynyl, cycloalkyl, aryl, heterocyclyl, heteroaryl, heterocycloalky, cycloalkylalkyl, aralkyl, heterocyclylalkyl, heteroarylalkyl, heterocycloalkylalkyl, optionally further substituted; hydroxy; alkoxy; cycloalkyloxy, aryloxy, heterocyclyloxy, heteroaryloxy, heterocycloalkyoxy, cycloalkylalkyloxy, aralkyloxy, heterocyclylalkyloxy, heteroarylalkyloxy, heterocycloalkyalkyloxy; oxo (=O); oxide (e.g., a nitrogen atom substituted with an oxide is called N-oxide); amino, alkylamino, cycloalkylamino, arylamino, heterocyclylamino, heteroarylamino, heterocycloalkylamino; imino; imido; amidino; guanidino; enamino; acylamino; sulfonylamino; urea, nitrourea; oxime; hydroxylamino; alkoxyamino; aralkoxyamino; hydrazino; hydrazido; hydrazono; azido; nitro; thio (—SH), alkylthio; =S; sulfinyl; sulfonyl; aminosulfonyl; phosphonate; phosphinyl; acyl; formyl; carboxy; ester; carbamate; amido; cyano; isocyanato; isothiocyanato; cyanato; thiocyanato; or —B(OH)$_2$. In some embodiments, one or more hydrogens, such as one, two, three, four, or five hydrogens, in a substituent may be replaced with halogen. In some embodiments, substitution replaces a hydrogen atom with alkyl, alkoxy, aryloxy, halogen, or haloalkyl.

As used herein, the term "hemoglobinopathy" or "hemoglobinopathies" means any disease or disorder that affects red blood cells. Hemoglobinopathies include, but are not limited to, sickle cell disease and anemias.

As used herein, the term "HbF" means fetal hemoglobin.

As used herein, the term "gene therapy" means the treatment of a disease or condition by the transfer or contact of genetic material into a cell.

As used herein, the term "CRISPR" means clustered regularly interspaced short palindromic repeats.

As used herein, the term "pharmaceutically acceptable salt(s)" refers to a salt prepared from a pharmaceutically acceptable non-toxic acid or base including an inorganic acid and base and an organic acid and base. Suitable pharmaceutically acceptable base addition salts of the compounds of formula (I), formula (I'), formula (II), formula (II'), formula (III), and Table 1, include, but are not limited to metallic salts made from aluminum, calcium, lithium, magnesium, potassium, sodium and zinc or organic salts made from lysine, N,N'-dibenzylethylenediamine, chloroprocaine, choline, diethanolamine, ethylenediamine, meglumine (N-methyl-glucamine) and procaine. Suitable non-toxic acids include, but are not limited to, inorganic and organic acids such as acetic, alginic, anthranilic, benzenesulfonic, benzoic, camphorsulfonic, citric, ethenesulfonic, formic, fumaric, furoic, galacturonic, gluconic, glucuronic, glutamic, glycolic, hydrobromic, hydrochloric, isethionic, lactic, maleic, malic, mandelic, methanesulfonic, mucic, nitric, pamoic, pantothenic, phenylacetic, phosphoric, propionic, salicylic, stearic, succinic, sulfanilic, sulfuric, tartaric acid, and p-toluenesulfonic acid. Specific non-toxic acids include hydrochloric, hydrobromic, maleic, phosphoric, sulfuric, and methanesulfonic acids. Examples of specific salts thus include hydrochloride and mesylate salts. Others are well-known in the art, see for example, *Remington's Pharmaceutical Sciences*, 18th eds., Mack Publishing, Easton PA (1990) or *Remington: The Science and Practice of Pharmacy*, 19th eds., Mack Publishing, Easton PA (1995).

As used herein and unless otherwise indicated, the term "stereoisomer" or "stereomerically pure" means one stereoisomer of a compound of formula (I), formula (I'), formula (II), formula (II'), formula (III), or Table 1 that is substantially free of other stereoisomers of that compound. For example, a stereomerically pure compound having one chiral center will be substantially free of the opposite enantiomer of the compound. A stereomerically pure compound having two chiral centers will be substantially free of other diastereomers of the compound. A typical stereomerically pure compound comprises greater than about 80% by weight of one stereoisomer of the compound and less than about 20% by weight of other stereoisomers of the compound, greater than about 90% by weight of one stereoisomer of the compound and less than about 10% by weight of the other stereoisomers of the compound, greater than about 95% by weight of one stereoisomer of the compound and less than about 5% by weight of the other stereoisomers of the compound, or greater than about 97% by weight of one stereoisomer of the compound and less than about 3% by weight of the other stereoisomers of the compound. The compounds of formula (I), formula (I'), formula (II), formula (II'), formula (III), or Table 1 can have chiral centers and can occur as racemates, individual enantiomers or diastereomers, and mixtures thereof. All such isomeric forms are included within the embodiments disclosed herein, including mixtures thereof.

The use of stereomerically pure forms of such compounds of formula (I), formula (I'), formula (II), formula (II'), formula (III) and included in Table 1, as well as the use of mixtures of those forms, are encompassed by the embodiments disclosed herein. For example, mixtures comprising equal or unequal amounts of the enantiomers of a particular compound of formula (I), formula (I'), formula (II), formula (II'), formula (III), or in Table 1 may be used in methods and compositions disclosed herein. These isomers may be asymmetrically synthesized or resolved using standard techniques such as chiral columns or chiral resolving agents. See, e.g., Jacques, J., et al., *Enantiomers, Racemates and Resolutions* (Wiley-Interscience, New York, 1981); Wilen, S. H., et al., *Tetrahedron* 33:2725 (1977); Eliel, E. L., *Stereochemistry of Carbon Compounds* (McGraw-Hill, NY, 1962); and Wilen, S. H., *Tables of Resolving Agents and Optical Resolutions* p. 268 (E. L. Eliel, Ed., Univ. of Notre Dame Press, Notre Dame, IN, 1972).

It should also be noted the compounds of formula (I), formula (I'), formula (II), formula (II'), formula (III), or in Table 1 can include E and Z isomers, or a mixture thereof, and cis and trans isomers or a mixture thereof. In certain embodiments, the compounds of formula (I), formula (I'), formula (II), formula (II'), formula (III), or in Table 1 are isolated as either the E or Z isomer. In other embodiments, the compounds of formula (I), formula (I'), formula (II), formula (II'), formula (III), or in Table 1 are a mixture of the E and Z isomers.

"Tautomers" refers to isomeric forms of a compound that are in equilibrium with each other through the migration of a proton. The concentrations of the isomeric forms will depend on the environment the compound is found in and may be different depending upon, for example, whether the compound is a solid or is in an organic or aqueous solution. For example, in aqueous solution, pyrazoles may exhibit the following isomeric forms, which are referred to as tautomers of each other:

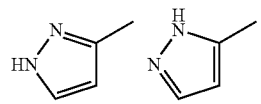

As readily understood by one skilled in the art, a wide variety of functional groups and other structures may exhibit tautomerism and all tautomers of compounds of formula (I), formula (I'), formula (II), formula (II'), formula (III), or in Table 1 are within the scope of the present disclosure.

It should also be noted that the compounds of formula (I), formula (I'), formula (II), formula (II'), formula (III), or in Table 1 can contain unnatural proportions of atomic isotopes at least one of the atoms. For example, the compounds may be radiolabeled with radioactive isotopes, such as for example tritium (3H), iodine-125 ($^{125}$I), sulfur-35 ($^{35}$S), or carbon-14 ($^{14}$C), or may be isotopically enriched, such as with carbon-13 ($^{13}$C), or nitrogen-15 ($^{15}$N). As used herein, an "isotopologue" is an isotopically enriched compound. The term "isotopically enriched" refers to an atom having an isotopic composition other than the natural isotopic composition of that atom. "Isotopically enriched" may also refer to a compound containing at least one atom having an isotopic composition other than the natural isotopic composition of that atom. The term "isotopic composition" refers to the amount of each isotope present for a given atom. Radiolabeled and isotopically enriched compounds are useful as therapeutic agents, e.g., cancer and inflammation therapeutic agents, research reagents, e.g., binding assay reagents, and diagnostic agents, e.g., in vivo imaging agents. All isotopic variations of the compounds of formula (I), formula (I'), formula (II), formula (II'), formula (III), or in Table 1 as described herein, whether radioactive or not, are intended to be encompassed within the scope of the embodiments provided herein. In some embodiments, there are provided isotopologues of the compounds of formula (I), formula (I'), formula (II), formula (II'), formula (III), or in Table 1, for example, the isotopologues are carbon-13, or nitrogen-15 enriched compounds of formula (I), formula (I'), formula (II), formula (II'), formula (III), or in Table 1. As used herein, "deuterated", means a compound wherein at least one hydrogen (H) has been replaced by deuterium (indicated by D or $^2$H), that is, the compound is enriched in deuterium in at least one position It should be noted that if there is a discrepancy between a depicted structure and a name for that structure, the depicted structure is to be accorded more weight.

"Treating" as used herein, means an alleviation, in whole or in part, of a disorder, disease or condition, or one or more of the symptoms associated with a disorder, disease, or condition, or slowing or halting of further progression or worsening of those symptoms, or alleviating or eradicating the cause(s) of the disorder, disease, or condition itself. In one embodiment, the disorder, disorder or condition is a hemoglobinopathy.

"Preventing" as used herein, means a method of delaying and/or precluding the onset, recurrence or spread, in whole or in part, of a disorder, disease or condition; barring a subject from acquiring a disorder, disease, or condition; or reducing a subject's risk of acquiring a disorder, disease, or condition. In one embodiment, the disorder, disorder or condition is a hemoglobinopathy.

The term "effective amount" in connection with a compound of formula (I), formula (I'), formula (II), formula (II'), formula (III), or Table 1 means an amount capable of treating or preventing a disorder, disease or condition, or symptoms thereof, disclosed herein. In one embodiment, the disorder, disorder or condition is a hemoglobinopathy.

The term "subject" or "patient" includes humans.

The term "combination" or administration "in combination" includes administration as a mixture, simultaneous administration using separate formulations, and consecutive administration in any order.

Unless otherwise defined, the technical and scientific terms used herein have the same meaning as commonly understood by one of ordinary skill in the art to which this application belongs.

Compounds

Provided herein are compounds having the following formula (I):

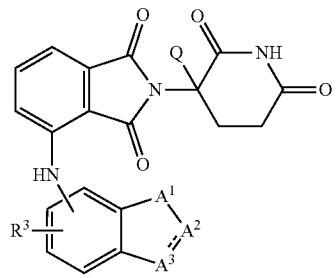

wherein:
------ is a single or double bond;
$A^1$ is $NR^1$, O, $CH(R^2)$, or $C(R^2)_2$;
$A^2$ is $NR^1$, C=O, $CH(R^2)$, or $C(R^2)_2$;
$A^3$ is $NR^1$, O, $CH(R^2)$, or $C(R^2)_2$;

each $R^1$ is independently absent, H, a substituted or unsubstituted alkyl, a substituted or unsubstituted cyclylalkyl, a substituted or unsubstituted heterocyclyl, or a substituted or unsubstituted heterocyclylalkyl;
each $R^2$ is independently absent, H, an amine, or a substituted or unsubstituted alkyl;
each $R^3$ is independently H, a substituted or unsubstituted cycloalkyl, —O—$R^4$, $CH_2$—R', a substituted or unsubstituted aryl, a substituted or unsubstituted heteroaryl, a substituted or unsubstituted heterocyclyl, or a substituted 3,4-Dihydro-2(1H)-quinolinone;
$R^\#$ is a substituted or unsubstituted aryl, or a substituted or unsubstituted heteroaryl;
R' is a cycloalkyl; and
Q is H or $CH_3$.

Provided herein are compounds of formula (I) having the following formula (I'):

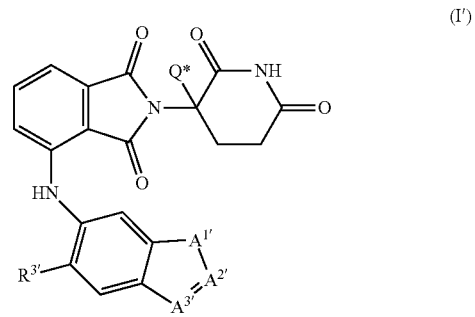

and pharmaceutically acceptable salts, tautomers, isotopologues, and stereoisomers thereof,
wherein:
------ is a single or double bond;
$A^{1'}$ is $NR^{1'}$, O, or $CH(R^{2'})$;
$A^{2'}$ is $NR^{1'}$, C=O, $CR^{2'}$, or $CH(R^{2'})$;
$A^{3'}$ is $NR^{1'}$, O, $CR^{2'}$, or $CH(R^{2'})$;
each $R^{1'}$ is independently absent, H, a substituted or unsubstituted alkyl, a substituted or unsubstituted cyclylalkyl, or a substituted or unsubstituted heterocyclylalkyl;
each $R^{2'}$ is independently H, an amine, or a substituted or unsubstituted alkyl;
each $R^{3'}$ is independently H, a substituted or unsubstituted cycloalkyl, —O—$R^{4'}$, $CH_2$—R*, a substituted or unsubstituted aryl, a substituted or unsubstituted heteroaryl, or a substituted 3,4-Dihydro-2(1H)-quinolinone;
$R^{4'}$ is a substituted or unsubstituted aryl, or a substituted or unsubstituted heteroaryl;
R* is a cycloalkyl; and
Q* is H or $CH_3$.

In certain embodiments, ------ is a single bond. In certain embodiments ------ is a double bond.
In certain embodiments, $A^{1'}$ is $NR^1$. In certain embodiments, $A^1$ is $NR^1$.
In certain embodiments, $A^{2'}$ is $NR^1$. In certain embodiments, $A^2$ is $NR^1$.
In certain embodiments, $A^{3'}$ is $NR^1$. In certain embodiments, $A^3$ is $NR^1$.
In certain embodiments, $R^{2'}$ is $CH_3$. In certain embodiments, $R^1$ is $CH_3$.
In certain embodiments, $A^{2'}$ is $CR^{2'}$. In certain embodiments, $A^2$ is $CR^{2'}$.

In certain embodiments, $R^{2'}$ is H. In certain embodiments, $R^2$ is H.

In certain embodiments, $R^{2'}$ is $CH_3$. In certain embodiments, $R^2$ is $CH_3$.

In certain embodiments, $R^{3'}$ is $CH_2-R^*$ and $R^*$ is a $C_1-C_6$ substituted or unsubstituted alkyl or a $C_3-C_6$ substituted or unsubstituted cycloalkyl. In certain embodiments, $R^3$ is $CH_2-R'$ and $R'$ is a $C_1-C_6$ substituted or unsubstituted alkyl or a $C_3-C_6$ substituted or unsubstituted cycloalkyl.

In certain embodiments, $R^3$ is

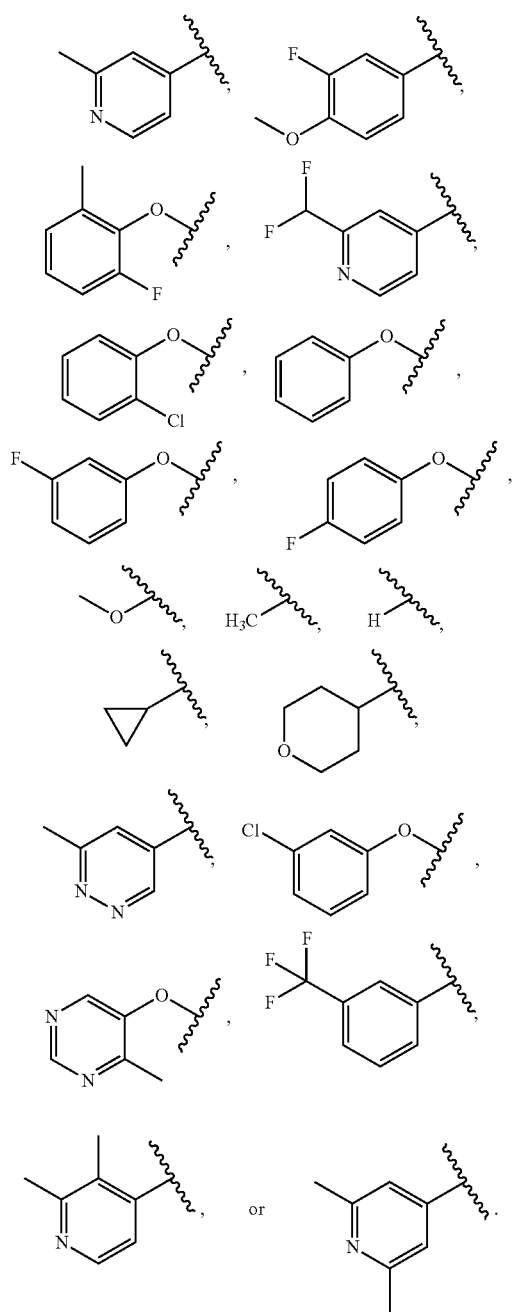

In certain embodiments, $R^*$ is cyclopropyl. In certain embodiments, $R'$ is cyclopropyl.

In certain embodiments, $R^{3'}$ is:

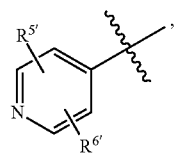

wherein:
$R^{5'}$ is H, a substituted or unsubstituted alkyl, or an alkoxy; and
$R^{6'}$ is H, a halogen, or a substituted or unsubstituted alkyl.

In certain embodiments, $R^3$ is:

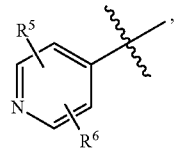

wherein:
$R^5$ is H, a substituted or unsubstituted alkyl, or an alkoxy; and
$R^6$ is H, a halogen, or a substituted or unsubstituted alkyl.

In certain embodiments, $R^{5'}$ is $CH_3$. In certain embodiments, $R^5$ is $CH_3$.

In certain embodiments, $R^{6'}$ is a halo alkyl. In certain embodiments, $R^6$ is a halo alkyl.

In certain embodiments,

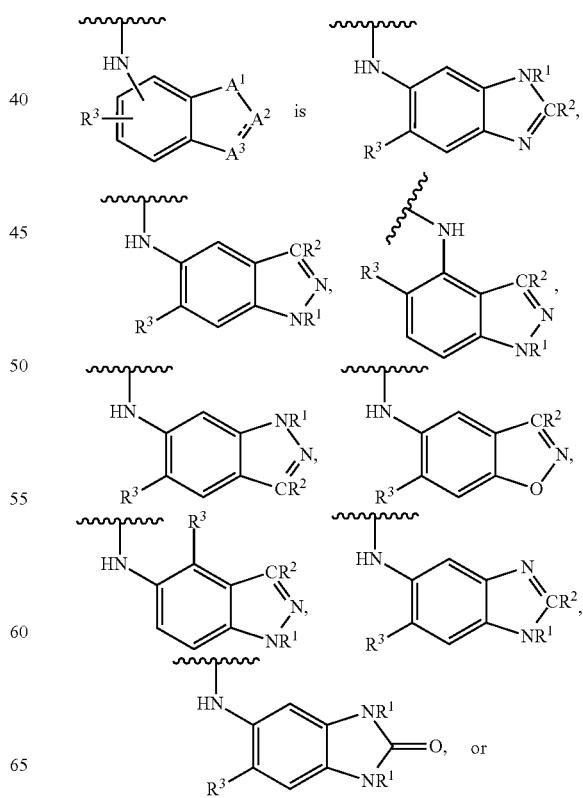

-continued
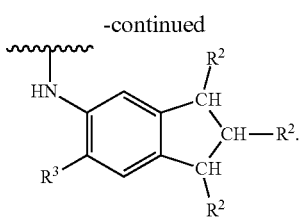
Provided herein are compounds of Formula (I) chosen from:
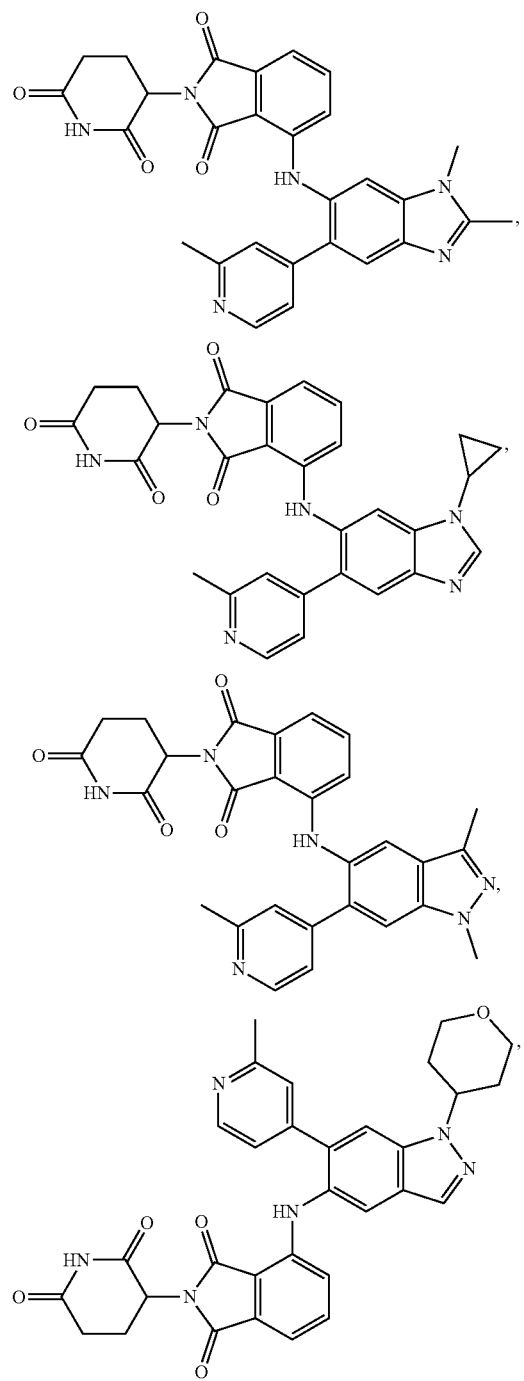
-continued
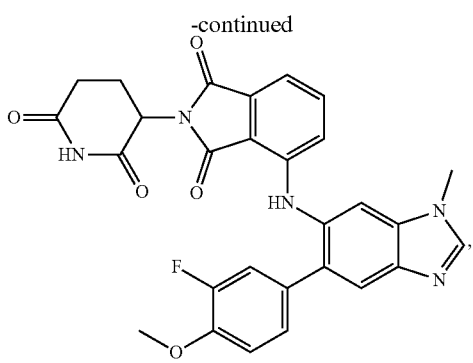
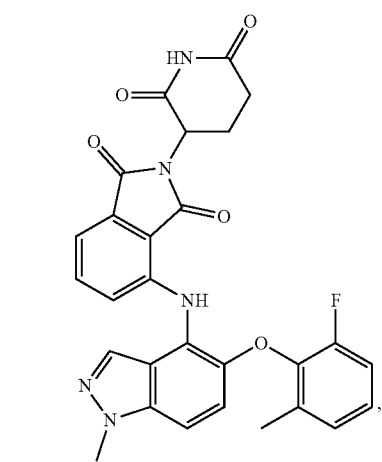 [SMILES: Cc1ncncc1Oc1ccc2c(cnn2C)c1Nc1cccc2c1C(=O)N(C1CCC(=O)NC1=O)C2=O]

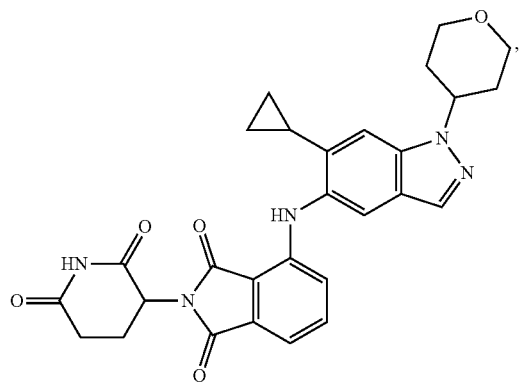
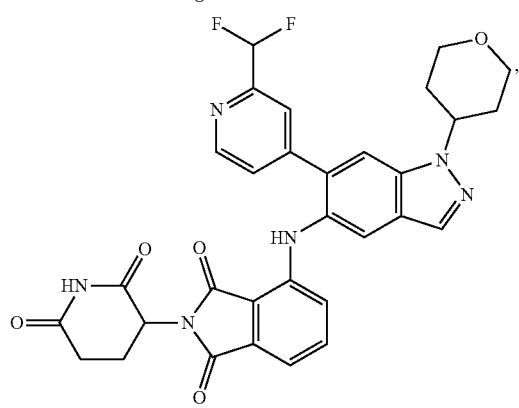
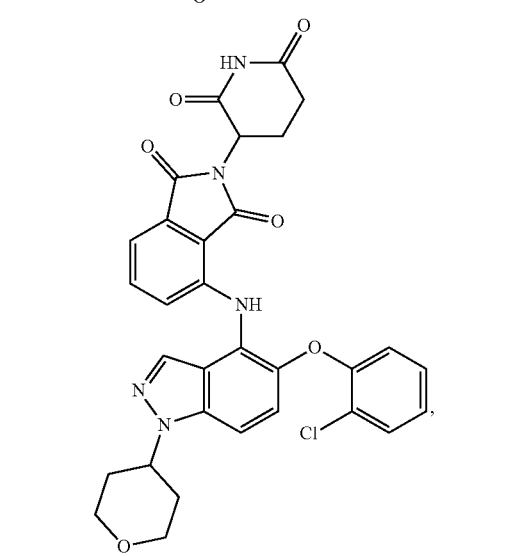
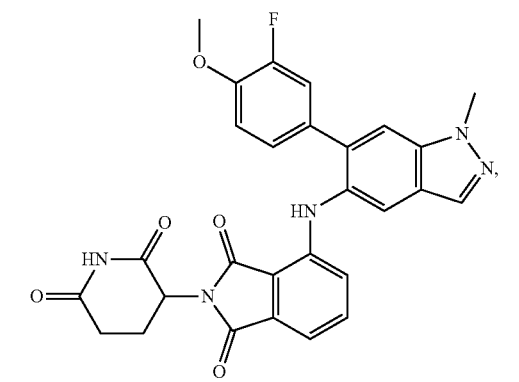
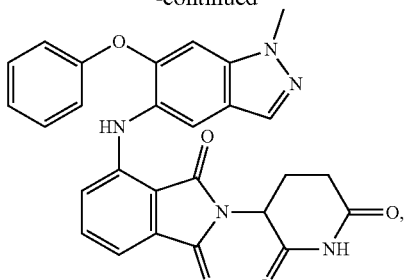
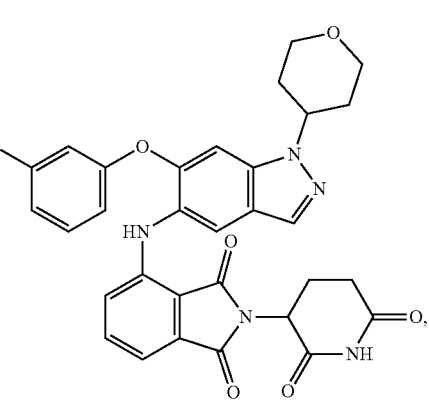
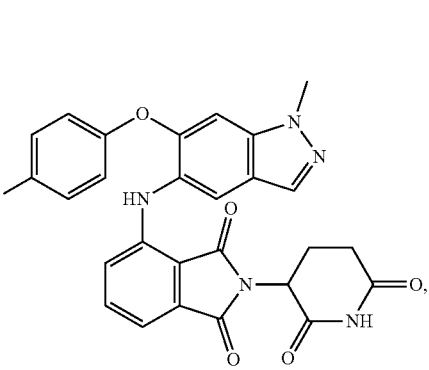
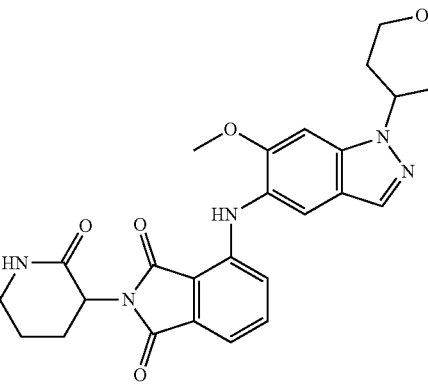

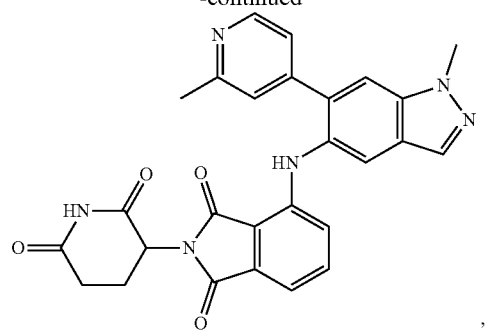
,
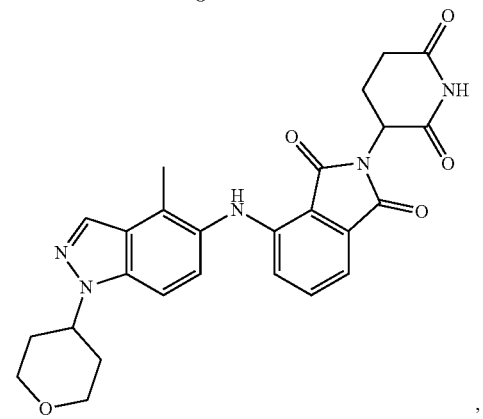
,
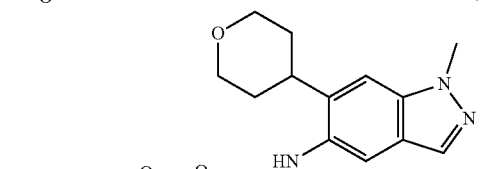
,
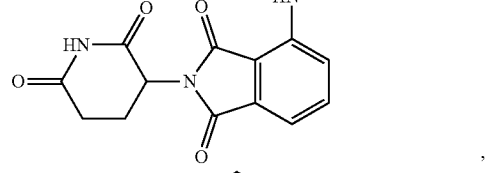
,
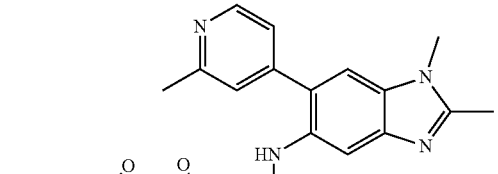
,
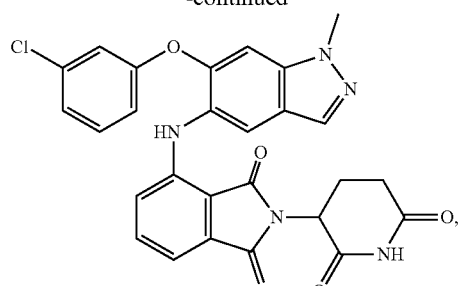
,
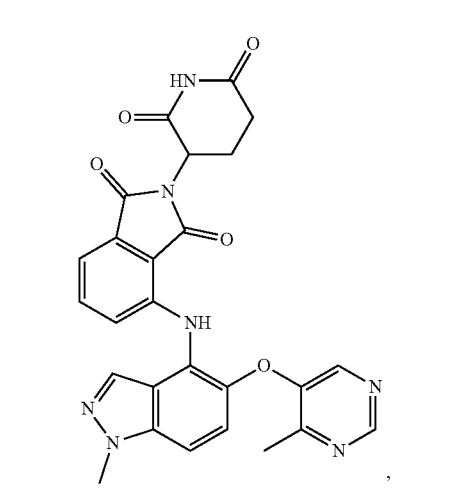
,
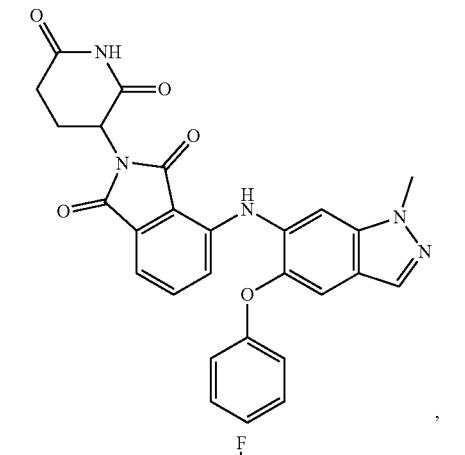
,
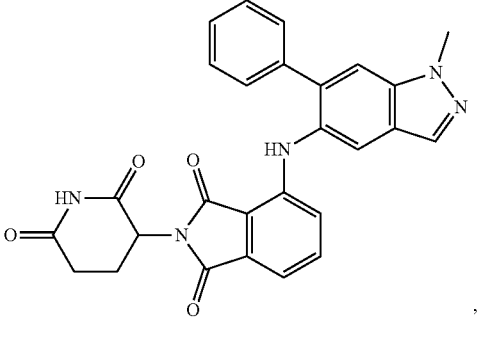
, -continued
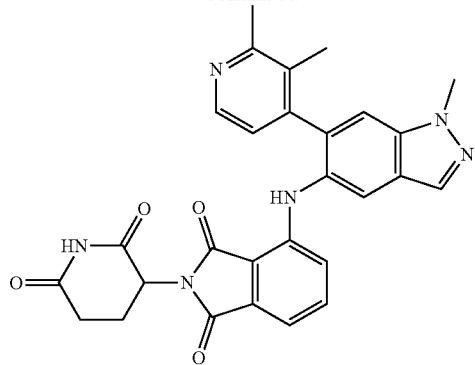 [SMILES: Cc1nccc(-c2cc3c(cnn3C)cc2Nc2cccc3c2C(=O)N(C2CCC(=O)NC2=O)C3=O)c1C]
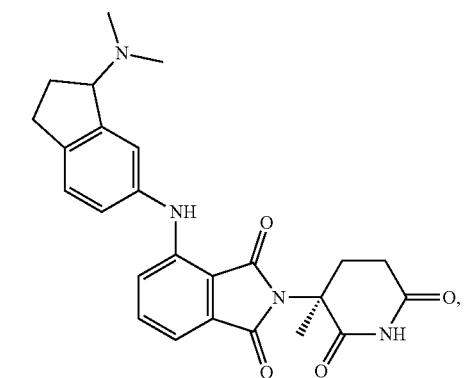 [SMILES: CN(C)C1CCc2ccc(Nc3cccc4c3C(=O)N([C@@]3(C)CCC(=O)NC3=O)C4=O)cc21]
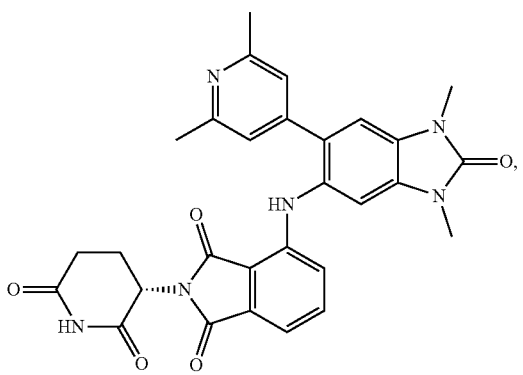
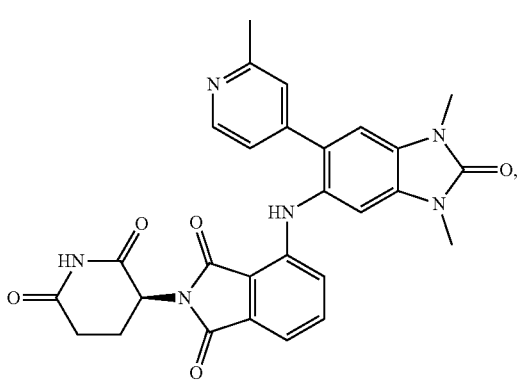
-continued
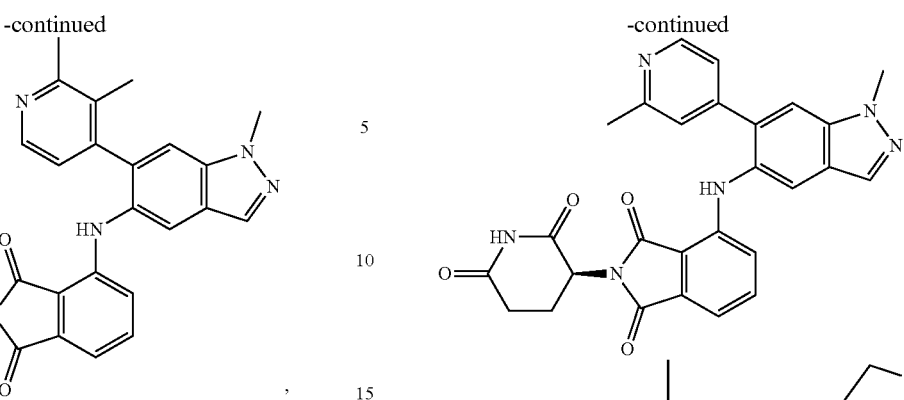
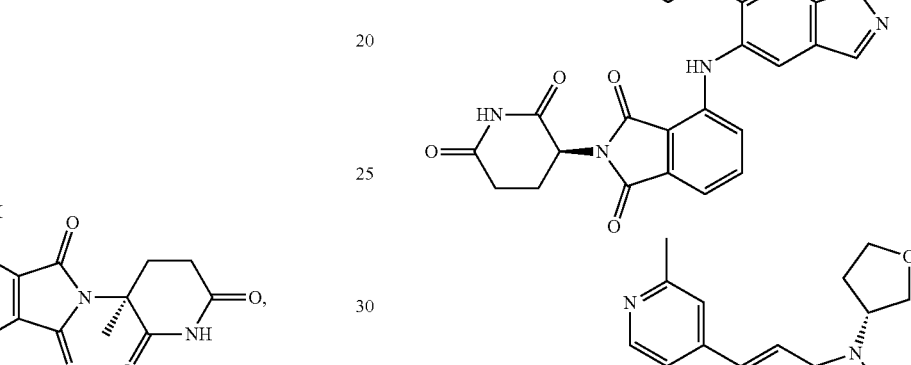
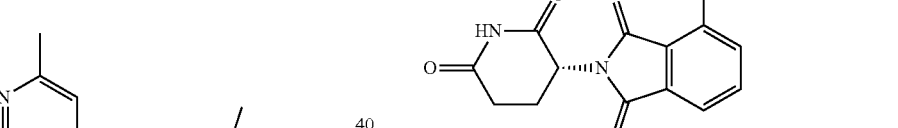
or a pharmaceutically acceptable salt, tautomer, isotopologue, or stereoisomer thereof.
Provided herein are compounds having the following formula (II):
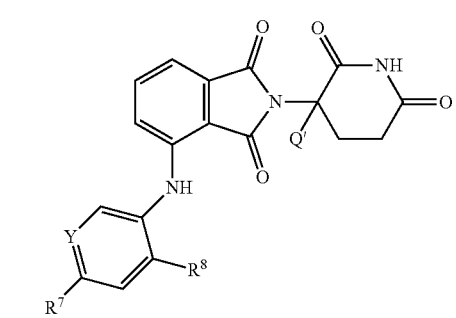
(II)
and pharmaceutically acceptable salts, tautomers, isotopologues, and stereoisomers thereof,
wherein:
Q' is H or $CH_3$;
Y is $CR^{13}$, CH, or N;

R⁷ is H, O—R⁹, a substituted or unsubstituted aryl, or a substituted or unsubstituted alkyl, R⁸ is H, O—R¹⁰, or a substituted or unsubstituted aryl;

R⁹ is a substituted or unsubstituted alkyl, an aryl, CH₂CH₂N(CH₃)₂, or CH₂CH₂—R¹¹;

R¹⁰ is a substituted or unsubstituted alkyl, or a substituted or unsubstituted aryl;

R¹¹ is piperidinyl; and

R¹³ is a substituted or unsubstituted alkyl. Provided herein are compounds of formula (II) having the following formula (II'):

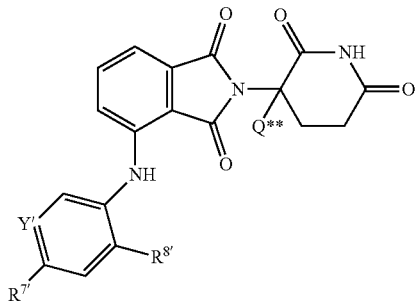

(II)

and pharmaceutically acceptable salts, tautomers, isotopologues, and stereoisomers thereof, wherein:

Q** is H or CH₃;

Y' is CH or N;

R⁷' is H, O—R⁹', a substituted or unsubstituted aryl, or a substituted or unsubstituted alkyl, R⁸' is H, O—R¹⁰', or a substituted or unsubstituted aryl;

R⁹' is a substituted or unsubstituted alkyl, an aryl, CH₂CH₂N(CH₃)₂, or CH₂CH₂—R¹¹';

R¹⁰' is a substituted or unsubstituted alkyl, or a substituted or unsubstituted aryl; and R¹¹' is piperidinyl.

In certain embodiments, Y is CH. In certain embodiments, Y' is CH.

In certain embodiments, Y is N. In certain embodiments, Y' is N.

In certain embodiments, R⁷ is CH₃. In certain embodiments, R⁷' is CH₃.

In certain embodiments, R¹⁰ is CH₃. In certain embodiments, R¹⁰' is CH₃.

In certain embodiments, R¹⁰ is aryl. In certain embodiments, R¹⁰' is aryl.

In certain embodiments, R¹⁰ is phenyl. In certain embodiments, R¹⁰' is phenyl.

In certain embodiments, R¹⁰ is a substituted phenyl. In certain embodiments, R¹⁰' is a substituted phenyl.

In certain embodiments, R¹³ is C₁-C₆ alkyl substituted with aryloxy.

Provided herein are compounds of Formula (II) chosen from:

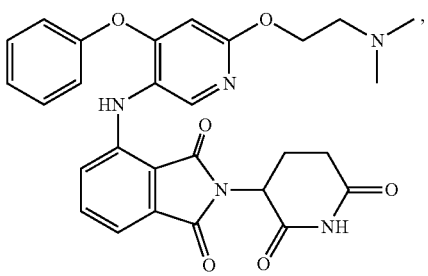

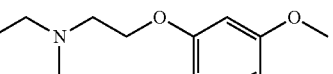

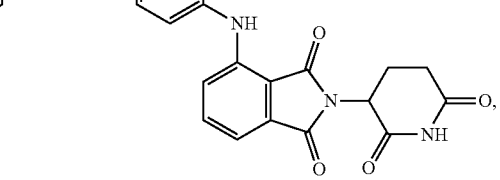

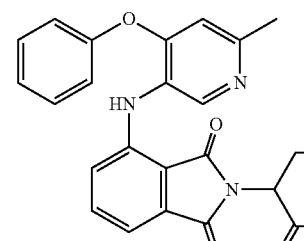

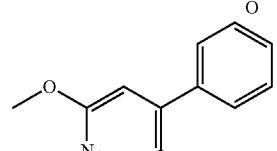

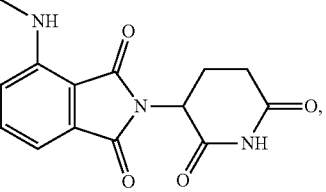

or a pharmaceutically acceptable salt, tautomer, isotopologue, or stereoisomer thereof.

Provided herein are compounds having the following Formula (III):

(III)

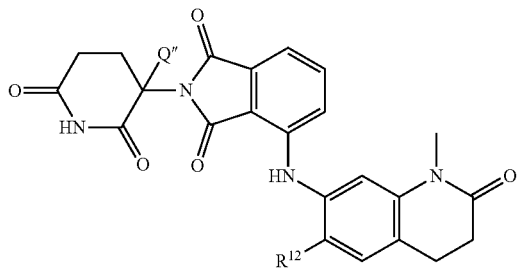

and pharmaceutically acceptable salts, tautomers, isotopologues, and stereoisomers thereof,
wherein:
Q" is H or CH$_3$.
R$^{12}$ is a substituted or unsubstituted pyridyl, a substituted or unsubstituted alkyl, a substituted or unsubstituted heterocyclyl, or a substituted or unsubstituted C$_3$-C$_6$ cycloalkyl.
In certain embodiments, Q" is H.
In certain embodiments, Q" is CH$_3$.
In certain embodiments, R$^{12}$ is CH$_3$.
In certain embodiments, R$^{12}$ is cyclopropyl.
In certain embodiments, R$^{12}$ is selected from a substituted or unsubstituted thiazole, or a substituted or unsubstituted pyrazole.
In certain embodiments, R$^{12}$ is:

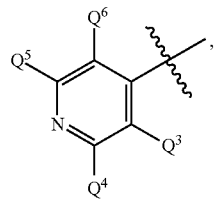

wherein
Q$^3$ is selected from H, Cl, or F;
Q$^4$ is selected from H, CH$_3$, or CH(F)$_2$;
Q$^5$ is selected from H, CH$_3$, or OCH$_3$; and
Q$^6$ is selected from H or F.
In certain embodiments, Q$^3$ is F.
In certain embodiments, Q$^5$ is OCH$_3$.
In certain embodiments, Q$^5$ is CH$_3$.
In certain embodiments, Q$^3$ is H, Q$^4$ is H, Q$^5$ is CH$_3$, and Q$^6$ is H.
In certain embodiments, Q$^3$ is H, Q$^4$ is CH(F)$_2$, Q$^5$ is H, and Q$^6$ is H.
In certain embodiments, Q$^3$ is F, Q$^4$ is CH$_3$, Q$^5$ is H, and Q$^6$ is H.
In certain embodiments, Q$^3$ is F, Q$^4$ is H, Q$^5$ is CH$_3$, and Q$^6$ is H.
In certain embodiments, Q$^3$ is Cl, Q$^4$ is CH$_3$, Q$^5$ is H, and Q$^6$ is H.
In certain embodiments, Q$^3$ is H, Q$^4$ is CH$_3$, Q$^5$ is CH$_3$, and Q$^6$ is H.
In certain embodiments, Q$^3$ is H, Q$^4$ is CH$_3$, Q$^5$ is OCH$_3$, and Q$^6$ is H.
In certain embodiments, Q$^3$ is F, Q$^4$ is H, Q$^5$ is OCH$_3$, and Q$^6$ is H.
In certain embodiments, Q$^3$ is F, Q$^4$ is OCH$_{33}$, Q$^5$ is H, and Q$^6$ is H.

Provided herein are compounds of Formula (III) chosen from:

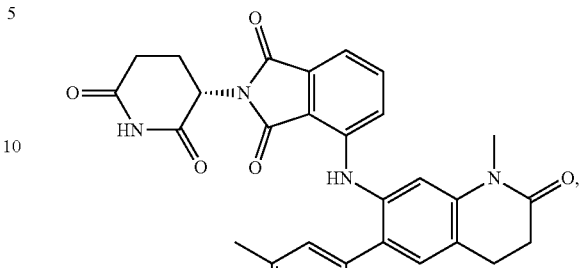

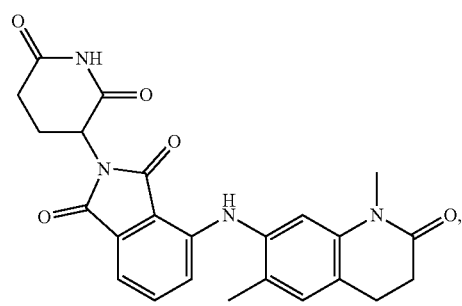

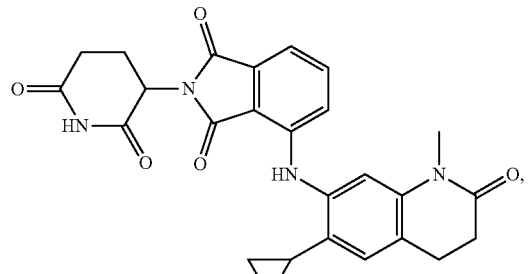

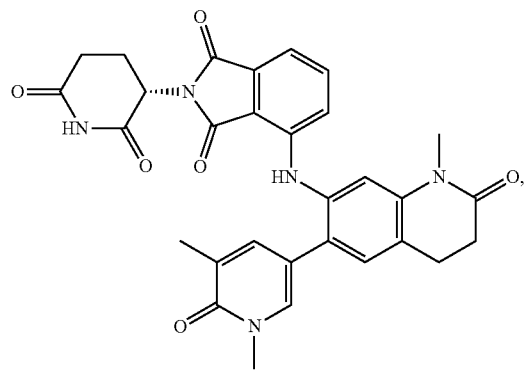

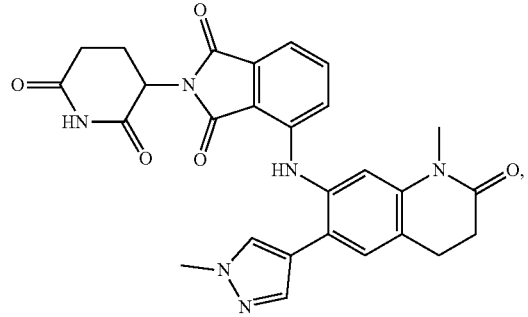

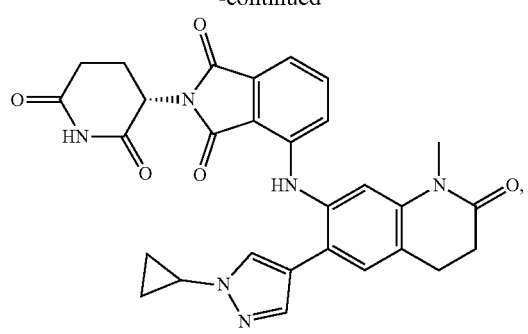
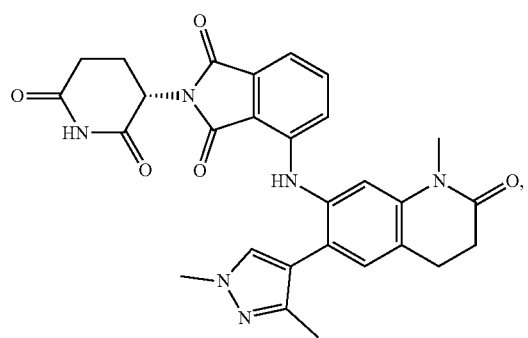
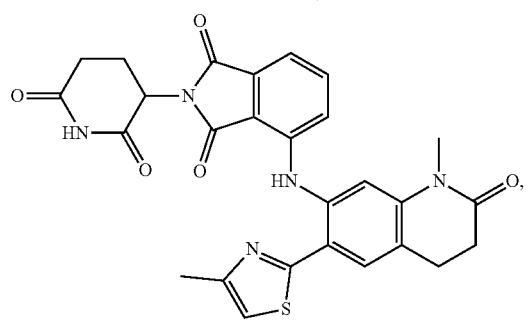
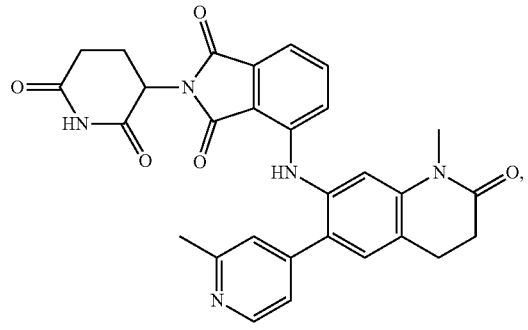
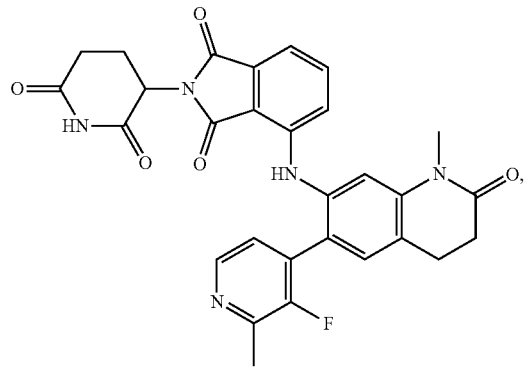 [SMILES: Cc1nccc(-c2cc3c(cc2Nc2cccc4c2C(=O)N(C2CCC(=O)NC2=O)C4=O)N(C)C(=O)CC3)c1F]
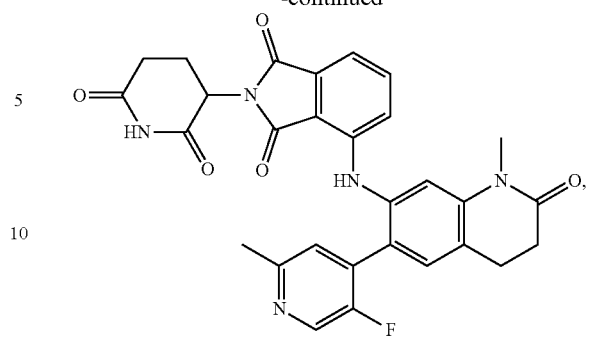
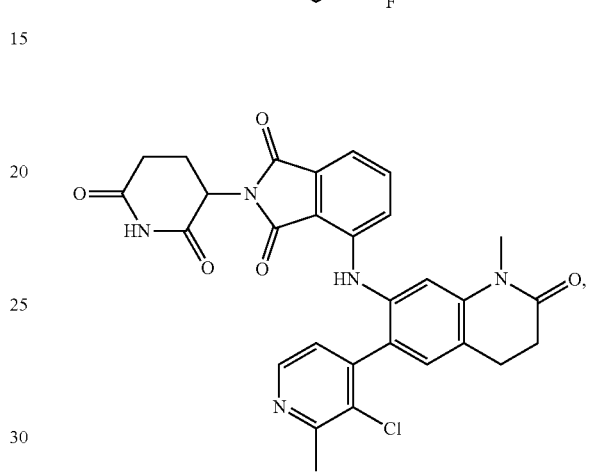
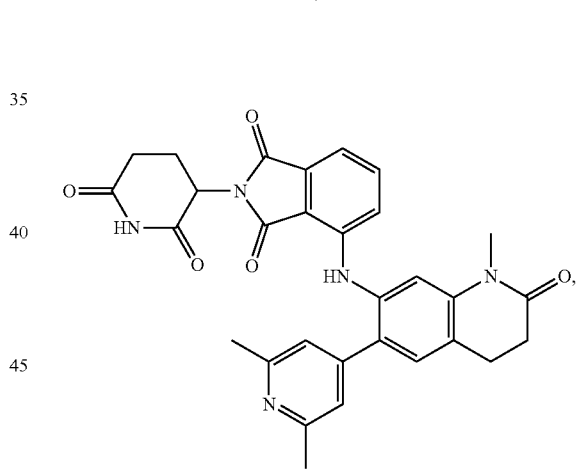
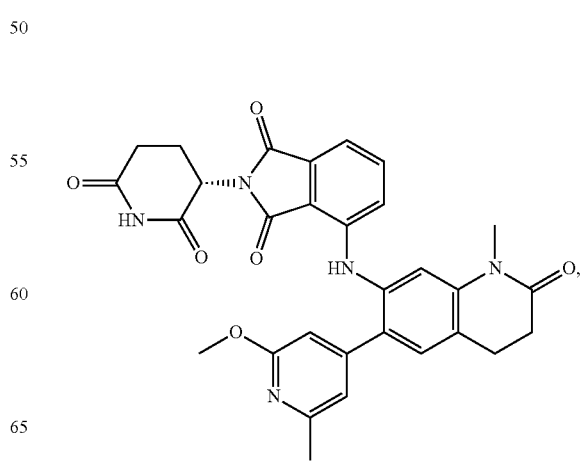

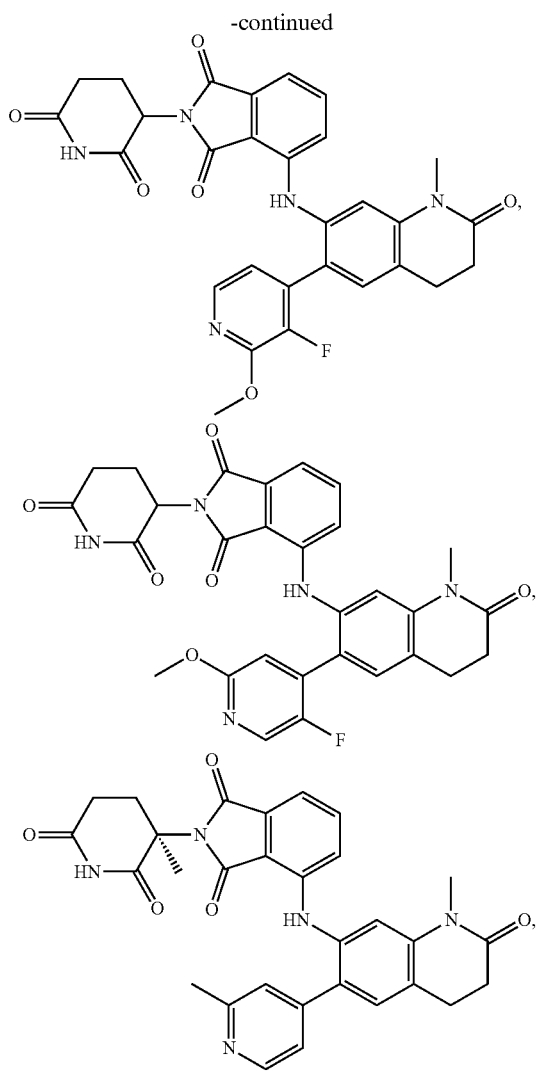

or a pharmaceutically acceptable salt, tautomer, isotopologue, or stereoisomer thereof.

In some embodiments, the compound is chosen from
4-((1,2-dimethyl-5-(2-methylpyridin-4-yl)-1H-benzo[d] imidazol-6-yl)amino)-2-(2,6-dioxopiperidin-3-yl)isoindoline-1,3-dione;
4-((1-cyclopropyl-5-(2-methylpyridin-4-yl)-1H-benzo[d] imidazol-6-yl)amino)-2-(2,6-dioxopiperidin-3-yl)isoindoline-1,3-dione;
4-((1,3-dimethyl-6-(2-methylpyridin-4-yl)-1H-indazol-5-yl)amino)-2-(2,6-dioxopiperidin-3-yl)isoindoline-1,3-dione;
2-(2,6-dioxopiperidin-3-yl)-4-((6-(2-methylpyridin-4-yl)-1-(tetrahydro-2H-pyran-4-yl)-1H-indazol-5-yl)amino) isoindoline-1,3-dione;
2-(2,6-dioxopiperidin-3-yl)-4-((5-(3-fluoro-4-methoxyphenyl)-1-methyl-1H-benzo[d]imidazol-6-yl)amino)isoindoline-1,3-dione;
2-(2,6-dioxopiperidin-3-yl)-4-((5-(2-fluoro-6-methylphenoxy)-1-methyl-1H-indazol-4-yl)amino)isoindoline-1,3-dione;
2-(2,6-dioxopiperidin-3-yl)-4-((1-methyl-5-(2-methylpyridin-4-yl)-1H-indazol-6-yl)amino)isoindoline-1,3-dione;
2-(2,6-dioxopiperidin-3-yl)-4-((3-methyl-6-(2-methylpyridin-4-yl)benzo[d]isoxazol-5-yl)amino)isoindoline-1,3-dione;
4-((6-(2-(dimethylamino)ethoxy)-4-phenoxypyridin-3-yl) amino)-2-(2,6-dioxopiperidin-3-yl)isoindoline-1,3-dione;
4-((6-cyclopropyl-1-(tetrahydro-2H-pyran-4-yl)-1H-indazol-5-yl)amino)-2-(2,6-dioxopiperidin-3-yl)isoindoline-1,3-dione;
4-((6-(2-(difluoromethyl)pyridin-4-yl)-1-(tetrahydro-2H-pyran-4-yl)-1H-indazol-5-yl)amino)-2-(2,6-dioxopiperidin-3-yl)isoindoline-1,3-dione;
2-(2,6-dioxopiperidin-3-yl)-4-((2-methoxy-4-(2-(piperidin-1-yl)ethoxy)phenyl)amino)isoindoline-1,3-dione;
4-((5-(2-chlorophenoxy)-1-(tetrahydro-2H-pyran-4-yl)-1H-indazol-4-yl)amino)-2-(2,6-dioxopiperidin-3-yl)isoindoline-1,3-dione;
2-(2,6-dioxopiperidin-3-yl)-4-((6-(3-fluoro-4-methoxyphenyl)-1-methyl-1H-indazol-5-yl)amino)isoindoline-1,3-dione;
2-(2,6-dioxopiperidin-3-yl)-4-((1-methyl-6-phenoxy-1H-indazol-5-yl)amino)isoindoline-1,3-dione;
2-(2,6-dioxopiperidin-3-yl)-4-((6-(3-fluorophenoxy)-1-(tetrahydro-2H-pyran-4-yl)-1H-indazol-5-yl)amino)isoindoline-1,3-dione;
2-(2,6-dioxopiperidin-3-yl)-4-((6-(4-fluorophenoxy)-1-methyl-1H-indazol-5-yl)amino)isoindoline-1,3-dione;
2-(2,6-dioxopiperidin-3-yl)-4-((6-methoxy-1-(tetrahydro-2H-pyran-4-yl)-1H-indazol-5-yl)amino)isoindoline-1,3-dione;
2-(2,6-dioxopiperidin-3-yl)-4-((1-methyl-6-(2-methylpyridin-4-yl)-1H-indazol-5-yl)amino)isoindoline-1,3-dione;
2-(2,6-dioxopiperidin-3-yl)-4-((4-methyl-1-(tetrahydro-2H-pyran-4-yl)-1H-indazol-5-yl)amino)isoindoline-1,3-dione;
2-(2,6-dioxopiperidin-3-yl)-4-((6-methyl-4-phenoxypyridin-3-yl)amino)isoindoline-1,3-dione;
2-(2,6-dioxopiperidin-3-yl)-4-((1-methyl-6-(tetrahydro-2H-pyran-4-yl)-1H-indazol-5-yl)amino)isoindoline-1,3-dione;
4-((1,2-dimethyl-6-(2-methylpyridin-4-yl)-1H-benzo[d] imidazol-5-yl)amino)-2-(2,6-dioxopiperidin-3-yl)isoindoline-1,3-dione;
2-(2,6-dioxopiperidin-3-yl)-4-((1-methyl-6-(6-methylpyridazin-4-yl)-1H-indazol-5-yl)amino)isoindoline-1,3-dione;
4-((6-(3-chlorophenoxy)-1-methyl-1H-indazol-5-yl) amino)-2-(2,6-dioxopiperidin-3-yl)isoindoline-1,3-dione;
2-(2,6-dioxopiperidin-3-yl)-4-((1-methyl-5-((4-methylpyrimidin-5-yl)oxy)-1H-indazol-4-yl)amino)isoindoline-1,3-dione;
2-(2,6-dioxopiperidin-3-yl)-4-((1-methyl-5-phenoxy-1H-indazol-6-yl)amino)isoindoline-1,3-dione;
2-(2,6-dioxopiperidin-3-yl)-4-((1-methyl-6-(3-(trifluoromethyl)phenyl)-1H-indazol-5-yl)amino)isoindoline-1,3-dione;
4-((6-(2,3-dimethylpyridin-4-yl)-1-methyl-1H-indazol-5-yl)amino)-2-(2,6-dioxopiperidin-3-yl)isoindoline-1,3-dione;
2-(2,6-dioxopiperidin-3-yl)-4-((6-methoxy-4-phenylpyridin-3-yl)amino)isoindoline-1,3-dione,
4-((3-(dimethylamino)-2,3-dihydro-1H-inden-5-yl)amino)-2-((S)-3-methyl-2,6-dioxopiperidin-3-yl)isoindoline-1,3-dione;
(S)-2-(2,6-dioxopiperidin-3-yl)-4-((1-methyl-6-(2-methylpyridin-4-yl)-2-oxo-1,2,3,4-tetrahydroquinolin-7-yl) amino)isoindoline-1,3-dione;
4-((1,6-dimethyl-2-oxo-1,2,3,4-tetrahydroquinolin-7-yl) amino)-2-(2,6-dioxopiperidin-3-yl)isoindoline-1,3-dione;

4-((6-cyclopropyl-1-methyl-2-oxo-1,2,3,4-tetrahydroquinolin-7-yl)amino)-2-(2,6-dioxopiperidin-3-yl)isoindoline-1,3-dione;

(S)-4-((6-(1,5-dimethyl-6-oxo-1,6-dihydropyridin-3-yl)-1-methyl-2-oxo-1,2,3,4-tetrahydroquinolin-7-yl)amino)-2-(2,6-dioxopiperidin-3-yl)isoindoline-1,3-dione;

2-(2,6-dioxopiperidin-3-yl)-4-((1-methyl-6-(1-methyl-1H-pyrazol-4-yl)-2-oxo-1,2,3,4-tetrahydroquinolin-7-yl)amino)isoindoline-1,3-dione;

(S)-4-((6-(1-cyclopropyl-1H-pyrazol-4-yl)-1-methyl-2-oxo-1,2,3,4-tetrahydroquinolin-7-yl)amino)-2-(2,6-dioxopiperidin-3-yl)isoindoline-1,3-dione;

(S)-4-((6-(1,3-dimethyl-1H-pyrazol-4-yl)-1-methyl-2-oxo-1,2,3,4-tetrahydroquinolin-7-yl)amino)-2-(2,6-dioxopiperidin-3-yl)isoindoline-1,3-dione;

2-(2,6-dioxopiperidin-3-yl)-4-((1-methyl-6-(4-methylthiazol-2-yl)-2-oxo-1,2,3,4-tetrahydroquinolin-7-yl)amino)isoindoline-1,3-dione;

(S)-4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione;

(S)-4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione;

(S)-2-(2,6-dioxopiperidin-3-yl)-4-((1-methyl-6-(2-methylpyridin-4-yl)-1H-indazol-5-yl)amino)isoindoline-1,3-dione;

2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione; 2-((S)-2,6-dioxopiperidin-3-yl)-4-((6-(2-methylpyridin-4-yl)-1-((R)-tetrahydrofuran-3-yl)-1H-indazol-5-yl)amino)isoindoline-1,3-dione;

2-(2,6-dioxopiperidin-3-yl)-4-((6-(3-fluoro-2-methylpyridin-4-yl)-1-methyl-2-oxo-1,2,3,4-tetrahydroquinolin-7-yl)amino)isoindoline-1,3-dione;

2-(2,6-dioxopiperidin-3-yl)-4-((6-(5-fluoro-2-methylpyridin-4-yl)-1-methyl-2-oxo-1,2,3,4-tetrahydroquinolin-7-yl)amino)isoindoline-1,3-dione;

4-((6-(3-chloro-2-methylpyridin-4-yl)-1-methyl-2-oxo-1,2,3,4-tetrahydroquinolin-7-yl)amino)-2-(2,6-dioxopiperidin-3-yl)isoindoline-1,3-dione;

4-((6-(2,6-dimethylpyridin-4-yl)-1-methyl-2-oxo-1,2,3,4-tetrahydroquinolin-7-yl)amino)-2-(2,6-dioxopiperidin-3-yl)isoindoline-1,3-dione;

(S)-2-(2,6-dioxopiperidin-3-yl)-4-((6-(2-methoxy-6-methylpyridin-4-yl)-1-methyl-2-oxo-1,2,3,4-tetrahydroquinolin-7-yl)amino)isoindoline-1,3-dione;

2-(2,6-dioxopiperidin-3-yl)-4-((6-(3-fluoro-2-methoxypyridin-4-yl)-1-methyl-2-oxo-1,2,3,4-tetrahydroquinolin-7-yl)amino)isoindoline-1,3-dione;

2-(2,6-dioxopiperidin-3-yl)-4-((6-(5-fluoro-2-methoxypyridin-4-yl)-1-methyl-2-oxo-1,2,3,4-tetrahydroquinolin-7-yl)amino)isoindoline-1,3-dione;

2-((R)-2,6-dioxopiperidin-3-yl)-4-((6-(2-methylpyridin-4-yl)-1-((R)-tetrahydrofuran-3-yl)-1H-indazol-5-yl)amino)isoindoline-1,3-dione;

(R)-2-(3-methyl-2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione;

2-(3-methyl-2,6-dioxopiperidin-3-yl)-4-((3-(phenoxymethyl)phenyl)amino)isoindoline-1,3-dione, or a pharmaceutically acceptable salt, tautomer, isotopologue, and/or stereoisomer thereof.

In certain embodiments, the compound is 4-((1,2-dimethyl-5-(2-methylpyridin-4-yl)-1H-benzo[d]imidazol-6-yl)amino)-2-(2,6-dioxopiperidin-3-yl)isoindoline-1,3-dione, or a pharmaceutically acceptable salt, tautomer, isotopologue, and/or stereoisomer thereof.

In certain embodiments, the compound is 4-((1-cyclopropyl-5-(2-methylpyridin-4-yl)-1H-benzo[d]imidazol-6-yl)amino)-2-(2,6-dioxopiperidin-3-yl)isoindoline-1,3-dione, or a pharmaceutically acceptable salt, tautomer, isotopologue, and/or stereoisomer thereof.

In certain embodiments, the compound is 4-((1,3-dimethyl-6-(2-methylpyridin-4-yl)-1H-indazol-5-yl)amino)-2-(2,6-dioxopiperidin-3-yl)isoindoline-1,3-dione, or a pharmaceutically acceptable salt, tautomer, isotopologue, and/or stereoisomer thereof.

In certain embodiments, the compound is 2-(2,6-dioxopiperidin-3-yl)-4-((6-(2-methylpyridin-4-yl)-1-(tetrahydro-2H-pyran-4-yl)-1H-indazol-5-yl)amino)isoindoline-1,3-dione, or a pharmaceutically acceptable salt, tautomer, isotopologue, and/or stereoisomer thereof.

In certain embodiments, the compound is 2-(2,6-dioxopiperidin-3-yl)-4-((5-(3-fluoro-4-methoxyphenyl)-1-methyl-1H-benzo[d]imidazol-6-yl)amino)isoindoline-1,3-dione, or a pharmaceutically acceptable salt, tautomer, isotopologue, and/or stereoisomer thereof.

In certain embodiments, the compound is 2-(2,6-dioxopiperidin-3-yl)-4-((5-(2-fluoro-6-methylphenoxy)-1-methyl-1H-indazol-4-yl)amino)isoindoline-1,3-dione.

In certain embodiments, the compound is 2-(2,6-dioxopiperidin-3-yl)-4-((1-methyl-5-(2-methylpyridin-4-yl)-1H-indazol-6-yl)amino)isoindoline-1,3-dione, or a pharmaceutically acceptable salt, tautomer, isotopologue, and/or stereoisomer thereof.

In certain embodiments, the compound is 2-(2,6-dioxopiperidin-3-yl)-4-((3-methyl-6-(2-methylpyridin-4-yl)benzo[d]isoxazol-5-yl)amino)isoindoline-1,3-dione.

In certain embodiments, the compound is 4-((6-(2-(dimethylamino)ethoxy)-4-phenoxypyridin-3-yl)amino)-2-(2,6-dioxopiperidin-3-yl)isoindoline-1,3-dione, or a pharmaceutically acceptable salt, tautomer, isotopologue, and/or stereoisomer thereof.

In certain embodiments, the compound is 4-((6-cyclopropyl-1-(tetrahydro-2H-pyran-4-yl)-1H-indazol-5-yl)amino)-2-(2,6-dioxopiperidin-3-yl)isoindoline-1,3-dione, or a pharmaceutically acceptable salt, tautomer, isotopologue, and/or stereoisomer thereof.

In certain embodiments, the compound is 4-((6-(2-(difluoromethyl)pyridin-4-yl)-1-(tetrahydro-2H-pyran-4-yl)-1H-indazol-5-yl)amino)-2-(2,6-dioxopiperidin-3-yl)isoindoline-1,3-dione, or a pharmaceutically acceptable salt, tautomer, isotopologue, and/or stereoisomer thereof.

In certain embodiments, the compound is 2,6-dioxopiperidin-3-yl)-4-((2-methoxy-4-(2-(piperidin-1-yl)ethoxy)phenyl)amino)isoindoline-1,3-dione, or a pharmaceutically acceptable salt, tautomer, isotopologue, and/or stereoisomer thereof.

In certain embodiments, the compound is 4-((5-(2-chlorophenoxy)-1-(tetrahydro-2H-pyran-4-yl)-1H-indazol-4-yl)amino)-2-(2,6-dioxopiperidin-3-yl)isoindoline-1,3-dione, or a pharmaceutically acceptable salt, tautomer, isotopologue, and/or stereoisomer thereof.

In certain embodiments, the compound is 4-((5-(2-chlorophenoxy)-1-(tetrahydro-2H-pyran-4-yl)-1H-indazol-4-yl)amino)-2-(2,6-dioxopiperidin-3-yl)isoindoline-1,3-dione, or a pharmaceutically acceptable salt, tautomer, isotopologue, and/or stereoisomer thereof.

In certain embodiments, the compound is (S)-2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione.

In certain embodiments, the compound is 2-(2,6-dioxopiperidin-3-yl)-4-((6-(3-fluoro-4-methoxyphenyl)-1-methyl-1H-indazol-5-yl)amino)isoindoline-1,3-dione, or a pharmaceutically acceptable salt, tautomer, isotopologue, and/or stereoisomer thereof.

In certain embodiments, the compound is 2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione.

In some embodiments, the present disclosure provides pharmaceutical compositions comprising an effective amount of a compound of formula (I), formula (I'), formula (II), formula (II'), formula (III), Table 1 or a pharmaceutically acceptable salt, tautomer, isotopologue, or stereoisomer thereof, and a pharmaceutically acceptable carrier, excipient or vehicle.

Representative compounds of formula (I), formula (I'), formula (II), formula (II'), and formula (III) are set forth in Table 1.

METHODS OF USE In some embodiments, the present disclosure provides methods of inducing HbF expression in a cell, comprising contacting a cell with a compound of formula (I), formula (I'), formula (II), formula (II'), formula (III), Table 1 or a pharmaceutically acceptable salt, tautomer, isotopologue, or stereoisomer thereof.

In some embodiments, the present disclosure provides methods of decreasing WIZ expression in a cell, comprising contacting a cell with a compound of formula (I), formula (I'), formula (II), formula (II'), formula (III), Table 1 or a pharmaceutically acceptable salt, tautomer, isotopologue, or stereoisomer thereof.

In some embodiments, the present disclosure provides methods of decreasing ZBTB7A expression in a cell, comprising contacting a cell with a compound of formula (I), formula (I'), formula (II), formula (II'), formula (III), Table 1 or a pharmaceutically acceptable salt, tautomer, isotopologue, or stereoisomer thereof.

In some embodiments, the present disclosure provides methods of inducing HbF expression in a cell, and/or decreasing ZBTB7A expression in a cell, and/or decreasing WIZ expression in a cell, comprising contacting a cell with a compound of formula (I), formula (I'), formula (II), formula (II'), formula (III), Table 1 or a pharmaceutically acceptable salt, tautomer, isotopologue, or stereoisomer thereof.

In some embodiments, the present disclosure provides methods of treating a hemoglobinopathy, comprising administering to a subject in need thereof a compound of formula (I), formula (I'), formula (II), formula (II'), formula (III), Table 1 or a pharmaceutically acceptable salt, tautomer, isotopologue, or stereoisomer thereof.

In some embodiments, the present disclosure provides use of a compound of formula (I), formula (I'), formula (II), formula (II'), formula (III), Table 1 or a pharmaceutically acceptable salt, tautomer, isotopologue, or stereoisomer thereof for the treatment of a hemoglobinopathy.

In certain embodiments, the hemoglobinopathy is anemia. In certain embodiments, the hemoglobinopathy is sickle cell disease. In certain embodiments, the hemoglobinopathy is thalassemia. In certain embodiments, the hemoglobinopathy is alpha-thalassemia. In certain embodiments, the hemoglobinopathy is beta-thalassemia.

In certain embodiments a pharmaceutical composition comprising an effective amount of a compound of formula (I), formula (I'), formula (II), formula (II'), formula (III), or Table 1, or a pharmaceutically acceptable salt, tautomer, isotopologue, or stereoisomer thereof, and a pharmaceutically acceptable carrier, excipient or vehicle are provided herein.

In certain embodiments a method of inducing HbF expression in a cell, comprising contacting a cell with a compound of formula (I), formula (I'), formula (II), formula (II'), formula (III), or Table 1 are provided herein.

In certain embodiments a method of decreasing WIZ expression, a regulator of G9a/GLP histone methyltransferases, in a cell, comprising contacting a cell with a compound of formula (I), formula (I'), formula (II), formula (II'), formula (III), or Table 1 are provided herein.

In certain embodiments a method of decreasing ZBTB7A expression in a cell, comprising contacting a cell with a compound of formula (I), formula (I'), formula (II), formula (II'), formula (III), or Table 1 are provided herein.

In certain embodiments, provided herein are methods of treating a hemoglobinopathy, wherein the method comprises administering to a subject in need thereof a compound of formula (I), formula (I'), formula (II), formula (II'), formula (III), or Table 1 or a pharmaceutical composition of a compound of formula (I), formula (I'), formula (II), formula (II'), formula (III), or Table 1.

In certain embodiments, the hemoglobinopathy is anemia.

In certain embodiments, the hemoglobinopathy is sickle cell disease.

In certain embodiments, the hemoglobinopathy is sickle cell anemia.

In certain embodiments, the hemoglobinopathy is thalassemia.

In certain embodiments, the hemoglobinopathy is alpha-thalassemia.

In certain embodiments, the hemoglobinopathy is beta-thalassemia.

In certain embodiments, provided herein are methods of treating a hemoglobinopathy, comprising administering to a subject in need thereof a compound of formula (I), formula (I'), formula (II), formula (II'), formula (III), or Table 1 or a pharmaceutical composition of a compound of formula (I), formula (I'), formula (II), formula (II'), formula (III), or Table 1 in combination with a second active agent and/or therapy. In certain embodiments, the second active agent is luspatercept. In certain embodiments, the second active agent is voxelotor. In certain embodiments, the second active agent is crizanlizumab-tmca. In certain embodiments, the second active agent is hydroxyurea. In certain embodiments, the second active agent is L-glutamine. In certain embodiments, the second active agent is etavopivat. In certain embodiments, the second active agent is mitapivat. In certain embodiments, the second active agent is osivelotor. In certain embodiments, the second active agent is inclacumab. In certain embodiments, the second therapy is a blood transfusion. In certain embodiments, the second therapy is a stem cell transplant. In certain embodiments, the second therapy is a bone marrow transplant. In certain embodiments, the second therapy is a gene therapy. In certain embodiments, the gene therapy is a CRISPR therapy. In certain embodiments, the hemoglobinopathy is anemia. In certain embodiments, the hemoglobinopathy is sickle cell disease. In certain embodiments, the hemoglobinopathy is thalassemia. In certain embodiments, the hemoglobinopathy is alpha-thalassemia. In certain embodiments, the hemoglobinopathy is beta-thalassemia.

The compounds of formula (I), formula (I'), formula (II), formula (II'), formula (III), or Table 1 have utility as pharmaceuticals to treat, prevent or improve hemoglobinopathies. The compounds provided herein have utility for use in the treatment or prevention of all diseases, disorders or conditions disclosed herein.

In one aspect, provided herein is a method of treating a disease caused by a hemoglobinopathy. In certain embodiments, a compound as described herein is used in human medical therapy, particularly in the treatment of a hemoglobinopathy.

In one aspect, provided herein is a method of treating a disease caused by a hemoglobinopathy. In certain embodiments, a compound as described herein is used in human medical therapy, particularly in the treatment of a hemoglobinopathy. In certain embodiments, the method includes administering a therapeutically effective amount of a compound as described to a subject having a disease caused by a hemoglobinopathy.

In one embodiment, provided herein is a method for the treatment or prevention of a hemoglobinopathy, the methods comprising administering to a subject an effective amount of a compound of formula (I), formula (I'), formula (II), formula (II'), formula (III), or Table 1, or a pharmaceutically acceptable salt, tautomer, isotopologue, or stereoisomer thereof. In certain embodiments, the hemoglobinopathy is anemia. In certain embodiments, the hemoglobinopathy is sickle cell disease. In certain embodiments, the hemoglobinopathy is sickle cell anemia.

In another aspect, also provided is a method of preventing a disease caused by a hemoglobinopathy. In certain embodiments, a compound of formula (I), formula (I'), formula (II), formula (II'), formula (III), or Table 1, or a pharmaceutically acceptable salt, tautomer, isotopologue, or stereoisomer thereof, is used in human medical therapy, particularly in the prevention of a hemoglobinopathy. In certain embodiments, the method includes administering a therapeutically effective amount of a compound of formula (I), formula (I'), formula (II), formula (II'), formula (III), or Table 1, or a pharmaceutically acceptable salt, tautomer, isotopologue, or stereoisomer thereof, to a subject to prevent a disease caused by a hemoglobinopathy.

Second Active Agents and Therapies

In one embodiment, the second active agent used in the methods provided herein is selected from the group consisting of luspatercept, voxelotor, crizanlizumab-tmca, hydroxyurea, L-glutamine, etavopivat, mitapivat, osivelotor and inclacumab.

In one embodiment, the second therapy used in the methods provided herein is selected from the group consisting of a blood transfusion, a stem cell and/or bone marrow transplant, and/or a gene therapy. In certain embodiments, the gene therapy is a CRISPR therapy.

Methods of Treatment and/or Prevention

In one embodiment, provided herein is a method of treating a hemoglobinopathy, which comprises administering to a patient a therapeutically effective amount of a compound of formula (I), formula (I'), formula (II), formula (II'), formula (III), or Table 1, or an enantiomer, mixture of enantiomers, tautomer, isotopolog, or pharmaceutically acceptable salt thereof, in combination with a second active agent, wherein the second active agent is selected from the group consisting of luspatercept, voxelotor, crizanlizumab-tmca, hydroxyurea, L-glutamine, etavopivat, mitapivat, osivelotor and inclacumab.

In one embodiment, provided herein is a method of treating a hemoglobinopathy, which comprises administering to a patient a therapeutically effective amount of a compound of formula (I), formula (I'), formula (II), formula (II'), formula (III), or Table 1, or an enantiomer, mixture of enantiomers, tautomer, isotopolog, or pharmaceutically acceptable salt thereof, in combination with a second therapy, wherein the second therapy is selected from the group consisting of a blood transfusion, a stem cell and/or bone marrow transplant, and/or a gene therapy. In certain embodiments, the gene therapy is a CRISPR therapy.

Pharmaceutical Compositions and Routes of Administration

Provided herein are pharmaceutical compositions comprising an effective amount of a compound of formula (I), formula (I'), formula (II), formula (II'), formula (III), or Table 1, as described herein, and a pharmaceutically acceptable carrier, excipient or vehicle. The compounds of formula (I), formula (I'), formula (II), formula (II'), formula (III), or Table 1 can be administered to a subject enterally (for example, orally, rectally), topically, or parenterally (for example, intravenously, intramuscularly, subcutaneously), in the conventional form of preparations, such as capsules, microcapsules, tablets, granules, powder, troches, pills, suppositories, injections, suspensions, syrups, patches, creams, lotions, ointments, gels, sprays, solutions and emulsions. Suitable formulations can be prepared by methods commonly employed using conventional, organic or inorganic additives, such as an excipient (e.g., sucrose, starch, mannitol, sorbitol, lactose, glucose, cellulose, talc, calcium phosphate or calcium carbonate), a binder (e.g., cellulose, methylcellulose, hydroxymethylcellulose, polypropylpyrrolidone, polyvinylpyrrolidone, gelatin, gum arabic, polyethyleneglycol, sucrose or starch), a disintegrator (e.g., starch, carboxymethylcellulose, hydroxypropylstarch, low substituted hydroxypropylcellulose, sodium bicarbonate, calcium phosphate or calcium citrate), a lubricant (e.g., magnesium stearate, light anhydrous silicic acid, talc or sodium lauryl sulfate), a flavoring agent (e.g., citric acid, menthol, glycine or orange powder), a preservative (e.g., sodium benzoate, sodium bisulfite, methylparaben or propylparaben), a stabilizer (e.g., citric acid, sodium citrate or acetic acid), a suspending agent (e.g., methylcellulose, polyvinyl pyrrolidone or aluminum stearate), a dispersing agent (e.g., hydroxypropylmethylcellulose), a diluent (e.g., water), a cosolvent (e.g., propylene glocyl/glycofurol), a buffer, a copolymer (e.g., poly(lactic-co-glycolic acid, i.e PLGA), and base wax (e.g., cocoa butter, white petrolatum or polyethylene glycol). The effective amount of a compound of formula (I), formula (I'), formula (II), formula (II'), formula (III), or Table 1 in the pharmaceutical composition may be at a level that will exercise the desired effect; for example, about 0.005 mg/kg of a subject's body weight to about 20 mg/kg of a subject's body weight in unit dosage for both oral and parenteral administration.

The dose of a compound of formula (I), formula (I'), formula (II), formula (II'), formula (III), or Table 1 to be administered to a subject is rather widely variable and can be subject to the judgment of a health-care practitioner. In general, the compounds of formula (I), formula (I'), formula (II), formula (II'), formula (III), or Table 1 can be administered one to four times a day in a dose of about 0.5 mg/kg of a subject's body weight to about 20 mg/kg of a subject's body weight in a subject, but the above dosage may be properly varied depending on the age, body weight and medical condition of the subject and the type of administration. In one embodiment, the dose is about 0.1 mg/kg of a subject's body weight to about 3 mg/kg of a subject's body weight, about 0.5 mg/kg of a subject's body weight to about 2 mg/kg of a subject's body weight, about 1 mg/kg of a subject's body weight to about 2 mg/kg of a subject's body weight or about 1.5 mg/kg of a subject's body weight to about 2 mg/kg of a subject's body weight. In one embodiment, the dose is about 1 mg/kg of a subject's body weight to about 3 mg/kg of a subject's body weight. In one embodiment, the dose is about 0.5 mg/kg of a subject's body weight to about 1 mg/kg of a subject's body weight. In one embodiment, the dose is about 1 mg/kg of a subject's body weight to about 2 mg/kg of a subject's body weight. In one embodiment, the dose is about 1.5, 1.6, 1.7, 1.8, 1.9, 2.0, 2.1, 2.2, 2.3, 2.4, 2.5, 2.6, 2.7, 2.8, 2.9, 3.0 mg/kg of a subject's body weight. In one embodiment, one dose is given per day. In any given case, the amount of the compound of formula (I), formula (I'), formula (II), formula (II'), formula (III), or Table 1 administered will depend on such factors as the solubility of the active component, the formulation used and the route of administration. In one embodiment, application of a topical concentration provides intracellular exposures or concentrations of about 0.01-10 μM.

In another embodiment, provided herein are methods for the treatment or prevention of a disease or disorder comprising the administration of about 1 mg/day to about 1200 mg/day of a compound of formula (I), formula (I'), formula (II), formula (II'), formula (III), or Table 1, to a subject affected by a hemoglobinopathy. In another embodiment, provided herein are methods for the treatment or prevention of a disease or disorder comprising the administration of about 0.375 mg/day to about 750 mg/day, about 0.75 mg/day to about 375 mg/day, about 3.75 mg/day to about 75 mg/day, about 7.5 mg/day to about 55 mg/day or about 18 mg/day to about 37 mg/day of a compound of formula (I), formula (I'), formula (II), formula (II'), formula (III), or Table 1 to a subject affected by a hemoglobinopathy. In one embodiment, the methods for the treatment of a disease or disorder comprise the administration of about 0.375 mg/day to about 750 mg/day of a compound of formula (I), formula (I'), formula (II), formula (II'), formula (III), or Table 1 to a subject affected by a hemoglobinopathy. In one embodiment, the methods for the treatment of a disease or disorder comprise the administration of about 3.75 mg/day to about 75 mg/day of a compound of formula (I), formula (I'), formula (II), formula (II'), formula (III), or Table 1 to a subject affected a hemoglobinopathy.

In another embodiment, provided herein are unit dosage formulations that comprise between about 1 mg and 200 mg, about 35 mg and about 1400 mg, about 125 mg and about 1000 mg, about 250 mg and about 1000 mg, or about 500 mg and about 1000 mg of a compound of formula (I), formula (I'), formula (II), formula (II'), formula (III), or Table 1. In one embodiment, the unit dosage formulations comprise between about 1 mg and 200 mg of a compound of formula (I), formula (I'), formula (II), formula (II'), formula (III), or Table 1. In one embodiment, the unit dosage formulations comprise between about 35 mg and about 1400 mg of a compound of formula (I), formula (I'), formula (II), formula (II'), formula (III), or Table 1. In one embodiment, the unit dosage formulations comprise between about 125 mg and about 1000 mg of a compound of formula (I), formula (I'), formula (II), formula (II'), formula (III), or Table 1. In one embodiment, the unit dosage formulations comprise between about 250 mg and about 1000 mg of a compound of formula (I), formula (I'), formula (II), formula (II'), formula (III), or Table 1. In one embodiment, the unit dosage formulations comprise between about 500 mg and about 1000 mg of a compound of formula (I), formula (I'), formula (II), formula (II'), formula (III), or Table 1.

In a particular embodiment, provided herein are unit dosage formulations comprising about 100 mg or 400 mg of a compound of formula (I), formula (I'), formula (II), formula (II'), formula (III), or Table 1.

In another embodiment, provided herein are unit dosage formulations that comprise 1 mg, 5 mg, 10 mg, 15 mg, 20 mg, 30 mg, 35 mg, 40 mg, 50 mg, 70 mg, 100 mg, 125 mg, 130 mg, 140 mg, 175 mg, 200 mg, 250 mg, 280 mg, 350 mg, 500 mg, 560 mg, 700 mg, 750 mg, 1000 mg or 1400 mg of a compound of formula (I), formula (I'), formula (II), formula (II'), formula (III), or Table 1. In one embodiment, the unit dosage formulations comprise 1 mg of a compound of formula (I), formula (I'), formula (II), formula (II'), formula (III), or Table 1. In one embodiment, the unit dosage formulations comprise 5 mg of a compound of formula (I), formula (I'), formula (II), formula (II'), formula (III), or Table 1. In one embodiment, the unit dosage formulations comprise 10 mg of a compound of formula (I), formula (I'), formula (II), formula (II'), formula (III), or Table 1. In one embodiment, the unit dosage formulations comprise 15 mg of a compound of formula (I), formula (I'), formula (II), formula (II'), formula (III), or Table 1. In one embodiment, the unit dosage formulations comprise 20 mg of a compound of formula (I), formula (I'), formula (II), formula (II'), formula (III), or Table 1. In one embodiment, the unit dosage formulations comprise 25 mg of a compound of formula (I), formula (I'), formula (II), formula (II'), formula (III), or Table 1. In one embodiment, the unit dosage formulations comprise 30 mg of a compound of formula (I), formula (I'), formula (II), formula (II'), formula (III), or Table 1. In one embodiment, the unit dosage formulations comprise 35 mg of a compound of formula (I), formula (I'), formula (II), formula (II'), formula (III), or Table 1. In one embodiment, the unit dosage formulations comprise 40 mg of a compound of formula (I), formula (I'), formula (II), formula (II'), formula (III), or Table 1. In one embodiment, the unit dosage formulations comprise 50 mg of a compound of formula (I), formula (I'), formula (II), formula (II'), formula (III), or Table 1. In one embodiment, the unit dosage formulations comprise 70 mg of a compound of formula (I), formula (I'), formula (II), formula (II'), formula (III), or Table 1. In one embodiment, the unit dosage formulations comprise 100 mg of a compound of formula (I), formula (I'), formula (II), formula (II'), formula (III), or Table 1. In one embodiment, the unit dosage formulations comprise 125 mg of a compound of formula (I), formula (I'), formula (II), formula (II'), formula (III), or Table 1. In one embodiment, the unit dosage formulations comprise 130 mg of a compound of formula (I), formula (I'), formula (II), formula (II'), formula (III), or Table 1. In one embodiment, the unit dosage formulations comprise 140 mg of a compound of formula (I), formula (I'), formula (II), formula (II'), formula (III), or Table 1. In one embodiment, the unit dosage formulations comprise 175 mg of a compound of formula (I), formula (I'), formula (II), formula (II'), formula (III), or Table 1. In one embodiment, the unit dosage formulations comprise 200 mg of a compound of formula (I), formula (I'), formula (II), formula (II'), formula (III), or Table 1. In one embodiment, the unit dosage formulations comprise 250 mg of a compound of formula (I), formula (I'), formula (II), formula (II'), formula (III), or Table 1. In one embodiment, the unit dosage formulations comprise 280 mg of a compound of formula (I), formula (I'), formula (II), formula (II'), formula (III), or Table 1. In one embodiment, the unit dosage formulations comprise 350 mg of a compound of formula (I), formula (I'), formula (II), formula (II'), formula (III), or Table 1. In one embodiment, the unit dosage formulations comprise 500 mg of a compound of formula (I), formula (I'), formula (II), formula (II'), formula (III), or Table 1. In one embodiment, the unit dosage formulations comprise 560 mg of a compound of formula (I), formula (I'), formula (II), formula (II'), formula (III), or Table 1. In one embodiment, the unit dosage formulations comprise 700 mg of a compound of formula (I), formula (I'), formula (II), formula (II'), formula (III), or Table 1. In one embodiment, the unit dosage formulations comprise 750 mg of a compound of formula (I), formula (I'), formula (II), formula (II'), formula (III), or Table 1. In one embodiment, the unit dosage formulations comprise 1000 mg of a compound of formula (I), formula (I'), formula (II), formula (II'), formula (III), or Table 1. In one embodiment, the unit dosage formulations comprise 1400 mg of a compound of formula (I), formula (I'), formula (II), formula (II'), formula (III), or Table 1.

A compound of formula (I), formula (I'), formula (II), formula (II'), formula (III), or Table 1 can be administered once, twice, three, four or more times daily. In a particular embodiment, doses of 600 mg or less are administered as a once daily dose and doses of more than 600 mg are administered twice daily in an amount equal to one half of the total daily dose.

A compound of formula (I), formula (I'), formula (II), formula (II'), formula (III), or Table 1 can be administered orally for reasons of convenience. In one embodiment, when administered orally, a compound of formula (I), formula (I'), formula (II), formula (II'), formula (III), or Table 1 is administered with a meal and water. In another embodiment, the compound of formula (I), formula (I'), formula (II), formula (II'), formula (III), or Table 1 is dispersed in water or juice (e.g., apple juice or orange juice) and administered orally as a suspension.

The compound of formula (I), formula (I'), formula (II), formula (II'), formula (III), or Table 1 can also be administered intradermally, intramuscularly, intraperitoneally, percutaneously, intravenously, subcutaneously, intranasally, epidurally, sublingually, intracerebrally, intravaginally, transdermally, rectally, mucosally, by inhalation, topically to the ears, nose, eyes, or skin, or by local ocular (i.e., subconjunctival, intravitreal, retrobulbar, intracameral). The mode of administration is left to the discretion of the healthcare practitioner, and can depend in-part upon the site of the medical condition.

In one embodiment, provided herein are capsules containing a compound of formula (I), formula (I'), formula (II), formula (II'), formula (III), or Table 1 without an additional carrier, excipient or vehicle.

In another embodiment, provided herein are compositions comprising an effective amount of a compound of formula (I), formula (I'), formula (II), formula (II'), formula (III), or Table 1 and a pharmaceutically acceptable carrier or vehicle, wherein a pharmaceutically acceptable carrier or vehicle can comprise an excipient, diluent, or a mixture thereof. In one embodiment, the composition is a pharmaceutical composition.

The compositions can be in the form of tablets, chewable tablets, capsules, solutions, parenteral solutions, troches, suppositories, suspensions, gels, intra-ruminal devices (e.g., for prolonged prophylaxis or controlled release), implants, topical pour-ons, transdermal delivery gels, spot-ons, implants (including devices, gels, liquids (e.g., PLGA), and the like. Compositions can be formulated to contain a daily dose, or a convenient fraction of a daily dose, in a dosage unit, which may be a single tablet or capsule or convenient volume of a liquid. In one embodiment, the solutions are prepared from water-soluble salts, such as the hydrochloride salt. In general, all of the compositions are prepared according to known methods in pharmaceutical chemistry. Capsules can be prepared by mixing a compound of formula (I), formula (I'), formula (II), formula (II'), formula (III) or Table 1 with a suitable carrier or diluent and filling the proper amount of the mixture in capsules. The usual carriers and diluents include, but are not limited to, inert powdered substances such as starch of many different kinds, powdered cellulose, especially crystalline and microcrystalline cellulose, sugars such as fructose, mannitol and sucrose, grain flours and similar edible powders.

Tablets can be prepared by direct compression, by wet granulation, or by dry granulation. Their formulations usually incorporate diluents, binders, lubricants and disintegrators as well as the compound. Typical diluents include, for example, various types of starch, lactose, mannitol, kaolin, calcium phosphate or sulfate, inorganic salts such as sodium chloride and powdered sugar. Powdered cellulose derivatives are also useful. Typical tablet binders are substances such as starch, gelatin and sugars such as lactose, fructose, glucose and the like. Natural and synthetic gums are also convenient, including acacia, alginates, methylcellulose, polyvinylpyrrolidine and the like. Polyethylene glycol, ethylcellulose and waxes can also serve as binders.

A lubricant might be necessary in a tablet formulation to prevent the tablet and punches from sticking in the dye. The lubricant can be chosen from such slippery solids as talc, magnesium and calcium stearate, stearic acid and hydrogenated vegetable oils. Tablet disintegrators are substances that swell when wetted to break up the tablet and release the compound. They include starches, clays, celluloses, algins and gums. More particularly, corn and potato starches, methylcellulose, agar, bentonite, wood cellulose, powdered natural sponge, cation-exchange resins, alginic acid, guar gum, citrus pulp and carboxymethyl cellulose, for example, can be used as well as sodium lauryl sulfate. Tablets can be coated with sugar as a flavor and sealant, or with film-forming protecting agents to modify the dissolution properties of the tablet. The compositions can also be formulated as chewable tablets, for example, by using substances such as mannitol in the formulation.

The effect of a compound of formula (I), formula (I'), formula (II), formula (II'), formula (III) or Table 1 can be delayed or prolonged by proper formulation. For example, a slowly soluble pellet of a compound of formula (I), formula (I'), formula (II), formula (II'), formula (III) or Table 1 can be prepared and incorporated in a tablet or capsule, or as a slow-release implantable device. The technique also includes making pellets of several different dissolution rates and filling capsules with a mixture of the pellets. Tablets or capsules can be coated with a film that resists dissolution for a predictable period of time. Even the parenteral preparations can be made long-acting, by dissolving or suspending a compound of formula (I), formula (I'), formula (II), formula (II'), formula (III), or Table 1 in oily or emulsified vehicles, or adding amounts of PLGA, that allow it to disperse slowly in the serum.

Embodiments of the Present Disclosure Include

1. A compound according to Formula (I):

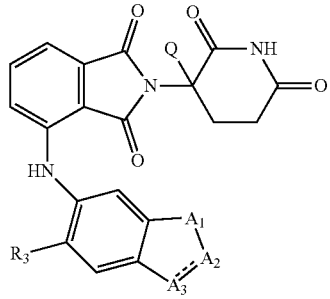

(I)

and pharmaceutically acceptable salts, tautomers, isotopologues, and stereoisomers thereof,
wherein:
------ is a single or double bond;
$A_1$ is $NR^1$, O, or $CR_2$;
$A_2$ is $NR^1$, C=O, or $CR_2$;
$A_3$ is $NR^1$, O, or $CR_2$;
each $R_1$ is independently absent, H, a substituted or unsubstituted alkyl, a substituted or unsubstituted cyclylalkyl, or a substituted or unsubstituted heterocyclylalkyl;
each $R_2$ is independently H, an amine, or a substituted or unsubstituted alkyl;
each $R_3$ is independently H, a substituted or unsubstituted alkyl, a cycloalkyl, —O—$R_4$, $CH_2$—R', a substituted or unsubstituted aryl, a substituted or unsubstituted heteroaryl, or a substituted 3,4-Dihydro-2(1H)-quinolinone;
$R_4$ is a substituted or unsubstituted aryl, or a substituted or unsubstituted heteroaryl;
R' is a cycloalkyl; and
Q is H or $CH_3$.
2. The compound of embodiment 1, wherein ------ is a single bond.
3. The compound of embodiment 1, wherein ------ is a double bond.
4. The compound of any one of embodiments 1-3, wherein $A_1$ is $NR^1$.
5. The compound of any one of embodiments 1-4, wherein $A_2$ is $NR^1$.
6. The compound of any one of embodiments 1-5, wherein $A_3$ is $NR^1$.
7. The compound of any one of embodiments 1-6, wherein $R_1$ is $CH_3$.
8. The compound of any one of embodiments 1-6, wherein $A_2$ is $CR_2$.
9. The compound of any one of embodiments 1-8, $R_2$ is H.
10. The compound of any one of embodiments 1-8, $R_2$ is $CH_3$.
11. The compound of any one of embodiments 1-10, wherein $R_3$ is $CH_2$—R' and R' is a $C_1$-$C_6$ substituted or unsubstituted alkyl or a $C_3$-$C_6$ substituted or unsubstituted cycloalkyl.
12. The compound of embodiment 11, wherein R' is cyclopropyl.

13. The compound of any one of embodiments 1-12, wherein $R_3$ is:

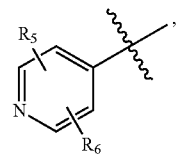

wherein:
$R_5$ is H, a substituted or unsubstituted alkyl, or an alkoxy; and
$R_6$ is H, a halogen, or a substituted or unsubstituted alkyl.
14. The compound of embodiment 13, wherein $R_5$ is $CH_3$.
15. The compound of any one of embodiments 13-14, wherein $R_6$ is a halo alkyl.
16. A compound according to Formula (II):

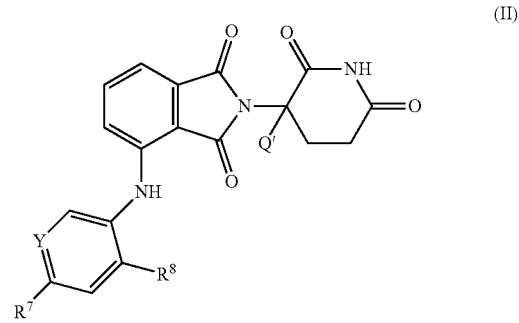

(II)

and pharmaceutically acceptable salts, tautomers, isotopologues, and stereoisomers thereof,
wherein:
Q' is H or $CH_3$;
Y is CH or N;
$R_7$ is H, O—$R_9$, a substituted or unsubstituted aryl, or a substituted or unsubstituted alkyl,
$R_8$ is H, O—$R_{10}$, or a substituted or unsubstituted aryl;
$R_9$ is a substituted or unsubstituted alkyl, an aryl, $CH_2CH_2N(CH_3)_2$, or $CH_2CH_2$—$R_{11}$;
$R_{10}$ is a substituted or unsubstituted alkyl, or a substituted or unsubstituted aryl; and
$R_{11}$ is piperidinyl.
17. The compound of embodiment 16, wherein Y is CH.
18. The compound of embodiment 16, wherein Y is N.
19. The compound of any one of embodiments 16-18, wherein $R_7$ is $CH_3$.
20. The compound of any one of embodiments 16-18, wherein $R_{10}$ is $CH_3$.
21. The compound of any one of embodiments 16-18, wherein $R_{10}$ is aryl.
22. The compound of any one of embodiments 16-18, wherein $R_{10}$ is phenyl.
23. The compound of any one of embodiments 16-18, wherein $R_{10}$ is a substituted phenyl.

24. A compound according to Formula (III):

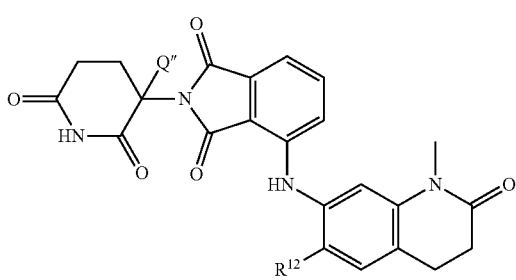

(III)

and pharmaceutically acceptable salts, tautomers, isotopologues, and stereoisomers thereof,
wherein:
Q" is H or $CH_3$.
$R_{12}$ is a substituted or unsubstituted pyridyl, a substituted or unsubstituted alkyl, a substituted or unsubstituted heterocyclyl, or a substituted or unsubstituted $C_3$-$C_6$ cycloalkyl.

25. The compound of embodiment 24, wherein Q" is H.
26. The compound of embodiment 24, wherein Q" is $CH_3$.
27. The compound of any one of embodiments 24-26, wherein $R_{12}$ is $CH_3$.
28. The compound of any one of embodiments 24-26, wherein $R_{12}$ is cyclopropyl.
29. The compound of any one of embodiments 24-26, wherein $R_{12}$ is selected from a substituted or unsubstituted thiazole, or a substituted or unsubstituted pyrazole.
30. The compound of any one of embodiments 24-26, wherein $R_{12}$ is:

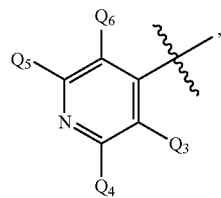

wherein
$Q_3$ is selected from H, Cl, or F;
$Q_4$ is selected from H, $CH_3$, or $CH(F)_2$;
$Q_5$ is selected from H, $CH_3$, or $OCH_3$; and
$Q_6$ is selected from H or F.
31. The compound of embodiment 30, wherein $Q_3$ is F.
32. The compound of any one of embodiments 30-31, wherein $Q_5$ is $OCH_3$.
33. The compound of any one of embodiments 30-31, wherein $Q_5$ is $CH_3$.
34. The compound of embodiment 30, wherein $Q_3$ is H, $Q_4$ is H, $Q_5$ is $CH_3$, and $Q_6$ is H.
35. The compound of embodiment 30, wherein $Q_3$ is H, $Q_4$ is $CH(F)_2$, $Q_5$ is H, and $Q_6$ is H.
36. The compound of embodiment 30, wherein $Q_3$ is F, $Q_4$ is $CH_3$, $Q_5$ is H, and $Q_6$ is H.
37. The compound of embodiment 30, wherein $Q_3$ is F, $Q_4$ is H, $Q_5$ is $CH_3$, and $Q_6$ is H.
38. The compound of embodiment 30, wherein $Q_3$ is Cl, $Q_4$ is $CH_3$, $Q_5$ is H, and $Q_6$ is H.
39. The compound of embodiment 30, wherein $Q_3$ is H, $Q_4$ is $CH_3$, $Q_5$ is $CH_3$, and $Q_6$ is H.
40. The compound of embodiment 30, wherein $Q_3$ is H, $Q_4$ is $CH_3$, $Q_5$ is $OCH_3$, and $Q_6$ is H.
41. The compound of embodiment 30, wherein $Q_3$ is F, $Q_4$ is H, $Q_5$ is $OCH_3$, and $Q_6$ is H.
42. The compound of embodiment 30, wherein $Q_3$ is F, $Q_4$ is $OCH_3$, $Q_5$ is H, and $Q_6$ is H.
43. A pharmaceutical composition comprising an effective amount of a compound of any one of embodiments 1-42, or a pharmaceutically acceptable salt, tautomer, isotopologue, or stereoisomer thereof, and a pharmaceutically acceptable carrier, excipient or vehicle.
44. A method of inducing HbF expression in a cell, comprising contacting a cell with a compound or pharmaceutical composition of any one of embodiments 1-43.
45. A method of decreasing WIZ expression in a cell, comprising contacting a cell with a compound or pharmaceutical composition of any one of embodiments 1-43.
46. A method of decreasing ZBTB7A expression in a cell, comprising contacting a cell with a compound or pharmaceutical composition of any one of embodiments 1-43.
47. A method of inducing HbF expression in a cell, and/or decreasing ZBTB7A expression in a cell, and/or decreasing WIZ expression in a cell, comprising contacting a cell with a compound or pharmaceutical composition of any one of embodiments 1-43.
48. A method of treating a hemoglobinopathy, comprising administering to a subject in need thereof a compound or pharmaceutical composition of any one of embodiments 1 to 43.
49. The method of embodiment 48, wherein the hemoglobinopathy is anemia.
50. The method of embodiment 48, wherein the hemoglobinopathy is sickle cell disease.
51. The method of embodiment 48, wherein the hemoglobinopathy is thalassemia.
52. The method of embodiment 48, wherein the hemoglobinopathy is alpha-thalassemia.
53. The method of embodiment 48, wherein the hemoglobinopathy is beta-thalassemia.
54. Use of a compound or pharmaceutical composition of any one of embodiments 1 to 43 for the treatment of a hemoglobinopathy.
55. The use of embodiment 54, wherein the hemoglobinopathy is anemia.
56. The use of embodiment 54, wherein the hemoglobinopathy is sickle cell disease.
57. The use of embodiment 54, wherein the hemoglobinopathy is thalassemia.
58. The use of embodiment 54, wherein the hemoglobinopathy is alpha-thalassemia.
59. The use of embodiment 54, wherein the hemoglobinopathy is beta-thalassemia.

EXAMPLES

The following Examples are presented by way of illustration, not limitation. Compounds are named using the automatic name generating tool provided in Chemdraw Ultra 20.1 (Cambridgesoft), which generates systematic names for chemical structures, with support for the Cahn-Ingold-Prelog rules for stereochemistry. One skilled in the art can modify the procedures set forth in the illustrative examples to arrive at the desired products.

Provided herein are compounds of Formula (I), Formula (II), and Formula (III) as described in the below table:

TABLE 1

| Compound No. | Structure | Name |
|---|---|---|
| 1 | | 4-((1,2-dimethyl-5-(2-methylpyridin-4-yl)-1H-benzo[d]imidazol-6-yl)amino)-2-(2,6-dioxopiperidin-3-yl)isoindoline-1,3-dione |
| 2 | | 4-((1-cyclopropyl-5-(2-methylpyridin-4-yl)-1H-benzo[d]imidazol-6-yl)amino)-2-(2,6-dioxopiperidin-3-yl)isoindoline-1,3-dione |
| 3 | | 4-((1,3-dimethyl-6-(2-methylpyridin-4-yl)-1H-indazol-5-yl)amino)-2-(2,6-dioxopiperidin-3-yl)isoindoline-1,3-dione |
| 4 | | 2-(2,6-dioxopiperidin-3-yl)-4-((6-(2-methylpyridin-4-yl)-1-(tetrahydro-2H-pyran-4-yl)-1H-indazol-5-yl)amino)isoindoline-1,3-dione |

TABLE 1-continued

| Compound No. | Structure | Name |
|---|---|---|
| 5 | | 2-(2,6-dioxopiperidin-3-yl)-4-((5-(3-fluoro-4-methoxyphenyl)-1-methyl-1H-benzo[d]imidazol-6-yl)amino)isoindoline-1,3-dione |
| 6 | | 2-(2,6-dioxopiperidin-3-yl)-4-((5-(2-fluoro-6-methylphenoxy)-1-methyl-1H-indazol-4-yl)amino)isoindoline-1,3-dione |
| 7 | | 2-(2,6-dioxopiperidin-3-yl)-4-((1-methyl-5-(2-methylpyridin-4-yl)-1H-indazol-6-yl)amino)isoindoline-1,3-dione |
| 8 | | 2-(2,6-dioxopiperidin-3-yl)-4-((3-methyl-6-(2-methylpyridin-4-yl)benzo[d]isoxazol-5-yl)amino)isoindoline-1,3-dione |

TABLE 1-continued

| Compound No. | Structure | Name |
|---|---|---|
| 9 | | 4-((6-(2-(dimethylamino)ethoxy)-4-phenoxypyridin-3-yl)amino)-2-(2,6-dioxopiperidin-3-yl)isoindoline-1,3-dione |
| 10 | | 4-((6-cyclopropyl-1-(tetrahydro-2H-pyran-4-yl)-1H-indazol-5-yl)amino)-2-(2,6-dioxopiperidin-3-yl)isoindoline-1,3-dione |
| 11 | | 4-((6-(2-(difluoromethyl)pyridin-4-yl)-1-(tetrahydro-2H-pyran-4-yl)-1H-indazol-5-yl)amino)-2-(2,6-dioxopiperidin-3-yl)isoindoline-1,3-dione |
| 12 | | 2-(2,6-dioxopiperidin-3-yl)-4-((2-methoxy-4-(2-(piperidin-1-yl)ethoxy)phenyl)amino)isoindoline-1,3-dione |

TABLE 1-continued

| Compound No. | Structure | Name |
|---|---|---|
| 13 | | 4-((5-(2-chlorophenoxy)-1-(tetrahydro-2H-pyran-4-yl)-1H-indazol-4-yl)amino)-2-(2,6-dioxopiperidin-3-yl)isoindoline-1,3-dione |
| 14 | | 2-(2,6-dioxopiperidin-3-yl)-4-((6-(3-fluoro-4-methoxyphenyl)-1-methyl-1H-indazol-5-yl)amino)isoindoline-1,3-dione |
| 15 | | 2-(2,6-dioxopiperidin-3-yl)-4-((1-methyl-6-phenoxy-1H-indazol-5-yl)amino)isoindoline-1,3-dione |

TABLE 1-continued

| Compound No. | Structure | Name |
|---|---|---|
| 16 | | 2-(2,6-dioxopiperidin-3-yl)-4-((6-(3-fluorophenoxy)-1-(tetrahydro-2H-pyran-4-yl)-1H-indazol-5-yl)amino)isoindoline-1,3-dione |
| 17 | | 2-(2,6-dioxopiperidin-3-yl)-4-((6-(4-fluorophenoxy)-1-methyl-1H-indazol-5-yl)amino)isoindoline-1,3-dione |
| 18 | | 2-(2,6-dioxopiperidin-3-yl)-4-((6-methoxy-1-(tetrahydro-2H-pyran-4-yl)-1H-indazol-5-yl)amino)isoindoline-1,3-dione |
| 19 | | 2-(2,6-dioxopiperidin-3-yl)-4-((1-methyl-6-(2-methylpyridin-4-yl)-1H-indazol-5-yl)amino)isoindoline-1,3-dione |

TABLE 1-continued

| Compound No. | Structure | Name |
| --- | --- | --- |
| 20 | | 2-(2,6-dioxopiperidin-3-yl)-4-((4-methyl-1-(tetrahydro-2H-pyran-4-yl)-1H-indazol-5-yl)amino)isoindoline-1,3-dione |
| 21 | | 2-(2,6-dioxopiperidin-3-yl)-4-((6-methyl-4-phenoxypyridin-3-yl)amino)isoindoline-1,3-dione |
| 22 | | 2-(2,6-dioxopiperidin-3-yl)-4-((1-methyl-6-(tetrahydro-2H-pyran-4-yl)-1H-indazol-5-yl)amino)isoindoline-1,3-dione |
| 23 | | 4-((1,2-dimethyl-6-(2-methylpyridin-4-yl)-1H-benzo[d]imidazol-5-yl)amino)-2-(2,6-dioxopiperidin-3-yl)isoindoline-1,3-dione |

TABLE 1-continued

| Compound No. | Structure | Name |
|---|---|---|
| 24 | | 2-(2,6-dioxopiperidin-3-yl)-4-((1-methyl-6-(6-methylpyridazin-4-yl)-1H-indazol-5-yl)amino)isoindoline-1,3-dione |
| 25 | | 4-((6-(3-chlorophenoxy)-1-methyl-1H-indazol-5-yl)amino)-2-(2,6-dioxopiperidin-3-yl)isoindoline-1,3-dione |
| 26 | | 2-(2,6-dioxopiperidin-3-yl)-4-((1-methyl-5-((4-methylpyrimidin-5-yl)oxy)-1H-indazol-4-yl)amino)isoindoline-1,3-dione |
| 27 | | 2-(2,6-dioxopiperidin-3-yl)-4-((1-methyl-5-phenoxy-1H-indazol-6-yl)amino)isoindoline-1,3-dione |

TABLE 1-continued

| Compound No. | Structure | Name |
|---|---|---|
| 28 | | 2-(2,6-dioxopiperidin-3-yl)-4-((1-methyl-6-(3-(trifluoromethyl)phenyl)-1H-indazol-5-yl)amino)isoindoline-1,3-dione |
| 29 | | 4-((6-(2,3-dimethylpyridin-4-yl)-1-methyl-1H-indazol-5-yl)amino)-2-(2,6-dioxopiperidin-3-yl)isoindoline-1,3-dione |
| 30 | | 2-(2,6-dioxopiperidin-3-yl)-4-((6-methoxy-4-phenylpyridin-3-yl)amino)isoindoline-1,3-dione |
| 31 | | 4-((3-(dimethylamino)-2,3-dihydro-1H-inden-5-yl)amino)-2-((S)-3-methyl-2,6-dioxopiperidin-3-yl)isoindoline-1,3-dione |

TABLE 1-continued

| Compound No. | Structure | Name |
| --- | --- | --- |
| 32 | | (S)-2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione |
| 33 | | 4-((1,6-dimethyl-2-oxo-1,2,3,4-tetrahydroquinolin-7-yl)amino)-2-(2,6-dioxopiperidin-3-yl)isoindoline-1,3-dione |
| 34 | | 4-((6-cyclopropyl-1-methyl-2-oxo-1,2,3,4-tetrahydroquinolin-7-yl)amino)-2-(2,6-dioxopiperidin-3-yl)isoindoline-1,3-dione |
| 35 | | (S)-4-((6-(1,5-dimethyl-6-oxo-1,6-dihydropyridin-3-yl)-1-methyl-2-oxo-1,2,3,4-tetrahydroquinolin-7-yl)amino)-2-(2,6-dioxopiperidin-3-yl)isoindoline-1,3-dione |

TABLE 1-continued

| Compound No. | Structure | Name |
|---|---|---|
| 36 | | 2-(2,6-dioxopiperidin-3-yl)-4-((1-methyl-6-(1-methyl-1H-pyrazol-4-yl)-2-oxo-1,2,3,4-tetrahydroquinolin-7-yl)amino)isoindoline-1,3-dione |
| 37 | | (S)-4-((6-(1-cyclopropyl-1H-pyrazol-4-yl)-1-methyl-2-oxo-1,2,3,4-tetrahydroquinolin-7-yl)amino)-2-(2,6-dioxopiperidin-3-yl)isoindoline-1,3-dione |
| 38 | | (S)-4-((6-(1,3-dimethyl-1H-pyrazol-4-yl)-1-methyl-2-oxo-1,2,3,4-tetrahydroquinolin-7-yl)amino)-2-(2,6-dioxopiperidin-3-yl)isoindoline-1,3-dione |
| 39 | | 2-(2,6-dioxopiperidin-3-yl)-4-((1-methyl-6-(4-methylthiazol-2-yl)-2-oxo-1,2,3,4-tetrahydroquinolin-7-yl)amino)isoindoline-1,3-dione |

TABLE 1-continued

| Compound No. | Structure | Name |
|---|---|---|
| 40 | | (S)-4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione |
| 41 | | (S)-4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione |
| 42 | | (S)-2-(2,6-dioxopiperidin-3-yl)-4-((1-methyl-6-(2-methylpyridin-4-yl)-1H-indazol-5-yl)amino)isoindoline-1,3-dione |
| 43 | | 2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione |

TABLE 1-continued

| Compound No. | Structure | Name |
| --- | --- | --- |
| 44 | | 2-((S)-2,6-dioxopiperidin-3-yl)-4-((6-(2-methylpyridin-4-yl)-1-((R)-tetrahydrofuran-3-yl)-1H-indazol-5-yl)amino)isoindoline-1,3-dione |
| 45 | | 2-(2,6-dioxopiperidin-3-yl)-4-((6-(3-fluoro-2-methylpyridin-4-yl)-1-methyl-2-oxo-1,2,3,4-tetrahydroquinolin-7-yl)amino)isoindoline-1,3-dione |
| 46 | | 2-(2,6-dioxopiperidin-3-yl)-4-((6-(5-fluoro-2-methylpyridin-4-yl)-1-methyl-2-oxo-1,2,3,4-tetrahydroquinolin-7-yl)amino)isoindoline-1,3-dione |
| 47 | | 4-((6-(3-chloro-2-methylpyridin-4-yl)-1-methyl-2-oxo-1,2,3,4-tetrahydroquinolin-7-yl)amino)-2-(2,6-dioxopiperidin-3-yl)isoindoline-1,3-dione |

TABLE 1-continued

| Compound No. | Structure | Name |
|---|---|---|
| 48 | | 4-((6-(2,6-dimethylpyridin-4-yl)-1-methyl-2-oxo-1,2,3,4-tetrahydroquinolin-7-yl)amino)-2-(2,6-dioxopiperidin-3-yl)isoindoline-1,3-dione |
| 49 | | (S)-2-(2,6-dioxopiperidin-3-yl)-4-((6-(2-methoxy-6-methylpyridin-4-yl)-1-methyl-2-oxo-1,2,3,4-tetrahydroquinolin-7-yl)amino)isoindoline-1,3-dione |
| 50 | | 2-(2,6-dioxopiperidin-3-yl)-4-((6-(3-fluoro-2-methoxypyridin-4-yl)-1-methyl-2-oxo-1,2,3,4-tetrahydroquinolin-7-yl)amino)isoindoline-1,3-dione |
| 51 | | 2-(2,6-dioxopiperidin-3-yl)-4-((6-(5-fluoro-2-methoxypyridin-4-yl)-1-methyl-2-oxo-1,2,3,4-tetrahydroquinolin-7-yl)amino)isoindoline-1,3-dione |

TABLE 1-continued

| Compound No. | Structure | Name |
|---|---|---|
| 52 | | 2-((R)-2,6-dioxopiperidin-3-yl)-4-((6-(2-methylpyridin-4-yl)-1-((R)-tetrahydrofuran-3-yl)-1H-indazol-5-yl)amino)isoindoline-1,3-dione |
| 53 | | (R)-2-(3-methyl-2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione |
| 54 | | 2-(3-methyl-2,6-dioxopiperidin-3-yl)-4-((3-(phenoxymethyl)phenyl)amino)isoindoline-1,3-dione |

The compounds disclosed herein can be made using conventional organic syntheses and commercially available starting materials. Certain compounds of formula (I), formula (I'), formula (II), formula (II'), and formula (III) are prepared as described in the examples below:

Example 1: 2-(2,6-dioxopiperidin-3-yl)-4-((1-methyl-6-phenoxy-1H-indazol-5yl)amino)isoindoline-1,3-dione

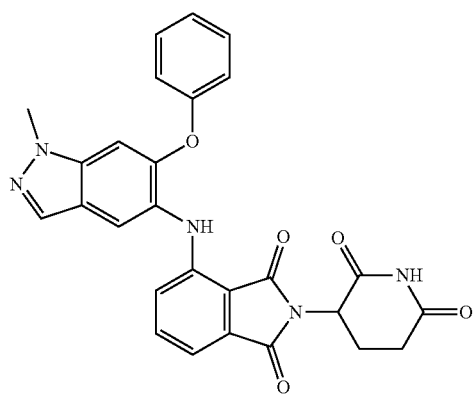 [SMILES: Cn1ncc2cc(Nc3cccc4c3C(=O)N(C3CCC(=O)NC3=O)C4=O)c(Oc3ccccc3)cc21]

6-bromo-1-methyl-5-nitro-1H-indazole

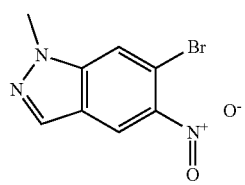

To a solution of 4-bromo-2-fluoro-5-nitrobenzaldehyde (0.500 g, 2.02 mmol) in propan-2-ol (2 mL)/Water (1 mL) was added potassium carbonate (0.420 g, 3.04 mmol). The mixture was stirred at 41° C. for 1 h and methylhydrazine (0.350 g, 3.04 mmol) (40% purity) was added dropwise. The resulting mixture was heated to 77° C. and stirred for 6 h. The mixture was cooled to 20° C. and water (8 mL) was added. The mixture was stirred for 1 h and filtered. The isolated solid was rinsed with water (2 mL) and filtered. The isolated solid was mixed with water (20 mL) and lyophilized to give 6-bromo-1-methyl-5-nitro-1H-indazole (0.470 g, 1.84 mmol, 91.045% yield). $^1$H NMR (400 MHz, DMSO-$d_6$) δ 8.61 (s, 1H), 8.32 (d, J=1.2 Hz, 2H), 4.11 (s, 3H).

1-methyl-5-nitro-6-phenoxy-1H-indazole

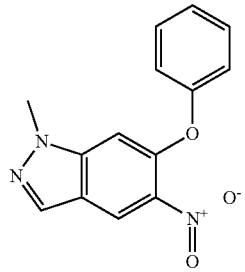

To a solution of 6-bromo-1-methyl-5-nitro-1H-indazole (0.470 g, 1.84 mmol) in N,N-dimethylformamide (5 mL) was added phenol (0.180 g, 1.91 mmol) and cesium carbonate (1.492 g, 4.59 mmol). The resulting mixture was stirred at 100° C. for 36 h. The mixture was diluted with water (30 mL) and extracted with ethyl acetate (30 mL×3). The combined organic layers were washed with brine (20 mL×3), dried over sodium sulfate, and filtered. The filtrate was concentrated under reduced pressure. The resulting crude residue was purified by silica gel column chromatography (petroleum ether:ethyl acetate) to give 1-methyl-5-nitro-6-phenoxy-1H-indazole (0.330 g, 1.22 mmol, 66% yield). $^1$H NMR (400 MHz, DMSO-$d_6$) δ 8.59 (s, 1H), 8.33 (s, 1H), 7.55 (s, 1H), 7.42-7.38 (m, 2H), 7.18-7.14 (m, 1H), 7.04 (dd, J=0.8 Hz, 7.6 Hz, 2H), 4.02 (s, 3H); MS (ESI) m/z: 270.0 [M+1]$^+$.

1-methyl-6-phenoxy-1H-indazol-5-amine

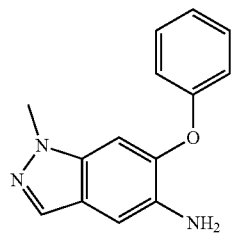

To a solution of 1-methyl-5-nitro-6-phenoxy-1H-indazole (0.260 g, 0.97 mmol) in methanol (50 mL) was added dry palladium on carbon (0.070 g, 0.66 mmol). The resulting mixture was stirred under 15 psi of hydrogen at 20° C. for 3 h. The mixture was diluted with methanol (50 mL) and filtered. The filtrate was concentrated under reduced pressure by water pump. The residue was purified by silica gel column chromatography (ethyl acetate/petroleum ether) to give 1-methyl-6-phenoxy-1H-indazol-5-amine (0.200 g, 0.84 mmol, 86% yield). $^1$H NMR (400 MHz, DMSO-$d_6$) δ 7.75 (d, J=0.8 Hz, 1H), 7.37-7.35 (m, 2H), 7.11 (d, J=7.2 Hz, 1H), 7.07 (s, 1H), 7.00 (d, J=0.8 Hz, 1H), 6.98 (d, J=7.6 Hz, 2H), 4.69 (s, 2H), 3.85 (s, 3H); MS (ESI) m/z: 240.1 [M+1]$^+$.

2-(2,6-dioxopiperidin-3-yl)-4-((1-methyl-6-phenoxy-1H-indazol-5-yl)amino)isoindoline-1,3-dione

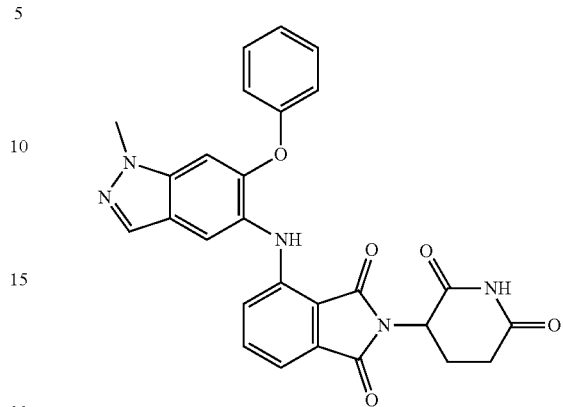

To a solution of 1-methyl-6-phenoxy-1H-indazol-5-amine (0.120 g, 0.50 mmol) in 1,4-Dioxane (5 mL) was added 4-bromo-2-(2,6-dioxopiperidin-3-yl)isoindoline-1,3-dione (0.205 g, 0.61 mmol), XPhos-Pd-G2 (0.040 g, 0.05 mmol) and potassium carbonate (0.208 g, 1.51 mmol). The resulting mixture was stirred under nitrogen at 110° C. for 12 h. The mixture was diluted with dichloromethane and filtered. The filtrate was concentrated under reduced pressure. The residue was purified by prep-TLC (petroleum ether:ethyl acetate) to give crude product (0.100 g). The crude was dissolved in N,N-dimethylformamide (2 mL) and filtered. The mixture was purified by prep-HPLC (ACN/water) to give 2-(2,6-dioxopiperidin-3-yl)-4-((1-methyl-6-phenoxy-1H-indazol-5-yl)amino)isoindoline-1,3-dione (44.6 mg, 0.090 mmol, 17% yield). $^1$H NMR (400 MHz, DMSO-$d_6$) δ 11.11 (s, 1H), 8.19 (s, 1H), 8.05 (s, 1H), 7.94 (s, 1H), 7.60 (dd, J=7.2 Hz, 8.4 Hz, 1H), 7.35-7.31 (m, 3H), 7.29 (d, J=8.4 Hz, 1H), 7.20 (d, J=6.8 Hz, 1H), 7.12-7.08 (m, 1H), 6.98-6.96 (m, 2H), 5.08 (dd, J=5.2 Hz, 12.8 Hz, 1H), 3.97 (s, 3H), 2.88-2.85 (m, 1H), 2.62-2.57 (m, 1H), 2.47-2.46 (m, 1H), 2.05-2.02 (m, 1H); MS (ESI) m/z: 496.2 [M+1]$^+$.

Example 2: 2-(2,6-dioxopiperidin-3-yl)-4-((6-(4-fluorophenoxy)-1-methyl-1H-indazol-5-yl)amino)isoindoline-1,3-dione

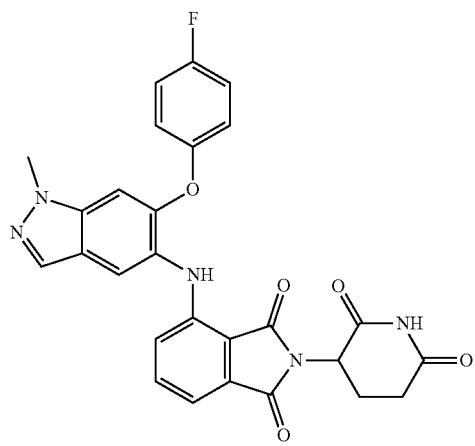 [SMILES: Cn1ncc2cc(Nc3cccc4c3C(=O)N(C3CCC(=O)NC3=O)C4=O)c(Oc3ccc(F)cc3)cc21]

6-(4-fluorophenoxy)-1-methyl-5-nitro-1H-indazole

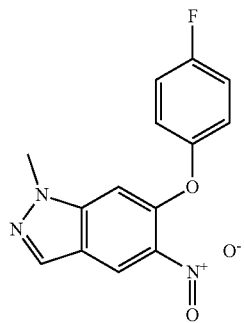

To a solution of 4-fluorophenol (0.219 g, 1.95 mmol) in N,N-dimethylformamide (10 mL) was added sodium hydride (0.047 g, 1.95 mmol). The mixture was stirred at 25° C. for 0.5 hour. 6-bromo-1-methyl-5-nitro-1H-indazole (0.250 g, 0.98 mmol), 2-(dimethylamino)acetic acid (0.010 g, 0.10 mmol) and cuprous iodide (0.0371 g, 0.20 mmol) were added, and the mixture was purged with nitrogen for 2 min and stirred at 120° C. for 12 h in a sealed tube. The mixture was filtered and concentrated. The residue was purified by prep-TLC (petroleum ether:ethyl acetate) to afford 6-(4-fluorophenoxy)-1-methyl-5-nitro-1H-indazole (0.150 g, 0.52 mmol, 53% yield). MS (ESI) m/z: 288.3 [M+1]$^+$

6-(4-fluorophenoxy)-1-methyl-1H-indazol-5-amine

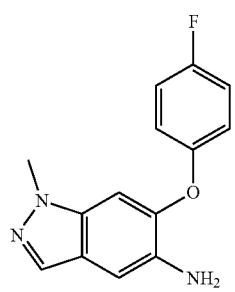 [SMILES: Cn1ncc2cc(N)c(Oc3ccc(F)cc3)cc21]

To a solution of 6-(4-fluorophenoxy)-1-methyl-5-nitro-1H-indazole (0.150 g, 0.52 mmol) in acetic acid (1 mL) and water (1 mL) was added ferrum (0.117 g, 2.09 mmol). The mixture was stirred at 40° C. for 12 h. The mixture was filtered and concentrated. The residue was purified by prep-TLC on silica gel (petroleum ether:ethyl acetate) to afford 6-(4-fluorophenoxy)-1-methyl-1H-indazol-5-amine (0.080 g, 0.31 mmol, 59% yield). $^1$H NMR (400 MHz, CDCl$_3$) δ 7.77 (s, 1H), 7.06 (m, 7.08-7.05, 5H), 6.70 (s, 1H), 3.90 (s, 3H); MS (ESI) m/z: 258.1 [M+1]$^+$.

2-(2,6-dioxopiperidin-3-yl)-4-((6-(4-fluorophenoxy)-1-methyl-1H-indazol-5-yl)amino)isoindoline-1,3-dione

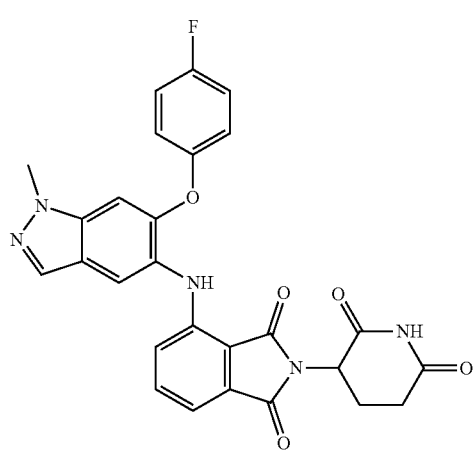 [SMILES: Cn1ncc2cc(Nc3cccc4c3C(=O)N(C3CCC(=O)NC3=O)C4=O)c(Oc3ccc(F)cc3)cc21]

To a solution of 4-bromo-2-(2,6-dioxopiperidin-3-yl)isoindoline-1,3-dione (0.060 g, 0.18 mmol) and 6-(4-fluorophenoxy)-1-methyl-1H-indazol-5-amine (0.046 g, 0.18 mmol) in 1,4-dioxane (1 mL) was added potassium carbonate (0.074 g, 0.53 mmol) and Chloro(2-dicyclohexylphosphino-2,4,6-triisopropyl-1,1-biphenyl)[2-(2-amino-1,1-biphenyl)]palladium(II) (0.014 g, 0.02 mmol). The mixture was stirred at 110° C. for 12 h under nitrogen. The mixture was filtered and concentrated. The residue was purified by prep-HPLC. The organic solvent was removed and the preparative liquid phase was lyophilized to afford 2-(2,6-dioxopiperidin-3-yl)-4-((6-(4-fluorophenoxy)-1-methyl-1H-indazol-5-yl)amino)isoindoline-1,3-dione (0.050 g, 0.10 mmol, 54% yield). The crude residue was dissolved in dichloromethane (5 mL) and purified by prep-TLC (petroleum ether:ethyl acetate). The mixture was filtered and concentrated. The solid was dissolved in acetonitrile (10 mL) and water (15 mL). The preparative liquid phase was lyophilized to afford 2-(2,6-dioxopiperidin-3-yl)-4-((6-(4-fluorophenoxy)-1-methyl-1H-indazol-5-yl)amino)isoindoline-1,3-dione (28 mg, 0.054 mmol, 55% yield) and 2-(2,6-dioxopiperidin-3-yl)-4-((6-(4-fluorophenoxy)-1-methyl-1H-indazol-5-yl)amino)isoindoline-1,3-dione (2.4 mg, 0.004 mmol, 4% yield). $^1$H NMR (400 MHz, DMSO-d$_6$) δ 11.11 (s, 1H), 8.20 (s, 1H), 8.04 (d, J=0.8 Hz, 1H), 7.91 (s, 1H), 7.58 (dd, J=7.6 Hz, 8.8 Hz, 1H), 7.27-7.23 (m, 2H), 7.20-7.14 (m, 3H), 7.03-7.00 (m, 2H), 5.11-5.06 (m, 1H), 3.96 (s, 3H), 2.93-2.84 (m, 1H), 2.61-2.54 (m, 2H), 2.07-1.99 (m, 1H); MS (ESI) m/z: 514.2 [M+1]$^+$.

Example 3: 2-(2,6-dioxopiperidin-3-yl)-4-((6-methoxy-4-phenylpyridin-3-yl)amino) isoindoline-1,3-dione

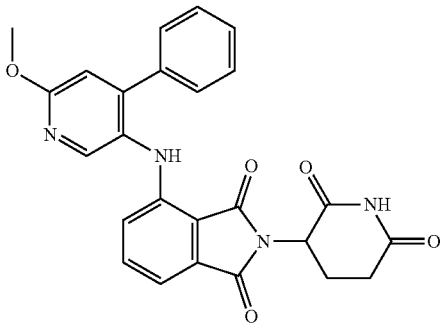 [SMILES: COc1cc(-c2ccccc2)c(Nc2cccc3c2C(=O)N(C2CCC(=O)NC2=O)C3=O)cn1]

2-chloro-5-nitro-4-phenyl-pyridine

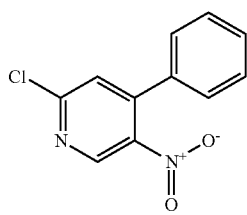 [SMILES: O=[N+]([O-])c1cnc(Cl)cc1-c1ccccc1]

To a deoxygenated solution of 2,4-dichloro-5-nitro-pyridine (0.40 g, 2.07 mmol) in 1,4-Dioxane (10 mL) and Water (2 mL) was added phenylboronic acid (0.252 g, 2.07 mmol), potassium carbonate (0.858 g, 6.22 mmol) and (1,1'-bis(diphenylphosphino)ferrocene)palladium(II) dichloride (0.169 g, 0.2100 mmol). The resulting mixture was heated at 60° C. under nitrogen for 18 h. The mixture was cooled and partitioned between water (50 mL) and ethyl acetate (30 mL×3). The combined organic layers were dried over sodium sulfate and concentrated, and the residue was purified by silica gel column chromatography (petroleum ether: ethyl acetate) to give 2-chloro-5-nitro-4-phenyl-pyridine (350 mg, 1.49 mmol, 71% yield). $^1$H NMR (400 MHz, CDCl$_3$) δ 8.92 (s, 1H), 7.53-7.51 (m, 3H), 7.47 (s, 1H), 7.37-7.35 (m, 2H); MS (ESI) m/z: 235.4 [M+1]$^+$.

2-methoxy-5-nitro-4-phenylpyridine

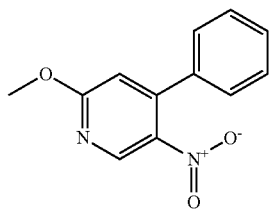 [SMILES: COc1cc(-c2ccccc2)c([N+](=O)[O-])cn1]

To a solution of 2-chloro-5-nitro-4-phenyl-pyridine (0.20 g, 0.8500 mmol) in methanol (10 mL) was added sodium methoxide (0.13 g, 2.56 mmol). The solution was stirred at 25° C. for 12 h. The reaction liquid was concentrated under reduced pressure, and the obtained residue was purified by silica gel column chromatography (8:1 to 4:1 petroleum ether:ethyl acetate) to obtain the 2-methoxy-5-nitro-4-phenyl-pyridine (150 mg, 0.651 mmol, 76% yield). $^1$H NMR (400 MHz, CDCl$_3$) δ 8.85 (s, 1H), 7.80-7.45 (m, 3H), 7.32-7.31 (m, 2H), 6.74 (s, 1H), 4.06 (s, 3H); MS (ESI) m/z: 231.0 [M+1]$^+$.

6-methoxy-4-phenylpyridin-3-amine

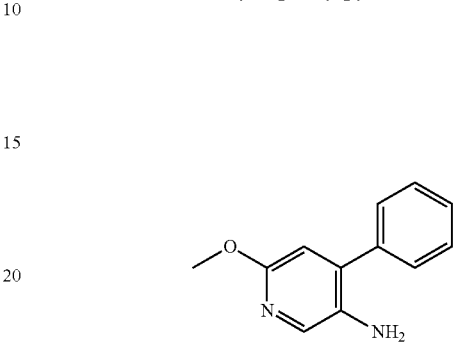

To a solution of 2-methoxy-5-nitro-4-phenyl-pyridine (0.150 g, 0.6500 mmol) in methanol (10 mL) was added wet palladium on active carbonate (0.03 g). The suspension was degassed under nitrogen. The solution was stirred at 25° C. under hydrogen (15 psi) for 12 h. The suspension was filtered and the filtrate was concentrated to afford 6-methoxy-4-phenyl-pyridin-3-amine (130 mg, 0.64 mmol, 99% yield). MS (ESI) m/z: 269.5 [M+1]$^+$ 2-(2,6-dioxopiperidin-3-yl)-4-((6-methoxy-4-phenylpyridin-3-yl)amino) isoindoline-1,3-dione

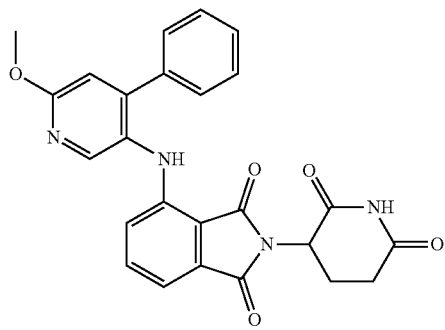 [SMILES: COc1cc(-c2ccccc2)c(Nc2cccc3c2C(=O)N(C2CCC(=O)NC2=O)C3=O)cn1]

To a solution of 6-methoxy-4-phenyl-pyridin-3-amine (0.10 g, 0.50 mmol) and 4-bromo-2-(2,6-dioxo-3-piperidyl)isoindoline-1,3-dione (0.168 g, 0.500 mmol) in 1,4-Dioxane (5 mL) was added chloro(2-dicyclohexylphosphino-2,4,6-triisopropyl-1,1-biphenyl)[2-(2-amino-1,1-biphenyl)]palladium(II) (0.019 g, 0.020 mmol) and potassium carbonate (0.206 g, 1.500 mmol) under nitrogen. The suspension was degassed under vacuum and purged with nitrogen several times. The reaction mixture was stirred at 110° C. for 12 hours. The suspension was filtered and the filtrate was concentrated and the residue was purified by prep-HPLC. The result solution and then lyophilized and the crude product was purified by prep-TLC to afford 2-(2,6-dioxo-3-piperidyl)-4-[(6-methoxy-4-phenyl-3-pyridyl)amino]isoindoline-1,3-dione (150 mg, 0.330 mmol, 66% yield). 1H NMR (400 MHz, DMSO-d$_6$) δ 11.10 (s, 1H), 8.23 (s, 1H), 8.19 (s, 1H), 7.53-7.52 (m, 1H), 7.51-7.34 (m, 4H), 7.04 (d, J=6.8 Hz, 1H), 6.91 (s, 1H), 6.67 (d, J=6.8 Hz, 1H), 5.08-5.04 (m, 1H), 3.93 (s, 3H), 2.91-2.90 (m, 1H), 2.60-2.58 (m, 2H), 2.08-2.04 (m, 1H); MS (ESI) m/z: 457.2 [M+1]$^+$.

Example 4: 2-(2,6-dioxopiperidin-3-yl)-4-((6-methyl-4-phenoxypyridin-3-yl)amino)isoindoline-1,3-dione 2-(2,6-dioxo-3-piperidyl)-4-[(6-methyl-4-phenoxy-3-pyridyl)amino]isoindoline-1,3-dione

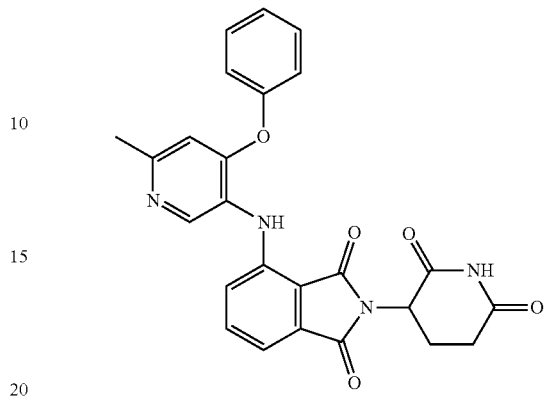

To a solution of 5-bromo-2-methyl-4-phenoxy-pyridine (0.060 g, 0.23 mmol) and 4-amino-2-(2,6-dioxo-3-piperidyl)isoindoline-1,3-dione (0.062 g, 0.23 mmol) in 1,4-Dioxane (1 mL) was added chloro(2-dicyclohexylphosphino-2,4,6-triisopropyl-1,1-biphenyl)[2-(2-amino-1,1-biphenyl)]palladium(II) (0.018 g, 0.02 mmol) and potassium carbonate (0.031 g, 0.23 mmol). The mixture was stirred at 110° C. for 12 hours under nitrogen. The mixture was filtered and concentrated. The residue was purified by prep-TLC on silica gel (petroleum ether:ethyl acetate) to afford 2-(2,6-dioxo-3-piperidyl)-4-[(6-methyl-4-phenoxy-3-pyridyl)amino]isoindoline-1,3-dione (29 mg, 0.06 mmol, 27% yield). $^1$H NMR (400 MHz, DMSO-d$_6$) δ 11.13 (s, 1H), 8.78 (s, 1H), 8.73 (s, 1H), 7.71 (t, J=7.8 Hz, 1H), 7.56-7.52 (m, 2H), 7.40-7.36 (m, 3H), 7.27 (d, J=8.4 Hz, 2H), 6.98 (s, 1H), 5.12 (dd, J=5.2, 12.8 Hz, 1H), 2.94-2.85 (m, 1H), 2.62-2.56 (m, 2H), 2.55 (s, 3H), 2.07-2.03 (m, 1H); MS (ESI) m/z: 456.9 [M+1]$^+$.

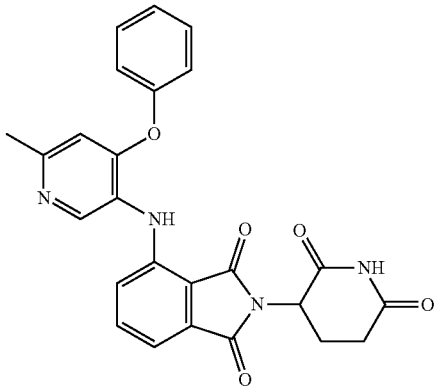 [SMILES: Cc1cc(Oc2ccccc2)c(Nc2cccc3c2C(=O)N(C2CCC(=O)NC2=O)C3=O)cn1]

5-bromo-2-methyl-4-phenoxy-pyridine

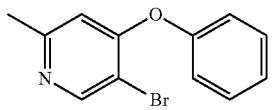

To a solution of phenol (0.040 g, 0.43 mmol) in N-methyl pyrrolidone (1.5 mL) was added cesium carbonate (0.345 g, 1.06 mmol) and 5-bromo-4-chloro-2-methyl-pyridine (0.105 g, 0.51 mmol). The mixture was stirred at 90° C. for 4 h. The reaction mixture was diluted with water (10 mL) and extracted with ethyl acetate (12 mL×3). The combined organic layer was washed with brine (10 mL×2), dried over anhydrous sodium sulfate and filtered. The filtrate was concentrated in vacuo and the resulting residue was purified by prep-TLC on silica gel (petroleum ether:ethyl acetate) to afford 5-bromo-2-methyl-4-phenoxy-pyridine (0.080 g, 0.30 mmol, 71% yield). $^1$H NMR (400 MHz, CDCl$_3$) δ 8.62 (s, 1H), 7.52-7.48 (m, 2H), 7.35 (t, J=7.2 Hz, 1H), 7.14 (d, J=7.6 Hz, 2H), 6.53 (s, 1H), 2.53 (s, 3H); MS (ESI) m/z: 264.0 [M+1]$^+$.

Example 5: 4-((6-(2-(dimethylamino)ethoxy)-4-phenoxypyridin-3-yl)amino)-2-(2,6-dioxopiperidin-3-yl)isoindoline-1,3-dione

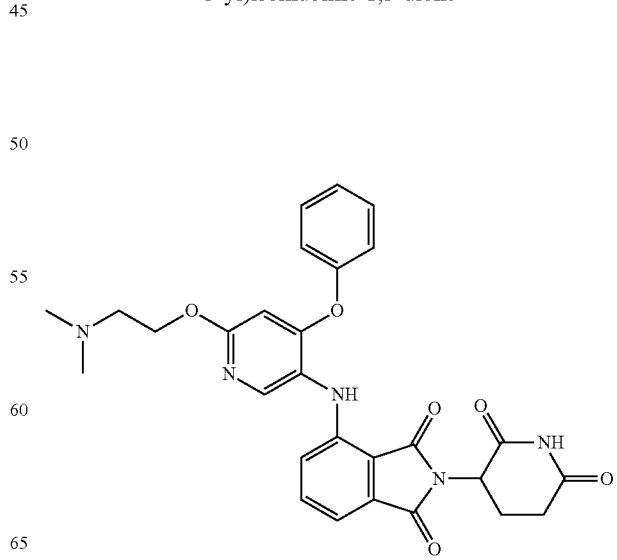

2-((4-chloro-5-nitropyridin-2-yl)oxy)-N,N-dimethyl-ethanamine

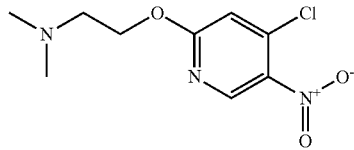 [SMILES: CN(C)CCOc1cc(Cl)c([N+](=O)[O-])cn1]

To a solution of 4-chloro-5-nitro-pyridin-2-ol (1.50 g, 8.59 mmol) in tetrahydrofuran (30 mL) was added 2-chloro-N,N-dimethyl-ethanamine hydrochloride (1.857 g, 12.89 mmol) and silver carbonate (7.11 g, 25.78 mmol). The mixture was stirred at 15° C. for 12 h. The mixture was concentrated under reduced pressure. The residue was diluted with water (20 mL) and dichloromethane (50 mL) and the mixture was filtered. The organic layer of the filtrate was dried over anhydrous sodium sulfate, filtered and concentrated under reduced pressure to give 2-((4-chloro-5-nitropyridin-2-yl)oxy)-N,N-dimethylethanamine (0.10 g, 0.41 mmol, 5% yield). $^1$H NMR (400 MHz, CDCl$_3$) δ 8.67 (s, 1H), 6.67 (s, 1H), 4.09-4.02 (m, 2H), 2.69-2.60 (m, 2H), 2.29 (s, 6H); MS (ESI) m/z 246.1 [M+1]$^+$.

N,N-dimethyl-2-((5-nitro-4-phenoxypyridin-2-yl)oxy)ethanamine

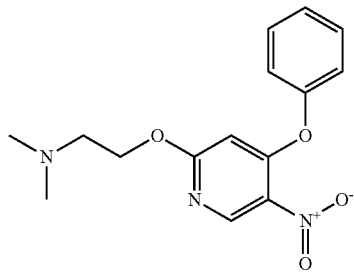 [SMILES: CN(C)CCOc1cc(Oc2ccccc2)c([N+](=O)[O-])cn1]

To a solution of 2-((4-chloro-5-nitropyridin-2-yl)oxy)-N,N-dimethylethanamine (0.090 g, 0.37 mmol) in N,N-dimethylformamide (1 mL) was added dropwise a solution of phenoxysodium (0.064 g, 0.55 mmol) in N,N-dimethylformamide (1 mL) at 0° C. The mixture was stirred at 15° C. for 2 h. The mixture was filtered and the filtrate was purified by prep-HPLC. The mixture was evaporated to remove the organic phase and the water phase was lyophilized to give N,N-dimethyl-2-[(5-nitro-4-phenoxy-2-pyridyl)oxy]ethanamine (0.013 g, 0.04 mmol, 12% yield). $^1$H NMR (400 MHz, CDCl$_3$) δ 8.87 (s, 1H), 7.50-7.45 (m, 2H), 7.36-7.31 (m, 1H), 7.17-7.13 (m, 2H), 6.11 (s, 1H), 4.72-4.34 (m, 2H), 3.10-2.59 (m, 2H), 2.57-2.18 (m, 6H); MS (ESI) m/z 304.1 [M+1].

6-(2-(dimethylamino)ethoxy)-4-phenoxypyridin-3-amine

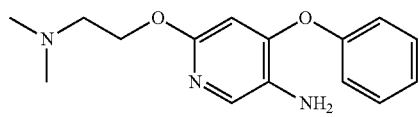 [SMILES: CN(C)CCOc1cc(Oc2ccccc2)c(N)cn1]

To a solution of N,N-dimethyl-2-[(5-nitro-4-phenoxy-2-pyridyl)oxy]ethanamine (0.013 g, 0.04 mmol) in methanol (5 mL) was added palladium active/carbon catalyst (0.010 g, 0.05 mmol) under nitrogen. The suspension was degassed under vacuum and purged with nitrogen several times. The mixture was stirred at 15° C. for 12 h under hydrogen (15 Psi). The mixture was filtered and the filtrate was concentrated under reduced pressure. The crude product was used directly for next step without purification. 6-[2-(dimethylamino)ethoxy]-4-phenoxy-pyridin-3-amine (0.01 g, 0.04 mmol, 85% yield). MS (ESI) m/z 274.1 [M+1]$^+$

4-((6-(2-(dimethylamino)ethoxy)-4-phenoxypyridin-3-yl)amino)-2-(2,6-dioxopiperidin-3-yl)isoindoline-1,3-dione

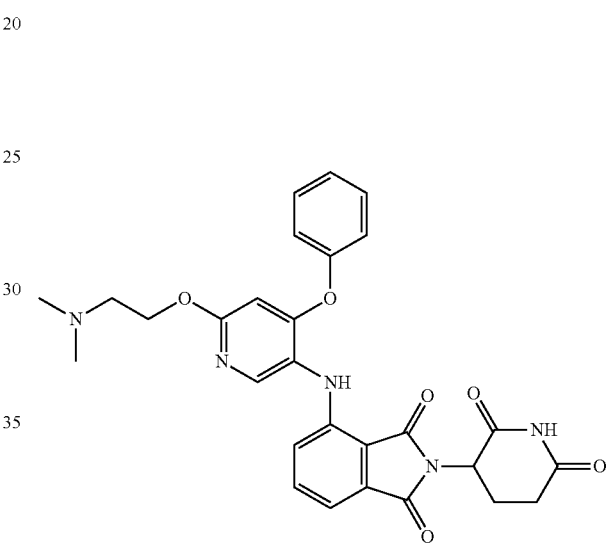

To a solution of 6-[2-(dimethylamino)ethoxy]-4-phenoxy-pyridin-3-amine (0.010 g, 0.04 mmol) in 1,4-Dioxane (3 mL) was added 4-bromo-2-(2,6-dioxo-3-piperidyl)isoindoline-1,3-dione (15 mg g, 0.04 mmol), potassium carbonate (15 mg, 0.11 mmol) and chloro(2-dicyclohexylphosphino-2',4',6'-tri-i-propyl-1,1'-biphenyl)(2'-amino-1,1'-biphenyl-2-yl) palladium(II) (3 mg). The suspension was degassed under vacuum and purged with nitrogen several times. The mixture was stirred at 110° C. for 12 h. The mixture was filtered and filtrate was concentrated under reduced pressure. The residue was purified by prep-HPLC to afford 4-((6-(2-(dimethylamino)ethoxy)-4-phenoxypyridin-3-yl)amino)-2-(2,6-dioxopiperidin-3-yl)isoindoline-1,3-dione (3.41 mg, 0.006 mmol, 17% yield). $^1$H NMR (400 MHz, DMSO-d$_6$) δ 11.12 (s, 1H), 10.08-9.87 (m, 1H), 8.23 (s, 2H), 7.61 (dd, J=7.4, 8.4 Hz, 1H), 7.52-7.44 (m, 2H), 7.33-7.27 (m, 1H), 7.24-7.19 (m, 1H), 7.19-7.13 (m, 2H), 7.05 (d, J=8.4 Hz, 1H), 6.04 (s, 1H), 5.10 (dd, J=5.4, 12.8 Hz, 1H), 4.61-4.50 (m, 2H), 3.48-3.44 (m, 2H), 2.95-2.86 (m, 1H), 2.79 (s, 6H), 2.64-2.57 (m, 2H), 2.09-2.01 (m, 1H); MS (ESI) m/z 530.3 [M+1]$^+$.

Example 6: 2-(2,6-dioxopiperidin-3-yl)-4-((6-(3-fluorophenoxy)-1-(tetrahydro-2H-pyran-4-yl)-1H-indazol-5-yl)amino)isoindoline-1,3-dione

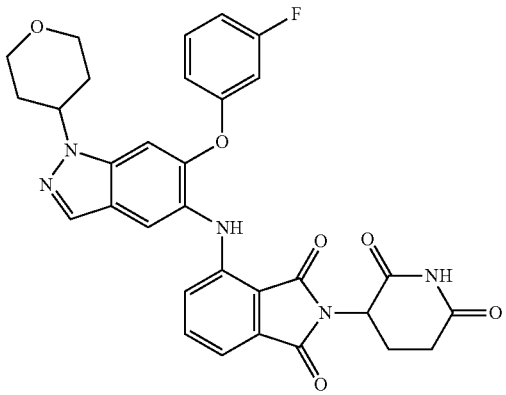 [SMILES: O=C1CCC(N2C(=O)c3cccc(Nc4cc5cnn(C6CCOCC6)c5cc4Oc4cccc(F)c4)c3C2=O)C(=O)N1]

6-fluoro-5-nitro-1H-indazole

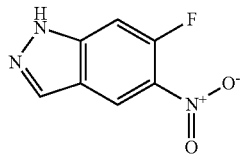 [SMILES: O=[N+]([O-])c1cc2cn[nH]c2cc1F]

To a solution of 6-fluoro-1H-indazole (10.000 g, 73.50 mmol) in concentrated sulfuric acid (220 mL) was added nitrate of potash (7.4 g, 7.35 mmol) at 0° C. The resulting mixture was stirred at 25° C. for 12 hours. The mixture was added dropwise to ice water (1000 mL) and extracted with ethyl acetate (200 mL×2). The combined organic phase was washed with brine (200 mL×2), dried with anhydrous sodium sulfate, filtered and concentrated in vacuo. It was purified by silica gel column chromatography (40-50% ethyl acetate in petroleum ether) to afford 6-fluoro-5-nitro-1H-indazole (3.0 g, 16.56 mmol, 22% yield). NMR (400 MHz, DMSO-$d_6$) δ 8.79 (d, J=7.2 Hz, 1H), 8.38 (s, 1H), 7.68 (d, J=12.0 Hz, 1H).

6-fluoro-5-nitro-1-((2-(trimethylsilyl)ethoxy)methyl)-1H-indazole

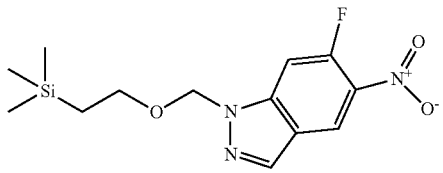 [SMILES: C[Si](C)(C)CCOCn1ncc2cc([N+](=O)[O-])c(F)cc21]

To a solution of 6-fluoro-5-nitro-1H-indazole (3.00 g, 16.56 mmol) in N,N-dimethylformamide (30 mL) was added sodium hydride (6.34 g, 26.50 mmol) at 0° C., the mixture was stirred for 0.5 hour, and then (2-(chloromethoxy)ethyl)trimethylsilane (4.3 mL, 24.29 mmol) was added to the mixture. The mixture was extracted with ethyl acetate (200 mL×2). The combined organic phase was washed with brine (100 mL×2), dried with anhydrous sodium sulfate, filtered and concentrated in vacuum. The resulting crude material was purified by silica gel column chromatography (20-25% ethyl acetate in petroleum ether) to afford 6-fluoro-5-nitro-1-((2-(trimethylsilyl)ethoxy)methyl)-1H-indazole (1.00 g, 3.21 mmol, 14% yield). $^1$H NMR (400 MHz, DMSO-$d_6$) δ 8.81 (d, J=7.2 Hz, 1H), 8.45 (s, 1H), 8.04 (d, J=12.0 Hz, 1H), 5.80 (s, 2H), 3.55 (t, J=8.0 Hz, 2H), 3.32 (s, 3H), 0.05 (s, 2H), 0.09 (s, 1H), 0.10 (s, 6H).

6-(3-fluorophenoxy)-5-nitro-1-((2-(trimethylsilyl)ethoxy)methyl)-1H-indazole

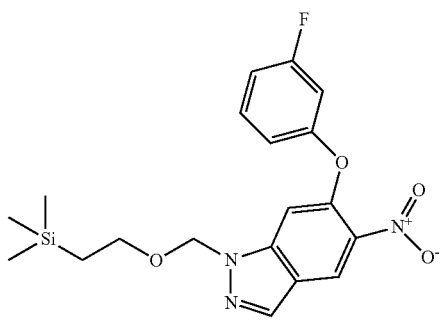 [SMILES: C[Si](C)(C)CCOCn1ncc2cc([N+](=O)[O-])c(Oc3cccc(F)c3)cc21]

To a solution of 6-fluoro-5-nitro-1-((2-(trimethylsilyl)ethoxy)methyl)-1H-indazole (1.00 g, 3.20 mmol) in N,N-dimethylformamide (10 mL) was added 3-fluorophenol (0.432 g, 0.39 mmol) and potassium carbonate (0.668 g, 0.48 mmol). The resulting mixture was stirred at 110° C. for 12 hours. The mixture was extracted with ethyl acetate (100 mL×2). The combined organic phase was washed with brine (50 mL×2), dried with anhydrous sodium sulfate, filtered and concentrated in vacuum. The resulting crude material was purified by silica gel column chromatography (20-25% ethyl acetate in petroleum ether) to afford 6-(3-fluorophenoxy)-5-nitro-1-((2-(trimethylsilyl)ethoxy)methyl)-1H-indazole (0.70 g, 1.73 mmol, 54% yield). $^1$HNMR (400 MHz, DMSO-$d_6$) δ 9.85 (s, 1H), 8.75 (s, 1H), 8.43 (s, 1H), 7.73 (s, 1H), 7.43 (d, J=1.6, 6.8 Hz, 1H), 7.17 (s, 1H), 7.01-6.95 (m, 1H), 6.93 (m, 1H), 6.88 (t, J=2.0 Hz, 1H), 6.55 (m, 2H), 5.76 (s, 2H), 3.51 (t, J=8.0, 2H), 0.14 (s, 9H).

6-(3-fluorophenoxy)-5-nitro-1H-indazole

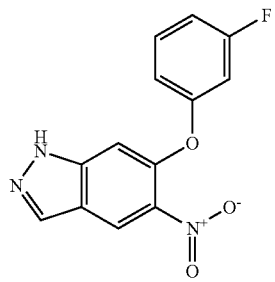 [SMILES: O=[N+]([O-])c1cc2cn[nH]c2cc1Oc1cccc(F)c1]

To a solution of 6-(3-fluorophenoxy)-5-nitro-1-((2-(trimethylsilyl)ethoxy)methyl)-1H-indazole (0.700 g, 1.70 mmol) in dichloromethane (2 mL) was added trifluoroacetic (0.5 mL, 0.10 mmol), the mixture was stirred at 25° C. for 12 hours. The mixture was extracted with ethyl acetate (100 mL×2). The combined organic phase was washed with brine (100 mL×2), dried with anhydrous sodium sulfate, filtered and concentrated in vacuo and purified by silica gel column chromatography (10-20% ethyl acetate in petroleum ether) to afford 6-(3-fluorophenoxy)-5-nitro-1H-indazole (0.50 g, 1.83 mmol, 61% yield). $^1$H NMR (400 MHz, DMSO-d$_6$) δ 8.72 (s, 1H), 7.68 (s, 1H), 7.33 (s, 1H), 7.02-6.99 (m, 2H), 6.98-6.88 (m, 2H).

6-(3-fluorophenoxy)-5-nitro-1-(tetrahydro-2H-pyran-4-yl)-1H-indazole

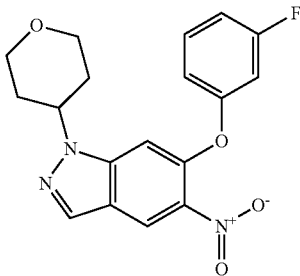 [SMILES: O=[N+]([O-])c1cc2cnn(C3CCOCC3)c2cc1Oc1cccc(F)c1]

To a solution of 6-(3-fluorophenoxy)-5-nitro-1H-indazole (0.10 g, 0.37 mmol) in dimethyl formamide (2 mL) was added 4-iodotetrahydro-2H-pyran (0.093 g, 0.44 mmol) and potassium carbonate (0.151 g, 1.10 mmol). The mixture was stirred at 110° C. for 12 hours. The mixture was filtered. The filtrate was purified by prep-HPLC to afford 6-(3-fluorophenoxy)-5-nitro-1-(tetrahydro-2H-pyran-4-yl)-1H-indazole (0.02 g, 0.042 mmol, 11% yield). MS (ESI) m/z: 538.2[M+1]+

6-(3-fluorophenoxy)-1-(tetrahydro-2H-pyran-4-yl)-1H-indazol-5-amine

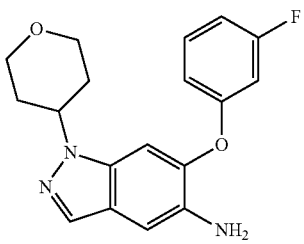 [SMILES: Nc1cc2cnn(C3CCOCC3)c2cc1Oc1cccc(F)c1]

To a solution of 6-(3-fluorophenoxy)-5-nitro-1-(tetrahydro-2H-pyran-4-yl)-1H-indazole (0.015 g, 0.04 mmol) in ethanol (1.5 mL) and water (0.50 mL) was added iron powder (0.007 g, 0.13 mmol) and ammonium chloride (0.022 g, 0.42 mmol). The mixture was stirred at 80° C. for 2 hours. The reaction mixture was filtered and the filtrate was concentrated to afford 6-(3-fluorophenoxy)-1-(tetrahydro-2H-pyran-4-yl)-1H-indazol-5-amine (0.008 g, 0.024 mmol, 58% yield). MS (ESI) m/z: 328.1 [M+1]+

2-(2,6-dioxopiperidin-3-yl)-4-((6-(3-fluorophenoxy)-1-(tetrahydro-2H-pyran-4-yl)-1H-indazol-5-yl)amino)isoindoline-1,3-dione

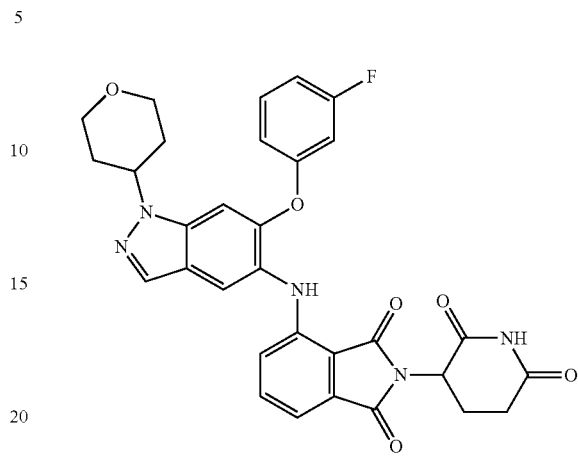

To a solution of 6-(3-fluorophenoxy)-1-(tetrahydro-2H-pyran-4-yl)-1H-indazol-5-amine (0.008 g, 0.03 mmol) in 1,4-Dioxane (2 mL) was added 4-bromo-2-(2,6-dioxopiperidin-3-yl)isoindoline-1,3-dione (0.018 g, 0.05 mmol), chloro(2-dicyclohexylphosphino-2,4,6-triisopropyl-1,1-biphenyl)[2-(2-amino-1,1-biphenyl)]palladium(II) (0.036 g, 0.01 mmol) and potassium carbonate (0.006 g, 0.05 mmol). The mixture was stirred at 110° C. for 12 hours under nitrogen. The solution was filtered and concentrated, and purified by prep-HPLC to afford 2-(2,6-dioxopiperidin-3-yl)-4-((6-(3-fluorophenoxy)-1-(tetrahydro-2H-pyran-4-yl)-1H-indazol-5-yl)amino)isoindoline-1,3-dione (7.82 mg, 0.013 mmol, 28% yield). $^1$H NMR (400 MHz, DMSO-d$_6$) δ 11.12-11.04 (m, 1H), 8.11 (d, J=7.2 Hz, 2H), 7.95 (s, 1H), 7.67 (s, 1H), 7.56-7.32 (m, 1H), 7.30 (m, 1H), 7.24-7.22 (m, 2H), 7.19-7.17 (m, 1H), 6.78-6.74 (m, 2H), 5.07 (dd, J=4.8, 12.4, 1H), 4.86 (s, 1H), 4.00-3.96 (m, 2H), 3.53 (t, J=12.8 Hz, 2H), 2.61 (m, 1H), 2.60 (m, 2H), 2.12-2.04 (m, 2H), 1.90-1.86 (m, 2H), 1.24 (s, 1H); MS (ESI) m/z: 584.2 [M+1]+.

Example 7: 2-(2,6-dioxopiperidin-3-yl)-4-((1-methyl-6-(2-methylpyridin-4-yl)-1H-indazol-5-yl)amino)isoindoline-1,3-dione

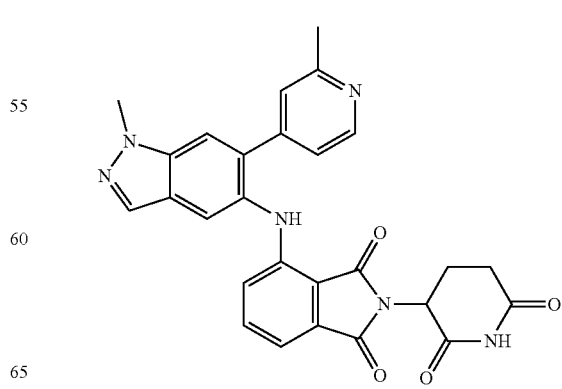

1-methyl-6-(2-methylpyridin-4-yl)-5-nitro-1H-indazole

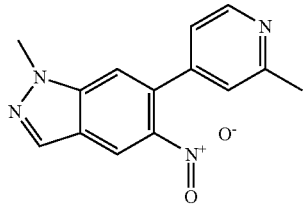

To a solution of 6-bromo-1-methyl-5-nitro-1H-indazole (0.300 g, 1.17 mmol) and 2-methyl-4-(4,4,5,5-tetramethyl-1,3,2-dioxaborolan-2-yl)pyridine (0.282 g, 1.29 mmol) in 1,4-Dioxane (3 mL) was added cesium carbonate (1.14 g, 3.51 mmol) and dichloro(1,1'-bis(diphenylphosphanyl)ferrocene)palladium(II) (0.096 g, 0.120 mmol). The resulting mixture was stirred at 110° C. for 12 hours under nitrogen. The reaction mixture was filtered and the filtrate was concentrated under reduced pressure. The residue was purified by prep-HPLC to give 1-methyl-6-(2-methylpyridin-4-yl)-5-nitro-1H-indazole (0.250 mg, 0.931 mmol, 79% yield). $^1$H NMR (400 MHz, CDCl$_3$) δ 8.80 (d, J=5.6 Hz, 1H), 8.67 (s, 1H), 8.23 (s, 1H), 7.52 (d, J=5.6 Hz, 1H), 7.46 (s, 1H), 7.19 (s, 1H), 4.12 (s, 3H), 2.83 (s, 3H); MS (ESI) m/z: 268.8 [M−100]$^+$.

1-methyl-6-(2-methylpyridin-4-yl)-1H-indazol-5-amine

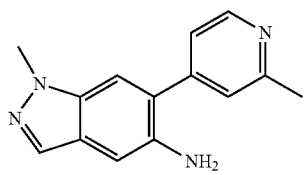 [SMILES: Cc1cc(-c2cc3c(cnn3C)cc2N)ccn1]

To a solution of 1-methyl-6-(2-methylpyridin-4-yl)-5-nitro-1H-indazole (0.250 g, 0.930 mmol) in ethanol (3 mL) and water (1 mL) was added ammonium chloride (0.503 g, 9.32 mmol) and ferrous powder (0.520 g, 9.32 mmol). The resulting mixture was stirred at 70° C. for 2 hours. The reaction mixture was filtered and the filtrate was concentrated under reduced pressure. The residue was purified by prep-TLC (petroleum ether:ethyl acetate) to give 1-methyl-6-(2-methylpyridin-4-yl)-1H-indazol-5-amine (0.145 g, 0.638 mmol, 96% yield). MS (ESI) m/z: 239.1[M+1].

2-(2,6-dioxopiperidin-3-yl)-4-((1-methyl-6-(2-methylpyridin-4-yl)-1H-indazol-5-yl)amino)isoindoline-1,3-dione

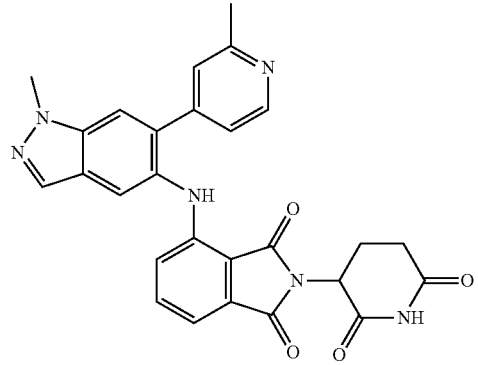 [SMILES: Cc1cc(-c2cc3c(cnn3C)cc2Nc2cccc3c2C(=O)N(C2CCC(=O)NC2=O)C3=O)ccn1]

To a solution of 1-methyl-6-(2-methylpyridin-4-yl)-1H-indazol-5-amine (0.070 g, 0.290 mmol) and 4-bromo-2-(2,6-dioxopiperidin-3-yl)isoindoline-1,3-dione (0.099 g, 0.290 mmol) in 1,4-Dioxane (2 mL) was added chloro(2-dicyclohexylphosphino-2',4',6'-triisopropyl-1,1'-biphenyl)[2-(2'-amino-1,1'-biphenyl)]palladium(II) (0.024 g, 0.030 mmol) and potassium carbonate (0.122 g, 0.880 mmol). The resulting mixture was stirred at 110° C. for 12 hours under nitrogen. The reaction mixture was filtered and the filtrate was concentrated under reduced pressure by water pump. The residue was purified by prep-HPLC to give 2-(2,6-dioxopiperidin-3-yl)-4-((1-methyl-6-(2-methylpyridin-4-yl)-1H-indazol-5-yl)amino)isoindoline-1,3-dione (93 mg, 0.188 mmol, 64% yield). $^1$H NMR (400 MHz, DMSO-d$_6$) δ 11.14 (s, 1H), 8.73 (d, J=6.4 Hz, 1H), 8.51 (s, 1H), 8.19 (s, 1H), 8.12 (s, 1H), 8.05 (s, 1H), 7.99 (d, J=5.2 Hz, 1H), 7.94 (s, 1H), 7.40 (dd, J=7.2, 8.4 Hz, 1H), 7.09 (d, J=7.2 Hz, 1H), 6.66 (d, J=8.4 Hz, 1H), 5.10 (dd, J=5.6, 12.8 Hz, 1H), 4.16 (s, 3H), 2.91-2.88 (m, 1H), 2.67 (s, 3H), 2.58 (d, J=12.8 Hz, 2H), 2.08-2.05 (m, 1H); MS (ESI) m/z: 495.1 [M+1]$^+$.

Example 8: 4-((5-(2-chlorophenoxy)-1-(tetrahydro-2H-pyran-4-yl)-1H-indazol-4-yl)amino)-2-(2,6-dioxopiperidin-3-yl)isoindoline-1,3-dione

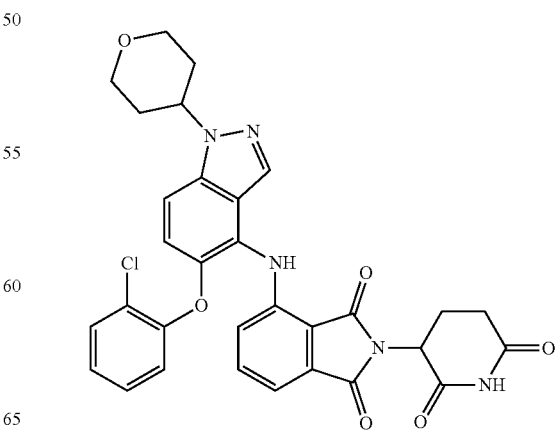

5-fluoro-4-nitro-1H-indazole

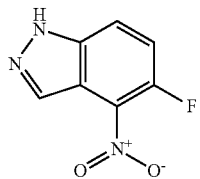 [SMILES: O=[N+]([O-])c1c(F)ccc2[nH]ncc12]

A solution of 5-fluoro-1H-indazole (10 g, 73.46 mmol) in concentrated sulfuric acid (200 mL, 73.46 mmol) was cooled to 0° C. Fuming nitric acid (10.00 mL, 224.29 mmol) was added dropwise and the reaction was stirred at 0° C. for 1 h. The reaction mixture was poured onto ice water (1000 mL) and the precipitate was collected by filtration, washed with water (300 mL) and dried under reduced pressure to afford the crude 5-fluoro-4-nitro-1H-indazole (8 g, yield: 60%). $^1$H NMR (400 MHz, DMSO-$d_6$) δ 11.29-11.20 (m, 1H), 8.33 (d, J=0.8 Hz, 1H), 7.95 (dd, J=0.8, 8.8 Hz, 1H), 7.21 (d, J=8.8 Hz, 1H).

2-[(5-fluoro-4-nitro-indazol-1-yl)methoxy]ethyl-trimethyl-silane

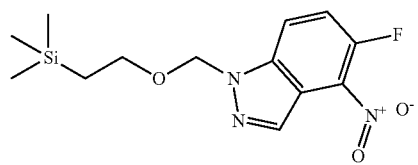

To a solution of 5-fluoro-4-nitro-1H-indazole (8.0 g, 44.1 mmol) in dimethylformamide (80 mL) at 0° C. was added sodium hydride (1.9 g, 48.59 mmol) and stirred for 0.5 h. (2-(chloromethoxy)ethyl)trimethylsilane (8.8 g, 53.0 mmol) was added. The mixture was stirred at 25° C. for 12 h. The mixture was quenched with water (50 mL) and extracted with ethyl acetate (100 mL×2). The combined organic layers were washed with lithium chloride solution (30 mL×2), dried over anhydrous sodium sulfate, filtered and concentrated under reduced pressure. The resulting residue was purified by prep-HPLC to give the product 2-[(5-fluoro-4-nitro-indazol-1-yl)methoxy]ethyl-trimethyl-silane (3.0 g, yield: 21%). $^1$H NMR (400 MHz, DMSO-$d_6$) δ 8.26 (s, 1H), 8.16 (d, J=9.2 Hz, 1H), 7.63 (d, J=9.2 Hz, 1H), 5.46 (s, 2H), 3.55-3.49 (m, 2H), 0.82-0.79 (m, 2H), −0.12 (s, 9H).

2-[[5-(2-chlorophenoxy)-4-nitro-indazol-1-yl]methoxy]ethyl-trimethyl-silane

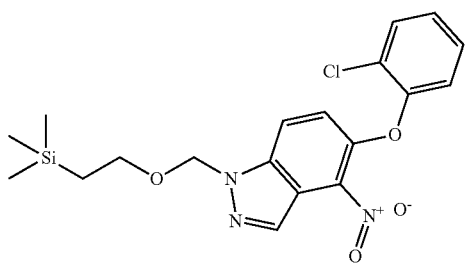

To a solution of 2-chlorophenol (0.136 g, 1.06 mmol) in dimethylformamide (4 mL) was added cesium carbonate (0.626 g, 1.93 mmol) and 2-[(5-fluoro-4-nitro-indazol-1-yl)methoxy]ethyl-trimethyl-silane (0.300 g, 0.96 mmol). The mixture was stirred at 25° C. for 12 h. The mixture was diluted with water 20 mL and extracted with ethyl acetate 20 mL (20 mL×2). The combined organic layers were washed with lithium chloride solution (10 mL×2), dried over anhydrous sodium sulfate, filtered and concentrated under reduced pressure to give a residue. The residue was purified by prep-TLC (ethyl acetate) to give the product 2-[[5-(2-chlorophenoxy)-4-nitro-indazol-1-yl]methoxy]ethyl-trimethyl-silane (0.370 g, yield: 91%). MS (ESI) m/z: 421.2[M+1]$^+$

5-(2-chlorophenoxy)-4-nitro-1H-indazole

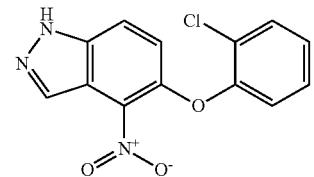 [SMILES: O=[N+]([O-])c1c(Oc2ccccc2Cl)ccc2[nH]ncc12]

To a solution of 2-[[5-(2-chlorophenoxy)-4-nitro-indazol-1-yl]methoxy]ethyl-trimethyl-silane (0.370 g, 0.88 mmol) in dichloromethane (2 mL) was added trifluoroacetic acid (2 mL, 26.12 mmol). The mixture was stirred at 25° C. for 3 h. The mixture was evaporated and the resulting residue was purified by prep-TLC (ethyl acetate) to give 5-(2-chlorophenoxy)-4-nitro-1H-indazole (0.110 g, yield: 43%). $^1$H NMR (400 MHz, CDCl$_3$) δ 8.57 (s, 1H), 7.81-7.78 (m, 1H), 7.51 (d, J=1.2 Hz, 1H), 7.30-7.29 (m, 1H), 7.19-7.17 (m, 1H), 7.12-7.11 (m, 1H), 6.99-6.97 (m, 1H); MS (ESI) m/z: 290.2 [M+1]$^+$.

5-(2-chlorophenoxy)-4-nitro-1-tetrahydropyran-4-yl-indazole

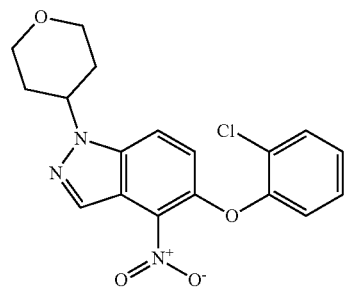 [SMILES: O=[N+]([O-])c1c(Oc2ccccc2Cl)ccc2c1cnn2C1CCOCC1]

To a solution of 5-(2-chlorophenoxy)-4-nitro-1H-indazole (0.050 g, 0.17 mmol) and 4-iodotetrahydropyran (0.044 g, 0.21 mmol) in dimethylformamide (1 mL) was added potassium carbonate (0.048 g, 0.35 mmol). The mixture was stirred at 85° C. for 12 h. The reaction mixture was filtered, and filtrate was concentrated under reduced pressure by water pump to give a residue. The residue was purified by prep-HPLC to give the product 5-(2-chlorophenoxy)-4-nitro-1-tetrahydropyran-4-yl-indazole (0.010 g, yield: 15%). $^1$H NMR (400 MHz, CDCl$_3$) δ 8.45 (s, 1H), 7.67 (d, J=9.2 Hz, 1H), 7.51 (dd, J=1.6, 8.0 Hz, 1H), 7.26-7.22 (m, 1H), 7.16-7.12 (m, 1H), 7.06 (d, J=8.8 Hz, 1H), 6.93 (dd, J=1.2, 8.0 Hz, 1H), 4.71-4.63 (m, 1H), 4.23-4.19 (m, 2H), 3.67-3.61 (m, 2H), 2.50-2.39 (m, 2H), 2.04-2.00 (m, 2H); MS (ESI) m/z: 374.1 [M+1]⁺.

5-(2-chlorophenoxy)-1-tetrahydropyran-4-yl-indazol-4-amine

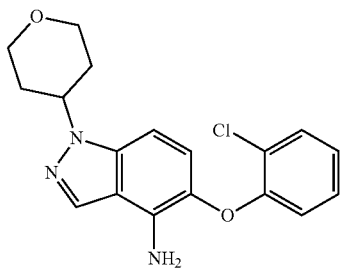 [SMILES: Nc1c(Oc2ccccc2Cl)ccc2c1cnn2C1CCOCC1]

To a solution of 5-(2-chlorophenoxy)-4-nitro-1-tetrahydropyran-4-yl-indazole (0.023 g, 0.06 mmol) in ethanol (1 mL) and water (0.30 mL) was added ammonia hydrochloride (0.033 g, 0.62 mmol) and iron powder (0.017 g, 0.31 mmol). The mixture was stirred at 80° C. for 2 h. The reaction mixture was filtered, and filtrate was concentrated under reduced pressure. The residue was purified by prep-TLC (100% ethyl acetate) to give the product 5-(2-chlorophenoxy)-1-tetrahydropyran-4-yl-indazol-4-amine (0.013 g, yield: 61%). ¹H NMR (400 MHz, CDCl₃) δ 7.99 (s, 1H), 7.45 (dd, J=1.6, 8.0 Hz, 1H), 7.13-7.08 (m, 1H), 7.04 (d, J=8.8 Hz, 1H), 6.99-6.95 (m, 1H), 6.82 (d, J=9.2 Hz, 1H), 6.74 (dd, J=1.2, 8.4 Hz, 1H), 4.62-4.54 (m, 1H), 4.20-4.16 (m, 2H), 3.65-3.59 (m, 2H), 2.46-2.35 (m, 2H), 2.03-1.99 (m, 2H); MS (ESI) m/z: 344.1 [M+1]⁺.

Dimethyl 3-[[5-(2-chlorophenoxy)-1-tetrahydropyran-4-yl-indazol-4-yl]amino]benzene-1,2-dicarboxylate

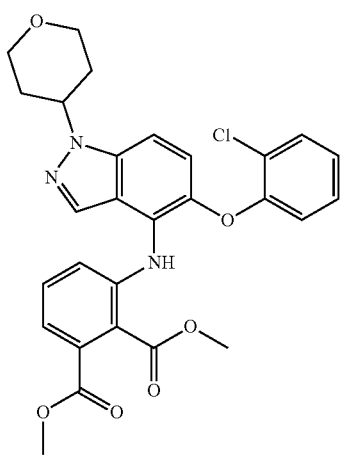 [SMILES: COC(=O)c1cccc(Nc2c(Oc3ccccc3Cl)ccc3c2cnn3C2CCOCC2)c1C(=O)OC]

To a solution of 5-(2-chlorophenoxy)-1-tetrahydropyran-4-yl-indazol-4-amine (0.013 g, 0.04 mmol) and dimethyl 3-bromobenzene-1,2-dicarboxylate (0.011 g, 0.04 mmol) in 1,4-dioxane (1 mL) was added potassium carbonate (0.016 g, 0.11 mmol) and chloro(2-dicyclohexylphosphino-2,4,6-triisopropyl-1,1-biphenyl)[2-(2-amino-1,1-biphenyl)]palladium(II) (0.003 g) under nitrogen. The suspension was degassed under vacuum and purged with nitrogen several times. The reaction mixture was stirred at 90° C. for 12 hours. The reaction mixture was filtered, and the filtrate was concentrated under reduced pressure. The residue was purified by prep-TLC (ethyl acetate) to give the product dimethyl 3-[[5-(2-chlorophenoxy)-1-tetrahydropyran-4-yl-indazol-4-yl]amino]benzene-1,2-dicarboxylate (0.020 g, 98%). MS (ESI) m/z: 536.1 [M+1]⁺.

4-[[5-(2-chlorophenoxy)-1-tetrahydropyran-4-yl-indazol-4-yl]amino]-2-(2,6-dioxo-3-piperidyl)isoindoline-1,3-dione

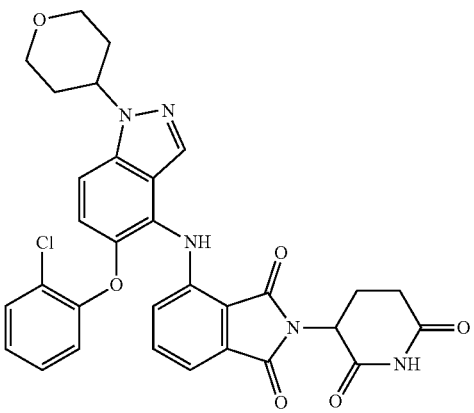 [SMILES: O=C1CCC(N2C(=O)c3cccc(Nc4c(Oc5ccccc5Cl)ccc5c4cnn5C4CCOCC4)c3C2=O)C(=O)N1]

To a solution of dimethyl 3-[[5-(2-chlorophenoxy)-1-tetrahydropyran-4-yl-indazol-4-yl]amino]benzene-1,2-dicarboxylate (0.020 g, 0.04 mmol) and 3-aminopiperidine-2,6-dione hydrochloride (0.007 g, 0.04 mmol) in pyridine (1 mL) was added lithium iodide (0.01 mL, 0.11 mmol). The suspension was degassed under vacuum and purged with nitrogen several times. The reaction mixture was stirred at 120° C. for 12 hours. The reaction mixture was filtered, and the filtrate was concentrated under reduced pressure. The resulting residue was purified by prep-HPLC to give the product 4-[[5-(2-chlorophenoxy)-1-tetrahydropyran-4-yl-indazol-4-yl]amino]-2-(2,6-dioxo-3-piperidyl) isoindoline-1,3-dione (10 mg, 40%). ¹H NMR (400 MHz, DMSO-d₆) δ 11.11 (s, 1H), 8.29 (s, 1H), 7.97 (s, 1H), 7.72 (d, J=9.2 Hz, 1H), 7.57-7.53 (m, 1H), 7.44 (dd, J=1.6, 8.0 Hz, 1H), 7.24 (d, J=7.2 Hz, 1H), 7.20-7.15 (m, 2H), 7.05-6.97 (m, 2H), 6.83 (dd, J=1.2, 8.4 Hz, 1H), 5.10-5.06 (m, 1H), 4.99-4.91 (m, 1H), 4.04-3.97 (m, 2H), 3.61-3.55 (m, 2H), 2.93-2.83 (m, 1H), 2.62-2.54 (m, 2H), 2.18-2.12 (m, 2H), 2.04-2.00 (m, 1H), 1.96-1.92 (m, 2H); MS (ESI) m/z: 600.2 [M+1]⁺.

Example 9: 2-(2,6-dioxopiperidin-3-yl)-4-((6-(3-fluoro-4-methoxyphenyl)-1-methyl-1H-indazol-5-yl)amino)isoindoline-1,3-dione

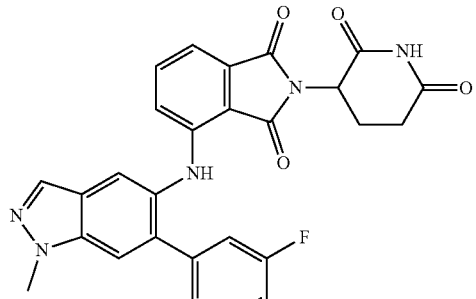

6-bromo-1-methyl-5-nitro-1H-indazole

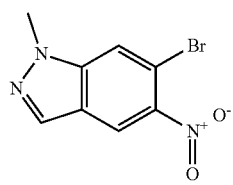

To a 250 mL three-necked flask was added 4-bromo-2-fluoro-5-nitrobenzaldehyde (15 g, 60.48 mmol), potassium carbonate (12.6 g, 91.3 mmol), isopropyl alcohol (120 mL) and water (60 mL). The mixture was stirred at 41° C. for 1 hour. Then methylhydrazine (10.5 g, 91.17 mmol) was added dropwise. The resulting mixture was stirred at 77° C. for 6 hours. The mixture was cooled to 20° C. and water (240 mL) was added. The mixture was stirred for 1 hour and filtered. The isolated solid was rinsed with water (20 mL×3) and filtered. The solid was dried under reduce pressure to give 6-bromo-1-methyl-5-nitro-1H-indazole (7.0 g, 27.3 mmol, 45% yield). $^1$H NMR (400 MHz, CDCl$_3$) δ 8.30 (s, 1H), 8.06 (s, 1H), 7.69 (s, 1H), 4.04 (s, 3H).

6-(3-fluoro-4-methoxyphenyl)-1-methyl-5-nitro-1H-indazole

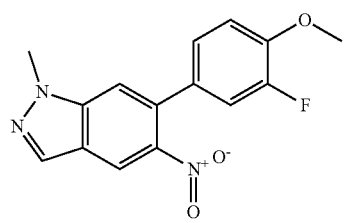

To a solution of 6-bromo-1-methyl-5-nitro-1H-indazole (0.300 g, 1.17 mmol) and (3-fluoro-4-methoxyphenyl)boronic acid (0.209 g, 1.23 mmol) in dioxane (3 mL) was added cesium carbonate (1.146 g, 3.52 mmol) and dichloro(1,1'-bis(diphenylphosphanyl)ferrocene) palladium(II) dichloromethane adduct (0.096 g, 0.120 mmol). The resulting mixture was stirred at 110° C. for 12 hours under nitrogen. The reaction was filtered and the filtrate was concentrated under reduce pressure by water pump. The residue was purified by prep-HPLC to give 6-(3-fluoro-4-methoxyphenyl)-1-methyl-5-nitro-1H-indazole (0.100 g, 0.332 mmol, 28% yield). $^1$H NMR (400 MHz, CDCl$_3$) δ 8.32 (s, 1H), 8.10 (s, 1H), 7.25 (s, 1H), 7.07 (dd, J=2.0, 11.6 Hz, 1H), 7.01-6.92 (m, 2H), 4.06 (s, 3H), 3.88 (s, 3H); MS (ESI) m/z: 301.8[M+1]$^+$.

6-(3-fluoro-4-methoxyphenyl)-1-methyl-1H-indazol-5-amine

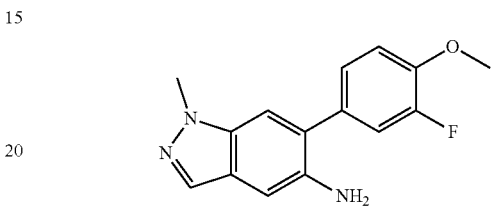

To a solution of 6-(3-fluoro-4-methoxyphenyl)-1-methyl-5-nitro-1H-indazole (0.080 g, 0.270 mmol) in ethanol (0.6 mL) and water (0.2 mL) was added ammonium chloride (0.143 g, 2.66 mmol) and ferrous powder (0.148 g, 2.66 mmol). The resulting mixture was stirred at 70° C. for 12 hours. The reaction mixture was filtered and the filtrate was concentrated under reduce to give 6-(3-fluoro-4-methoxyphenyl)-1-methyl-1H-indazol-5-amine (0.070 g, 0.258 mmol, 97% yield). $^1$H NMR (400 MHz, CDCl$_3$) δ 7.72 (d, J=0.8 Hz, 1H), 7.21 (d, J=2.0 Hz, 1H), 7.18-7.15 (m, 1H), 7.06 (s, 1H), 7.01 (d, J=8.4 Hz, 1H), 6.94 (s, 1H), 3.94 (s, 3H), 3.89 (s, 3H); MS (ESI) m/z: 272.4[M+1]$^+$.

2-(2,6-dioxopiperidin-3-yl)-4-((6-(3-fluoro-4-methoxyphenyl)-1-methyl-1H-indazol-5-yl)amino)isoindoline-1,3-dione

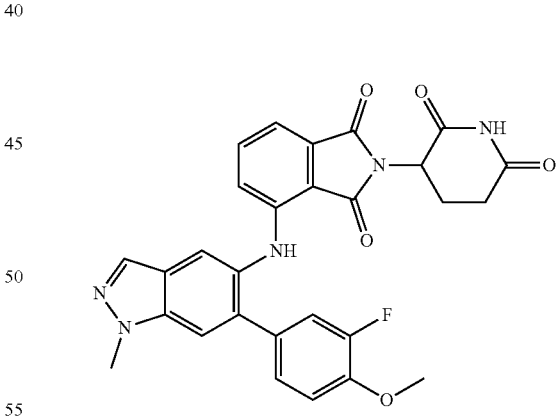

To a solution of 6-(3-fluoro-4-methoxyphenyl)-1-methyl-1H-indazol-5-amine (0.070 g, 0.260 mmol) and 4-bromo-2-(2,6-dioxopiperidin-3-yl)isoindoline-1,3-dione (0.091 g, 0.270 mmol) in dioxane (2 mL) was added potassium carbonate (0.107 mg, 0.770 mmol) and chloro(2-dicyclohexylphosphino-2',4',6'-triisopropyl-1,1'-biphenyl)[2-(2'-amino-1,1'-biphenyl)]palladium (II) (0.020 g, 0.030 mmol). The resulting mixture was stirred at 110° C. for 12 hours under nitrogen. The reaction mixture was filtered and the filtrate was concentrated under reduced pressure. The residue was purified by prep-HPLC and prep-TLC (petroleum ether:ethyl acetate 1:1) to give 2-(2,6-dioxopiperidin-3-yl)-4-((6-(3-fluoro-4-methoxyphenyl)-1-methyl-1H-indazol-5-yl)amino)isoindoline-1,3-dione (53 mg, 0.098 mmol, 38% yield). $^1$H NMR (400 MHz, DMSO-d$_6$) δ 11.17 (s, 1H), 8.29 (s, 1H), 8.13 (s, 1H), 7.88 (s, 1H), 7.79 (s, 1H), 7.49 (s, 1H), 7.46 (dd, J=2.4, 4.8 Hz, 1H), 7.34 (d, J=8.0 Hz, 1H), 7.23-7.18 (m, 1H), 7.12 (d, J=7.2 Hz, 1H), 6.85 (d, J=8.8 Hz, 1H), 5.14 (dd, J=5.2, 12.8 Hz, 1H), 4.16 (s, 3H), 3.87 (s, 3H), 2.99-2.90 (m, 1H), 2.69-2.63 (m, 2H), 2.10 (dd, J=5.2, 10.8 Hz, 1H); MS (ESI) m/z: 528.1 [M+1]$^+$.

Example 10: 2-(2,6-dioxopiperidin-3-yl)-4-((5-(2-fluoro-6-methylphenoxy)-1-methyl-1H-indazol-4-yl)amino)isoindoline-1,3-dione

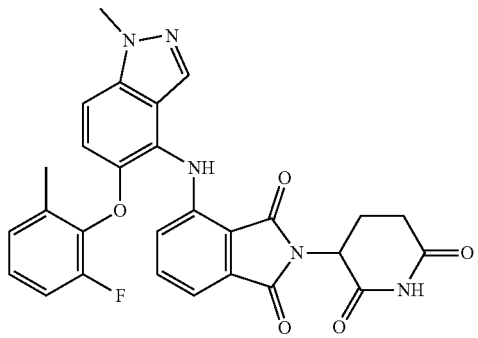 [SMILES: Cc1cccc(F)c1Oc1ccc2c(cnn2C)c1Nc1cccc2c1C(=O)N(C1CCC(=O)NC1=O)C2=O]

5-(2-fluoro-6-methylphenoxy)-1-methyl-4-nitro-1H-indazole

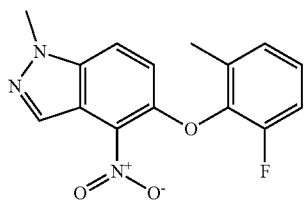 [SMILES: Cc1cccc(F)c1Oc1ccc2c(cnn2C)c1[N+](=O)[O-]]

To a solution of 2-fluoro-6-methyl-phenol (0.1 g, 0.79 mmol) in N,N-dimethylformamide (3 mL) was added 5-fluoro-1-methyl-4-nitro-indazole (0.154 g, 0.79 mmol), cesium carbonate (0.515 g, 1.59 mmol), the mixture was stirred at 90° C. for 12 hours. The mixture was diluted with water, extracted with ethyl acetate (10 ml×3), the separated organic layer washed with brine (30 ml), dried over anhydrous sodium sulfate. The organic layer was filtrated and the filtrate was concentrated to afford crude 5-(2-fluoro-6-methyl-phenoxy)-1-methyl-4-nitro-indazole (190 mg, 0.630 mmol, 79% yield). MS (ESI) m/z: 301.8 [M+1]$^+$ 5-(2-fluoro-6-methylphenoxy)-1-methyl-1H-indazol-4-amine

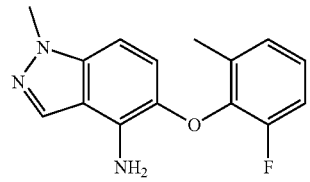 [SMILES: Cc1cccc(F)c1Oc1ccc2c(cnn2C)c1N]

To a solution of 5-(2-fluoro-6-methyl-phenoxy)-1-methyl-4-nitro-indazole (0.19 g, 0.63 mmol) in ethanol (3 mL), water (1 mL) was added ferrum (0.176 g, 3.15 mmol), ammonium chloride (0.34 g, 6.31 mmol), the mixture was stirred at 80° C. for 2 hours. The mixture was filtered and the filtrate was concentrated. The residue was purified by prep-TLC (40% ethyl acetate in petroleum ether) to afford 5-(2-fluoro-6-methyl-phenoxy)-1-methyl-indazol-4-amine (50 mg, 0.184 mmol, 29% yield).

2-(2,6-dioxopiperidin-3-yl)-4-((5-(2-fluoro-6-methylphenoxy)-1-methyl-1H-indazol-4-yl)amino)isoindoline-1,3-dione

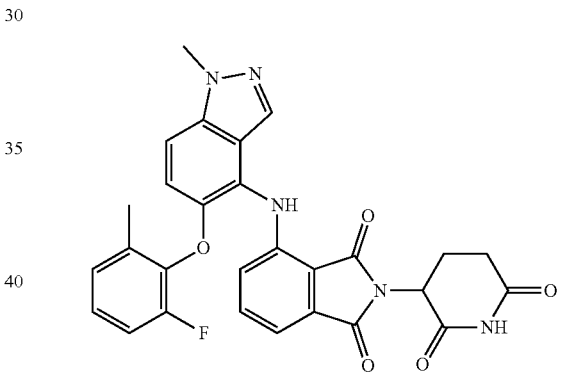

To a solution of 5-(2-fluoro-6-methyl-phenoxy)-1-methyl-indazol-4-amine (0.05 g, 0.18 mmol) in 1,4-dioxane (3 mL) was added 4-bromo-2-(2,6-dioxo-3-piperidyl)isoindoline-1,3-dione (0.062 g, 0.18 mmol), potassium carbonate (0.05 g, 0.37 mmol), chloro(2-dicyclohexylphosphino-2,4,6-triisopropyl-1,1-biphenyl)[2-(2-amino-1,1-biphenyl)]palladium(II) (0.014 g, 0.02 mmol), the mixture was stirred under nitrogen at 110° C. for 12 hours. The mixture was filtered and the filtrate was concentrated. The residue was purified by prep-HPLC to afford 2-(2,6-dioxo-3-piperidyl)-4-[[5-(2-fluoro-6-methyl-phenoxy)-1-methyl-indazol-4-yl]amino]isoindoline-1,3-dione (13 mg, 0.025 mmol, 13% yield) and 2-(2,6-dioxo-3-piperidyl)-4-[[5-(2-fluoro-6-methyl-phenoxy)-1-methyl-indazol-4-yl]amino]isoindoline-1,3-dione (3 mg, 0.005 mmol, 3% yield). $^1$H NMR (400 MHz, DMSO-d$_6$) δ 11.12 (s, 1H), 8.38 (s, 1H), 7.83 (s, 1H), 7.60-7.46 (m, 2H), 7.30-7.27 (m, 1H), 7.15-7.13 (m, 3H), 6.96-6.86 (m, 2H), 5.16-5.11 (m, 1H), 4.05 (s, 3H), 2.90-2.80 (m, 1H), 2.63-2.58 (m, 2H), 2.18 (s, 3H), 2.08-2.00 (m, 1H); MS (ESI) m/z: 528.2 [M+1]$^+$.

Example 11: 2-(2,6-dioxopiperidin-3-yl)-4-((4-methyl-1-(tetrahydro-2H-pyran-4-yl)-1H-indazol-5-yl)amino)isoindoline-1,3-dione

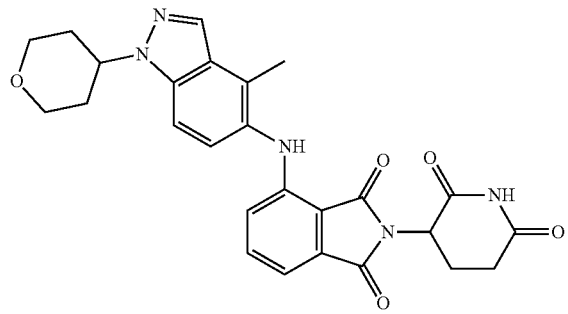 [SMILES: Cc1c(Nc2cccc3c2C(=O)N(C2CCC(=O)NC2=O)C3=O)ccc2c1cnn2C1CCOCC1]

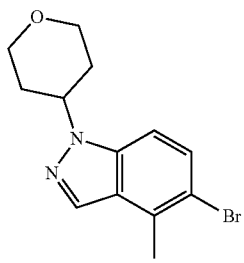 [SMILES: Cc1c(Br)ccc2c1cnn2C1CCOCC1]

5-bromo-4-methyl-1-(tetrahydro-2H-pyran-4-yl)-1H-indazole

To a solution of 5-bromo-4-methyl-1H-indazole (0.2 g, 0.95 mmol) in N,N-dimethylformamide (5 mL) was added cesium carbonate (0.924 g, 2.84 mmol), 4-iodotetrahydropyran (0.6 g, 2.84 mmol), the mixture was stirred at 135° C. for 24 hours. The mixture was diluted with 20 ml water and extracted with ethyl acetate (20 ml×3). The combined organic layer was washed with saturated brine (50 ml), dried over anhydrous sodium sulfate and filtered. The filtrate was concentrated and the residue was purified by prep-TLC on silica gel (50% of ethyl acetate in petroleum ether) to afford 5-bromo-4-methyl-1-tetrahydropyran-4-yl-indazole (100 mg, 0.338 mmol, 35% yield). $^1$H NMR (400 MHz, CDCl$_3$) δ 7.95 (s, 1H), 7.44-7.37 (m, 2H), 4.68-4.64 (m, 1H), 4.19-4.16 (m, 2H), 3.64-3.58 (m, 2H), 2.57 (s, 3H), 2.27-2.23 (m, 4H); MS (ESI) m/z: 295.1 [M+1]$^+$.

2-(2,6-dioxopiperidin-3-yl)-4-((4-methyl-1-(tetrahydro-2H-pyran-4-yl)-1H-indazol-5-yl)amino)isoindoline-1,3-dione

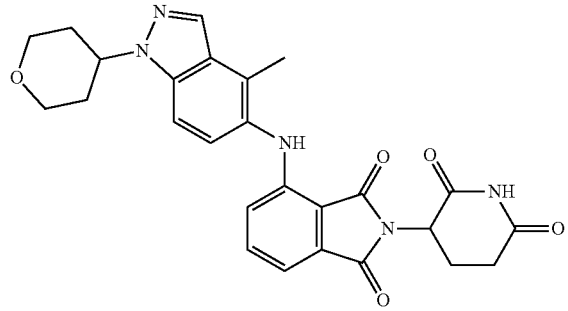 [SMILES: Cc1c(Nc2cccc3c2C(=O)N(C2CCC(=O)NC2=O)C3=O)ccc2c1cnn2C1CCOCC1]

To a solution of 5-bromo-4-methyl-1-tetrahydropyran-4-yl-indazole (0.1 g, 0.34 mmol) in 1,4-dioxane (3 mL) was added 4-amino-2-(2,6-dioxo-3-piperidyl)isoindoline-1,3-dione (0.101 g, 0.37 mmol), potassium carbonate (0.09 g, 0.68 mmol), chloro(2-dicyclohexylphosphino-2,4,6-triisopropyl-1,1-biphenyl)[2-(2-amino-1,1-biphenyl)]palladium(II) (0.026 g, 0.03 mmol). The mixture was stirred under nitrogen at 110° C. for 12 hours. The mixture was filtered and the filtrate was concentrated. The residue was purified by prep-HPLC to afford 2-(2,6-dioxo-3-piperidyl)-4-[(4-methyl-1-tetrahydropyran-4-yl-indazol-5-yl)amino]isoindoline-1,3-dione (65 mg, 0.134 mmol, 39% yield) and 2-(2,6-dioxo-3-piperidyl)-4-[(4-methyl-1-tetrahydropyran-4-yl-indazol-5-yl)amino]isoindoline-1,3-dione (3 mg, 0.006 mmol, 2% yield). $^1$H NMR (400 MHz, DMSO-d$_6$) δ 11.13 (s, 1H), 8.20-8.19 (m, 2H), 7.66-7.64 (m, 1H), 7.50-7.46 (m, 1H), 7.30-7.28 (m, 1H), 7.14-7.12 (m, 1H), 6.64-6.62 (m, 1H), 5.15-5.10 (m, 1H), 4.92-4.88 (m, 1H), 4.04-4.00 (m, 2H), 3.60-3.55 (m, 2H), 2.90-2.85 (m, 1H), 2.60-2.55 (m, 2H), 2.40 (s, 3H), 2.20-2.12 (m, 3H), 1.92-1.88 (m, 2H); MS (ESI) m/z: 488.3 [M+1]$^+$.

Example 12: 2-(2,6-dioxopiperidin-3-yl)-4-((6-methoxy-1-(tetrahydro-2H-pyran-4-yl)-1H-indazol-5-yl)amino)isoindoline-1,3-dione

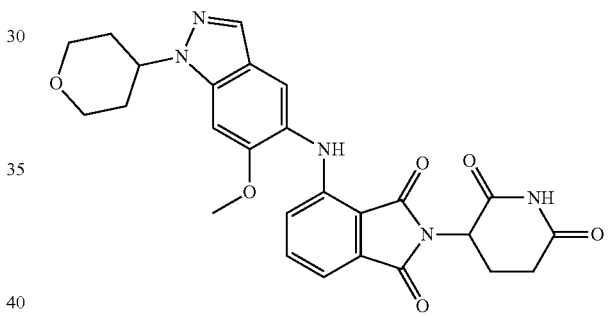

5-bromo-6-methoxy-1 tetrahydropyran-4-yl-indazole

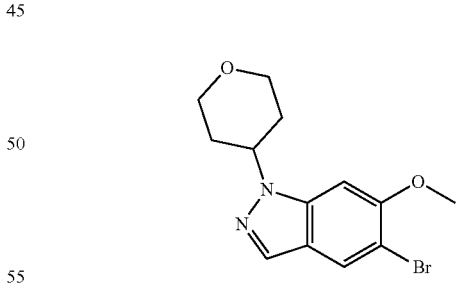

To a solution of 5-bromo-6-methoxy-1H-indazole (0.3 g, 1.32 mmol) in dimethyl formamide (4 mL) was added 4-iodotetrahydropyran (0.56 g, 2.64 mmol) and cesium carbonate (1.2 g, 3.96 mmol). The mixture was stirred at 135° C. for 24 hours. The mixture was extracted with ethyl acetate (30 mL×3), the combined organic layers were washed with saturated brine (60 mL), dried over anhydrous sodium sulfate and filtered. The filtrate was concentrated. The crude product was purified by prep-TLC (petroleum ether:ethyl acetate 3:1) to afford 5-bromo-6-methoxy-1-tetrahydropyran-4-yl-indazole (60 mg, 0.192 mmol, 15% yield). ¹H NMR (400 MHz, DMSO-d₆) δ 7.98 (s, 1H), 7.94 (s, 1H), 7.38 (s, 1H), 4.91-4.85 (m, 1H), 4.05-3.99 (m, 2H), 3.94 (s, 3H), 3.59-3.52 (m, 2H), 2.14-2.04 (m, 2H), 1.88-1.84 (m, 2H); MS (ESI) m/z: 313.3 [M+1]⁺.

2-(2,6-dioxo-3-piperidyl)-4-[(6-methoxy-1-tetrahydropyran-4-yl-indazol-5-yl)amino]isoindoline-1,3-dione

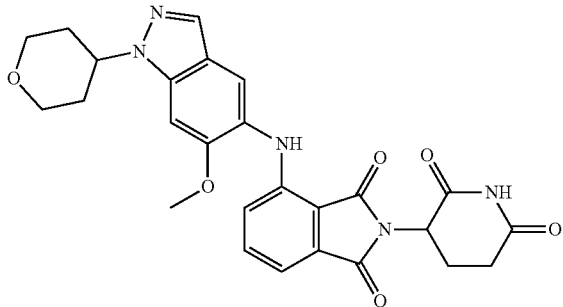 [SMILES: COc1cc2c(cnn2C2CCOCC2)cc1Nc1cccc2c1C(=O)N(C1CCC(=O)NC1=O)C2=O]

To a solution of 5-bromo-6-methoxy-1-tetrahydropyran-4-yl-indazole (0.06 g, 0.19 mmol) in 1,4-dioxane (2 mL) was added potassium carbonate (0.09 g, 0.57 mmol) and chloro(2-dicyclohexylphosphino-2',4',6'-tri-i-propyl-1,1'-biphenyl)(2'-amino-1,1'-biphenyl-2-yl) palladium(II) (0.02 g, 0.02 mmol) and 4-amino-2-(2,6-dioxo-3-piperidyl)isoindoline-1,3-dione (0.08 g, 0.29 mmol). The mixture was stirred at 110° C. for 12 hours. The mixture was concentrated under reduced pressure. The residue was purified by prep-HPLC to afford 2-(2,6-dioxo-3-piperidyl)-4-[(6-methoxy-1-tetrahydropyran-4-yl-indazol-5-yl)amino]isoindoline-1,3-dione (52 mg, 0.103 mmol, 53% yield). ¹HNMR (400 MHz, DMSO-d₆) δ 11.13 (s, 1H), 8.24 (s, 1H), 7.96 (s, 1H), 7.76 (s, 1H), 7.59 (t, J=8.4 Hz, 1H), 7.42 (s, 1H), 7.3 (d, J=8.4 Hz, 1H), 7.2 (d, J=8 Hz, 1H), 5.15-5.10 (m, 1H), 4.92-4.87 (m, 1H), 4.04-4.01 (m, 2H), 3.94 (s, 3H), 3.61-3.55 (m, 2H), 2.95-2.86 (m, 1H), 2.66-2.55 (m, 2H), 2.18-2.05 (m, 3H), 1.90-1.87 (m, 2H); MS (ESI) m/z: 504.3 [M+1]⁺.

Example 13: 2-(2,6-dioxo-3-piperidyl)-4-[[1-methyl-5-(2-methyl-4-pyridyl)indazol-6-yl]amino]isoindoline-1,3-dione

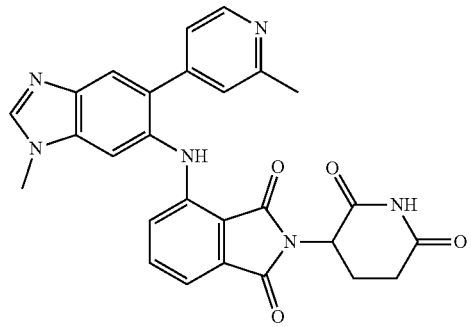 [SMILES: Cc1cc(-c2cc3ncn(C)c3cc2Nc2cccc3c2C(=O)N(C2CCC(=O)NC2=O)C3=O)ccn1]

5-bromo-1-methyl-6-nitro-indazole

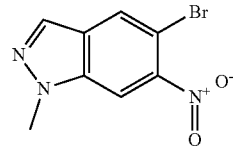

To a solution of 5-bromo-6-nitro-1H-indazole (2.0 g, 8.26 mmol) in DMF (20 mL) was added sodium hydride (0.363 g, 9.09 mmol) at 0° C. The mixture was stirred at 0° C. for 0.5 h. To the mixture was added iodomethane (1.17 g, 8.26 mmol). The mixture was stirred at 25° C. for 12 h. The mixture was added to water (50 mL) and extracted with ethyl acetate (50 mL×3). The combined organic layers were washed with brine (50 mL×1), dried with anhydrous sodium sulfate, filtered and concentrated in vacuo. The resulting residue was purified by semi-preparative reverse phase-HPLC to afford 5-bromo-1-methyl-6-nitro-indazole (1.20 g, 4.69 mmol, 57% yield). ¹H NMR (400 MHz, DMSO-d₆) δ 8.56 (s, 1H), 8.32 (s, 1H), 8.21 (d, J=0.8 Hz, 1H), 4.12 (s, 3H); MS (ESI) m/z: 256.1[M+1]⁺.

1-methyl-5-(2-methyl-4-pyridyl)-6-nitro-indazole

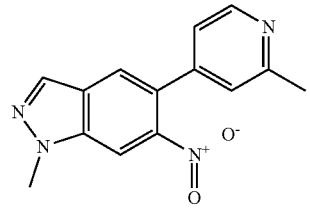

To a solution of 5-bromo-1-methyl-6-nitro-indazole (0.300 g, 1.17 mmol) in 1,4-dioxane (3 mL) and water (0.6 mL) was added 2-methyl-4-(4,4,5,5-tetramethyl-1,3,2-dioxaborolan-2-yl)pyridine (0.385 g, 1.76 mmol), potassium carbonate (0.485 g, 3.51 mmol) and (1,1'-bis(diphenylphosphino)ferrocene)palladium(II) dichloride (0.096 g, 0.12 mmol). The mixture was stirred at 100° C. under nitrogen for 12 h. The mixture was filtered and concentrated. The residue was purified by prep-TLC (50% ethyl acetate in petroleum ether) to afford 1-methyl-5-(2-methyl-4-pyridyl)-6-nitro-indazole (0.290 g, 1.08 mmol, 92% yield). MS (ESI) m/z: 269.1[M+1]⁺

1-methyl-5-(2-methyl-4-pyridyl)indazol-6-amine

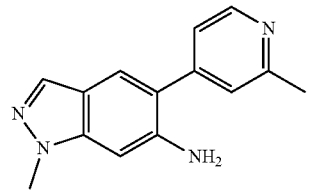 [SMILES: Cc1cc(-c2cc3cnn(C)c3cc2N)ccn1]

To a solution of 1-methyl-5-(2-methyl-4-pyridyl)-6-nitro-indazole (0.290 g, 1.08 mmol) in ethanol (3 mL) and water (1.5 mL) was added iron powder (0.182 g, 3.24 mmol) and ammonium chloride (0.286 g, 5.41 mmol). The mixture was stirred at 80° C. for 2 h. The mixture was filtered and concentrated in vacuo. The resulting residue was purified by prep-TLC (100% ethyl acetate) to afford 1-methyl-5-(2-methyl-4-pyridyl)indazol-6-amine (0.130 g, 0.54 mmol, 50% yield). $^1$HNMR (400 MHz, DMSO-$d_6$) δ 8.46 (d, J=5.2 Hz, 1H), 7.78 (s, 1H), 7.39 (s, 1H), 7.32 (s, 1H), 7.25 (d, J=5.2 Hz, 1H), 6.70 (s, 1H), 5.09 (s, 2H), 3.85 (s, 3H), 2.50 (s, 3H); MS (ESI) m/z: 239.2[M+1]$^+$.

Dimethyl 3-[[1-methyl-5-(2-methyl-4-pyridyl)indazol-6-yl]amino]benzene-1,2-dicarboxylate

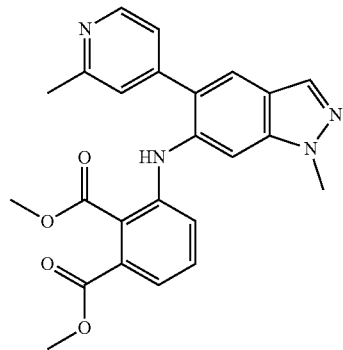 [SMILES: COC(=O)c1cccc(Nc2cc3c(cnn3C)cc2-c2ccnc(C)c2)c1C(=O)OC]

To a solution of 1-methyl-5-(2-methyl-4-pyridyl)indazol-6-amine (0.120 g, 0.50 mmol) in 1,4-dioxane (2 mL) was added dimethyl 3-bromobenzene-1,2-dicarboxylate (0.165 g, 0.60 mmol), potassium carbonate (0.208 g, 1.51 mmol) and chloro(2-dicyclohexylphosphino-2',4',6'-tri-i-propyl-1,1'-biphenyl)(2'-amino-1,1'-biphenyl-2-yl) palladium(II) (0.043 g, 0.05 mmol). The mixture was stirred at 110° C. under nitrogen for 12 h. The mixture was filtered and concentrated. The residue was purified by semi-preparative reverse phase-HPLC to afford dimethyl 3-[[1-methyl-5-(2-methyl-4-pyridyl)indazol-6-yl]amino]benzene-1,2-dicarboxylate (0.200 g, 0.46 mmol, 92% yield). MS (ESI) m/z: 431.2[M+1]$^+$.

2-(2,6-dioxo-3-piperidyl)-4-[[1-methyl-5-(2-methyl-4-pyridyl)indazol-6-yl]amino]isoindoline-1,3-dione

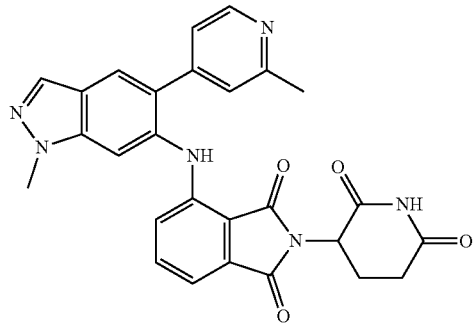 [SMILES: Cc1cc(-c2cc3cnn(C)c3cc2Nc2cccc3c2C(=O)N(C2CCC(=O)NC2=O)C3=O)ccn1]

To a solution of dimethyl 3-[[1-methyl-5-(2-methyl-4-pyridyl)indazol-6-yl]amino]benzene-1,2-dicarboxylate (0.100 g, 0.23 mmol) in pyridine (1 mL) was added 3-aminopiperidine-2,6-dione; hydrochloride (0.042 g, 0.26 mmol) and lithium iodide (0.091 g, 0.70 mmol). The mixture was stirred at 120° C. for 12 h. The mixture was concentrated in vacuo. The resulting residue was purified by semi-preparative reverse phase-HPLC to afford the product 2-(2,6-dioxo-3-piperidyl)-4-[[1-methyl-5-(2-methyl-4-pyridyl)indazol-6-yl]amino]isoindoline-1,3-dione (52 mg, 0.104 mmol, 45% yield). $^1$H NMR (400 MHz, DMSO-$d_6$) δ 11.11 (s, 1H), 8.41-8.35 (m, 2H), 8.12 (s, 1H), 7.86 (s, 1H), 7.78 (s, 1H), 7.52-7.45 (m, 1H), 7.39 (s, 1H), 7.29 (d, J=5.2 Hz, 1H), 7.17-7.09 (m, 2H), 5.10-5.03 (m, 1H), 4.06 (s, 3H), 2.90-2.82 (m, 1H), 2.61-2.57 (m, 2H), 2.43 (s, 3H), 2.07-1.99 (m, 1H); MS (ESI) m/z: 495.1 [M+1]$^+$.

Example 14: 2-(2,6-dioxopiperidin-3-yl)-4-((5-(3-fluoro-4-methoxyphenyl)-1-methyl-1H-benzo[d]imidazol-6-yl)amino)isoindoline-1,3-dione

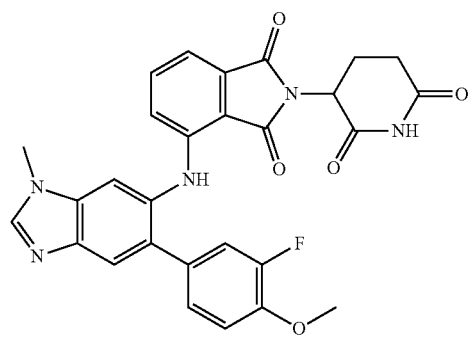 [SMILES: COc1ccc(-c2cc3ncn(C)c3cc2Nc2cccc3c2C(=O)N(C2CCC(=O)NC2=O)C3=O)cc1F]

5-(3-fluoro-4-methoxyphenyl)-1-methyl-6-nitro-1H-benzo[d]imidazole

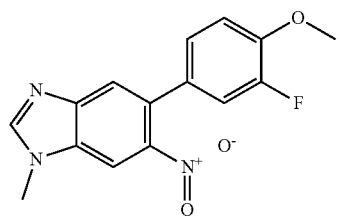

To a solution of 5-bromo-1-methyl-6-nitro-1H-benzo[d]imidazole (0.060 g, 0.23 mmol) and (3-fluoro-4-methoxyphenyl)boronic acid (0.048 g, 0.28 mmol) in dioxane (0.5000 mL) was added potassium carbonate (0.096 g, 0.70 mmol) and dichloro(1,1'-bis(diphenylphosphanyl)ferrocene) palladium(II) (0.018 g, 0.03 mmol). The resulting mixture was stirred at 110° C. for 12 hours under nitrogen. The mixture was filtered and the filtrate was concentrated in vacuo. The residue was purified by prep-TLC (petroleum ether:ethyl acetate 1:2) to afford 5-(3-fluoro-4-methoxyphenyl)-1-methyl-6-nitro-1H-benzo[d]imidazole (0.054 g, 0.18 mmol, 76% yield). MS (ESI) m/z: 302.1[M+1]$^+$

5-(3-fluoro-4-methoxyphenyl)-1-methyl-1H-benzo[d]imidazol-6-amine

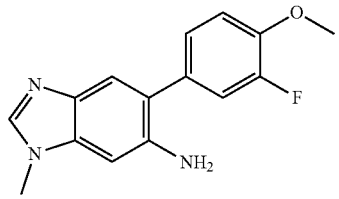 [SMILES: COc1ccc(-c2cc3ncn(C)c3cc2N)cc1F]

To a solution of 5-(3-fluoro-4-methoxyphenyl)-1-methyl-6-nitro-1H-benzo[d]imidazole (0.050 g, 0.17 mmol) in ethanol (0.3 mL) and water (0.1 mL) was added ferrous powder (0.050 g, 0.90 mmol) and ammonium chloride (0.090 g, 1.67 mmol). The resulting mixture was stirred at 70° C. for 12 hours. The mixture was filtered and the filtrate was concentrated in vacuo. The crude product was purified by prep-HPLC to afford 5-(3-fluoro-4-methoxyphenyl)-1-methyl-1H-benzo[d]imidazol-6-amine (0.051 g, 0.188 mmol, 100% yield). $^1$H NMR (400 MHz, CDCl$_3$) δ 7.56 (s, 1H), 7.19 (s, 1H), 7.14-7.01 (m, 3H), 6.74 (s, 1H), 5.00-5.52 (m, 2H), 3.92 (s, 3H), 3.89 (s, 3H); MS (ESI) m/z: 272.1[M+1]$^+$.

Dimethyl 3-((5-(3-fluoro-4-methoxyphenyl)-1-methyl-1H-benzo[d]imidazol-6-yl)amino)phthalate

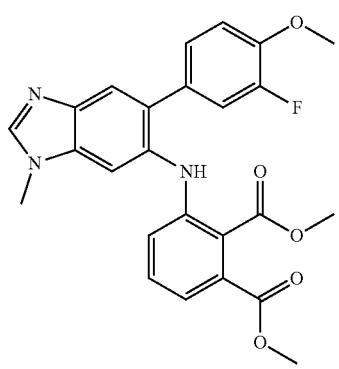 [SMILES: COC(=O)c1cccc(Nc2cc3c(cc2-c2ccc(OC)c(F)c2)ncn3C)c1C(=O)OC]

To a solution of 5-(3-fluoro-4-methoxyphenyl)-1-methyl-1H-benzo[d]imidazol-6-amine (0.041 g, 0.15 mmol) and dimethyl 3-bromo phthalate (0.045 g, 0.16 mmol) in dioxane (2 mL) was added methanesulfonato(2-dicyclohexylphosphino-2,6-di-i-propoxy-1,1-biphenyl)(2-amino-1,1-biphenyl-2-yl)palladium(II) (0.012 g, 0.01 mmol) and cesium carbonate (0.148 g, 0.46 mmol). The resulting mixture was stirred at 110° C. for 12 hours under nitrogen. The mixture was filtered and the filtrate was concentrated in vacuo. The residue was purified by prep-TLC (petroleum ether:ethyl acetate1:1) to afford dimethyl 3-((5-(3-fluoro-4-methoxyphenyl)-1-methyl-1H-benzo[d]imidazol-6-yl)amino)phthalate (0.041 g, 0.088 mmol, 58% yield). MS (ESI) m/z: 464.2[M+1]$^+$

2-(2,6-dioxopiperidin-3-yl)-4-((5-(3-fluoro-4-methoxyphenyl)-1-methyl-1H-benzo[d]imidazol-6-yl)amino)isoindoline-1,3-dione

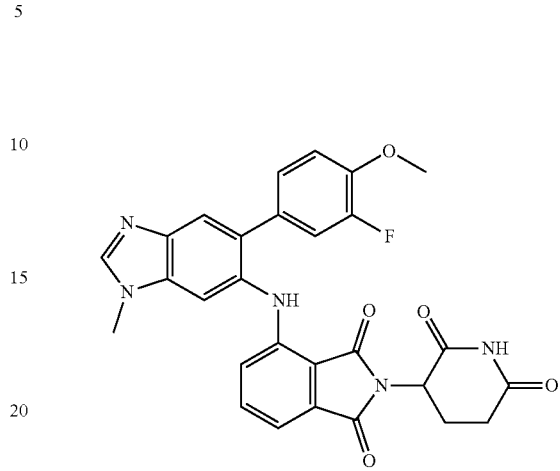

To a solution of dimethyl 3-((5-(3-fluoro-4-methoxyphenyl)-1-methyl-1H-benzo[d]imidazol-6-yl)amino)phthalate (0.035 g, 0.08 mmol) and 3-aminopiperidine-2,6-dione hydrochloride (0.035 g, 0.21 mmol) in pyridine (1.5 mL) was added lithium iodide (0.049 mg, 0.38 mmol). The resulting mixture was stirred at 130° C. for 12 hours. The reaction mixture was filtered and the filtrate was concentrated under reduced pressure. The crude product was purified by prep-HPLC to afford 2-(2,6-dioxopiperidin-3-yl)-4-((5-(3-fluoro-4-methoxyphenyl)-1-methyl-1H-benzo[d]imidazol-6-yl)amino)isoindoline-1,3-dione (33 mg, 0.063 mmol, 84% yield). $^1$H NMR (400 MHz, DMSO-d$_6$) δ 11.11 (s, 1H), 8.94-8.90 (m, 1H), 8.32 (s, 1H), 7.90 (s, 1H), 7.75 (s, 1H), 7.49-7.40 (m, 1H), 7.39-7.37 (m, 1H), 7.28 (d, J=1.6 Hz, 1H), 7.18-7.14 (m, 2H), 7.28 (d, J=2.4 Hz, 1H), 5.08 (dd, J=5.6, 13.2 Hz, 1H), 3.96 (s, 3H), 3.82 (s, 3H), 2.92-2.89 (m, 1H), 2.86-2.84 (m, 2H), 2.10-2.01 (m, 1H); MS (ESI) m/z: 528.0 [M+1]$^+$.

Example 15: 2-(2,6-dioxopiperidin-3-yl)-4-((6-(2-methylpyridin-4-yl)-1-(tetrahydro-2H-pyran-4-yl)-1H-indazol-5-yl)amino)isoindoline-1,3-dione

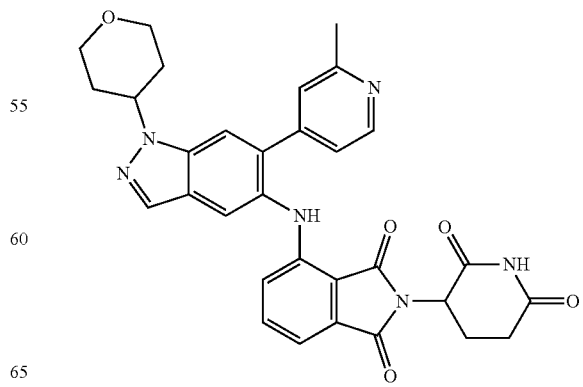

6-bromo-5-nitro-1-(tetrahydro-2H-pyran-4-yl)-1H-indazole

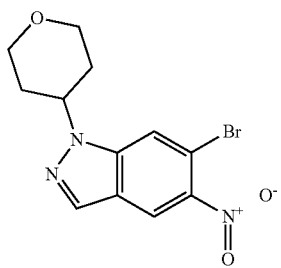

To a solution of 6-bromo-5-nitro-1H-indazole (1.0 g, 4.13 mmol) in N,N-dimethylacetamide (10 mL) was added potassium carbonate (1.7 g, 12.4 mmol), 4-iodotetrahydropyran (1.05 g, 4.96 mmol). The solution was stirred at 135° C. for 1 h. The suspension was filtered and the filtrate was concentrated. The residue was purified by prep-TLC (petroleum ether:ethyl acetate2:1) to afford 6-bromo-5-nitro-1-tetrahydropyran-4-yl-indazole (200 mg, 0.613 mmol, 14% yield). $^1$H NMR (400 MHz, CDCl$_3$) δ 8.41 (s, 1H), 8.09 (s, 1H), 7.59 (s, 1H), 4.56-4.53 (m, 1H), 4.14-4.10 (m, 2H), 3.60-3.53 (m, 2H), 2.36-2.32 (m, 2H), 1.94-1.90 (m, 2H); MS (ESI) m/z 326.2 [M+1]$^+$.

6-(2-methylpyridin-4-yl)-5-nitro-1-(tetrahydro-2H-pyran-4-yl)-1H-indazole

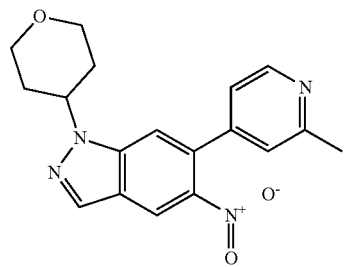

To a solution of 6-bromo-5-nitro-1-tetrahydropyran-4-yl-indazole (0.220 g, 0.670 mmol) in 1,4-dioxane (10 mL) was added 2-methyl-4-(4,4,5,5-tetramethyl-1,3,2-dioxaborolan-2-yl)pyridine (0.177 g, 0.810 mmol), potassium carbonate (0.279 g, 2.02 mmol) and [1,1-bis(diphenylphosphino)ferrocene]palladium(II) chloride dichloromethane complex (0.055 g, 0.070 mmol). The mixture was stirred at 110° C. under nitrogen for 12 h. The mixture was concentrated in vacuo. The residue was purified by prep-TLC (petroleum ether:ethyl acetate 3:1) to afford 6-(2-methyl-4-pyridyl)-5-nitro-1-tetrahydropyran-4-yl-indazole (160 mg, 0.472 mmol, 70% yield). $^1$H NMR (400 MHz, CDCl$_3$) δ 8.79 (d, J=6.0 Hz, 1H), 8.70 (s, 1H), 8.27 (s, 1H), 7.58 (d, J=5.2 Hz, 1H), 7.50 (s, 1H), 7.36 (s, 1H), 4.65-4.63 (m, 1H), 4.14-4.10 (m, 2H), 3.58-3.52 (m, 2H), 2.58 (s, 3H), 2.40-2.36 (m, 2H), 1.95-1.92 (m, 2H); MS (ESI) m/z 339.2 [M+1]$^+$.

6-(2-methylpyridin-4-yl)-1-(tetrahydro-2H-pyran-4-yl)-1H-indazol-5-amine

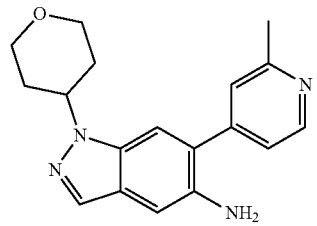 [SMILES: Cc1cc(-c2cc3c(cnn3C3CCOCC3)cc2N)ccn1]

To a solution of 6-(2-methyl-4-pyridyl)-5-nitro-1-tetrahydropyran-4-yl-indazole (0.160 g, 0.4700 mmol) in ethanol (10 mL) was added iron power (0.265 g, 4.73 mmol), ammonium chloride (0.255 g, 4.73 mmol) in water (2 mL). The solution was stirred at 90° C. for 2 h. The suspension was filtered and the filtrate was extracted with dichloromethane (100 ml×2). The combined organic phases were washed with brine (50 ml), dried over sodium sulfate, and filtered. The filtrate was concentrated to afford 6-(2-methyl-4-pyridyl)-1-tetrahydropyran-4-yl-indazol-5-amine (100 mg, 0.324 mmol, 68% yield). MS (ESI) m/z 309.4 [M+1]$^+$

Dimethyl-3-((6-(2-methylpyridin-4-yl)-1-(tetrahydro-2H-pyran-4-yl)-1H-indazol-5-yl)amino)phthalate

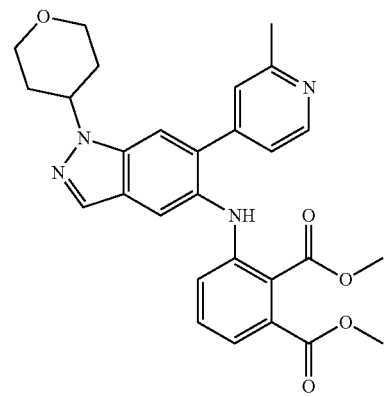 [SMILES: COC(=O)c1cccc(Nc2cc3cnn(C4CCOCC4)c3cc2-c2ccnc(C)c2)c1C(=O)OC]

To a solution of 6-(2-methyl-4-pyridyl)-1-tetrahydropyran-4-yl-indazol-5-amine (0.10 g, 0.320 mmol) in 1,4-dioxane (5 mL) was added dimethyl 3-bromobenzene-1,2-dicarboxylate (0.106 g, 0.390 mmol), potassium carbonate (0.134 g, 0.970 mmol) and chloro(2-dicyclohexylphosphino-2',4',6'-tri-i-propyl-1,1'-biphenyl)(2'-amino-1,1'-biphenyl-2-yl) palladium(II) (0.027 g, 0.030 mmol). The mixture was stirred at 110° C. under nitrogen for 12 h. The solution was concentrated and the residue was purified by prep-HPLC to afford dimethyl 3-[[6-(2-methyl-4-pyridyl)-1-tetrahydropyran-4-yl-indazol-5-yl]amino]benzene-1,2-dicarboxylate (100 mg, 0.199 mmol, 61% yield). $^1$H NMR (400 MHz, CDCl$_3$) δ 8.73 (s, 1H), 8.15 (s, 1H), 8.10 (s, 1H), 7.81 (s, 1H), 7.71 (brs, 2H), 7.58 (brs, 1H), 7.24-7.20 (m, 1H), 7.01-6.99 (m, 1H), 6.83 (d, J=8.4 Hz, 1H), 4.75-4.72 (m, 2H), 4.22-4.20 (m, 2H), 3.92 (s, 3H), 3.90 (s, 3H), 3.70-3.65 (m, 2H), 2.65 (s, 3H), 2.49-2.47 (m, 2H), 2.07-2.04 (m, 2H); MS (ESI) m/z 501.3 [M+1]$^+$.

2-(2,6-dioxopiperidin-3-yl)-4-((6-(2-methylpyridin-4-yl)-1-(tetrahydro-2H-pyran-4-yl)-1H-indazol-5-yl)amino)isoindoline-1,3-dione 6-bromo-5-nitro-1H-benzimidazole

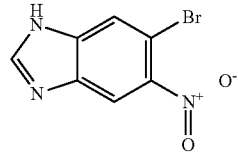

To a solution of 5-bromo-1H-benzimidazole (10.0 g, 50.75 mmol) in sulfuric acid (50 mL, 2967.60 mmol) was added potassium nitrate (5.18 g, 60.90 mmol) in portions at 0° C. The mixture was stirred at 25° C. for 1 hour. The reaction mixture was poured into 500 mL ice water, and the pH of the combined aqueous layer was adjusted to pH 7 by addition of 6 N sodium hydroxide aqueous solution. The resultant precipitate solid was collected by filtration and purified by prep-HPLC to afford 5-bromo-6-nitro-1H-benzimidazole (5.10 g, 21.07 mmol, 41% yield). $^1$H NMR (400 MHz, DMSO-$d_6$) δ 8.54 (s, 1H), 8.36 (s, 1H), 8.08 (s, 1H); MS (ESI) m z: 244.0 [M]$^+$.

5-bromo-1-cyclopropyl-6-nitro-1H-benzimidazole

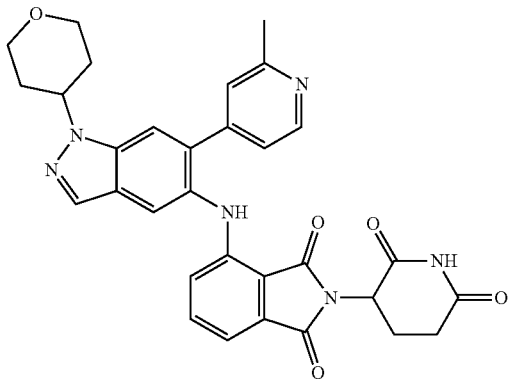 [SMILES: Cc1cc(-c2cc3c(cnn3C3CCOCC3)cc2Nc2cccc3c2C(=O)N(C2CCC(=O)NC2=O)C3=O)ccn1]

To a solution of dimethyl 3-[[6-(2-methyl-4-pyridyl)-1-tetrahydropyran-4-yl-indazol-5-yl]amino]benzene-1,2-dicarboxylate (0.10 g, 0.200 mmol) in pyridine (2 mL) was added 3-aminopiperidine-2,6-dione hydrochloride (0.036 g, 0.220 mmol) and lithium iodide (0.053 g, 0.400 mmol). The mixture was stirred at 120° C. for 12 h. The mixture was concentrated in vacuo and the residue was purified by semi-preparative reverse phase-HPLC to afford 2-(2,6-dioxo-3-piperidyl)-4-[[6-(2-methyl-4-pyridyl)-1-tetrahydropyran-4-yl-indazol-5-yl]amino]isoindoline-1,3-dione (45 mg, 0.073 mmol, 36% yield). $^1$H NMR (400 MHz, DMSO-$d_6$) δ 11.11 (s, 1H), 8.60 (d, J=5.6 Hz, 1H), 8.42 (s, 1H), 8.21 (s, 1H), 8.07 (s, 1H), 7.92 (s, 1H), 7.85 (brs, 1H), 7.76-7.74 (m, 1H), 7.41 (d, J=8.0 Hz, 1H), 7.08 (d, J=7.8 Hz, 1H), 6.72 (d, J=8.4 Hz, 1H), 5.10-5.03 (m, 2H), 4.06-4.02 (m, 2H), 3.60-3.55 (m, 2H), 2.91-2.88 (m, 1H), 2.67-2.66 (m, 2H), 2.51 (s, 3H), 2.20-2.15 (m, 2H), 2.09-2.00 (m, 1H), 1.95-1.92 (m, 2H); MS (ESI) m/z 565.3 [M+1]$^+$.

Example 16: 4-((1-cyclopropyl-5-(2-methylpyridin-4-yl)-1H-benzo[d]imidazol-6-yl)amino)-2-(2,6-dioxopiperidin-3-yl)isoindoline-1,3-dione To a solution of 6-bromo-5-nitro-1H-benzimidazole (0.600 g, 2.48 mmol) in dichloroethane (20 mL) was added cyclopropylboronic acid (0.430 g, 4.96 mmol), 2-(2-pyridyl)pyridine (0.388 g, 2.48 mmol), copper diacetate (0.394 g, 2.48 mmol), sodium carbonate (0.525 g, 4.96 mmol). The mixture was stirred under air at 70° C. for 12 hours. The mixture was filtered and the filtrate was concentrated. The residue was purified by prep-TLC on silica gel (50% of ethyl acetate in petroleum ether) to afford 6-bromo-1-cyclopropyl-5-nitro-benzimidazole (0.290 g, 1.02 mmol, 41% yield). MS (ESI) m/z: 283.3 [M+1]$^+$ 1-cyclopropyl-5-(2-methylpyridin-4-yl)-6-nitro-1H-benzimidazole

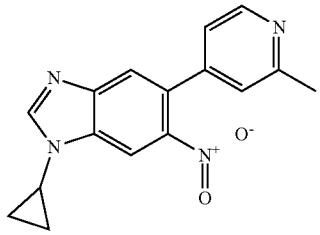

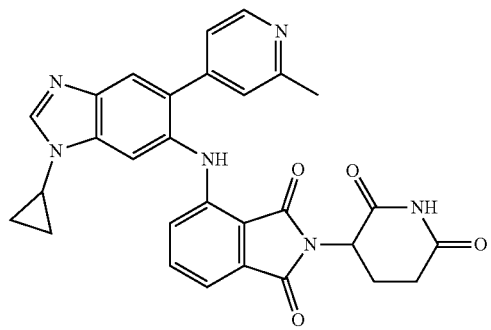 [SMILES: Cc1cc(-c2cc3ncn(C4CC4)c3cc2Nc2cccc3c2C(=O)N(C2CCC(=O)NC2=O)C3=O)ccn1]

To a solution of 6-bromo-1-cyclopropyl-5-nitro-benzimidazole (0.280 g, 0.99 mmol) in 1,4-dioxane (4 mL) and water (1 mL) was added 2-methyl-4-(4,4,5,5-tetramethyl-1,3,2-dioxaborolan-2-yl)pyridine (0.217 g, 0.99 mmol), (1,1'- bis(diphenylphosphino)ferrocene) palladium(II) dichloride (0.080 g, 0.10 mmol), potassium carbonate (0.274 g, 1.99 mmol). The mixture was stirred under nitrogen at 100° C. for 12 hours. The mixture was filtered and the filtrate was concentrated. The residue was purified by prep-TLC on silica gel (80% of ethyl acetate in petroleum ether) to afford 1-cyclopropyl-6-(2-methyl-4-pyridyl)-5-nitro-benzimidazole (0.200 g, 0.679 mmol, 68% yield). MS (ESI) m/z: 295.1 [M+1]$^+$ 1-cyclopropyl-5-(2-methylpyridin-4-yl)-1H-benzimidazol-6-amine

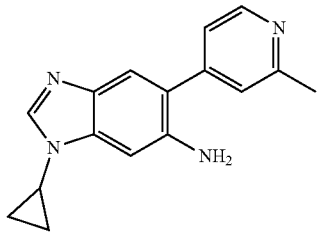 [SMILES: Cc1cc(-c2cc3ncn(C4CC4)c3cc2N)ccn1]

To a solution of 1-cyclopropyl-5-(2-methyl-4-pyridyl)-6-nitro-benzimidazole (0.200 g, 0.68 mmol) in ethanol (6 mL) and water (2 mL) was added iron (0.189 g, 3.40 mmol), and ammonium chloride (0.367 g, 6.80 mmol). The mixture was stirred at 80° C. for 1 hour. The mixture was filtered and the filtrate was concentrated. The resulting residue was purified by prep-HPLC to afford 3-cyclopropyl-6-(2-methyl-4-pyridyl)benzimidazol-5-amine (0.070 g, 0.264 mmol, 38% yield). MS (ESI) m/z: 265.1 [M+1]$^+$ Dimethyl 3-((1-cyclopropyl-5-(2-methylpyridin-4-yl)-1H-benzo[d]imidazol-6-yl)amino)phthalate

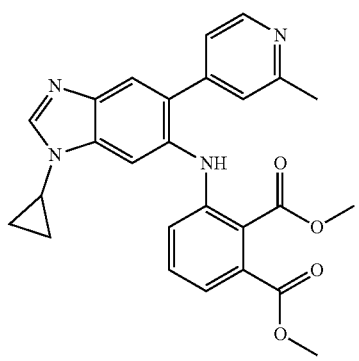 [SMILES: COC(=O)c1cccc(Nc2cc3c(cc2-c2ccnc(C)c2)ncn3C2CC2)c1C(=O)OC]

To a solution of 3-cyclopropyl-6-(2-methyl-4-pyridyl) benzimidazol-5-amine (0.050 g, 0.19 mmol) in 1,4-dioxane (4 mL) was added dimethyl 3-bromobenzene-1,2-dicarboxylate (0.057 g, 0.21 mmol), potassium carbonate (0.078 g, 0.57 mmol), and chloro(2-dicyclohexylphosphino-2,4,6-triisopropyl-1,1-biphenyl)[2-(2-amino-1,1-biphenyl)]palladium(II) (0.015 g, 0.02 mmol). The mixture was stirred under nitrogen at 110° C. for 12 hours. The mixture was filtered and the filtrate was concentrated. The residue was purified by prep-HPLC to afford dimethyl 3-[[3-cyclopropyl-6-(2-methyl-4-pyridyl)benzimidazol-5-yl]amino]benzene-1,2-dicarboxylate (0.030 g, 0.065 mmol, 34% yield).

$^1$H NMR (400 MHz, MeOD-d$_4$) δ 9.12 (brs, 1H), 8.59-8.58 (m, 1H), 8.08-8.01 (m, 1H), 8.00-7.98 (m, 2H), 7.82 (s, 1H), 7.28-7.20 (m, 2H), 6.94-6.93 (m, 1H), 3.85-3.82 (m, 6H), 3.70 (s, 1H), 3.32-3.30 (m, 1H), 2.74 (s, 3H), 1.31-1.23 (m, 4H). MS (ESI) m/z: 457.2 [M+1]$^+$ 4-((1-cyclopropyl-5-(2-methylpyridin-4-yl)-1H-benzo[d]imidazol-6-yl)amino)-2-(2,6-dioxopiperidin-3-yl)isoindoline-1,3-dione

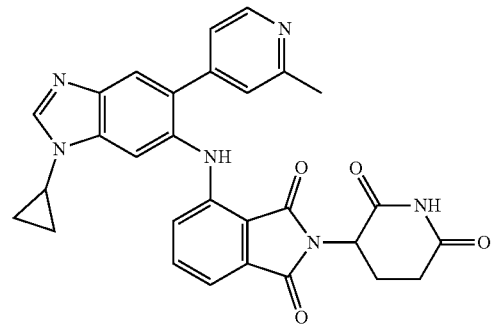 [SMILES: Cc1cc(-c2cc3ncn(C4CC4)c3cc2Nc2cccc3c2C(=O)N(C2CCC(=O)NC2=O)C3=O)ccn1]

To a solution of dimethyl 3-[[3-cyclopropyl-6-(2-methyl-4-pyridyl)benzimidazol-5-yl]amino]benzene-1,2-dicarboxylate (0.030 g, 0.07 mmol) in pyridine (2 mL) was added 3-aminopiperidine-2,6-dione hydrochloride (0.016 g, 0.10 mmol), and lithium iodide (0.044 g, 0.33 mmol). The solution was stirred at 120° C. for 12 hours. The mixture was concentrated under reduced pressure. The residue was purified by prep-HPLC to afford 4-[[3-cyclopropyl-6-(2-methyl-4-pyridyl)benzimidazol-5-yl]amino]-2-(2,6-dioxo-3-piperidyl)isoindoline-1,3-dione (9.96 mg, 0.018 mmol, 28% yield). $^1$H NMR (400 MHz, DMSO-d$_6$) δ 11.11 (s, 1H), 8.37-8.33 (m, 4H), 7.75-7.72 (m, 2H), 7.42-7.40 (m, 1H), 7.36 (s, 1H), 7.26-7.25 (m, 1H), 7.09-7.08 (m, 1H), 6.90-6.87 (m, 1H), 5.10-5.06 (m, 1H), 3.56-3.52 (m, 1H), 2.95-2.85 (m, 1H), 2.58-2.52 (m, 2H), 2.33 (s, 3H), 2.04-2.02 (m, 1H), 1.11-1.06 (m, 4H); MS (ESI) m/z: 521.3 [M+1]$^+$.

Example 17: 2-(2,6-dioxo-3-piperidyl)-4-[[3-methyl-6-(2-methyl-4-pyridyl)-1,2-benzoxazol-5-yl]amino]isoindoline-1,3-dione

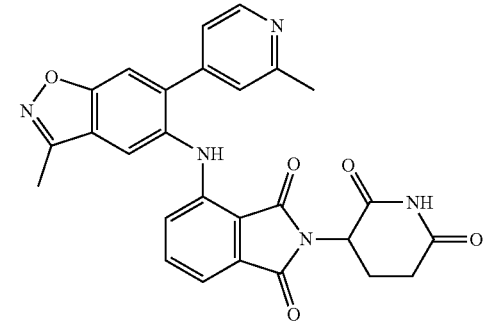 [SMILES: Cc1cc(-c2cc3onc(C)c3cc2Nc2cccc3c2C(=O)N(C2CCC(=O)NC2=O)C3=O)ccn1]

111
6-bromo-3-methyl-5-nitro-1,2-benzoxazole

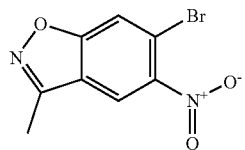

To a solution of 6-bromo-3-methyl-1,2-benzoxazole (2.00 g, 9.43 mmol) in concentrated sulfuric acid (30 mL, 9.43 mmol) was added dropwise concentrated nitric acid (1.26 mL, 28.30 mmol) at 0° C. The mixture was stirred at 25° C. for 2 hours. The mixture was slowly poured into ice water (100 mL). The aqueous phase was extracted with ethyl acetate (60 mL×2). The combined organic layers were dried over anhydrous sodium sulfate, filtered and concentrated under reduced pressure. The residue was purified by column chromatography on silica gel (20-25% ethyl acetate in petroleum ether) to afford 6-bromo-3-methyl-5-nitro-1,2-benzoxazole (0.40 g, 1.56 mmol, 16% yield). $^1$H NMR (400 MHz, DMSO-$d_6$) δ 8.73 (s, 1H), 8.43 (s, 1H), 2.60 (s, 3H).

3-methyl-6-(2-methyl-4-pyridyl)-5-nitro-1,2-benzoxazole

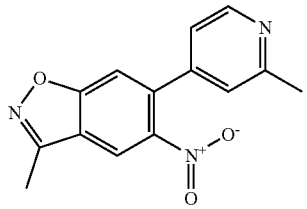 [SMILES: Cc1cc(-c2cc3onc(C)c3cc2[N+](=O)[O-])ccn1]

To a solution of 6-bromo-3-methyl-5-nitro-1,2-benzoxazole (0.360 g, 1.40 mmol) in 1,4-dioxane (5 mL) was added 2-methyl-4-(4,4,5,5-tetramethyl-1,3,2-dioxaborolan-2-yl)pyridine (0.368 g, 1.68 mmol), sodium carbonate (1.4 mL, 2 M, 2.80 mmol) and dichloro(1,1'-bis(diphenylphosphanyl)ferrocene)palladium(II) dichloromethane adduct (0.098 g, 0.14 mmol). The suspension was degassed under vacuum and purged with nitrogen several times. The mixture was stirred at 80° C. for 12 hours. The mixture was filtered and the filtrate was concentrated under reduced pressure. The residue was purified by prep-HPLC to afford 3-methyl-6-(2-methyl-4-pyridyl)-5-nitro-1,2-benzoxazole (0.260 g, 0.97 mmol, 68% yield). $^1$H NMR (400 MHz, CDCl$_3$) δ 8.61 (d, J=5.2 Hz, 1H), 8.37 (s, 1H), 7.55 (s, 1H), 7.16 (s, 1H), 7.10 (dd, J=1.2, 5.2 Hz, 1H), 2.70 (s, 3H), 2.65 (s, 3H); MS (ESI) m/z 270.1 [M+1]$^+$.

112
3-methyl-6-(2-methyl-4-pyridyl)-1,2-benzoxazol-5-amine

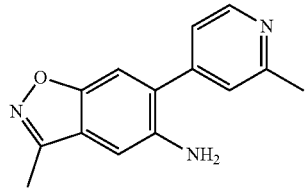 [SMILES: Cc1cc(-c2cc3onc(C)c3cc2N)ccn1]

To a solution of 3-methyl-6-(2-methyl-4-pyridyl)-5-nitro-1,2-benzoxazole (0.180 g, 0.67 mmol) in acetic acid (5 mL) was added a solution of stannous chloride (0.302 g, 1.34 mmol) in hydrogen chloride (0.67 mL, 1 M, 0.67 mmol). The mixture was stirred at 100° C. for 1 hour. The mixture was concentrated under reduced pressure. The mixture was basified to pH 7-8 with ammonium hydroxide. The residue was purified by prep-TLC (ethyl acetate) to afford 3-methyl-6-(2-methyl-4-pyridyl)-1,2-benzoxazol-5-amine (0.060 g, 0.25 mmol, 37% yield). MS (ESI) m/z 240.0 [M+1]$^+$ 2-(2,6-dioxo-3-piperidyl)-4-[[3-methyl-6-(2-methyl-4-pyridyl)-1,2-benzoxazol-5-yl]amino]isoindoline-1,3-dione

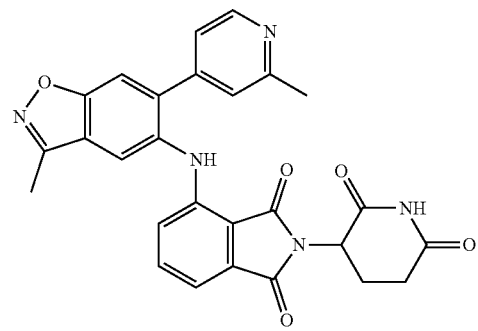 [SMILES: Cc1cc(-c2cc3onc(C)c3cc2Nc2cccc3c2C(=O)N(C2CCC(=O)NC2=O)C3=O)ccn1]

To a solution of 3-methyl-6-(2-methyl-4-pyridyl)-1,2-benzoxazol-5-amine (0.060 g, 0.25 mmol) in 1,4-dioxane (5 mL) was added 4-bromo-2-(2,6-dioxo-3-piperidyl)isoindoline-1,3-dione (0.101 g, 0.30 mmol), sodium carbonate (0.080 g, 0.75 mmol) and chloro(2-dicyclohexylphosphino-2',4',6'-tri-i-propyl-1,1'-biphenyl)(2'-amino-1,1'-biphenyl-2-yl)palladium(II) (0.020 g, 0.03 mmol). The suspension was degassed under vacuum and purged with nitrogen several times. The mixture was stirred at 80° C. for 12 hours. The mixture was filtered and filtrate was concentrated under reduced pressure. The residue was purified by prep-HPLC and prep-TLC (9% methanol in dichloromethane) to afford 2-(2,6-dioxo-3-piperidyl)-4-[[3-methyl-6-(2-methyl-4-pyridyl)-1,2-benzoxazol-5-yl]amino]isoindoline-1,3-dione (4.01 mg, 0.007 mmol, 3% yield). $^1$H NMR (400 MHz, DMSO-$d_6$) δ 11.11 (s, 1H), 8.46 (s, 1H), 8.39 (d, J=5.2 Hz, 1H), 8.36 (s, 1H), 7.99 (s, 1H), 7.85 (s, 1H), 7.47-7.40 (m, 2H), 7.30 (d, J=5.6 Hz, 1H), 7.10 (d, J=7.2 Hz, 1H), 6.84 (d, J=8.8 Hz, 1H), 5.07 (dd, J=5.6, 12.8 Hz, 1H), 2.90-2.86 (m, 1H), 2.62-2.60 (m, 1H), 2.59 (s, 3H), 2.58-2.56 (m, 1H), 2.41 (s, 3H), 2.06-2.01 (m, 1H); MS (ESI) m/z 496.1 [M+1]$^+$.

Example 18: 4-((1,2-dimethyl-5-(2-methylpyridin-4-yl)-1H-benzo[d]imidazol-6-yl)amino)-2-(2,6-dioxopiperidin-3-yl)isoindoline-1,3-dione

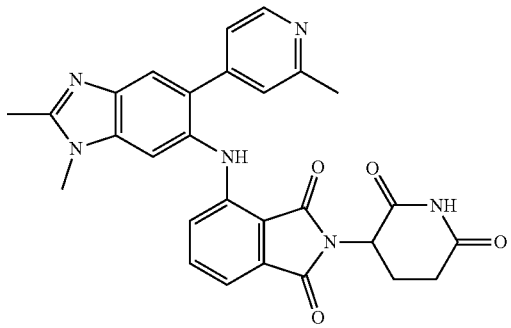 [SMILES: Cc1cc(-c2cc3nc(C)n(C)c3cc2Nc2cccc3c2C(=O)N(C2CCC(=O)NC2=O)C3=O)ccn1]

6-bromo-2-methyl-5-nitro-1H-benzimidazole

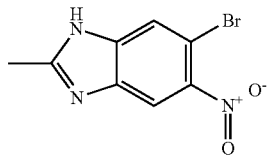

To a solution of 6-bromo-2-methyl-1H-benzimidazole (2.0 g, 9.48 mmol) in sulfuric acid (20 mL, 373.47 mmol) at 0° C. was added, dropwise, nitric acid (1.27 mL, 28.43 mmol). The mixture was stirred at 0° C. for 2 hours. The mixture was filtered and the filtrate was concentrated in vacuo. The residue was purified by prep-HPLC to afford 6-bromo-2-methyl-5-nitro-1H-benzimidazole and 6-bromo-2-methyl-7-nitro-1H-benzo[d]imidazole (1.40 g, 5.47 mmol, 58% yield). $^1$H NMR (400 MHz, DMSO-d$_6$) δ 8.21 (s, 1H), 8.13 (s, 1H), 7.92 (s, 1H), 2.49 (s, 3H); MS (ESI) m/z: 257.8 [M+1]$^+$.

6-bromo-1,2-dimethyl-5-nitro-benzimidazole

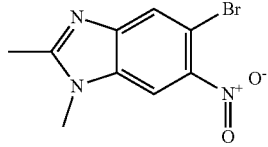

To a solution of 6-bromo-2-methyl-5-nitro-1H-benzimidazole (0.500 g, 1.95 mmol) in tetrahydrofuran (10 mL) at 0° C. was added sodium hydride (0.117 g, 2.93 mmol). The mixture was stirred for 30 minutes. Iodomethane (0.25 mL, 3.91 mmol) was added and the mixture was stirred at 20° C. for 12 hours. The mixture was filtered and the filtrate was concentrated in vacuo. The residue was purified by column chromatography on silica gel (petroleum ether/ethyl acetate 1:1) to afford the mixture of 6-bromo-1,2-dimethyl-5-nitro-benzimidazole and 5-bromo-1,2-dimethyl-6-nitro-benzimidazole (0.45 g, 1.67 mmol, 85% yield). MS (ESI) m/z: 270.3 [M+1]$^+$ 1,2-dimethyl-5-(2-methyl-4-pyridyl)-6-nitro-benzimidazole

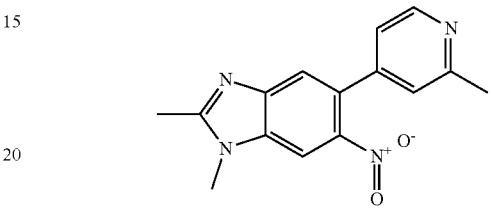

To a solution of the mixture of 6-bromo-1,2-dimethyl-5-nitro-benzimidazole and 5-bromo-1,2-dimethyl-6-nitro-benzimidazole (0.40 g, 1.30 mmol) in 1,4-dioxane (5 mL) and water (0.50 mL) was added 2-methyl-4-(4,4,5,5-tetramethyl-1,3,2-dioxaborolan-2-yl)pyridine (0.48 g, 2.22 mmol), cesium carbonate (0.96 g, 2.96 mmol) and (1,1'-bis(diphenylphosphino)ferrocene)palladium(II) dichloride (0.12 g, 0.15 mmol). The suspension was degassed and purged with nitrogen several times. The mixture was stirred at 110° C. for 12 hours. The mixture was filtered and the filtrate was concentrated under reduced pressure. The residue was purified by column chromatography (petroleum ether/ethyl acetate 1:1) to afford the mixture of 1,2-dimethyl-5-(2-methyl-4-pyridyl)-6-nitro-benzimidazole and 1,2-dimethyl-6-(2-methyl-4-pyridyl)-5-nitro-benzimidazole (0.40 g, 1.42 mmol, 96% yield). MS (ESI) m/z: 283.1 [M+1]$^+$ 2,3-dimethyl-6-(2-methyl-4-pyridyl)benzimidazol-5-amine

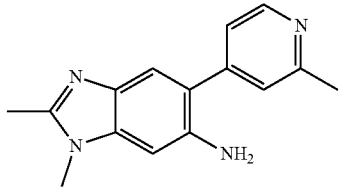

To a solution of the mixture of 1,2-dimethyl-5-(2-methyl-4-pyridyl)-6-nitro-benzimidazole and 1,2-dimethyl-6-(2-methyl-4-pyridyl)-5-nitro-benzimidazole (0.40 g, 1.42 mmol) in water (2 mL) and ethanol (5 mL) was added iron powder (0.395 g, 7.08 mmol) and ammonium chloride (0.765 g, 14.17 mmol). The mixture was stirred at 80° C. for 2 hours. The mixture was filtered and the filtrate was concentrated in vacuo. The residue was purified by prep-HPLC to afford the mixture of 2,3-dimethyl-6-(2-methyl-4-pyridyl)benzimidazol-5-amine and 2,3-dimethyl-5-(2-methyl-4-pyridyl)benzimidazol-6-amine (0.20 g, 0.79 mmol, 56% yield). MS (ESI) m/z: 253.2 [M+1]$^+$

115

Dimethyl 3-((1,2-dimethyl-5-(2-methylpyridin-4-yl)-1H-benzo[d]imidazol-6-yl)amino)phthalate

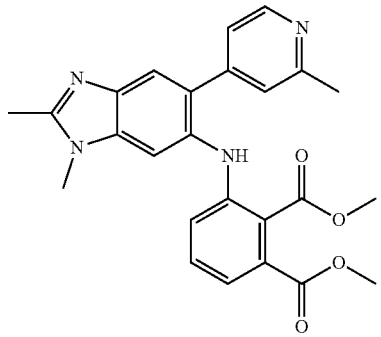

To a solution of the mixture of 2,3-dimethyl-6-(2-methyl-4-pyridyl)benzimidazol-5-amine and 2,3-dimethyl-5-(2-methyl-4-pyridyl)benzimidazol-6-amine (0.200 g, 0.79 mmol) in 1,4-dioxane (2 mL) was added potassium carbonate (0.328 g, 2.38 mmol) and methanesulfonato(2-dicyclohexylphosphino-2,6-di-i-propoxy-1,1-biphenyl)(2-amino-1,1-biphenyl-2-yl)palladium(II) (0.066 g, 0.08 mmol) and dimethyl 3-bromobenzene-1,2-dicarboxylate (0.303 g, 1.11 mmol). The mixture was stirred at 110° C. under nitrogen for 12 hours. The mixture was filtered and the filtrate was concentrated in vacuo. The residue was purified by prep-HPLC to afford dimethyl 3-[[2,3-dimethyl-6-(2-methyl-4-pyridyl)benzimidazol-5-yl]amino]benzene-1,2-dicarboxylate (0.080 g, 0.18 mmol, 22% yield). $^1$H NMR (400 MHz, DMSO-$d_6$) δ 8.66 (d, J=6.0 Hz, 1H), 8.05 (s, 1H), 7.89 (s, 1H), 7.86 (s, 1H), 7.81 (d, J=6.0 Hz, 1H), 7.73 (s, 1H), 7.28-7.24 (m, 1H), 7.11 (d, J=7.2 Hz, 1H), 6.81 (d, J=8.0 Hz, 1H), 3.84 (s, 3H), 3.78 (s, 3H), 3.69 (s, 3H), 2.75 (s, 3H), 2.61 (s, 3H); MS (ESI) m z: 445.3 [M+1]$^+$. Dimethyl 3-((1,2-dimethyl-6-(2-methylpyridin-4-yl)-1H-benzo[d]imidazol-5-yl)amino)phthalate (0.060 g, 0.13 mmol, 16.4% yield). $^1$H NMR (400 MHz, DMSO-$d_6$) δ 8.67 (d, J=6.4 Hz, 1H), 8.07 (s, 1H), 8.06 (s, 1H), 7.87 (s, 1H), 7.80 (d, J=6.0 Hz, 1H), 7.57 (s, 1H), 7.26 (t, J=8.0 Hz, 1H), 7.15 (d, J=6.8 Hz, 1H), 6.81 (d, J=8.4 Hz, 1H), 3.93 (s, 3H), 3.78 (s, 3H), 3.71 (s, 3H), 2.78 (s, 3H), 2.61 (s, 3H).

4-((1,2-dimethyl-5-(2-methylpyridin-4-yl)-1H-benzo[d]imidazol-6-yl)amino)-2-(2,6-dioxopiperidin-3-yl)isoindoline-1,3-dione

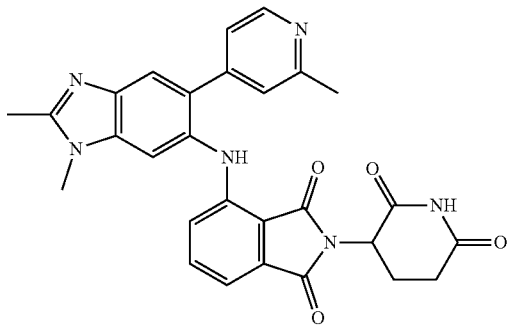 [SMILES: Cc1cc(-c2cc3nc(C)n(C)c3cc2Nc2cccc3c2C(=O)N(C2CCC(=O)NC2=O)C3=O)ccn1]

116

To a solution of dimethyl 3-[[2,3-dimethyl-6-(2-methyl-4-pyridyl)benzimidazol-5-yl]amino]benzene-1,2-dicarboxylate (0.100 g, 0.220 mmol) in pyridine (2 mL) was added 3-aminopiperidine-2,6-dione (0.057 g, 0.450 mmol), and lithium iodide (50 mg). The suspension was stirred at 135° C. for 12 h. The solution was filtered and the filtrate was concentrated. The residue was purified by prep-HPLC to afford 4-[[2,3-dimethyl-6-(2-methyl-4-pyridyl)benzimidazol-5-yl]amino]-2-(2,6-dioxo-3-piperidyl)isoindoline-1,3-dione (66 mg, 0.120 mmol, 53% yield). $^1$H NMR (400 MHz, DMSO-$d_6$) δ 11.12 (s, 1H), 8.59 (d, J=6.4 Hz, 1H), 8.54 (s, 1H), 7.92 (s, 1H), 7.88 (s, 1H), 7.83 (s, 1H), 7.77 (s, 1H), 7.49-7.45 (m, 1H), 7.15 (d, J=6.4 Hz, 1H), 6.82 (d, J=8.4 Hz, 1H), 5.12-5.07 (m, 1H), 3.93 (s, 3H), 2.90-2.89 (m, 1H), 2.58 (s, 3H), 2.54-2.53 (m, 1H), 2.51 (s, 3H), 2.49-2.48 (m, 1H), 2.05-2.04 (m, 1H); MS (ESI) m/z: 509.2 [M+1]$^+$.

Example 19: 4-((6-cyclopropyl-1-(tetrahydro-2H-pyran-4-yl)-1H-indazol-5-yl)amino)-2-(2,6-dioxopiperidin-3-yl)isoindoline-1,3-dione

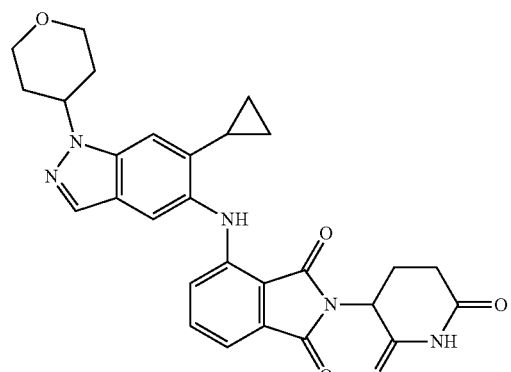

6-cyclopropyl-5-nitro-1-(tetrahydro-2H-pyran-4-yl)-1H-indazole

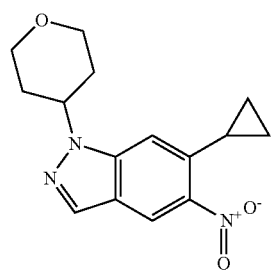

To a solution of 6-bromo-5-nitro-1-(tetrahydro-2H-pyran-4-yl)-1H-indazole (0.300 g, 0.92 mmol) in tert-amyl alcohol (4 mL) was added cyclopropylboronic acid (0.095 g, 1.11 mmol), cesium carbonate (0.900 g, 2.77 mmol) and methanesulfonato(diadamantyl-n-butylphosphino)-2-amino-1,1-biphenyl-2-yl)palladium(II) dichloromethane adduct (0.034 g, 0.05 mmol). The suspension was degassed and purged with nitrogen. The mixture was stirred at 90° C. for 12 hours. The mixture was filtered and filtrate was concentrated under reduced pressure. The residue was purified by prep-TLC (petroleum ether:ethyl acetate 3:1) to give 6-cyclopropyl-5-nitro-1-(tetrahydro-2H-pyran-4-yl)-1H-indazole (0.070 g, 0.24 mmol, 26% yield). MS (ESI) m/z: 287.8 [M+1]+

6-cyclopropyl-1-(tetrahydro-2H-pyran-4-yl)-1H-indazol-5-amine

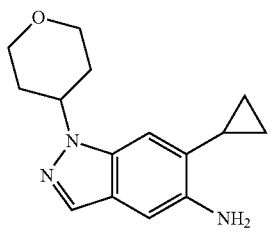 [SMILES: Nc1cc2cnn(C3CCOCC3)c2cc1C1CC1]

To a solution of 6-cyclopropyl-5-nitro-1-(tetrahydro-2H-pyran-4-yl)-1H-indazole (0.070 g, 0.24 mmol) in ethanol (3 mL) and water (1 mL) was added ferrous powder (0.136 g, 2.44 mmol) and ammonium chloride (0.132 g, 2.44 mmol). The resulting mixture was stirred at 70° C. for 12 hours. The reaction mixture was filtered and the filtrate was concentrated under reduced pressure. The residue was purified by prep-TLC (petroleum ether:ethyl acetate 1:1) to give the 6-cyclopropyl-1-(tetrahydro-2H-pyran-4-yl)-1H-indazol-5-amine (0.060 g, 0.233 mmol, 95% yield). MS (ESI) m/z: 258.1 [M+1]+

4-((6-cyclopropyl-1-(tetrahydro-2H-pyran-4-yl)-1H-indazol-5-yl)amino)-2-(2,6-dioxopiperidin-3-yl)isoindoline-1,3-dione

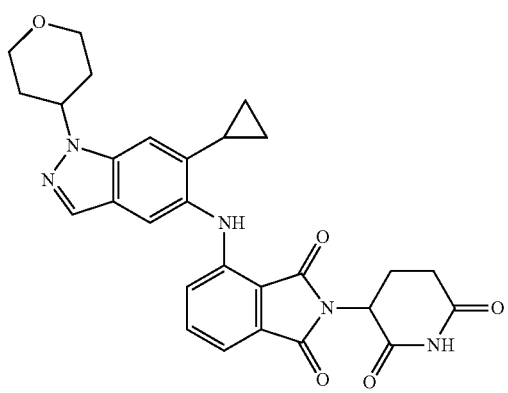 [SMILES: O=C1CCC(N2C(=O)c3cccc(Nc4cc5cnn(C6CCOCC6)c5cc4C4CC4)c3C2=O)C(=O)N1]

To a solution of 6-cyclopropyl-1-(tetrahydro-2H-pyran-4-yl)-1H-indazol-5-amine (0.060 g, 0.23 mmol) and 4-bromo-2-(2,6-dioxopiperidin-3-yl)isoindoline-1,3-dione (0.083 g, 0.24 mmol) in dioxane (2 mL) was added chloro(2-dicyclohexylphosphino-2',4',6'-triisopropyl-1,1'-biphenyl)[2-(2'-amino-1,1'-biphenyl)]palladium(II) (0.018 g, 0.02 mmol) and potassium carbonate (0.097 mg, 0.70 mmol). The resulting mixture was stirred at 110° C. for 12 hours under nitrogen. The reaction mixture was filtered and the filtrate was concentrated under reduced pressure. The residue was purified by prep-HPLC to give 4-((6-cyclopropyl-1-(tetrahydro-2H-pyran-4-yl)-1H-indazol-5-yl)amino)-2-(2,6-dioxopiperidin-3-yl)isoindoline-1,3-dione (26 mg, 0.051 mmol, 22% yield). 1H NMR (400 MHz, DMSO-d6) δ 11.13 (s, 1H), 8.40 (s, 1H), 8.02 (s, 1H), 7.73 (s, 1H), 7.56 (dd, J=7.2, 8.4 Hz, 1H), 7.51 (s, 1H), 7.18 (d, J=7.2 Hz, 1H), 7.09 (d, J=8.4 Hz, 1H), 5.14 (dd, J=5.6, 12.8 Hz, 1H), 4.98-4.91 (m, 1H), 4.01 (dd, J=3.6, 11.2 Hz, 2H), 3.58 (t, J=11.6 Hz, 2H), 2.96-2.86 (m, 1H), 2.64-2.55 (m, 2H), 2.13-2.06 (m, 3H), 2.01-1.96 (m, 1H), 1.87 (dd, J=2.0, 12.8 Hz, 2H), 0.95-0.92 (m, 2H), 0.82-0.79 (m, 2H); MS (ESI) m/z: 514.3 [M+1]+.

Example 20: 4-((1,3-dimethyl-6-(2-methylpyridin-4-yl)-1H-indazol-5-yl)amino)-2-(2,6-dioxopiperidin-3-yl)isoindoline-1,3-dione

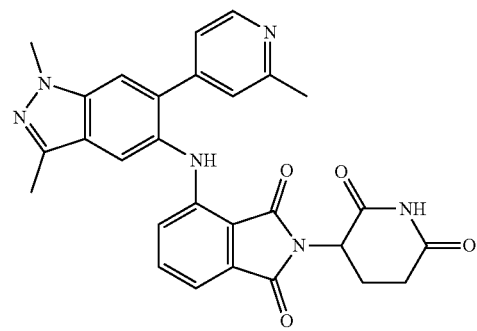 [SMILES: Cc1cc(-c2cc3c(cc2Nc2cccc4c2C(=O)N(C2CCC(=O)NC2=O)C4=O)c(C)nn3C)ccn1]

6-bromo-1,3-dimethyl-5-nitro-1H-indazole

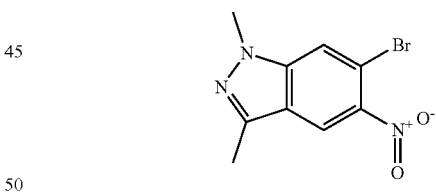

To a solution of 6-bromo-3-methyl-5-nitro-1H-indazole (1.30 g, 5.08 mmol) in tetrahydrofuran (15 mL) and N,N-dimethylformamide (15 mL) at 0° C. was added sodium hydride (0.146 g, 6.09 mmol). The mixture was stirred at 0° C. for 0.5 hours. Iodomethane (1.08 g, 7.62 mmol) was added and the resulting mixture was stirred at 25° C. for 12 hours. The reaction mixture was quenched with 60 mL of saturated aqueous ammonium chloride. The resulting solution was extracted with ethyl acetate (30 mL×3). The combined organic phase was washed with brine (50 mL×2), dried with anhydrous sodium sulfate, filtered and concentrated in vacuo. The resulting residue was purified by prep-HPLC to afford 6-bromo-1,3-dimethyl-5-nitro-1H-indazole (0.300 g, 1.11 mmol, 22% yield). MS (ESI) m/z: 271.9[M+1]+

1,3-dimethyl-6-(2-methyl-4-pyridyl)-5-nitro-indazole

To a solution of 6-bromo-1,3-dimethyl-5-nitro-1H-indazole (0.190 g, 0.80 mmol) in dichloromethane (3 mL) was added 2-methyl-4-(4,4,5,5-tetramethyl-1,3,2-dioxaborolan-2-yl)pyridine (0.295 g, 1.10 mmol). The reaction was stirred at 110° C. for 12 hours. The reaction was filtered and concentrated in vacuo The resulting material was purified by silica gel column chromatography (5-15% ethyl acetate in petroleum ether) to afford 1,3-dimethyl-6-(2-methyl-4-pyridyl)-5-nitro-indazole (0.080 g, 0.28 mmol, 32% yield). MS (ESI) m/z: 283.1[M+1]$^+$

1,3-dimethyl-6-(2-methylpyridin-4-yl)-1H-indazol-5-amine

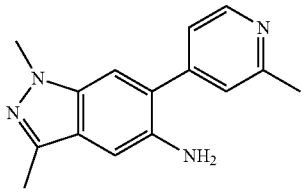 [SMILES: Cc1cc(-c2cc3c(cc2N)c(C)nn3C)ccn1]

To a solution of 1,3-dimethyl-6-(2-methyl-4-pyridyl)-5-nitro-indazole (0.080 g, 0.28 mmol) in ethanol (0.6 mL) was added ammonium chloride (0.153 g, 2.83 mmol) and ferrous powder (0.079 g, 1.42 mmol). The reaction was stirred at 80° C. for 12 hours. The reaction mixture was filtered and the filtrate was concentrated to afford 1,3-dimethyl-6-(2-methylpyridin-4-yl)-1H-indazol-5-amine (0.050 g, 0.20 mmol, 69% yield). MS (ESI) m/z: 253.1[M+1]$^+$

Dimethyl 3-((1,3-dimethyl-6-(2-methylpyridin-4-yl)-1H-indazol-5-yl)amino)phthalate

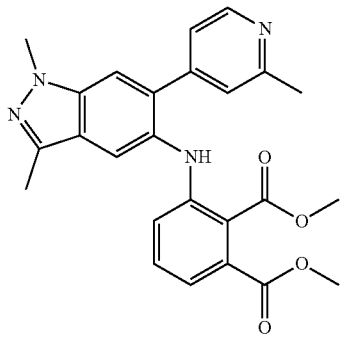 [SMILES: COC(=O)c1cccc(Nc2cc3c(C)nn(C)c3cc2-c2ccnc(C)c2)c1C(=O)OC]

To a solution of 1,3-dimethyl-6-(2-methylpyridin-4-yl)-1H-indazol-5-amine (0.040 g, 0.16 mmol) in 1,4-dioxane (0.60 mL) were added dimethyl 3-bromophthalate (0.043 g, 0.16 mmol), potassium carbonate (0.061 g, 0.44 mmol) and methanesulfonato(2-dicyclohexylphosphino-2,6-di-i-propoxy-1,1-biphenyl)(2-amino-1,1-biphenyl-2-yl)palladium(II) (0.013 g, 0.02 mmol). The reaction was stirred at 110° C. for 12 hours. The reaction mixture was filtered and the filtrate was concentrated under reduced pressure. The residue was purified by prep-HPLC to afford dimethyl 3-((1,3-dimethyl-6-(2-methylpyridin-4-yl)-1H-indazol-5-yl)amino)phthalate (0.05 g, 0.11 mmol, 70% yield). $^1$H NMR (400 MHz, DMSO-d$_6$) δ 8.66 (d, J=6.0 Hz, 1H), 7.97-7.91 (m, 2H), 7.89-7.84 (m, 2H), 7.75-7.70 (m, 1H), 7.15 (t, J=8.0 Hz, 1H), 6.94 (d, J=7.2 Hz, 1H), 6.55 (d, J=8.4 Hz, 1H), 4.03 (s, 3H), 3.76 (s, 3H), 3.74 (s, 3H), 2.61 (s, 3H), 2.52-2.51 (m, 3H); MS (ESI) m/z: 445.2[M+1]$^+$.

4-((1,3-dimethyl-6-(2-methylpyridin-4-yl)-1H-indazol-5-yl)amino)-2-(2,6-dioxopiperidin-3-yl)isoindoline-1,3-dione

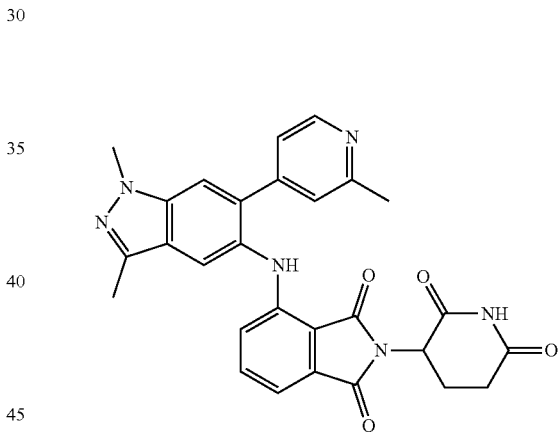

To a solution of dimethyl 3-((1,3-dimethyl-6-(2-methylpyridin-4-yl)-1H-indazol-5-yl)amino)phthalate (0.05 g, 0.11 mmol) in pyridine (1 mL) was added 3-aminopiperidine-2,6-dione (0.021 g, 0.17 mmol) and lithium iodide (0.030 g, 0.22 mmol). The reaction was stirred at 130° C. for 12 hours. The reaction was filtered and the filtrate was concentrated. The residue was purified by prep-HPLC to afford 4-((1,3-dimethyl-6-(2-methylpyridin-4-yl)-1H-indazol-5-yl)amino)-2-(2,6-dioxopiperidin-3-yl)iso indoline-1,3-dione (21 mg, 0.04 mmol, 37% yield). $^1$H NMR (400 MHz, DMSO-d$_6$) δ 11.13 (s, 1H), 8.60 (d, J=5.6 Hz, 1H), 8.43 (s, 1H), 7.88 (d, J=1.6 Hz, 3H), 7.76 (d, J=3.6 Hz, 1H), 7.39 (dd, J=7.2, 8.4 Hz, 1H), 7.06 (d, J=7.2 Hz, 1H), 6.64 (d, J=8.4 Hz, 1H), 5.09 (dd, J=5.6, 12.8 Hz, 1H), 4.05 (s, 3H), 2.96-2.84 (m, 1H), 2.63 (d, J=2.4 Hz, 1H), 2.57 (s, 3H), 2.52 (s, 3H), 2.47-2.44 (m, 1H), 2.08-2.01 (m, 1H); MS (ESI) m/z: 509.2[M+1]$^+$.

Example 21: 4-((6-(2-(difluoromethyl)pyridin-4-yl)-1-(tetrahydro-2H-pyran-4-yl)-1H-indazol-5-yl)amino)-2-(2,6-dioxopiperidin-3-yl)isoindoline-1,3-dione

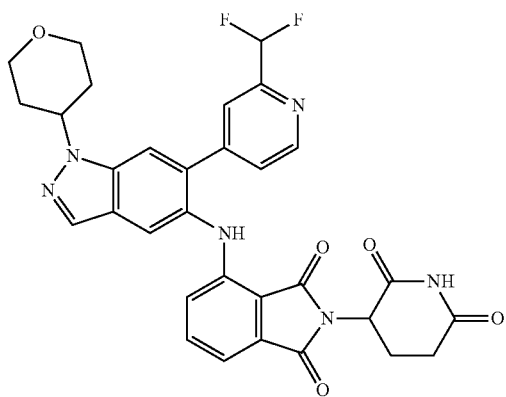 [SMILES: O=C1CCC(N2C(=O)c3cccc(Nc4cc5cnn(C6CCOCC6)c5cc4-c4ccnc(C(F)F)c4)c3C2=O)C(=O)N1]

2-(difluoromethyl)-4-(4,4,5,5-tetramethyl-1,3,2-dioxaborolan-2-yl)pyridine

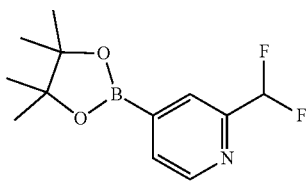 [SMILES: CC1(C)OB(c2ccnc(C(F)F)c2)OC1(C)C]

To a solution of 4-bromo-2-(difluoromethyl)pyridine (0.530 g, 2.55 mmol) in 1,4-dioxane (5 mL) was added 4,4,4',4',5,5,5',5'-octamethyl-2,2'-bi(1,3,2-dioxaborolane) (0.776 g, 3.06 mmol), potassium acetate (0.749 g, 7.64 mmol) and (1,1'-bis(diphenylphosphino)ferrocene)palladium(II) dichloride (0.208 g, 0.25 mmol). The suspension was degassed under vacuum and purged with nitrogen several times. The mixture was stirred at 100° C. for 12 hours. The reaction was diluted with water (60 mL) and extracted with ethyl acetate (30 mL×3). The combined organic phase was washed with brine (50 mL×2), dried with anhydrous sodium sulfate, filtered and concentrated in vacuo. The resulting crude material was purified by silica gel column chromatography (5-15% ethyl acetate in petroleum ether) to afford 2-(difluoromethyl)-4-(4,4,5,5-tetramethyl-1,3,2-dioxaborolan-2-yl)pyridine (0.600 g, 2.3 mmol, 92% yield). $^1$H NMR (400 MHz, DMSO-$d_6$) δ 8.75 (d, J=4.8 Hz, 1H), 7.94 (s, 1H), 7.82 (s, 1H), 7.78-7.73 (m, 1H), 1.34 (s, 12H).

6-(2-(difluoromethyl)pyridin-4-yl)-5-nitro-1-(tetrahydro-2H-pyran-4-yl)-1H-indazole

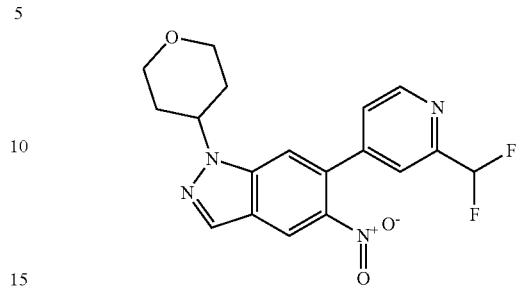

To a solution of 2-(difluoromethyl)-4-(4,4,5,5-tetramethyl-1,3,2-dioxaborolan-2-yl)pyridine (0.120 g, 0.47 mmol) in 1,4-dioxane (5 mL) and water (0.50 mL) was added 6-bromo-5-nitro-1-(tetrahydro-2H-pyran-4-yl)-1H-indazole (0.122 g, 0.38 mmol), potassium carbonate (0.129 g, 0.94 mmol) and (1,1'-bis(diphenylphosphino)ferrocene)palladium(II) dichloride (0.038 g, 0.05 mmol). The suspension was degassed and purged with nitrogen several times. The mixture was stirred at 110° C. for 12 hours. The reaction was filtered and the filtrate was concentrated and purified by prep-HPLC to afford 6-(2-(difluoromethyl)pyridin-4-yl)-5-nitro-1-(tetrahydro-2H-pyran-4-yl)-1H-indazole (0.140 g, 0.37 mmol, 79% yield). $^1$H NMR (400 MHz, DMSO-$d_6$) δ 8.79 (s, 1H), 8.77 (d, J=5.2 Hz, 1H), 8.47 (s, 1H), 8.07 (s, 1H), 7.80 (s, 1H), 7.65 (d, J=4.4 Hz, 1H), 5.17-5.04 (m, 1H), 4.01 (dd, J=3.2, 11.6 Hz, 2H), 3.58-3.54 (m, 2H), 2.17-2.09 (m, 2H), 1.92 (dd, J=2.4, 12.0 Hz, 2H); MS (ESI) m/z: 375.1[M]$^+$.

6-(2-(difluoromethyl)pyridin-4-yl)-1-(tetrahydro-2H-pyran-4-yl)-1H-indazol-5-amine

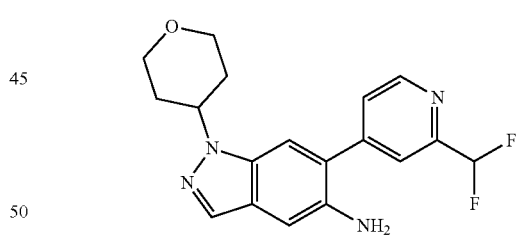

To a solution of 6-(2-(difluoromethyl)pyridin-4-yl)-5-nitro-1-(tetrahydro-2H-pyran-4-yl)-1H-indazole (0.140 g, 0.37 mmol) in ethanol (6 mL) and were added ammonium chloride (0.202 g, 3.74 mmol) and ferrous powder (0.104 g, 1.87 mmol). The reaction was stirred at 80° C. for 12 hours. The reaction mixture was filtered and the filtrate was concentrated to afford 6-(2-(difluoromethyl)pyridin-4-yl)-1-(tetrahydro-2H-pyran-4-yl)-1H-indazol-5-amine (0.110 g, 0.32 mmol, 85% yield). $^1$H NMR (400 MHz, DMSO-$d_6$) δ 8.75 (d, J=5.2 Hz, 1H), 7.85 (s, 1H), 7.84 (s, 1H), 7.76 (d, J=5.2 Hz, 1H), 7.57 (s, 1H), 7.04 (s, 1H), 5.76 (s, 1H), 4.86-4.78 (m, 1H), 3.98 (dd, J=3.6, 11.2 Hz, 2H), 3.57-3.48 (m, 2H), 2.12-2.02 (m, 2H), 1.86 (dd, J=2.4, 12.4 Hz, 2H); MS (ESI) m/z: 345.1[M+1]$^+$.

123

4-((6-(2-(difluoromethyl)pyridin-4-yl)-1-(tetrahydro-2H-pyran-4-yl)-1H-indazol-5-yl)amino)-2-(2,6-dioxopiperidin-3-yl)isoindoline-1,3-dione

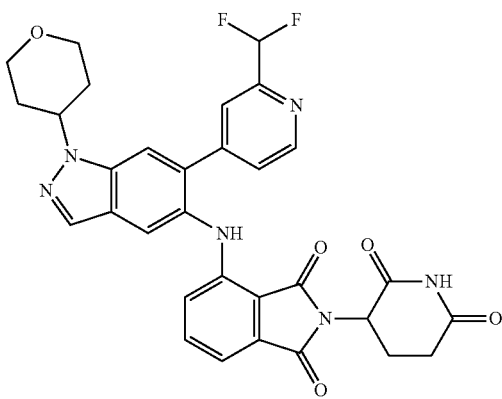 [SMILES: O=C1CCC(N2C(=O)c3cccc(Nc4cc5cnn(C6CCOCC6)c5cc4-c4ccnc(C(F)F)c4)c3C2=O)C(=O)N1]

To a solution of 6-(2-(difluoromethyl)pyridin-4-yl)-1-(tetrahydro-2H-pyran-4-yl)-1H-indazol-5-amine (0.080 g, 0.23 mmol) and 4-bromo-2-(2,6-dioxo-3-piperidyl)isoindoline-1,3-dione (0.082 g, 0.24 mmol) in 1,4-dioxane (3.5 mL) was added chloro(2-dicyclohexylphosphino-2',4',6'-triisopropyl-1,1'-biphenyl)[2-(2'-amino-1,1'-biphenyl)]palladium(II) (0.018 g, 0.02 mmol) and potassium carbonate (0.096 g, 0.70 mmol). The resulting mixture was stirred at 110° C. for 12 h under nitrogen. The reaction was filtered and the filtrate was concentrated and purified by prep-HPLC to afford 4-((6-(2-(difluoromethyl)pyridin-4-yl)-1-(tetrahydro-2H-pyran-4-yl)-1H-indazol-5-yl)amino)-2-(2,6-dioxopiperidin-3-yl)isoindoline-1,3-dione (46 mg, 0.07 mmol, 32% yield). $^1$HNMR (400 MHz, DMSO-$d_6$) δ 11.12 (s, 1H), 8.63 (d, J=5.2 Hz, 1H), 8.40 (s, 1H), 8.20 (s, 1H), 8.05 (s, 1H), 7.90 (s, 1H), 7.84 (s, 1H), 7.73 (d, J=5.2 Hz, 1H), 7.41-7.34 (m, 1H), 7.07-6.75 (m, 2H), 6.71 (d, J=8.4 Hz, 1H), 5.12-5.01 (m, 2H), 4.07-4.00 (m, 2H), 3.60-3.54 (m, 2H), 2.96-2.84 (m, 1H), 2.65-2.55 (m, 2H), 2.20-2.12 (m, 2H), 2.06-1.99 (m, 1H), 2.02-1.95 (m, 2H); MS (ESI) m/z: 601.2[M+1]$^+$.

Example 22: 4-((3-(dimethylamino)-2,3-dihydro-1H-inden-5-yl)amino)-2-((S)-3-methyl-2,6-dioxopiperidin-3-yl)isoindoline-1,3-dione

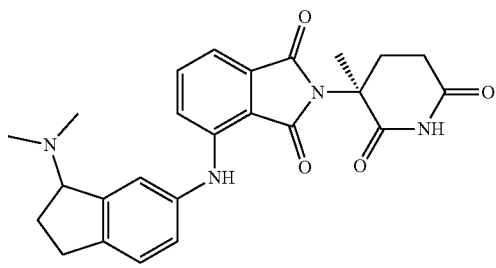 [SMILES: CN(C)C1CCc2ccc(Nc3cccc4c3C(=O)N([C@@]3(C)CCC(=O)NC3=O)C4=O)cc21]

124

(E)-6-bromo-2,3-dihydro-1H-inden-1-one oxime

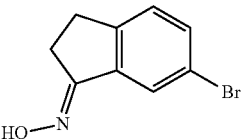 [SMILES: O/N=C1\CCc2ccc(Br)cc21]

To a solution of 6-bromoindan-1-one (5.0 g, 23.6 mmol) in ethyl alcohol (50 mL) was added hydroxylamine hydrochloride (3.2 g, 47.3 mmol) and pyridine (4.9 g, 61.9 mmol, 5 mL). The reaction was stirred 80° C. for 12 h. The reaction mixture was quenched with water (50 mL) and the aqueous layer was extracted with dichloromethane (3×50 mL). The combined organic extracts were washed with brine (50 mL), dried over sodium sulfate and filtered. The solvent was removed under reduced pressure to give 6-bromoindan-1-one oxime (4.5 g, 19.9 mmol, 84% yield). $^1$H NMR (400 MHz DMSO-$d_6$) δ 11.09 (s, 1H), 7.63 (brs, 1H), 7.49 (d, J=8.0 Hz, 1H), 7.32 (d, J=8.0 Hz, 1H), 2.95-2.80 (m, 2H), 2.79-2.77 (m, 2H); MS (ESI) m/z 224.0 [M+1]$^+$ 6-bromo-2,3-dihydro-1H-inden-1-amine

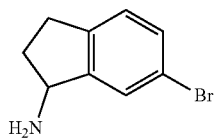 [SMILES: NC1CCc2ccc(Br)cc21]

To a solution of 6-bromoindan-1-one oxime (4.6 g, 20.35 mmol) in methyl alcohol (100 mL) was added trioxomolybdenum (3.51 g, 24.42 mmol,) and sodium borohydride (3.85 g, 101.74 mmol). The reaction was stirred at 25° C. for 12 hours. The reaction mixture was quenched with 1N aqueous hydrochloric acid solution (200 ml) and ethyl acetate (200 mL). The aqueous solution was rendered basic and then extracted with dichloromethane (3×200 ML. The combined organic extracts were dried over sodium sulfate, filtered and concentrated under reduced pressure to give 6-bromoindan-1-amine (2.3 g, 10.8 mmol, 53%). MS (ESI) m/z 195.0 [M−16]$^+$ 6-bromo-N,N-dimethyl-2,3-dihydro-1H-inden-1-amine

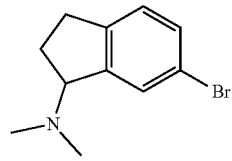

To a solution of 6-bromoindan-1-amine (2.3 g, 10.8 mmol) in formic acid (4 mL) was added formaldehyde (45.5 g, 500.9 mmol, 41.8 mL) in water. The reaction was stirred at 100° C. for 12 hours. The aqueous solution was rendered basic and then extracted with dichloromethane (3×100 mL), and dried over sodium sulfate. The extracts were then filtered and concentrated under reduced pressure to give 6-bromo-N,N-dimethyl-indan-1-amine (1.1 g, 4.58 mmol, 42%). ¹H NMR (400 MHz CDCl₃) δ 7.49 (s, 1H), 7.32 (d, J=8.0 Hz, 1H), 7.08 (d, J=8.0 Hz, 1H), 4.30 (t, J=6.8 Hz, 1H), 2.90-2.86 (m, 1H), 2.80-2.76 (m, 1H), 2.25 (s, 6H), 2.08-2.04 (m, 2H); MS (ESI) m/z 240.0, 242.0 [M+1]⁺

4-((3-(dimethylamino)-2,3-dihydro-1H-inden-5-yl)amino)-2-((S)-3-methyl-2,6-dioxopiperidin-3-yl)isoindoline-1,3-dione

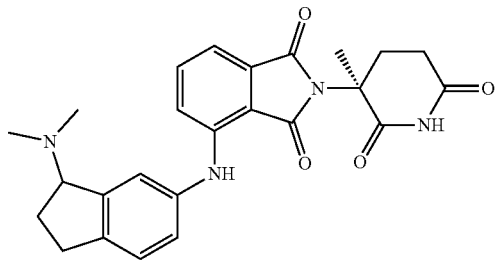 [SMILES: CN(C)C1CCc2ccc(Nc3cccc4c3C(=O)N([C@@]3(C)CCC(=O)NC3=O)C4=O)cc21]

To a solution of (S)-4-amino-2-(3-methyl-2,6-dioxopiperidin-3-yl)isoindoline-1,3-dione (0.100 g, 0.35 mmol) in 1,4-dioxane (3 mL) was added potassium carbonate (0.120 g, 0.87 mmol), [2-(2-aminophenyl)phenyl]-chloro-palladium; dicyclohexyl-[3-(2,4,6-triisopropylphenyl)phenyl]phosphane (0.030 g, 0.04 mmol) and 6-bromo-N,N-dimethyl-2,3-dihydro-1H-inden-1-amine (0.100 g, 0.42 mmol). The resulting mixture was stirred under nitrogen at 100° C. for 12 hours. The mixture was diluted with dichloromethane (20 mL) and acetonitrile (20 mL) and filtered. The filtrate was concentrated under reduced pressure. The resulting residue was dissolved in N,N-dimethylformamide (4 mL) and filtered. The filtrate was purified by prep-HPLC to give 4-((3-(dimethylamino)-2,3-dihydro-1H-inden-5-yl)amino)-2-((S)-3-methyl-2,6-dioxopiperidin-3-yl)isoindoline-1,3-dione (40 mg, 0.802 mmol, 23% yield). ¹H NMR (400 MHz DMSO-d₆) δ 11.02 (s, 2H), 8.52 (s, 1H), 7.72 (s, 1H), 7.61 (d, J=7.2 Hz, 1H), 7.59 (d, J=7.2 Hz, 1H), 7.49-7.35 (m, 2H), 7.19 (d, J=6.8 Hz, 1H), 4.95-4.94 (m, 1H), 3.11-3.02 (m, 1H), 2.92-2.85 (m, 1H), 2.73 (d, J=4.8 Hz, 3H), 2.69-2.56 (m, 3H), 2.54 (d, J=5.2 Hz, 3H), 2.42-2.33 (m, 2H), 2.09-2.03 (m, 1H), 1.91 (s, 3H); MS (ESI) m/z 447.1 [M+1]⁺.

Example 23: (S)-2-(2,6-dioxopiperidin-3-yl)-4-((1-methyl-6-(2-methylpyridin-4-yl)-1H-indazol-5-yl)amino)isoindoline-1,3-dione & (R)-2-(2,6-dioxopiperidin-3-yl)-4-((1-methyl-6-(2-methylpyridin-4-yl)-1H-indazol-5-yl)amino)isoindoline-1,3-dione

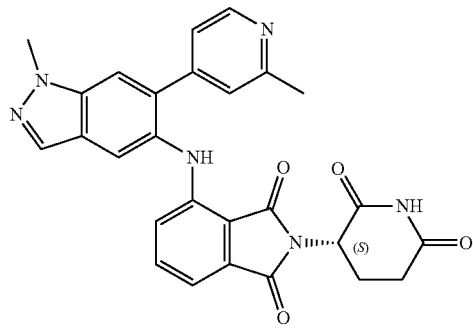

-continued

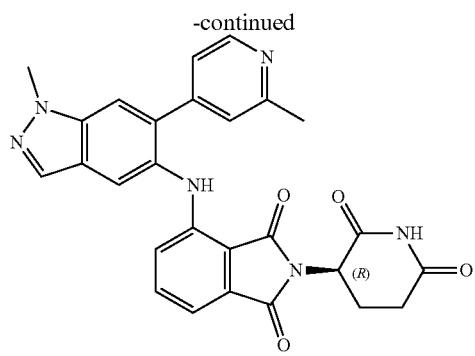

6-bromo-1-methyl-5-nitro-1H-indazole

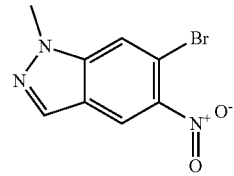

To a 500 ml three-necked flask was added 4-bromo-2-fluoro-5-nitrobenzaldehyde (10.00 g, 40.32 mmol), potassium carbonate (8.400 g, 60.87 mmol), isopropanol (80 mL) and water (40 mL). The mixture was stirred at 41° C. for 1 h and methylhydrazine (11.730 g, 101.85 mmol) was added dropwise. The resulting mixture was warmed to 77° C. and stirred for 6 hours. The mixture was cooled to 20° C. and water (150 mL) was added. The mixture was stirred for 1 h and filtered. The isolated solid was rinsed with water (20 mL×3) and dried under reduced pressure to give 6-bromo-1-methyl-5-nitro-1H-indazole (7.00 g, 27.34 mmol, 67.8% yield). 1H NMR (400 MHz, CDCl₃) δ 8.38 (s, 1H), 8.13 (s, 1H), 7.77 (s, 1H), 4.12 (s, 3H).

1-methyl-6-(2-methylpyridin-4-yl)-5-nitro-1H-indazole

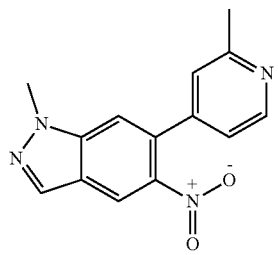

To a solution of 6-bromo-1-methyl-5-nitro-1H-indazole (2.0 g, 7.81 mmol) and 2-methyl-4-(4,4,5,5-tetramethyl-1,3,2-dioxaborolan-2-yl)pyridine (1.80 g, 8.22 mmol) in dioxane (30 mL) was added cesium carbonate (7.62 g, 23.43 mmol) and dichloro(1,1'-bis(diphenylphosphanyl)ferrocene)palladium(II) (0.319 g, 0.39 mmol). The resulting mixture was stirred at 110° C. for 12 h under nitrogen. The reaction mixture was filtered and the filtrate was concentrated under reduced pressure. The residue was purified by column chromatography on silica gel to give 1-methyl-6-(2-methylpyridin-4-yl)-5-nitro-1H-indazole (1.500 g, 5.59 mmol, 71.6% yield). ¹H NMR (400 MHz, CDCl₃) δ 8.57 (d, J=5.2 Hz, 1H), 8.53 (s, 1H), 8.22 (s, 1H), 7.33 (s, 1H), 7.18 (s, 1H), 7.12 (d, J=4.8 Hz, 1H), 4.15 (s, 3H), 2.64 (s, 3H); MS (ESI) m/z: 269.3[M+1]⁺.

1-methyl-6-(2-methylpyridin-4-yl)-1H-indazol-5-amine

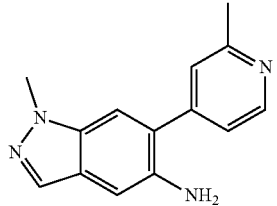 [SMILES: Cc1cc(-c2cc3c(cnn3C)cc2N)ccn1]

To a solution of 1-methyl-6-(2-methylpyridin-4-yl)-5-nitro-1H-indazole (1.50 g, 5.59 mmol) in ethanol (15 mL) and water (5 mL) was added ammonium chloride (1.51 g, 27.96 mmol) and ferrous powder (1.56 g, 27.96 mmol). The resulting mixture was stirred at 70° C. for 12 h. The reaction mixture was filtered and the filtrate was concentrated under reduced pressure. The resulting residue was extracted with water (50 mL) and ethyl acetate (3×60 mL). The combined organic phases were dried with anhydrous sodium sulfate and filtered. The filtrate was concentrated under reduced pressure to give 1-methyl-6-(2-methylpyridin-4-yl)-1H-indazol-5-amine (1.3 g, 5.46 mmol, 97.6% yield). MS (ESI) m/z: 239.1[M+1]⁺¹H NMR (400 MHz, CDCl₃) δ 8.60 (d, J=4.8 Hz, 1H), 7.81 (s, 1H), 7.35 (s, 1H), 7.30 (d, J=5.2 Hz, 1H), 7.16 (s, 1H), 7.04 (s, 1H), 4.03 (s, 3H), 2.65 (s, 3H).

2-(2,6-dioxopiperidin-3-yl)-4-((1-methyl-6-(2-methylpyridin-4-yl)-1H-indazol-5-yl)amino)isoindoline-1,3-dione

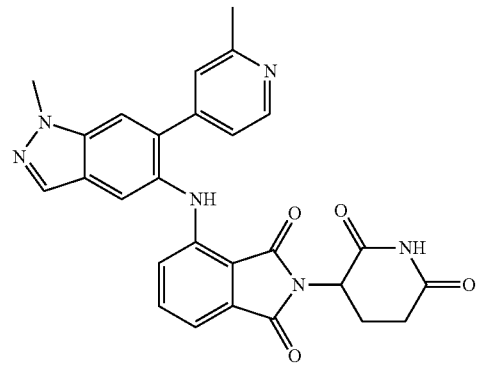 [SMILES: Cc1cc(-c2cc3c(cnn3C)cc2Nc2cccc3c2C(=O)N(C2CCC(=O)NC2=O)C3=O)ccn1]

To a solution of 1-methyl-6-(2-methylpyridin-4-yl)-1H-indazol-5-amine (1.300 g, 5.46 mmol) and 4-bromo-2-(2,6-dioxopiperidin-3-yl)isoindoline-1,3-dione (1.931 g, 5.73 mmol) in dioxane (30 mL) was added potassium carbonate (2.258 g, 16.36 mmol) and chloro(2-dicyclohexylphosphino-2',4',6'-triisopropyl-1,1'-biphenyl)[2-(2'-amino-1,1'-biphenyl)]palladium(II) (0.215 g, 0.27 mmol). The resulting mixture was stirred at 110° C. for 12 h under nitrogen. The reaction mixture was filtered and the filtrate was concentrated under reduced pressure. The resulting residue was purified by reversed-phase prep-HPLC (5-35% acetonitrile in water, 0.1% 2,2,2-trifluoroacetic modifier). The isolated material was lyophilized to give crude 2-(2,6-dioxopiperidin-3-yl)-4-((1-methyl-6-(2-methylpyridin-4-yl)-1H-indazol-5-yl)amino)isoindoline-1,3-dione (1.80 g, 3.64 mmol, 66.7% yield). MS (ESI) m/z: 495.2 [M+1]+

(S)-2-(2,6-dioxopiperidin-3-yl)-4-((1-methyl-6-(2-methylpyridin-4-yl)-1H-indazol-5-yl)amino)isoindoline-1,3-dione

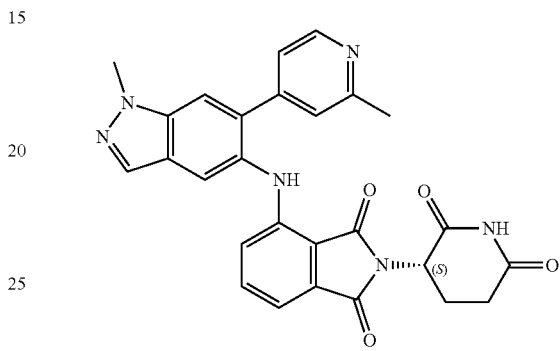

2-(2,6-dioxopiperidin-3-yl)-4-((1-methyl-6-(2-methylpyridin-4-yl)-1H-indazol-5-yl)amino)isoindoline-1,3-dione (0.600 g, 1.21 mmol) was purified by chiral prep-SFC (70% ethanol in acetonitrile). The isolated material was concentrated under reduced pressure to give (S)-2-(2,6-dioxopiperidin-3-yl)-4-((1-methyl-6-(2-methylpyridin-4-yl)-1H-indazol-5-yl)amino)isoindoline-1,3-dione (210 mg, 0.421 mmol, 34.7% yield). ¹H NMR (400 MHz, DMSO-d₆) δ 11.14 (s, 1H), 8.38 (d, J=5.2 Hz, 1H), 8.34 (s, 1H), 8.13 (d, J=0.8 Hz, 1H), 7.87 (s, 1H), 7.84 (s, 1H), 7.43 (s, 1H), 7.40 (dd, J=7.2, 8.4 Hz, 1H), 7.33 (d, J=4.4 Hz, 1H), 7.06 (d, J=6.8 Hz, 1H), 6.75 (d, J=8.8 Hz, 1H), 5.08 (dd, J=5.6, 12.8 Hz, 1H), 4.12 (s, 3H), 2.94-2.85 (m, 1H), 2.63-2.58 (m, 2H), 2.43 (s, 3H), 2.06-2.01 (m, 1H); MS (ESI) m/z: 495.3 [M+1]⁺

(R)-2-(2,6-dioxopiperidin-3-yl)-4-((1-methyl-6-(2-methylpyridin-4-yl)-1H-indazol-5-yl)amino)isoindoline-1,3-dione

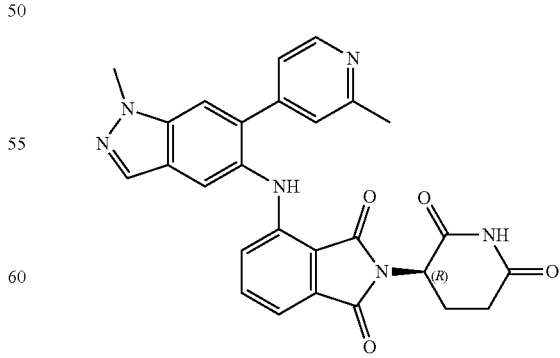

2-(2,6-dioxopiperidin-3-yl)-4-((1-methyl-6-(2-methylpyridin-4-yl)-1H-indazol-5-yl)amino)isoindoline-1,3-dione (0.600 g, 1.21 mmol) was purified by chiral prep-SFC (70% ethanol in acetonitrile). The isolated material was concentrated under reduced pressure to give (R)-2-(2,6-dioxopiperidin-3-yl)-4-((1-methyl-6-(2-methylpyridin-4-yl)-1H-indazol-5-yl)amino)isoindoline-1,3-dione (220 mg, 0.441 mmol, 36.3% yield). $^1$H NMR (400 MHz, DMSO-d$_6$) δ 11.12 (s, 1H), 8.38 (d, J=4.8 Hz, 1H), 8.32 (s, 1H), 8.13 (d, J=0.8 Hz, 1H), 7.88 (s, 1H), 7.84 (s, 1H), 7.42-7.39 (m, 2H), 7.32 (dd, J=1.6, 5.2 Hz, 1H), 7.06 (d, J=7.2 Hz, 1H), 6.77 (d, J=8.8 Hz, 1H), 5.08 (dd, J=5.2, 12.8 Hz, 1H), 4.12 (s, 3H), 2.95-2.86 (m, 1H), 2.63-2.55 (m, 2H), 2.43 (s, 3H), 2.07-2.02 (m, 1H); MS (ESI) m/z: 495.1 [M+1]$^+$.

Example 24: (R)-4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione & (S)-4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione

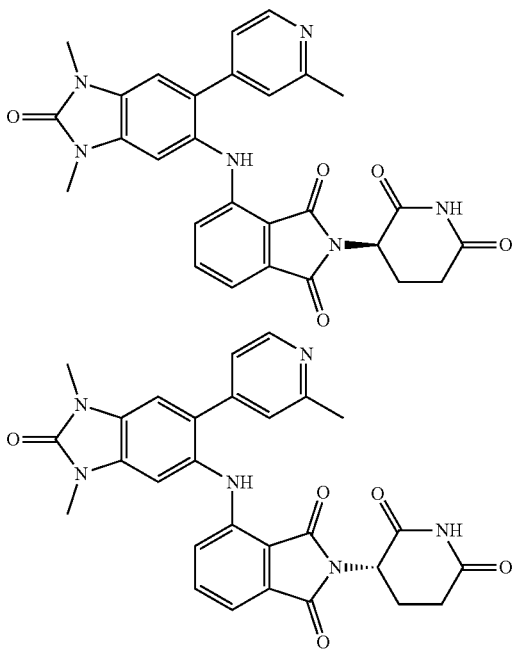

5-bromo-1,3-dimethyl-benzimidazol-2-one

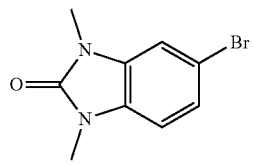

To a solution of 6-bromo-1-methyl-1,3-dihydro-2H-benzo[d]imidazol-2-one (5.00 g, 22.02 mmol) in N,N-dimethylformamide (100 mL) at 0° C. was added sodium hydride (1.590 g, 66.06 mmol) and the mixture was stirred at 0° C. for 0.5 hours. Iodomethane (15.63 g, 110.10 mmol) was added. The resulting mixture was stirred at 25° C. for 12 h. The reaction mixture was quenched with 60 mL of saturated aqueous ammonium chloride and extracted with ethyl acetate (100 mL×3). The combined organic phases were washed with brine (150 mL×2), dried over anhydrous sodium sulfate, filtered and concentrated in vacuo to afford 5-bromo-1,3-dimethyl-benzimidazol-2-one (5.00 g, 20.74 mmol, 94.2% yield). MS (ESI) m/z: 241.1[M]

5-bromo-1,3-dimethyl-6-nitro-1,3-dihydro-2H-benzo[d]imidazol-2-one

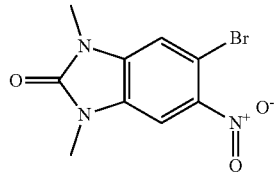

To a solution of 5-bromo-1,3-dimethyl-1,3-dihydro-2H-benzo[d]imidazol-2-one (5.00 g, 20.74 mmol) in acetic anhydride (83 mL) under nitrogen at −30° C. was slowly added fuming nitric acid (1.85 mL, 41.48 mmol), making sure that the temperature was kept below −25° C. The mixture was warmed slowly 0° C. and stirred for 1 h. The reaction mixture was quenched with water (300 mL). The resulting solution was extracted with ethyl acetate (300 mL×3). The combined organic phase was washed with brine (300 mL×2), dried with anhydrous sodium sulfate, filtered and concentrated in vacuo to afford 5-bromo-1,3-dimethyl-6-nitro-1,3-dihydro-2H-benzo[d]imidazol-2-one (4.50 g, 15.73 mmol, 75.8% yield). 1H NMR (400 MHz, DMSO-d$_6$) δ 7.97 (s, 1H), 7.70 (s, 1H), 3.37 (s, 6H); MS (ESI) m/z: 287.9[M+2]$^+$.

1,3-dimethyl-5-(2-methylpyridin-4-yl)-6-nitro-1,3-dihydro-2H-benzo[d]imidazol-2-one

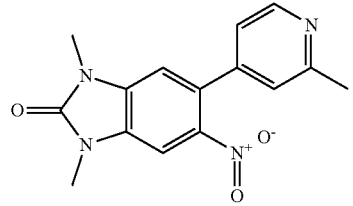

To a solution of 5-bromo-1,3-dimethyl-6-nitro-1,3-dihydro-2H-benzo[d]imidazol-2-one (4.00 g, 13.98 mmol) in 1,4-dioxane (40 mL) was added 2-methyl-4-(4,4,5,5-tetramethyl-1,3,2-dioxaborolan-2-yl)pyridine (4.60 g, 20.97 mmol), cesium carbonate (13.63 g, 41.95 mmol) and (1,1'-bis(diphenylphosphino)ferrocene)palladium(II) dichloride (1.140 g, 1.39 mmol). The suspension was degassed and purged with nitrogen. The mixture was stirred at 110° C. for 12 h. The reaction mixture was quenched with water (300 mL) and extracted with ethyl acetate (300 mL×3). The combined organic phase was washed with brine (300 mL×2), dried with anhydrous sodium sulfate, filtered and concentrated in vacuo. The resulting residue was purified by silica gel column chromatography (5-15% methanol in dichloromethane) to afford 1,3-dimethyl-5-(2-methylpyridin-4-yl)-6-nitro-1,3-dihydro-2H-benzo[d]imidazol-2-one (4.00 g, 13.41 mmol, 95.9% yield). 1H NMR (400 MHz, DMSO-d$_6$) δ 8.48 (d, J=4.8 Hz, 1H), 8.01 (s, 1H), 7.32 (s, 1H), 7.26 (s, 1H), 7.14 (dd, J=1.2, 4.8 Hz, 1H), 3.43 (s, 3H), 3.39 (s, 3H), 2.52 (s, 3H); MS (ESI) m/z: 299.1[M+1]$^+$.

5-amino-1,3-dimethyl-6-(2-methylpyridin-4-yl)-1,3-dihydro-2H-benzo[d]imidazol-2-one

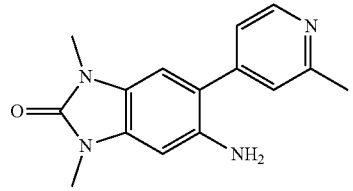 [SMILES: Cc1cc(-c2cc3c(cc2N)n(C)c(=O)n3C)ccn1]

To a solution of 1,3-dimethyl-5-(2-methylpyridin-4-yl)-6-nitro-1,3-dihydro-2H-benzo[d]imidazol-2-one (4.00 g, 13 mmol) in ethanol (60 mL) and water (20 mL) was added ammonium chloride (7.24 g, 134 mmol) and iron powder (3.74 g, 67 mmol). The reaction was stirred at 80° C. for 12 h. The reaction mixture was filtered and the filtrate was concentrated in vacuo to afford 5-amino-1,3-dimethyl-6-(2-methylpyridin-4-yl)-1,3-dihydro-2H-benzo[d]imidazol-2-one (2.600 g, 9.69 mmol, 72.3% yield). MS (ESI) m/z: 269.0[M+1]$^+$.

4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione

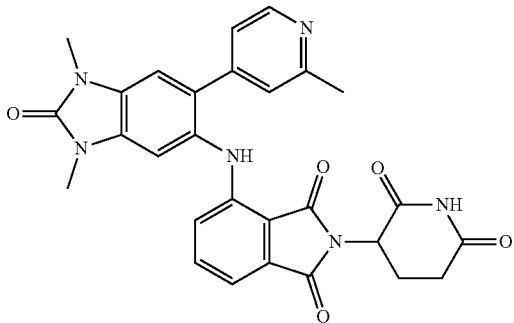 [SMILES: Cc1cc(-c2cc3c(cc2Nc2cccc4c2C(=O)N(C2CCC(=O)NC2=O)C4=O)n(C)c(=O)n3C)ccn1]

To a solution of 5-amino-1,3-dimethyl-6-(2-methylpyridin-4-yl)-1,3-dihydro-2H-benzo[d]imidazol-2-one (2.60 g, 9.69 mmol) in 1,4-dioxane (50 mL) was added 4-bromo-2-(2,6-dioxopiperidin-3-yl)isoindoline-1,3-dione (3.43 g, 10.17 mmol), potassium carbonate (4.01 g, 29.07 mmol) and chloro(2-dicyclohexylphosphino-2',4',6'-triisopropyl-1,1'-biphenyl)[2-(2'-amino-1,1'-biphenyl)]palladium(II) (0.380 g, 0.48 mmol). The resulting suspension was degassed and purged with nitrogen. The mixture was stirred at 115° C. for 12 h. The reaction was filtered and the filtrate was concentrated under reduced pressure. The resulting material was purified by semi-preparative reverse phase HPLC (15-45% acetonitrile in water, 0.1% trifluoroacetic acid modifier). The relevant fractions were lyophilized to afford 4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione (2.1 g, 3.82 mmol, 39% yield). 1H NMR (400 MHz, DMSO-d$_6$) δ 11.12 (s, 1H), 8.65 (d, J=6.0 Hz, 1H), 8.48 (s, 1H), 7.98 (s, 1H), 7.88 (d, J=5.4 Hz, 1H), 7.49 (s, 1H), 7.43 (t, J=8.0 Hz, 1H), 7.38 (s, 1H), 7.11 (d, J=7.2 Hz, 1H), 6.74-6.69 (m, 1H), 5.09 (dd, J=5.4, 12.8 Hz, 1H), 3.42 (s, 3H), 3.37 (s, 3H), 2.96-2.84 (m, 1H), 2.62 (s, 3H), 2.60-2.54 (m, 1H), 2.53-2.51 (m, 1H), 2.09-2.01 (m, 1H); MS (ESI) m/z: 525.2[M+1]$^+$.

(S)-4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione

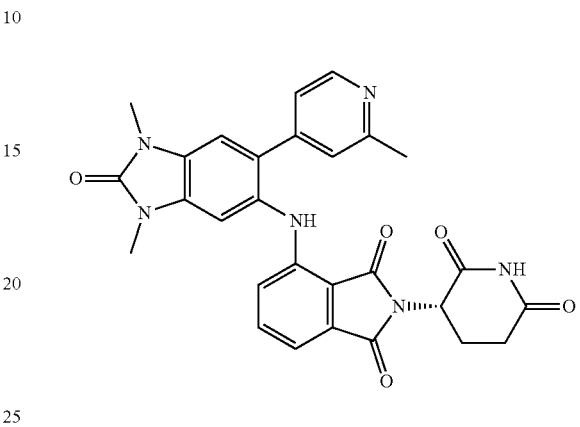

4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione (1.00 g, 1.91 mmol) was separated by chiral prep-SFC (70-70% isopropyl alcohol in acetonitrile). Peak 1 was concentrated under reduced pressure, and extracted with sodium bicarbonate (50 mL×2) and dichloromethane (60 mL×3). The combined organic layers were washed with water (50 mL), dried with anhydrous sodium sulfate and filtered. The filtrate was concentrated under reduced pressure. The resulting residue was treated with acetonitrile (6 mL) and water (60 mL) and lyophilized to obtain (S)-4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione (359 mg, 0.684 mmol, 35% yield). 1H NMR (400 MHz, DMSO-d$_6$) δ 11.12 (s, 1H), 8.34 (d, J=5.2 Hz, 1H), 8.27 (s, 1H), 7.45-7.39 (m, 1H), 7.35 (s, 1H), 7.32 (d, J=1.2 Hz, 2H), 7.25 (d, J=5.2 Hz, 1H), 7.07 (d, J=7.2 Hz, 1H), 6.78 (d, J=8.4 Hz, 1H), 5.08 (dd, J=5.2, 12.8 Hz, 1H), 3.39 (s, 3H), 3.36 (s, 3H), 2.95-2.83 (m, 1H), 2.62-2.53 (m, 1H), 2.52-2.50 (m, 1H), 2.40 (s, 3H), 2.09-2.00 (m, 1H); MS (ESI) m/z: 525.3[M+1]$^+$.

(R)-4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione

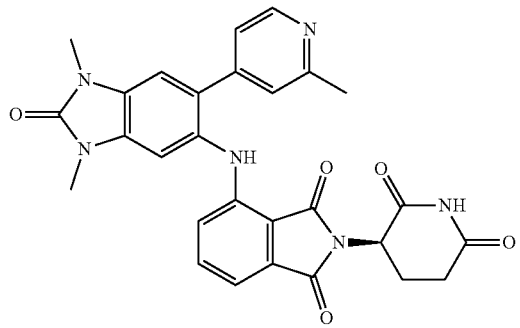 [SMILES: Cc1cc(-c2cc3c(cc2Nc2cccc4c2C(=O)N([C@@H]2CCC(=O)NC2=O)C4=O)n(C)c(=O)n3C)ccn1]

4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione (1.00 g, 1.91 mmol) was separated by chiral prep-SFC (70-70% isopropyl alcohol in acetonitrile). Peak 2 was concentrated under reduced pressure, and extracted with sodium bicarbonate (50 mL×2) and dichloromethane (60 mL×3). The combined organic layers were washed with water (50 mL), dried with anhydrous sodium sulfate and filtered. The filtrate was concentrated under reduced pressure. The resulting residue was treated with acetonitrile (6 mL) and water (60 mL) and lyophilized to obtain (R)-4-((1,3-dimethyl-6-(2-methylpyridin-4-yl)-2-oxo-2,3-dihydro-1H-benzo[d]imidazol-5-yl)amino)-2-(2,6-dioxopiperidin-3-yl)isoindoline-1,3-dione (359 mg, 0.684 mmol, 35% yield). 1H NMR (400 MHz, DMSO-$d_6$) δ 11.11 (s, 1H), 8.35 (d, J=5.2 Hz, 1H), 8.27 (s, 1H), 7.42 (dd, J=7.2, 8.4 Hz, 1H), 7.36 (s, 1H), 7.32 (s, 1H), 7.31 (s, 1H), 7.28-7.25 (m, 1H), 7.07 (d, J=7.2 Hz, 1H), 6.78 (d, J=8.4 Hz, 1H), 5.08 (dd, J=5.2, 12.8 Hz, 1H), 3.39 (s, 3H), 3.36 (s, 3H), 2.95-2.83 (m, 1H), 2.64-2.56 (m, 1H), 2.56-2.52 (m, 1H), 2.41 (s, 3H), 2.08-2.01 (m, 1H); MS (ESI) m/z: 525.3[M+1]$^+$.

Example 25: (R)-4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione & (S)-4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione

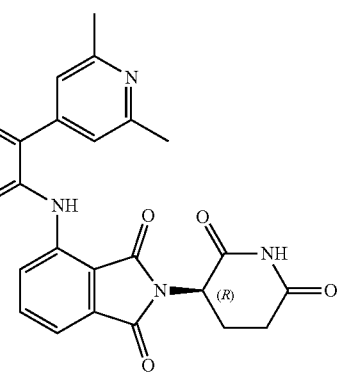

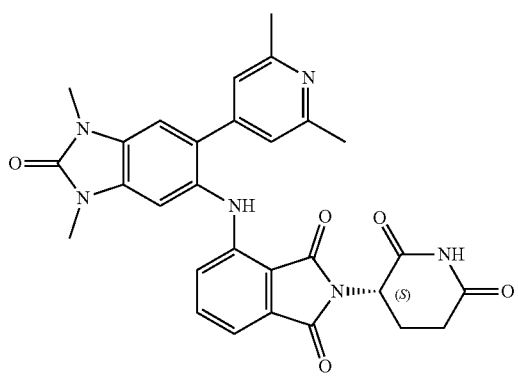

5-(2,6-dimethylpyridin-4-yl)-1,3-dimethyl-6-nitro-1,3-dihydro-2H-benzo[d]imidazol-2-one

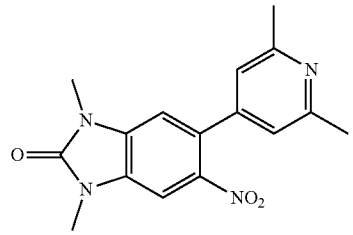 [SMILES: Cc1cc(-c2cc3c(cc2[N+](=O)[O-])n(C)c(=O)n3C)cc(C)n1]

To a solution of 5-bromo-1,3-dimethyl-6-nitro-1,3-dihydro-2H-benzo[d]imidazol-2-one (0.230 g, 0.80 mmol) in 1,4-dioxane (0.5 mL) was added 2,6-dimethyl-4-(4,4,5,5-tetramethyl-1,3,2-dioxaborolan-2-yl)pyridine (0.281 g, 1.21 mmol), cesium carbonate (0.784 g, 2.41 mmol) and (1,1'-bis(diphenylphosphino)ferrocene)palladium(II) dichloride (0.066 g, 0.08 mmol). The suspension was degassed and purged with nitrogen. The mixture was stirred at 110° C. for 12 h. The reaction was concentrated in vacuo, and the resulting residue was purified by silica gel column chromatography (5-15% methanol in dichloromethane) to afford 5-(2,6-dimethylpyridin-4-yl)-1,3-dimethyl-6-nitro-1,3-dihydro-2H-benzo[d]imidazol-2-one (0.180 g, 0.58 mmol, 71% yield). $^1$H NMR (400 MHz, DMSO-$d_6$) δ 7.99 (s, 1H), 7.30 (s, 1H), 7.02 (s, 2H), 3.43 (s, 3H), 3.39 (s, 3H), 2.46 (s, 6H); MS (ESI) m/z: 313.2 [M].

5-amino-6-(2,6-dimethylpyridin-4-yl)-1,3-dimethyl-1,3-dihydro-2H-benzo[d]imidazol-2-one

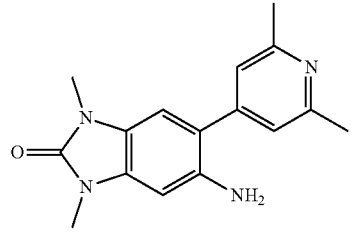

To a solution of 5-(2,6-dimethylpyridin-4-yl)-1,3-dimethyl-6-nitro-1,3-dihydro-2H-benzo[d]imidazol-2-one (0.180 g, 0.58 mmol) in ethanol (3 mL) and water (1 mL) were added ammonium chloride (0.156 g, 2.88 mmol) and ferrous powder (0.322 g, 5.76 mmol). The reaction was stirred at 80° C. for 12 h. The reaction mixture was filtered and the filtrate was concentrated to afford 5-amino-6-(2,6-dimethylpyridin-4-yl)-1,3-dimethyl-1,3-dihydro-2H-benzo[d]imidazol-2-one (0.130 g, 0.46 mmol, 79% yield). MS (ESI) m/z: 283.1[M+1]$^+$.

4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione

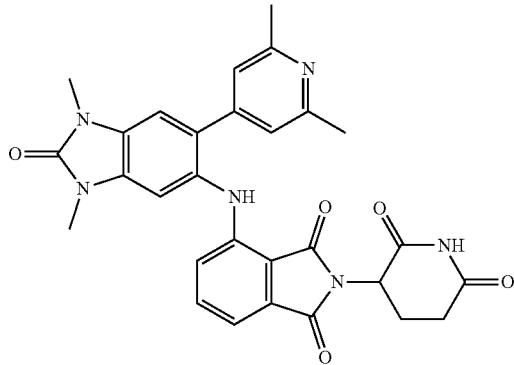 [SMILES: Cc1cc(-c2cc3c(cc2Nc2cccc4c2C(=O)N(C2CCC(=O)NC2=O)C4=O)n(C)c(=O)n3C)cc(C)n1]

To a solution of 5-amino-6-(2,6-dimethylpyridin-4-yl)-1,3-dimethyl-1,3-dihydro-2H-benzo[d]imidazol-2-one (0.130 g, 0.42 mmol) in 1,4-dioxane (3 mL) was added 4-bromo-2-(2,6-dioxopiperidin-3-yl)isoindoline-1,3-dione (0.168 g, 0.500 mmol), potassium carbonate (0.172 g, 1.25 mmol) and chloro(2-dicyclohexylphosphino-2',4',6'-triisopropyl-1,1'-biphenyl)[2-(2'-amino-1,1'-biphenyl)]palladium(II) (0.033 g, 0.04 mmol). The suspension was degassed and purged with nitrogen. The mixture was stirred at 110° C. for 12 h. The reaction was filtered and the filtrate was concentrated. The resulting residue was purified by semi-preparative reverse phase HPLC (13-43% acetonitrile in water, 0.1% trifluoroacetic acid modifier). The collected fraction was lyophilized to afford 4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione (153 mg, 0.284 mmol, 68% yield). $^1$H NMR (400 MHz, DMSO-d$_6$) δ 11.14 (s, 1H), 8.53 (s, 1H), 7.82 (s, 2H), 7.48 (s, 1H), 7.45-7.40 (m, 1H), 7.39 (s, 1H), 7.10 (d, J=7.2 Hz, 1H), 6.71-6.67 (m, 1H), 5.10 (dd, J=5.4, 12.8 Hz, 1H), 3.42 (s, 3H), 3.38 (s, 3H), 2.96-2.85 (m, 1H), 2.65-2.62 (m, 1H), 2.60-2.57 (m, 1H), 2.57 (s, 6H), 2.09-2.02 (m, 1H); MS (ESI) m/z: 539.2[M+1]$^+$

(R)-4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione

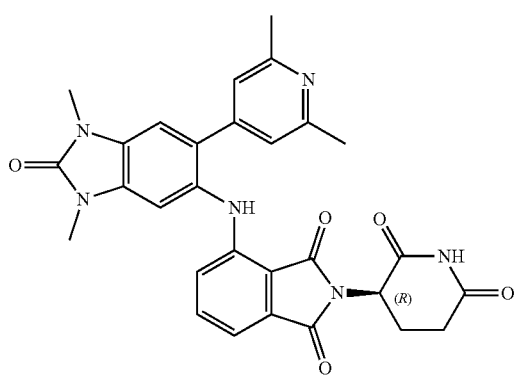

4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione (0.120 g, 0.22 mmol) was separated by chiral prep-SFC (70-70% isopropyl alcohol in acetonitrile). After the separation, one of the two isolated peaks were concentrated under reduced pressure to give (R)-4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione (42.74 mg, 0.079 mmol, 35.6% yield). $^1$H NMR (400 MHz, DMSO-d$_6$) δ 11.11 (s, 1H), 8.28 (s, 1H), 7.47-7.39 (m, 1H), 7.31 (d, J=1.6 Hz, 2H), 7.14 (s, 2H), 7.08 (d, J=7.2 Hz, 1H), 6.81 (d, J=8.4 Hz, 1H), 5.08 (dd, J=5.4, 12.8 Hz, 1H), 3.39 (s, 3H), 3.37 (s, 3H), 2.96-2.84 (m, 1H), 2.65-2.60 (m, 1H), 2.58-2.53 (m, 1H), 2.35 (s, 6H), 2.07-1.99 (m, 1H); MS (ESI) m/z: 539.3[M+1]$^+$.

(S)-4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione

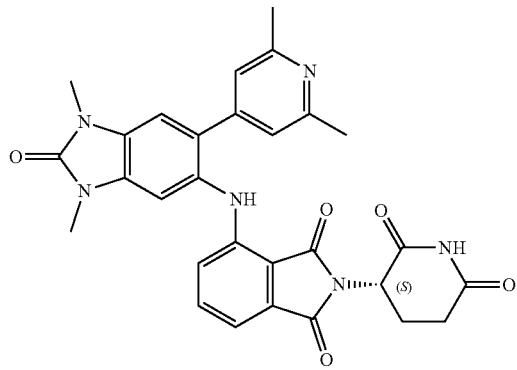

4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione (0.120 g, 0.22 mmol) was separated by chiral prep-SFC (70-70% isopropyl alcohol in acetonitrile). After the separation, one of the two isolated peaks were concentrated under reduced pressure to give (S)-4-((6-(2,6-dimethylpyridin-4-yl)-1,3-dimethyl-2-oxo-2,3-dihydro-1H-benzo[d]imidazol-5-yl)amino)-2-(2,6-dioxopiperidin-3-yl)isoindoline-1,3-dione (58 mg, 0.108 mmol, 48% yield). $^1$H NMR (400 MHz, DMSO-d$_6$) δ 11.13 (s, 1H), 8.48 (s, 1H), 7.79-7.64 (m, 2H), 7.48-7.39 (m, 2H), 7.38 (s, 1H), 7.10 (d, J=7.2 Hz, 1H), 6.75-6.69 (m, 1H), 5.13-5.07 (m, 1H), 3.41 (s, 3H), 3.38 (s, 3H), 2.98-2.84 (m, 1H), 2.65-2.61 (m, 1H), 2.60-2.56 (m, 1H), 2.54 (s, 6H), 2.09-2.00 (m, 1H); MS (ESI) m/z: 539.3[M+1]$^+$ Example 26: 2-((R)-2,6-dioxopiperidin-3-yl)-4-((6-(2-methylpyridin-4-yl)-1-((R)-tetrahydrofuran-3-yl)-1H-indazol-5-yl)amino)isoindoline-1,3-dione & 2-((S)-2,6-dioxopiperidin-3-yl)-4-((6-(2-methylpyri-din-4-yl)-1-((R)-tetrahydrofuran-3-yl)-1H-indazol-5-yl)amino)isoindoline-1,3-dione

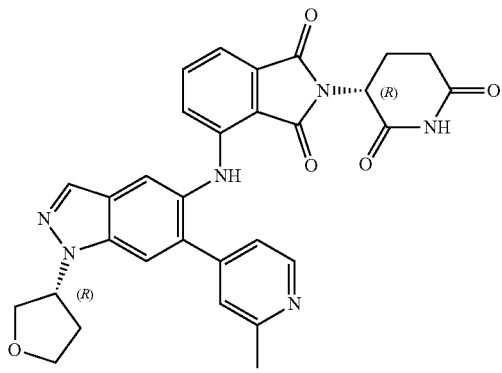

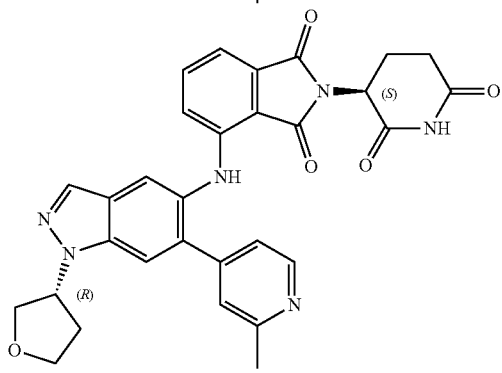

(R)-6-bromo-5-nitro-1-(tetrahydrofuran-3-yl)-1H-indazole

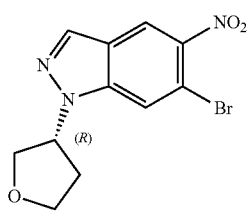

A mixture of 6-bromo-5-nitro-1H-indazole (5.00 g, 20.66 mmol), (S)-tetrahydrofuran-3-ol (2.18 g, 24.79 mmol) and triphenyl phosphine (6.50 g, 24.78 mmol) was dried in vacuo for 30 min, followed by addition of tetrahydrofuran (30 mL). A solution of di-tert-butyl (E)-diazene-1,2-dicar-boxylate (5.70 g, 24.78 mmol) in tetrahydrofuran (20 mL) was added and the mixture was stirred at 25° C. for 12 h. The reaction mixture was filtered and the filtrate was concentrated under reduced pressure. The resulting residue was purified by reversed-phase prep-HPLC. The isolated desired material was lyophilized to give (R)-6-bromo-5-nitro-1-(tetrahydrofuran-3-yl)-1H-indazole (3.50 g, 11.21 mmol, 54% yield). $^1$H NMR (400 MHz, CDCl$_3$) δ 8.38 (s, 1H), 8.16 (s, 1H), 7.89 (s, 1H), 5.31-5.25 (m, 1H), 4.31-4.26 (m, 1H), 4.20-4.19 (m, 2H), 4.05-3.99 (m, 1H), 2.60-2.52 (m, 1H), 2.50-2.42 (m, 1H); MS (ESI) m/z: 313.9 [M+1]$^+$.

(R)-6-(2-methylpyridin-4-yl)-5-nitro-1-(tetrahydrofuran-3-yl)-1H-indazole

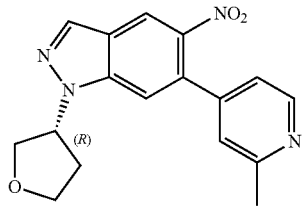

To a solution of (R)-6-bromo-5-nitro-1-(tetrahydrofuran-3-yl)-1H-indazole (3.00 g, 9.61 mmol) and 2-methyl-4-(4,4,5,5-tetramethyl-1,3,2-dioxaborolan-2-yl)pyridine (2.53 g, 11.53 mmol) in dioxane (40 mL) was added potassium carbonate (3.90 g, 28.26 mmol) and dichloro(1,1'-bis(diphe-nylphosphanyl)ferrocene)palladium(II) dichloromethane adduct (0.393 g, 0.48 mmol). The resulting mixture was stirred at 110° C. for 12 h under nitrogen. The reaction mixture was filtered and the filtrate was concentrated under reduced pressure. The resulting residue was purified by silica gel column chromatography to give (R)-6-(2-methylpyridin-4-yl)-5-nitro-1-(tetrahydrofuran-3-yl)-1H-indazole (3.00 g, 9.25 mmol, 96% yield). $^1$H NMR (400 MHz, CDCl$_3$) δ 8.57 (d, J=5.2 Hz, 1H), 8.52 (s, 1H), 8.25 (s, 1H), 7.44 (s, 1H), 7.27 (s, 1H), 7.16 (s, 1H), 7.10 (dd, J=5.2, 1.2 Hz, 1H), 5.35-5.30 (m, 1H), 4.31-4.25 (m, 1H), 4.20 (d, J=5.2 Hz, 2H), 4.05-3.99 (m, 1H), 2.63 (s, 3H), 2.59-2.49 (m, 2H); MS (ESI) m/z: 325.1 [M+1]$^+$.

(R)-6-(2-methylpyridin-4-yl)-1-(tetrahydrofuran-3-yl)-1H-indazol-5-amine

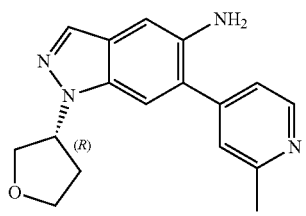

To a solution of (R)-6-(2-methylpyridin-4-yl)-5-nitro-1-(tetrahydrofuran-3-yl)-1H-indazole (3.00 g, 9.25 mmol) in ethanol (30 mL) and water (10 mL) was added ferrous powder (2.58 g, 46.25 mmol) and ammonium chloride (4.99 g, 92.5 mmol). The resulting mixture was stirred at 70° C. for 2 h. The reaction mixture was filtered and the filtrate was concentrated under reduced pressure to give crude (R)-6-(2-methylpyridin-4-yl)-1-(tetrahydrofuran-3-yl)-1H-inda-zol-5-amine (2.73 g, 9.27 mmol, 100% yield). $^1$H NMR (400 MHz, CDCl$_3$) δ 8.61 (d, J=5.2 Hz, 1H), 7.85 (s, 1H), 7.34 (s, 1H), 7.29 (d, J=5.2 Hz, 1H), 7.25 (s, 1H), 7.05 (s, 1H), 5.25-5.19 (m, 1H), 4.26-4.20 (m, 1H), 4.19-4.16 (m, 2H), 4.01-3.96 (m, 1H), 2.65 (s, 3H), 2.52-2.45 (m, 2H); MS (ESI) m/z: 295.1 [M+1]$^+$.

2-(2,6-dioxopiperidin-3-yl)-4-((6-(2-methylpyridin-4-yl)-1-((R)-tetrahydrofuran-3-yl)-1H-indazol-5-yl)amino)isoindoline-1,3-dione

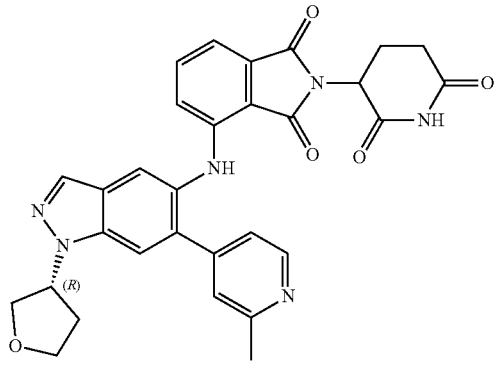

To a solution of (R)-6-(2-methylpyridin-4-yl)-1-(tetrahydrofuran-3-yl)-1H-indazol-5-amine (2.730 g, 9.27 mmol) and 4-bromo-2-(2,6-dioxopiperidin-3-yl)isoindoline-1,3-dione (3.130 g, 9.27 mmol) in dioxane (40 mL) was added potassium carbonate (3.840 g, 27.81 mmol) and chloro(2-dicyclohexylphosphino-2',4',6'-triisopropyl-1,1'-biphenyl)[2-(2'-amino-1,1'-biphenyl)]palladium(II) (0.365 g, 0.46 mmol). The mixture was degassed and purged with nitrogen. The resulting mixture was stirred at 110° C. for 12 h. The reaction mixture was filtered and the filtrate was concentrated under reduced pressure. The resulting residue was purified by reversed-phase prep-HPLC. The isolated material was lyophilized to give 2-(2,6-dioxopiperidin-3-yl)-4-((6-(2-methylpyridin-4-yl)-1-((R)-tetrahydrofuran-3-yl)-1H-indazol-5-yl)amino)isoindoline-1,3-dione trifluoroacetic acid salt (1026 mg, 1.86 mmol). $^1$H NMR (400 MHz, DMSO-$d_6$) δ 11.13 (s, 1H), 8.65 (d, J=6.0 Hz, 1H), 8.46 (s, 1H), 8.23 (s, 1H), 8.07 (s, 1H), 7.94 (s, 2H), 7.81 (d, J=3.2 Hz, 1H), 7.42-7.38 (m, 1H), 7.08 (d, J=7.2 Hz, 1H), 6.73-6.69 (m, 1H), 5.65-5.59 (m, 1H), 5.09 (dd, J=5.2, 12.8 Hz, 1H), 4.17-4.10 (m, 2H), 3.98-3.92 (m, 2H), 2.95-2.86 (m, 1H), 2.64-2.63 (m, 1H), 2.60 (s, 3H), 2.48-2.46 (m, 1H), 2.44-2.37 (m, 2H), 2.08-2.03 (m, 1H); MS (ESI) m/z: 551.2 [M+1]$^+$

2-((R)-2,6-dioxopiperidin-3-yl)-4-((6-(2-methylpyridin-4-yl)-1-((R)-tetrahydrofuran-3-yl)-1H-indazol-5-yl)amino)isoindoline-1,3-dione

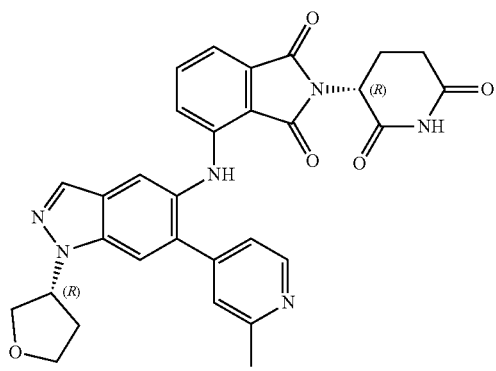

2-(2,6-dioxopiperidin-3-yl)-4-((6-(2-methylpyridin-4-yl)-1-((R)-tetrahydrofuran-3-yl)-1H-indazol-5-yl)amino)isoindoline-1,3-dione (0.75 g, 1.36 mmol) was separated by chiral prep-SFC (70-70% isopropyl alcohol in acetonitrile). One of the two isolated peaks was concentrated under reduce pressure to give 2-((R)-2,6-dioxopiperidin-3-yl)-4-((6-(2-methylpyridin-4-yl)-1-((R)-tetrahydrofuran-3-yl)-1H-indazol-5-yl)amino)isoindoline-1,3-dione (0.33 g, 0.60 mmol, 44% yield). $^1$H NMR (400 MHz, DMSO-$d_6$) δ 11.12 (s, 1H), 8.39 (d, J=5.2 Hz, 1H), 8.32 (s, 1H), 8.18 (s, 1H), 7.93 (s, 1H), 7.89 (s, 1H), 7.43-7.42 (m, 1H), 7.42-7.39 (m, 1H), 7.33 (d, J=4.8 Hz, 1H), 7.06 (d, J=7.2 Hz, 1H), 6.78 (d, J=8.8 Hz, 1H), 5.64-5.58 (m, 1H), 5.08 (dd, J=12.8, 5.2 Hz, 1H), 4.14-4.09 (m, 2H), 3.95-3.90 (m, 2H), 2.94-2.85 (m, 1H), 2.63-2.58 (m, 2H), 2.47-2.46 (m, 1H), 2.43 (s, 3H), 2.40-2.36 (m, 1H), 2.07-2.02 (m, 1H); MS (ESI) m/z: 551.3 [M+1]$^+$.

2-((S)-2,6-dioxopiperidin-3-yl)-4-((6-(2-methylpyridin-4-yl)-1-((R)-tetrahydrofuran-3-yl)-1H-indazol-5-yl)amino)isoindoline-1,3-dione

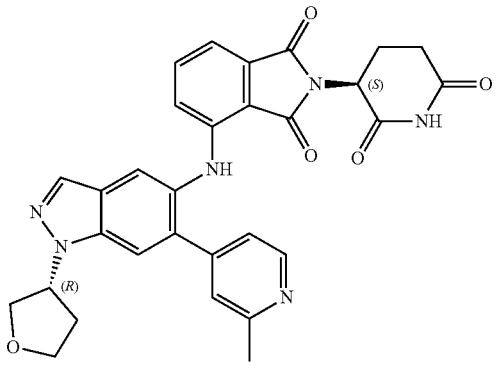

2-(2,6-dioxopiperidin-3-yl)-4-((6-(2-methylpyridin-4-yl)-1-((R)-tetrahydrofuran-3-yl)-1H-indazol-5-yl)amino)isoindoline-1,3-dione (0.75 g, 1.36 mmol) was separated by chiral prep-SFC (70-70% isopropyl alcohol in acetonitrile). One of the two isolated peaks was concentrated under reduce pressure to give 2-((S)-2,6-dioxopiperidin-3-yl)-4-((6-(2-methylpyridin-4-yl)-1-((R)-tetrahydrofuran-3-yl)-1H-indazol-5-yl)amino)isoindoline-1,3-dione (0.40 g, 0.73 mmol, 53% yield). $^1$H NMR (400 MHz, DMSO-$d_6$) δ 11.12 (s, 1H), 8.38 (d, J=5.2 Hz, 1H), 8.32 (s, 1H), 8.18 (s, 1H), 7.92 (s, 1H), 7.89 (s, 1H), 7.42 (s, 1H), 7.41-7.39 (m, 1H), 7.32-7.31 (m, 1H), 7.07 (d, J=6.8 Hz, 1H), 6.82-6.78 (m, 1H), 5.64-5.58 (m, 1H), 5.08 (dd, J=12.8, 5.6 Hz, 1H), 4.16-4.07 (m, 2H), 3.96-3.88 (m, 2H), 2.94-2.85 (m, 1H), 2.63-2.58 (m, 2H), 2.43 (s, 3H), 2.40-2.36 (m, 2H), 2.07-2.02 (m, 1H); MS (ESI) m/z: 551.3 [M+1]$^+$.

Example 27: (S)-2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione

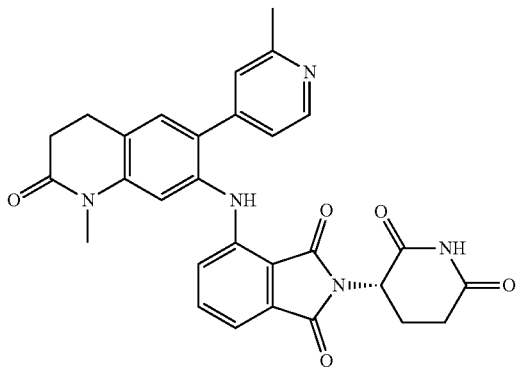 [SMILES: Cc1cc(-c2cc3c(cc2Nc2cccc4c2C(=O)N([C@H]2CCC(=O)NC2=O)C4=O)N(C)C(=O)CC3)ccn1]

7-amino-6-bromo-3,4-dihydroquinolin-2(1H)-one

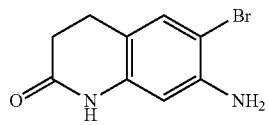 [SMILES: Nc1cc2c(cc1Br)CCC(=O)N2]

To a mixture of 7-amino-3,4-dihydroquinolin-2(1H)-one (5.00 g, 30.83 mmol) suspended in dichloromethane (100 mL) methanol (25 mL) was added tetra-n-butylammonium tribromide (6.00 g, 13.87 mmol). The reaction mixture was stirred at 0° C. for two hours. The reaction mixture was partitioned between dichloromethane and 10% aqueous sodium thiosulfate. The organic layer was dried over magnesium sulfate, filtered, and concentrated under reduced pressure. The resulting crude residue was purified by column chromatography to afford 7-amino-6-bromo-3,4-dihydroquinolin-2(1H)-one (1.00 g, 4.15 mmol, 13% yield). MS (ESI) m/z: 242.4[M+1]$^+$ 7-amino-6-bromo-1-methyl-3,4-dihydroquinolin-2(1H)-one

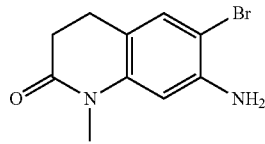

7-amino-6-bromo-3,4-dihydroquinolin-2(1H)-one (1.00 g, 4.15 mmol) was dissolved in tetrahydrofuran (15 mL) and cooled to 0° C. Potassium bis(trimethylsilyl)amide (1M) (4.6 mL, 4.56 mmol) was then added dropwise, followed by dropwise addition of iodomethane (0.65 g, 4.56 mmol). The mixture was stirred for 12 h at 25° C. The reaction was quenched with saturated ammonium chloride solution (10 mL), and then partitioned between ethyl acetate and brine. The organic layer was dried over magnesium sulfate, filtered, and concentrated under reduced pressure. The resulting crude residue was purified by column chromatography to afford 7-amino-6-bromo-1-methyl-3,4-dihydroquinolin-2 (1H)-one (0.80 g, 3.14 mmol, 75% yield) as a yellow solid. $^1$H NMR (400 MHz, DMSO-d$_6$) δ 7.17 (s, 1H), 6.56 (s, 1H), 5.26-5.19 (m, 2H), 3.17 (s, 3H), 2.72-2.68 (m, 2H), 2.49-2.45 (m, 2H); MS (ESI) m/z: 255.1[M].

7-amino-1-meth 1-6-2-methylpyridin-4-yl)-3,4-dihydroquinolin-2(1H)-one

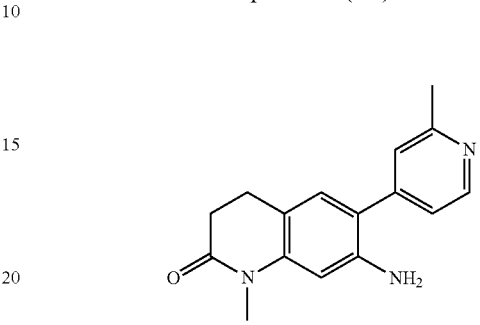

To a solution of the mixture of 7-amino-6-bromo-1-methyl-3,4-dihydroquinolin-2(1H)-one (0.80 g, 3.14 mmol) in 1,4-dioxane (10 mL) and water (1 mL) was added 2-methyl-4-(4,4,5,5-tetramethyl-1,3,2-dioxaborolan-2-yl) pyridine (0.81 g, 3.70 mmol), (1,1'-bis(diphenylphosphino) ferrocene)palladium(II) dichloride (0.25 g, 0.31 mmol) and potassium carbonate (1.29 g, 9.41 mmol). The suspension was degassed and purged with nitrogen. The mixture was stirred at 110° C. for 12 h. The reaction was concentrated in vacuo and purified by silica gel column chromatography to afford 7-amino-1-methyl-6-(2-methylpyridin-4-yl)-3,4-dihydroquinolin-2(1H)-one (0.60 g, 2.24 mmol, 71% yield). MS (ESI) m/z: 268.0[M+1]$^+$ 2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione

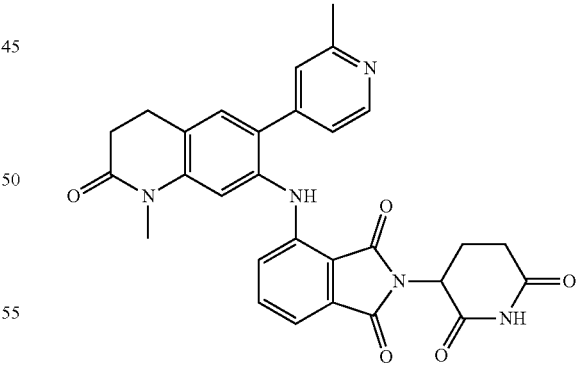

To a solution of 7-amino-1-methyl-6-(2-methylpyridin-4-yl)-3,4-dihydroquinolin-2(1H)-one (0.60 g, 2.24 mmol) in 1,4-dioxane (10 mL) was added 4-bromo-2-(2,6-dioxopiperidin-3-yl)isoindoline-1,3-dione (0.83 g, 2.47 mmol), potassium carbonate (0.92 g, 6.73 mmol) and chloro(2-dicyclohexylphosphino-2',4',6'-triisopropyl-1,1'-biphenyl) [2-(2'-amino-1,1'-biphenyl)]palladium(II) (0.17 g, 0.22 mmol). The suspension was degassed and purged with nitrogen. The mixture was stirred at 115° C. for 12 h. The reaction was filtered and the filtrate was concentrated and purified by semi-preparative reverse phase HPLC. The collected fraction was lyophilized to afford 2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione (0.60 g, 1.15 mmol, 51% yield). MS (ESI) m/z: 524.2[M+1]⁺

(S)-2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione

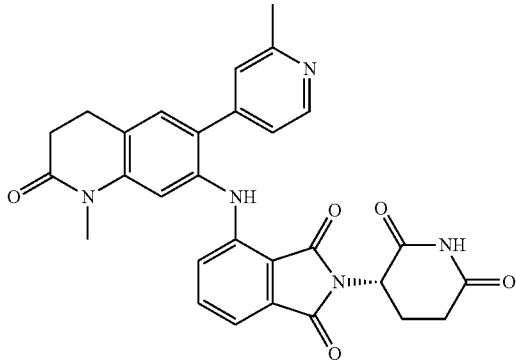 [SMILES: Cc1cc(-c2cc3c(cc2Nc2cccc4c2C(=O)N([C@H]2CCC(=O)NC2=O)C4=O)N(C)C(=O)CC3)ccn1]

2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione (0.60 g, 1.15 mmol) was separated by chiral prep-SFC (40-40% isopropyl alcohol in acetonitrile). After the separation, the peak (S)-2-(2,6-dioxopiperidin-3-yl)-4-((1-methyl-6-(2-methylpyridin-4-yl)-2-oxo-1,2,3,4-tetrahydroquinolin-7-yl)amino)isoindoline-1,3-dione (261 mg, 0.49 mmol, 43% yield) was obtained. ¹H NMR (400 MHz, DMSO-$d_6$) δ 11.11 (s, 1H), 8.35 (d, J=5.2 Hz, 1H), 8.33 (s, 1H), 7.49-7.43 (m, 1H), 7.38 (s, 1H), 7.32 (s, 1H), 7.23 (d, J=5.2 Hz, 1H), 7.20 (s, 1H), 7.15-7.11 (m, 1H), 6.99 (d, J=8.4 Hz, 1H), 5.08 (dd, J=5.2, 12.8 Hz, 1H), 3.27 (s, 3H), 2.99-2.93 (m, 2H), 2.92-2.83 (m, 1H), 2.64 (t, J=7.2 Hz, 2H), 2.60-2.55 (m, 1H), 2.54 (s, 1H), 2.41 (s, 3H), 2.07-1.99 (m, 1H); MS (ESI) m/z: 524.3[M+1]⁺

Example 28: 2-(2,6-dioxopiperidin-3-yl)-4-((1-methyl-6-(4-methylthiazol-2-yl)-2-oxo-1,2,3,4-tetrahydroquinolin-7-yl)amino)isoindoline-1,3-dione

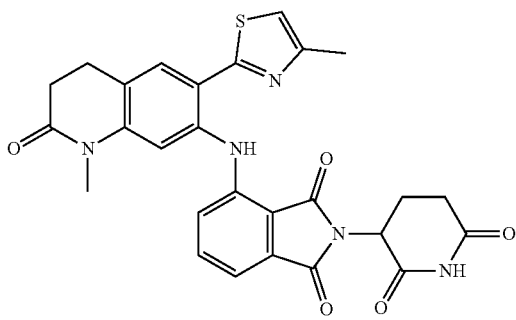 [SMILES: Cc1csc(-c2cc3c(cc2Nc2cccc4c2C(=O)N(C2CCC(=O)NC2=O)C4=O)N(C)C(=O)CC3)n1]

7-amino-1-methyl-6-(4,4,5,5-tetramethyl-1,3,2-dioxaborolan-2-yl)-3,4-dihydroquinolin-2(1H)-one

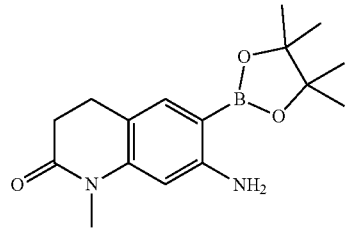 [SMILES: CN1C(=O)CCc2cc(B3OC(C)(C)C(C)(C)O3)c(N)cc21]

To a solution of 7-amino-6-bromo-1-methyl-3,4-dihydroquinolin-2(1H)-one (0.50 g, 1.96 mmol) and 4,4,4',4',5,5,5',5'-octamethyl-2,2'-bi(1,3,2-dioxaborolane) (0.59 g, 2.35 mmol) in 1,4-dioxane (8 mL) and was added potassium acetate (0.57 g, 5.88 mmol). The mixture was degassed and purged with nitrogen. To the mixture was added (1,1'-bis(diphenylphosphino)ferrocene)palladium(II) dichloride (0.16 g, 0.20 mmol), and the mixture was stirred at 110° C. for 12 h. The reaction mixture was filtered and the filtrate was concentrated. The resulting residue was purified by silica gel column chromatography to afford 7-amino-1-methyl-6-(4,4,5,5-tetramethyl-1,3,2-dioxaborolan-2-yl)-3,4-dihydroquinolin-2(1H)-one (0.28 g, 0.93 mmol, 47% yield). MS (ESI) m/z: 303.4[M+1]⁺

7-amino-1-methyl-6-(4-methylthiazol-2-yl)-3,4-dihydroquinolin-2(1H)-one

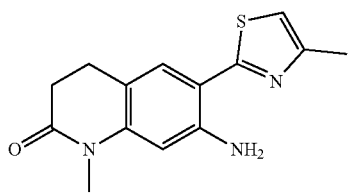 [SMILES: Cc1csc(-c2cc3c(cc2N)N(C)C(=O)CC3)n1]

To a solution of 7-amino-1-methyl-6-(4,4,5,5-tetramethyl-1,3,2-dioxaborolan-2-yl)-3,4-dihydroquinolin-2(1H)-one (0.20 g, 0.66 mmol) and 2-bromo-4-methylthiazole (0.14 g, 0.79 mmol) in 1,4-dioxane (1 mL) and water (0.2 mL) was added sodium carbonate (0.21 mg, 1.99 mmol). The mixture was degassed and purged with nitrogen. To the mixture was added (1,1'-bis(diphenylphosphino)ferrocene)palladium(II) dichloride (0.06 mg, 0.07 mmol), and the reaction was stirred at 110° C. for 12 h. The reaction mixture was filtered and the filtrate was concentrated. The resulting crude residue was purified by prep-TLC to afford 7-amino-1-methyl-6-(4-methylthiazol-2-yl)-3,4-dihydroquinolin-2(1H)-one (0.06 g, 0.22 mmol, 33% yield). ¹H NMR (400 MHz, CDCl₃) δ 7.37 (s, 1H), 6.73 (s, 1H), 6.35 (s, 1H), 3.34 (s, 3H), 2.88-2.82 (m, 2H), 2.69-2.63 (m, 2H), 2.47 (s, 3H).

145

2-(2,6-dioxopiperidin-3-yl)-4-((1-methyl-6-(4-methylthiazol-2-yl)-2-oxo-1,2,3,4-tetrahydroquinolin-7-yl)amino)isoindoline-1,3-dione

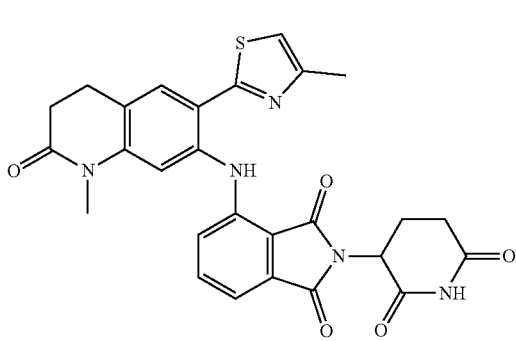 [SMILES: Cc1csc(-c2cc3c(cc2Nc2cccc4c2C(=O)N(C2CCC(=O)NC2=O)C4=O)N(C)C(=O)CC3)n1]

To a solution of 7-amino-1-methyl-6-(4-methylthiazol-2-yl)-3,4-dihydroquinolin-2(1H)-one (0.05 g, 0.18 mmol) in 1,4-dioxane (2 mL) was added 4-bromo-2-(2,6-dioxopiperidin-3-yl)isoindoline-1,3-dione (0.068 g, 0.20 mmol), potassium carbonate (0.076 g, 0.55 mmol) and chloro(2-dicyclohexylphosphino-2',4',6'-triisopropyl-1,1'-biphenyl)[2-(2'-amino-1,1'-biphenyl)]palladium(II) (0.014 g, 0.02 mmol). The suspension was degassed and purged with nitrogen. The mixture was stirred at 115° C. for 12 hours. The reaction mixture was filtered and the filtrate was concentrated. The resulting crude residue was purified by semi-preparative reverse phase HPLC and the collected fraction was lyophilized to afford 2-(2,6-dioxopiperidin-3-yl)-4-((1-methyl-6-(4-methylthiazol-2-yl)-2-oxo-1,2,3,4-tetrahydroquinolin-7-yl)amino)isoindoline-1,3-dione (12 mg, 0.023 mmol, 12% yield). $^1$H NMR (400 MHz, DMSO-$d_6$) δ 11.14 (s, 1H), 11.11-11.06 (m, 1H), 7.75-7.70 (m, 2H), 7.67-7.62 (m, 1H), 7.30 (d, J=7.2 Hz, 1H), 7.28 (d, J=0.8 Hz, 1H), 7.28 (s, 1H), 5.14 (dd, J=5.4, 12.4 Hz, 1H), 3.27 (s, 3H), 2.96 (t, J=7.2 Hz, 2H), 2.93-2.87 (m, 1H), 2.65-2.60 (m, 2H), 2.58-2.56 (m, 1H), 2.55-2.54 (m, 1H), 2.42 (s, 3H), 2.13-2.06 (m, 1H); MS (ESI) m/z: 530.0[M+1]$^+$ Example 29: (S)-4-((6-(1-cyclopropyl-1H-pyrazol-4-yl)-1-methyl-2-oxo-1,2,3,4-tetrahydroquinolin-7-yl)amino)-2-(2,6-dioxopiperidin-3-yl)isoindoline-1,3-dione

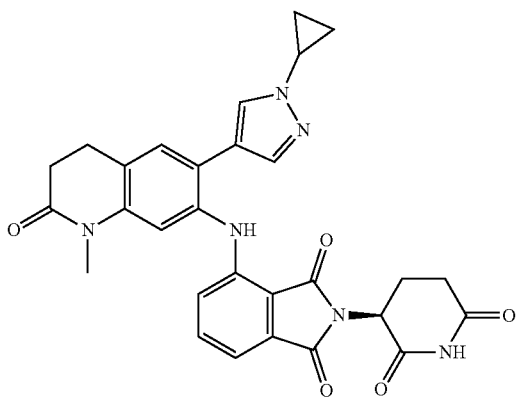 [SMILES: CN1C(=O)CCc2cc(-c3cnn(C4CC4)c3)c(Nc3cccc4c3C(=O)N([C@H]3CCC(=O)NC3=O)C4=O)cc21]

146

7-amino-6-(1-cyclopropyl-1H-pyrazol-4-yl)-1-methyl-3,4-dihydroquinolin-2(1H)-one

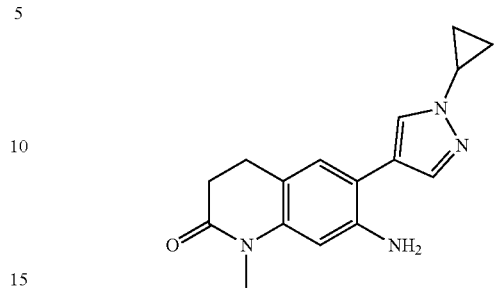

To a solution of the mixture of 7-amino-6-bromo-1-methyl-3,4-dihydroquinolin-2-one (0.20 g, 0.78 mmol) in 1,4-Dioxane (4 mL) and water (1 mL) was added 1-cyclopropyl-4-(4,4,5,5-tetramethyl-1,3,2-dioxaborolan-2-yl)pyrazole (0.20 g, 0.86 mmol), (1,1-bis(diphenylphosphino)ferrocene)palladium(II) dichloride (0.10 g, 0.12 mmol) and potassium carbonate (0.76 g, 2.35 mmol). The suspension was degassed and purged with nitrogen. The mixture was stirred at 110° C. for 12 h. The reaction mixture was dried over anhydrous sodium sulfate and then filtered. The filtrate was concentrated under reduced pressure and purified by silica gel column chromatography (5-15% methanol in dichloromethane) to afford 7-amino-6-(1-cyclopropyl-1H-pyrazol-4-yl)-1-methyl-3,4-dihydroquinolin-2(1H)-one (0.25 g, 0.91 mmol, 100% yield). MS (ESI) m/z: 283.0 [M+1]$^+$.

dimethyl 3-((6-(1-cyclopropyl-1H-pyrazol-4-yl)-1-methyl-2-oxo-1,2,3,4-tetrahydroquinolin-7-yl)amino)phthalate

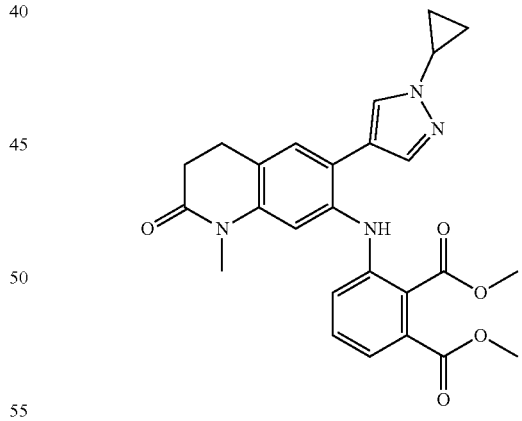

To a solution of 7-amino-6-(1-cyclopropylpyrazol-4-yl)-1-methyl-3,4-dihydroquinolin-2-one (0.197 g, 0.70 mmol) and dimethyl 3-bromobenzene-1,2-dicarboxylate (0.226 g, 0.83 mmol) in 1,4-Dioxane (5 mL) was added cesium carbonate (0.680 g, 2.09 mmol) and Methanesulfonato(2-dicyclohexylphosphino-2,6-di-i-propoxy-1,1-biphenyl)(2-amino-1,1-biphenyl-2-yl)palladium(II) (0.029 g, 0.04 mmol). The mixture was degassed and purged with nitrogen. The reaction mixture was stirred at 110° C. for 12 h. The reaction mixture was filtered and concentrated under reduce pressure. The resulting crude product was purified by prep- TLC to afford dimethyl 3-((6-(1-cyclopropyl-1H-pyrazol-4-yl)-1-methyl-2-oxo-1,2,3,4-tetrahydroquinolin-7-yl)amino)phthalate (0.127 g, 0.25 mmol, 38.4% yield). $^1$H NMR (400 MHz, CDCl$_3$) δ 7.26 (s, 2H), 7.24 (s, 1H), 7.07 (s, 1H), 7.05 (s, 1H), 7.03 (s, 1H), 7.01 (s, 1H), 6.93 (s, 1H), 3.90 (s, 3H); MS (ESI) m/z: 475.2 [M+1]$^+$ 3-((6-(1-cyclopropyl-1H-pyrazol-4-yl)-1-methyl-2-oxo-1,2,3,4-tetrahydroquinolin-7-yl)amino)phthalic acid

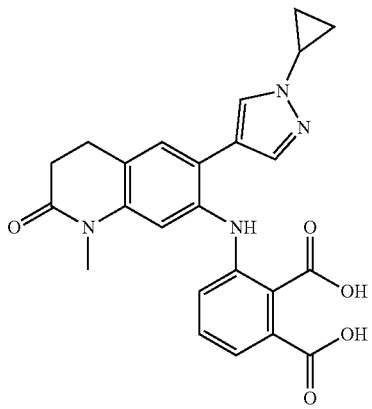 [SMILES: CN1C(=O)CCc2cc(-c3cnn(C4CC4)c3)c(Nc3cccc(C(=O)O)c3C(=O)O)cc21]

To a solution of dimethyl 3-((6-(1-cyclopropyl-1H-pyrazol-4-yl)-1-methyl-2-oxo-1,2,3,4-tetrahydroquinolin-7-yl)amino)phthalate (0.170 g, 0.36 mmol) in Water (1 mL) and Methanol (3 mL) was added sodium hydroxide (0.043 g, 1.07 mmol). The mixture was stirred at 80° C. for 12 hours. The mixture was adjusted to pH 3 with diluted hydrochloride acid and filtered. The filtrate was concentrated under reduced pressure to afford crude 3-((6-(1-cyclopropyl-1H-pyrazol-4-yl)-1-methyl-2-oxo-1,2,3,4-tetrahydroquinolin-7-yl)amino)phthalic acid (0.088 g, 0.20 mmol, 55.0% yield). MS (ESI) m/z: 447.2 [M+1]$^+$ tert-butyl rac-(4S)-5-amino-4-[4-[[6-(1-cyclopropylpyrazol-4-yl)-1-methyl-2-oxo-3,4-dihydroquinolin-7-yl]amino]-1,3-dioxo-isoindolin-2-yl]-5-oxo-pentanoate

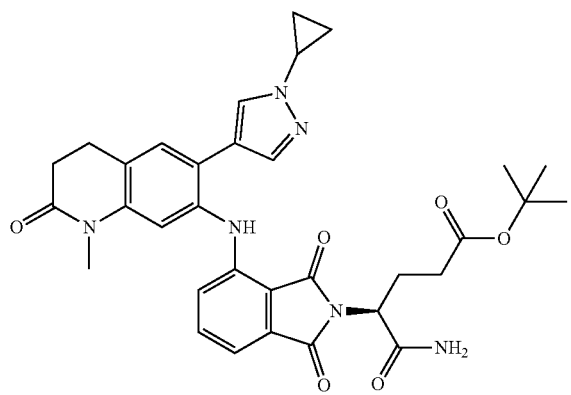 [SMILES: CN1C(=O)CCc2cc(-c3cnn(C4CC4)c3)c(Nc3cccc4c3C(=O)N([C@@H](CCC(=O)OC(C)(C)C)C(N)=O)C4=O)cc21]

To a solution of 3-((6-(1-cyclopropyl-1H-pyrazol-4-yl)-1-methyl-2-oxo-1,2,3,4-tetrahydroquinolin-7-yl)amino)phthalic acid (0.088 g, 0.20 mmol) in toluene (1.5 mL) and triethylamine (0.34 mL, 1.97 mmol) was added tert-butyl rac-(4S)-4,5-diamino-5-oxo-pentanoate (0.040 g, 0.20 mmol). The mixture was stirred at 130° C. for 12 h. The reaction mixture was concentrated under reduced pressure. The resulting residue was purified by prep-TLC to obtain tert-butyl rac-(4S)-5-amino-4-[4-[[6-(1-cyclopropylpyrazol-4-yl)-1-methyl-2-oxo-3,4-dihydroquinolin-7-yl]amino]-1,3-dioxo-isoindolin-2-yl]-5-oxo-pentanoate (0.069 g, 0.11 mmol, 57.1% yield).

(S)-4-((6-(1-cyclopropyl-1H-pyrazol-4-yl)-1-methyl-2-oxo-1,2,3,4-tetrahydroquinolin-7-yl)amino)-2-(2,6-dioxopiperidin-3-yl)isoindoline-1,3-dione

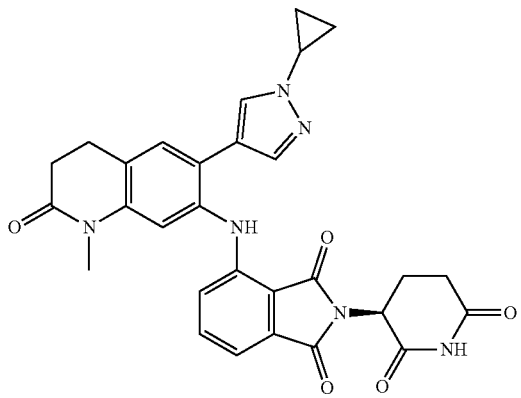 [SMILES: CN1C(=O)CCc2cc(-c3cnn(C4CC4)c3)c(Nc3cccc4c3C(=O)N([C@H]3CCC(=O)NC3=O)C4=O)cc21]

To a solution of tert-butyl rac-(4S)-5-amino-4-[4-[[6-(1-cyclopropylpyrazol-4-yl)-1-methyl-2-oxo-3,4-dihydroquinolin-7-yl]amino]-1,3-dioxo-isoindolin-2-yl]-5-oxo-pentanoate (0.069 g, 0.11 mmol) in acetonitrile (1 mL) was added benzenesulfonic acid (0.018 g, 0.11 mmol). The mixture was stirred at 60° C. for 12 hours. The reaction was extracted with dichloromethane (30 mL×3) and saturated sodium bicarbonate solution (30 mL). The combined organic layer was dried over anhydrous sodium sulfate, filtered, and concentrated under reduced pressure. The crude product was purified by reversed-phase prep-HPLC to give (S)-4-((6-(1-cyclopropyl-1H-pyrazol-4-yl)-1-methyl-2-oxo-1,2,3,4-tetrahydroquinolin-7-yl)amino)-2-(2,6-dioxopiperidin-3-yl)isoindoline-1,3-dione (12 mg, 0.023 mmol, 20% yield). $^1$H NMR (400 MHz, DMSO-d$_6$) δ 11.14 (s, 1H), 8.29 (s, 1H), 7.65 (s, 1H), 7.53-7.49 (m, 1H), 7.18 (d, J=8.0 Hz, 1H), 7.12 (s, 1H), 7.0 (m, J=8.0 Hz, 1H), 5.16 (dd, J=4.0, 12.0 Hz 12, 1H), 3.71-3.62 (m, 2H), 3.24 (s, 1H), 2.95-2.88 (m, 3H), 2.65 (s, 1H), 2.62-2.60 (m, 2H), 2.10-2.08 (m, 1H), 1.24 (s, 3H); MS (ESI) m/z: 539.2 [M+1]$^+$ Example 30: (S)-4-((6-(1,3-dimethyl-1H-pyrazol-4-yl)-1-methyl-2-oxo-1,2,3,4-tetrahydroquinolin-7-yl)amino)-2-(2,6-dioxopiperidin-3-yl)isoindoline-1,3-dione

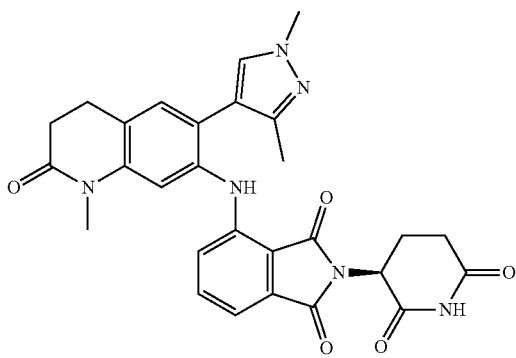 [SMILES: Cc1nn(C)cc1-c1cc2c(cc1Nc1cccc3c1C(=O)N([C@H]1CCC(=O)NC1=O)C3=O)N(C)C(=O)CC2]

7-amino-6-(1,3-dimethylpyrazol-4-yl)-1-methyl-3,4-dihydroquinolin-2-one

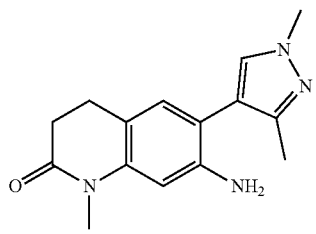 [SMILES: Cc1nn(C)cc1-c1cc2c(cc1N)N(C)C(=O)CC2]

To a solution of 7-amino-6-bromo-1-methyl-3,4-dihydroquinolin-2-one (0.17 g, 0.67 mmol) and 1,3-dimethyl-4-(4,4,5,5-tetramethyl-1,3,2-dioxaborolan-2-yl)pyrazole (0.16 g, 0.73 mmol) in 1,4-Dioxane (3 mL) and Water (0.5 mL) was added potassium carbonate (0.27 g, 2.00 mmol). The mixture was degassed and purged with nitrogen. (1,1'-bis(diphenylphosphino)ferrocene)palladium(II) dichloride (0.05 g, 0.07 mmol) was added and the mixture was stirred at 110° C. for 12 h. The reaction mixture was filtered and the filtrate was concentrated. The resulting residue was purified by prep-TLC to afford 7-amino-6-(1,3-dimethylpyrazol-4-yl)-1-methyl-3,4-dihydroquinolin-2-one (0.12 g, 0.44 mmol, 66% yield). MS (ESI) m/z: 271.2 [M+1]

dimethyl 3-((6-(1,3-dimethyl-1H-pyrazol-4-yl)-1-methyl-2-oxo-1,2,3,4-tetrahydroquinolin-7-yl)amino)phthalate

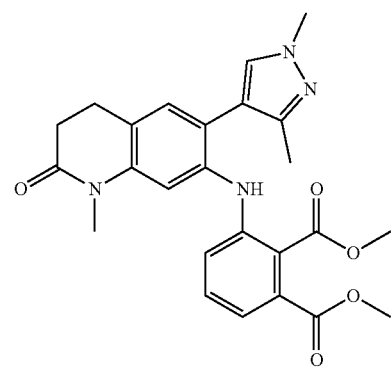 [SMILES: COC(=O)c1cccc(Nc2cc3c(cc2-c2cn(C)nc2C)CCC(=O)N3C)c1C(=O)OC]

To a solution of 7-amino-6-(1,3-dimethylpyrazol-4-yl)-1-methyl-3,4-dihydroquinolin-2-one (0.12 g, 0.44 mmol) and dimethyl 3-bromobenzene-1,2-dicarboxylate (0.13 g, 0.49 mmol) in 1,4-Dioxane (3 mL) was added potassium carbonate (0.18 g, 1.33 mmol) and chloro(2-dicyclohexylphosphino-2',4',6'-triisopropyl-1,1'-biphenyl)[2-(2'-amino-1,1'-biphenyl)]palladium(II) (0.03 g, 0.04 mmol). The mixture was stirred at 110° C. for 12 h. The suspension was filtered and the filtrate was concentrated. The residue was purified by prep-TLC to afford dimethyl 3-((6-(1,3-dimethyl-1H-pyrazol-4-yl)-1-methyl-2-oxo-1,2,3,4-tetrahydroquinolin-7-yl)amino)phthalate (0.15 g, 0.32 mmol, 73% yield). MS (ESI) m/z: 463.1[M+1]

3-((6-(1,3-dimethyl-1H-pyrazol-4-yl)-1-methyl-2-oxo-1,2,3,4-tetrahydroquinolin-7-yl)amino)phthalic acid

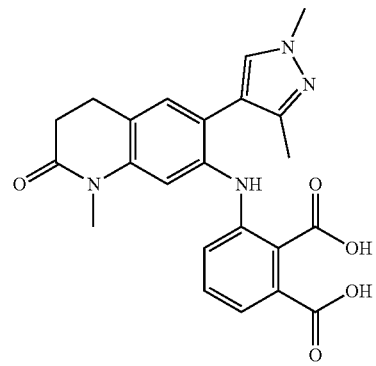 [SMILES: Cc1nn(C)cc1-c1cc2c(cc1Nc1cccc(C(=O)O)c1C(=O)O)N(C)C(=O)CC2]

To a solution of dimethyl 3-((6-(1,3-dimethyl-1H-pyrazol-4-yl)-1-methyl-2-oxo-1,2,3,4-tetrahydroquinolin-7-yl)amino)phthalate (0.15 g, 0.32 mmol) in methanol (3 mL) was added sodium hydroxide (0.06 g, 1.63 mmol) in water (1.5 mL). The mixture was stirred at 80° C. for 12 h. The pH of the mixture was adjusted to 6 by addition of 1 M HCl. The resultant precipitate solid was collected by filtration, washed with water (20 ml) and dried in vacuo to afford 3-((6-(1,3-dimethyl-1H-pyrazol-4-yl)-1-methyl-2-oxo-1,2,3,4-tetrahydroquinolin-7-yl)amino)phthalic acid (0.11 g, 0.25 mmol, 78% yield). $^1$H NMR (400 MHz, DMSO-$d_6$) δ 13.60-12.78 (m, 2H), 7.93-7.83 (m, 1H), 7.60 (s, 1H), 7.36-7.31 (m, 2H), 7.10-7.07 (m, 1H), 7.05-6.99 (m, 2H), 3.78-3.74 (m, 3H), 3.22-3.20 (m, 3H), 2.87-2.82 (m, 2H), 2.59-2.55 (m, 2H), 2.04-2.00 (m, 3H)

tert-butyl (S)-5-amino-4-(4-((6-(1,3-dimethyl-1H-pyrazol-4-yl)-1-methyl-2-oxo-1,2,3,4-tetrahydroquinolin-7-yl)amino)-1,3-dioxoisoindolin-2-yl)-5-oxopentanoate

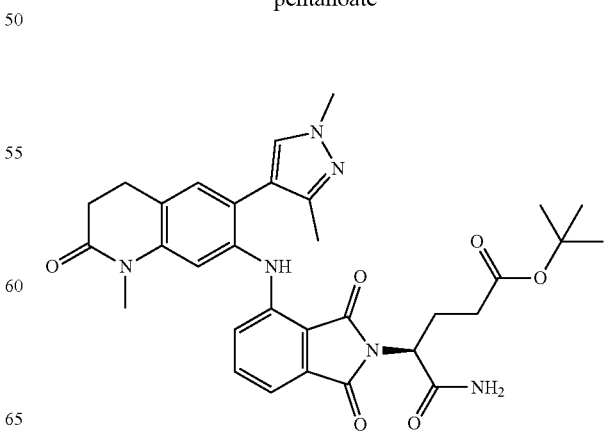

To a solution of tert-butyl rac-(4S)-4,5-diamino-5-oxopentanoate (0.052. g, 0.26 mmol) and 3-((6-(1,3-dimethyl-1H-pyrazol-4-yl)-1-methyl-2-oxo-1,2,3,4-tetrahydroquinolin-7-yl)amino)phthalic acid (0.110. g, 0.25 mmol) in toluene (2.5 mL) was added triethylamine (0.44 mL, 2.53 mmol). The resulting mixture was stirred at 130° C. for 12 h. The reaction mixture was concentrated under reduced pressure. The resulting residue was purified by prep-TLC to give tert-butyl (S)-5-amino-4-(4-((6-(1,3-dimethyl-1H-pyrazol-4-yl)-1-methyl-2-oxo-1,2,3,4-tetrahydroquinolin-7-yl)amino)-1,3-dioxoisoindolin-2-yl)-5-oxopentanoate (0.090 g, 0.15 mmol, 59.2% yield). MS (ESI) m/z: 601.3 [M+1]

(S)-4-((6-(1,3-dimethyl-1H-pyrazol-4-yl)-1-methyl-2-oxo-1,2,3,4-tetrahydroquinolin-7-yl)amino)-2-(2,6-dioxopiperidin-3-yl)isoindoline-1,3-dione

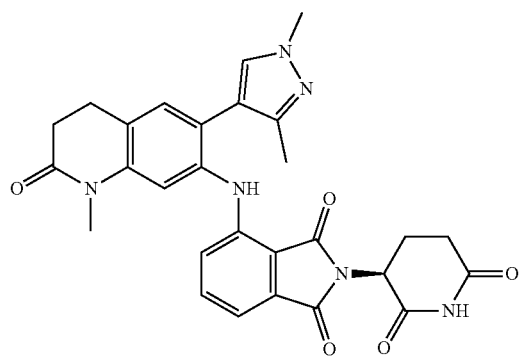 [SMILES: Cc1nn(C)cc1-c1cc2c(cc1Nc1cccc3c1C(=O)N([C@H]1CCC(=O)NC1=O)C3=O)N(C)C(=O)CC2]

To a solution of tert-butyl (S)-5-amino-4-(4-((6-(1,3-dimethyl-1H-pyrazol-4-yl)-1-methyl-2-oxo-1,2,3,4-tetrahydroquinolin-7-yl)amino)-1,3-dioxoisoindolin-2-yl)-5-oxopentanoate (0.09 g, 0.15 mmol) in acetonitrile (1.5 mL) was added benzenesulfonic acid (0.047. g, 0.30 mmol). The mixture was stirred at 60° C. for 12 h. The reaction mixture was quenched with dichloromethane (20 ml) and sodium bicarbonate (saturated aq, 10 mL), and then extracted with dichloromethane (50 mL×3). The combined organic layer was dried with anhydrous sodium sulfate and filtered. The filtrate was concentrated under reduced pressure. The isolated product was lyophilized to afford (S)-4-((6-(1,3-dimethyl-1H-pyrazol-4-yl)-1-methyl-2-oxo-1,2,3,4-tetrahydroquinolin-7-yl)amino)-2-(2,6-dioxopiperidin-3-yl) isoindoline-1,3-dione (0.07 g, 0.13 mmol, 88% yield). $^1$H NMR (400 MHz, DMSO-$d_6$) δ 11.13-11.10 (m, 1H), 8.06-8.00 (m, 1H), 7.65-7.61 (m, 1H), 7.58-7.52 (m, 1H), 7.30-7.27 (m, 1H), 7.20-7.16 (m, 3H), 5.12-5.06 (m, 1H), 3.74-3.70 (m, 3H), 3.27 (s, 3H), 2.93-2.86 (m, 3H), 2.60 (br s, 4H), 2.09-2.05 (m, 1H), 2.04 (s, 3H). MS (ESI) m/z: 527.2[M+1].

Example 31: (S)-4-((6-(1,5-dimethyl-6-oxo-1,6-dihydropyridin-3-yl)-1-methyl-2-oxo-1,2,3,4-tetrahydroquinolin-7-yl)amino)-2-(2,6-dioxopiperidin-3-yl)isoindoline-1,3-dione

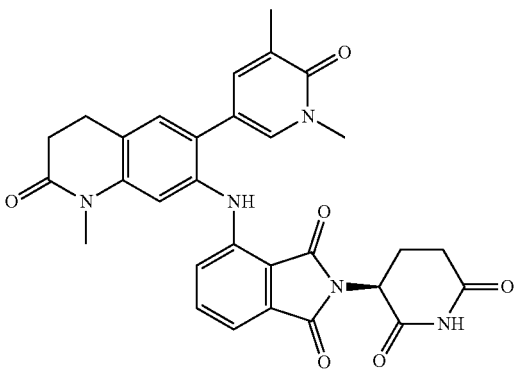 [SMILES: Cc1cc(-c2cc3c(cc2Nc2cccc4c2C(=O)N([C@H]2CCC(=O)NC2=O)C4=O)N(C)C(=O)CC3)cn(C)c1=O]

7-amino-6-(1,5-dimethyl-6-oxo-1,6-dihydropyridin-3-yl)-1-methyl-3,4-dihydroquinolin-2(1H)-one

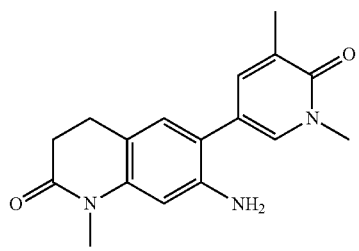 [SMILES: Cc1cc(-c2cc3c(cc2N)N(C)C(=O)CC3)cn(C)c1=O]

To a solution of potassium carbonate (0.48 g, 3.5 mmol) in 1,4-dioxane (3 mL) and water (0.3 mL) was added (1,1'-bis(diphenylphosphino)ferrocene) palladium(II) dichloride (0.048 g, 0.06 mmol), 7-amino-6-bromo-1-methyl-3,4-dihydroquinolin-2(1H)-one (0.300 g, 1.18 mmol) and 1,3-dimethyl-5-(4,4,5,5-tetramethyl-1,3,2-dioxaborolan-2-yl)pyridin-2(1H)-one (0.293 g, 1.18 mmol). The suspension was degassed and purged with nitrogen. The mixture was stirred at 110° C. for 12 h. The reaction was concentrated in vacuo and purified by silica gel column chromatography (5-15% methanol in dichloromethane) to afford 7-amino-6-(1,5-dimethyl-6-oxo-1,6-dihydropyridin-3-yl)-1-methyl-3,4-dihydroquinolin-2(1H)-one (0.15 g, 0.50 mmol, 42% yield). MS (ESI) m/z: 298.1[M+1]$^+$ dimethyl 3-((6-(1,5-dimethyl-6-oxo-1,6-dihydropyridin-3-yl)-1-methyl-2-oxo-1,2,3,4-tetrahydroquinolin-7-yl)amino)phthalate

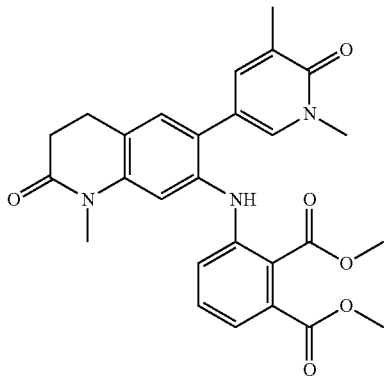 [SMILES: COC(=O)c1cccc(Nc2cc3c(cc2-c2cc(C)c(=O)n(C)c2)CCC(=O)N3C)c1C(=O)OC]

To a solution of 7-amino-6-(1,5-dimethyl-6-oxo-1,6-dihydropyridin-3-yl)-1-methyl-3,4-dihydroquinolin-2(1H)-one (0.150 g, 0.50 mmol) and dimethyl 3-bromophthalate (0.165 g, 0.61 mmol) in 1,4-dioxane (1 mL) was added cesium carbonate (0.492 g, 1.51 mmol) and methanesulfonato(2-dicyclohexylphosphino-2,6-di-i-propoxy-1,1-biphenyl)(2-amino-1,1-biphenyl-2-yl)palladium(II) (0.042 g, 0.05 mmol). The mixture was degassed and purged with nitrogen. The resulting mixture was stirred at 110° C. for 12 hours under nitrogen. The reaction was filtered and the filtrate was concentrated and purified by semi-preparative reversed-phase HPLC (45-65% acetonitrile in water, 0.1% trifluoroacetic acid modifier). The isolated fraction was lyophilized to afford dimethyl 3-((6-(1,5-dimethyl-6-oxo-1,6-dihydropyridin-3-yl)-1-methyl-2-oxo-1,2,3,4-tetrahydroquinolin-7-yl)amino)phthalate (0.05 g, 0.10 mmol, 20% yield). MS (ESI) m/z: 490.2[M+1]$^+$

3-((6-(1,5-dimethyl-6-oxo-1,6-dihydropyridin-3-yl)-1-methyl-2-oxo-1,2,3,4-tetrahydroquinolin-7-yl)amino)phthalic acid

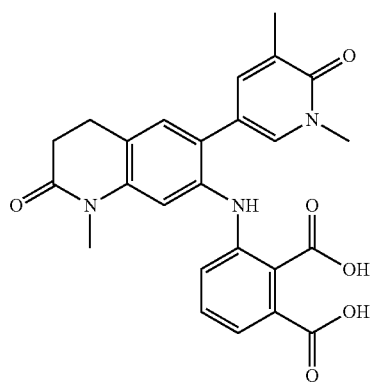 [SMILES: Cc1cc(-c2cc3c(cc2Nc2cccc(C(=O)O)c2C(=O)O)N(C)C(=O)CC3)cn(C)c1=O]

To a solution of dimethyl 3-((6-(1,5-dimethyl-6-oxo-1,6-dihydropyridin-3-yl)-1-methyl-2-oxo-1,2,3,4-tetrahydroquinolin-7-yl)amino)phthalate (0.050 g, 0.10 mmol) in methanol (1 mL) was added a solution of sodium hydroxide (0.041 g, 1.02 mmol) in water (1 mL). The mixture was stirred at 80° C. for 12 hours. The reaction mixture was added to water (10 mL) and the pH was adjusted to 6. The resulting suspension was filtered and the solid so obtained was dried under reduced pressure. The filtrate was extracted with dichloromethane (20 mL×3) and water (20 mL), and the combined organic layer was dried with sodium sulfate and filtered, and concentrated under reduced pressure to obtain 3-((6-(1,5-dimethyl-6-oxo-1,6-dihydropyridin-3-yl)-1-methyl-2-oxo-1,2,3,4-tetrahydroquinolin-7-yl)amino) phthalic acid (0.04 g, 0.087 mmol, 85% yield). MS (ESI) m/z: 462.1[M+1]$^+$.

tert-butyl (S)-5-amino-4-(4-((6-(1,5-dimethyl-6-oxo-1,6-dihydropyridin-3-yl)-1-methyl-2-oxo-1,2,3,4-tetrahydroquinolin-7-yl)amino)-1,3-dioxoisoindolin-2-yl)-5-oxopentanoate

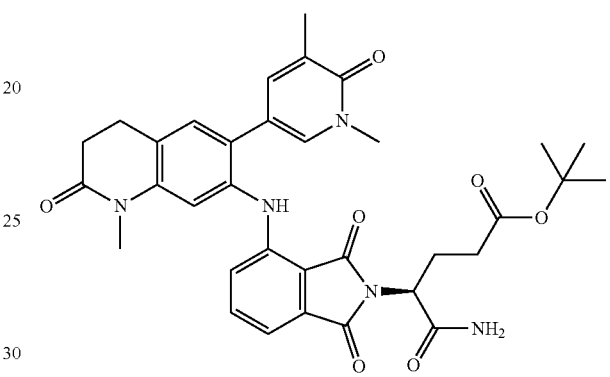

To a solution of 3-((6-(1,5-dimethyl-6-oxo-1,6-dihydropyridin-3-yl)-1-methyl-2-oxo-1,2,3,4-tetrahydroquinolin-7-yl)amino)phthalic acid (0.040 g, 0.09 mmol) and tert-butyl (S)-4,5-diamino-5-oxopentanoate (0.018 g, 0.09 mmol) in toluene (0.5 mL) was added triethylamine (0.15 mL, 0.87 mmol). The resulting mixture was stirred at 130° C. for 12 hours. The reaction mixture was concentrated under reduced pressure. The residue was purified by silica gel column chromatography to afford tert-butyl (S)-5-amino-4-(4-((6-(1,5-dimethyl-6-oxo-1,6-dihydropyridin-3-yl)-1-methyl-2-oxo-1,2,3,4-tetrahydroquinolin-7-yl)amino)-1,3-dioxoisoindolin-2-yl)-5-oxopentanoate (0.040 g, 0.06 mmol, 73.5% yield). MS (ESI) m/z: 628.3[M+1]$^+$

(S)-4-((6-(1,5-dimethyl-6-oxo-1,6-dihydropyridin-3-yl)-1-methyl-2-oxo-1,2,3,4-tetrahydroquinolin-7-yl)amino)-2-(2,6-dioxopiperidin-3-yl)isoindoline-1,3-dione

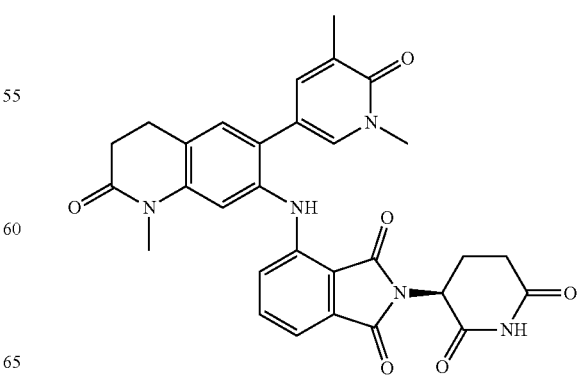

To a solution of tert-butyl (S)-5-amino-4-(4-((6-(1,5-dimethyl-6-oxo-1,6-dihydropyridin-3-yl)-1-methyl-2-oxo-1,2,3,4-tetrahydroquinolin-7-yl)amino)-1,3-dioxoisoindolin-2-yl)-5-oxopentanoate (0.040 g, 0.06 mmol) in acetonitrile (2 mL) was added benzenesulfonic acid (0.023 g, 0.14 mmol). The resulting mixture was stirred at 60° C. for 12 hours under nitrogen. The reaction mixture was quenched with dichloromethane (20 ml) and sodium bicarbonate (saturated aq, 10 mL), and then extracted with dichloromethane (30 mL×3). The combined organic layer was dried with anhydrous sodium sulfate and then filtered, and the filtrate was concentrated under reduced pressure. The crude product was repurified by chiral prep-SFC (40-40% isopropyl alcohol in acetonitrile). After the separation, the major peak was lyophilized to afford (S)-4-((6-(1,5-dimethyl-6-oxo-1,6-dihydropyridin-3-yl)-1-methyl-2-oxo-1,2,3,4-tetrahydroquinolin-7-yl)amino)-2-(2,6-dioxopiperidin-3-yl)isoindoline-1,3-dione (28.59 mg, 0.0516 mmol, 72.0% yield). $^1$H NMR (400 MHz, DMSO-d$_6$) δ 11.11 (s, 1H), 8.30 (s, 1H), 7.69 (d, J=2.4 Hz, 1H), 7.53-7.47 (m, 1H), 7.37 (d, J=1.2 Hz, 1H), 7.29 (s, 1H), 7.18-7.13 (m, 2H), 7.02 (t, J=8.4 Hz, 1H), 5.10 (dd, J=5.6, 12.8 Hz, 1H), 3.39 (s, 3H), 3.26 (s, 3H), 2.95-2.90 (m, 2H), 2.90-2.83 (m, 1H), 2.64-2.56 (m, 4H), 2.07-2.00 (m, 1H), 1.90 (s, 3H); MS (ESI) m/z: 554.2[M+1]$^+$.

Example 32: (S)-2-(2,6-dioxopiperidin-3-yl)-4-((1-methyl-6-(2-methylpyridin-4-yl)-1H-indazol-5-yl)amino)isoindoline-1,3-dione

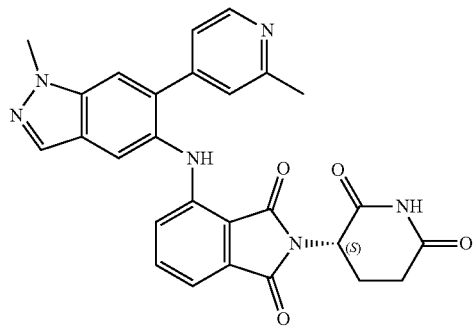

6-bromo-1-methyl-5-nitro-1H-indazole

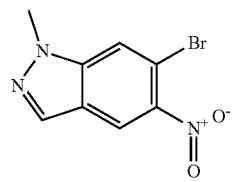

To a 500 ml three-necked flask was added 4-bromo-2-fluoro-5-nitrobenzaldehyde (10.0 g, 40.3 mmol), potassium carbonate (8.4 g, 60.8 mmol), isopropanol (80 mL) and water (40 mL). The mixture was stirred at 41° C. for 1 h and methylhydrazine (11.7 g, 101.8 mmol) was added dropwise. The resulting mixture was warmed to 77° C. and stirred for 6 hours. The mixture was cooled to 20° C. and water (150 mL) was added. The mixture was stirred for 1 h and filtered. The isolated solid was rinsed with water (20 mL×3) and dried under reduced pressure to give 6-bromo-1-methyl-5-nitro-1H-indazole (6.7 g, 26.2 mmol, 64% yield). $^1$H NMR (400 MHz, DMSO-d$_6$) δ 8.61 (s, 1H), 8.33 (d, J=2.4 Hz, 2H), 4.11 (s, 3H).

1-methyl-6-(2-methylpyridin-4-yl)-5-nitro-1H-indazole

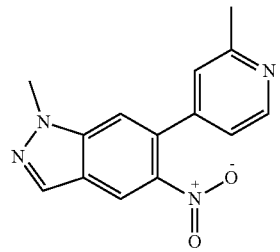

To a solution of 6-bromo-1-methyl-5-nitro-1H-indazole (10.0 g, 39.0 mmol) and 2-methyl-4-(4,4,5,5-tetramethyl-1,3,2-dioxaborolan-2-yl)pyridine (8.7 g, 39.8 mmol) in dioxane (100 mL) and water (10 mL) was added potassium carbonate (16.0 g, 115.9 mmol) and dichloro(1,1'-bis(diphenylphosphanyl)ferrocene)palladium(II) dichloromethane adduct (0.16 g, 0.20 mmol). The resulting mixture was stirred at 110° C. for 12 h under nitrogen. The reaction mixture was filtered and the filtrate was concentrated under reduced pressure. The residue was purified by silica gel column chromatography to give 1-methyl-6-(2-methylpyridin-4-yl)-5-nitro-1H-indazole (9 g, 33.5 mmol, 85% yield). $^1$H NMR (400 MHz, CDCl$_3$) δ 8.57 (d, J=5.2 Hz, 1H), 8.53 (s, 1H), 8.22 (s, 1H), 7.33 (s, 1H), 7.18 (s, 1H), 7.12 (d, J=4.8 Hz, 1H), 4.15 (s, 3H), 2.64 (s, 3H); MS (ESI) m/z: 269.3 [M+1]$^+$.

1-methyl-6-(2-methylpyridin-4-yl)-1H-indazol-5-amine

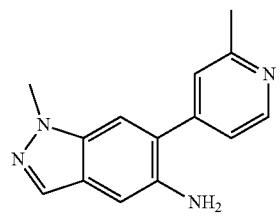

To a solution of 1-methyl-6-(2-methylpyridin-4-yl)-5-nitro-1H-indazole (9.0 g, 33.5 mmol) in ethanol (90 mL) and water (30 mL) was added ammonium chloride (9.0 g, 168.2 mmol) and ferrous powder (6.0 g, 107.1 mmol). The resulting mixture was stirred at 70° C. for 12 h. The reaction mixture was filtered and the filtrate was concentrated under reduced pressure. The resulting residue was extracted with water (200 mL) and ethyl acetate (3×200 mL). The combined organic phases were dried with anhydrous sodium sulfate and filtered. The filtrate was concentrated under reduced pressure to give 1-methyl-6-(2-methylpyridin-4-yl)-1H-indazol-5-amine (6.3 g, 26.4 mmol, 78% yield). $^1$H NMR (400 MHz, CDCl$_3$) δ 8.60 (d, J=4.8 Hz, 1H), 7.81 (s, 1H), 7.35 (s, 1H), 7.30 (d, J=5.2 Hz, 1H), 7.16 (s, 1H), 7.04 (s, 1H), 4.03 (s, 3H), 2.65 (s, 3H); MS (ESI) m/z: 239.1 [M+1]⁺.

Dimethyl 3-((1-methyl-6-(2-methylpyridin-4-yl)-1H-indazol-5-yl)amino)phthalate

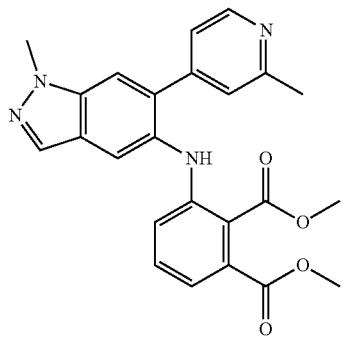 [SMILES: COC(=O)c1cccc(Nc2cc3cnn(C)c3cc2-c2ccnc(C)c2)c1C(=O)OC]

To a solution of 1-methyl-6-(2-methylpyridin-4-yl)-1H-indazol-5-amine (5.3 g, 22.2 mmol) and dimethyl 3-bromophthalate (6.2 g, 22.7 mmol) in dioxane (60 mL) was added cesium carbonate (21.6 g, 66.7 mmol) and Methanesulfonato(2-dicyclohexylphosphino-2,6-di-i-propoxy-1,1-biphenyl)(2-amino-1,1-biphenyl-2-yl)palladium(II) (0.93 g, 1.11 mmol). The resulting mixture was stirred at 110° C. for 12 hours under nitrogen. The reaction mixture was filtered and the filtrate was concentrated under reduced pressure. The residue was purified by silica gel column chromatography to give dimethyl 3-((1-methyl-6-(2-methylpyridin-4-yl)-1H-indazol-5-yl)amino)phthalate (8.0 g, 18.5 mmol, 83% yield). ¹H NMR (400 MHz, CDCl₃) δ 8.49 (d, J=5.2 Hz, 1H), 8.06 (s, 1H), 7.97 (s, 1H), 7.70 (s, 1H), 7.40 (s, 1H), 7.27 (s, 1H), 7.23-7.18 (m, 2H), 7.13 (d, J=5.2 Hz, 1H), 7.00 (d, J=8.4 Hz, 1H), 6.94 (d, J=7.2 Hz, 1H), 4.12 (s, 3H), 3.86 (s, 3H), 3.78 (s, 3H), 2.56 (s, 3H); MS (ESI) m/z: 431.2 [M+1]⁺.

3-((1-methyl-6-(2-methylpyridin-4-yl)-1H-indazol-5-yl)amino)phthalic acid

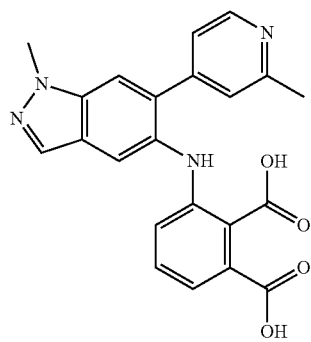 [SMILES: Cc1cc(-c2cc3c(cnn3C)cc2Nc2cccc(C(=O)O)c2C(=O)O)ccn1]

To a solution of dimethyl 3-((1-methyl-6-(2-methylpyridin-4-yl)-1H-indazol-5-yl)amino)phthalate (8.0 g, 18.58 mmol) in methanol (90 mL) was added the solution of sodium hydroxide (7.43 g, 185.85 mmol) in water (30 mL). The resulting mixture was stirred at 80° C. for 12 hours. The reaction mixture was added to water (300 mL) and the resulting suspension was filtered. The solid so obtained was dissolved in methanol (800 mL), which was then adjusted to pH=4 by aqueous HCl (6 M). The solution was concentrated under reduced pressure. The filtrate was adjusted pH=4 by aqueous HCl (6 M). The resulting precipitate was isolated by suction filtration and dried under reduced pressure. The isolated material was combined to afford 3-((1-methyl-6-(2-methylpyridin-4-yl)-1H-indazol-5-yl)amino)phthalic acid (4.0 g, 9.94 mmol, 53% yield). ¹H NMR (400 MHz, DMSO-d₆) δ 13.51-12.72 (m, 2H), 8.41 (d, J=5.2 Hz, 1H), 8.21 (s, 1H), 8.05 (s, 1H), 7.76 (s, 1H), 7.73 (s, 1H), 7.38 (s, 1H), 7.28 (d, J=5.2 Hz, 1H), 7.18 (t, J=8.0 Hz, 1H), 6.85 (d, J=7.2 Hz, 1H), 6.79 (d, J=8.4 Hz, 1H), 4.09 (s, 3H), 2.47 (s, 3H); MS (ESI) m/z: 403.2 [M+1]⁺ tert-butyl (S)-5-amino-4-(4-((1-methyl-6-(2-methylpyridin-4-yl)-1H-indazol-5-yl)amino)-1,3-dioxoisoindolin-2-yl)-5-oxopentanoate

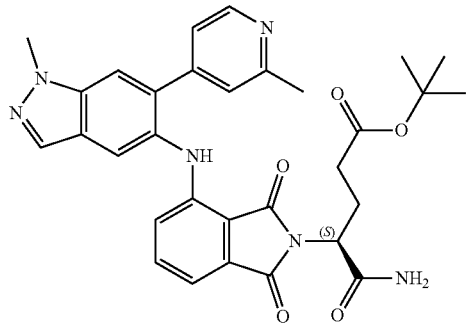

To a solution of 3-((1-methyl-6-(2-methylpyridin-4-yl)-1H-indazol-5-yl)amino)phthalic acid (4.0 g, 9.94 mmol) in toluene (60 mL) was added tert-butyl (S)-4,5-diamino-5-oxopentanoate (2.01 g, 9.94 mmol) and triethylamine (17 mL, 99.4 mmol). The resulting mixture was stirred at 130° C. for 12 hours. The reaction mixture was concentrated under reduced pressure. The residue was purified by silica gel column chromatography to give tert-butyl (S)-5-amino-4-(4-((1-methyl-6-(2-methylpyridin-4-yl)-1H-indazol-5-yl)amino)-1,3-dioxoisoindolin-2-yl)-5-oxopentanoate (2.83 g, 4.97 mmol, 50% yield). ¹H NMR (400 MHz, CDCl₃) δ 8.49 (d, J=4.8 Hz, 1H), 8.03 (s, 1H), 7.86 (s, 1H), 7.81 (s, 1H), 7.44 (s, 1H), 7.39 (t, J=7.6 Hz, 1H), 7.23 (s, 1H), 7.15 (d, J=7.2 Hz, 2H), 7.01 (d, J=8.8 Hz, 1H), 6.37-6.12 (m, 1H), 5.54-5.33 (m, 1H), 4.78 (t, J=7.2 Hz, 1H), 4.14 (s, 3H), 2.57 (s, 3H), 2.52-2.44 (m, 2H), 2.36-2.26 (m, 2H), 1.43 (s, 9H); MS (ESI) m/z: 569.3 [M+1]⁺

(S)-2-(2,6-dioxopiperidin-3-yl)-4-((1-methyl-6-(2-methylpyridin-4-yl)-1H-indazol-5-yl)amino)isoindoline-1,3-dione

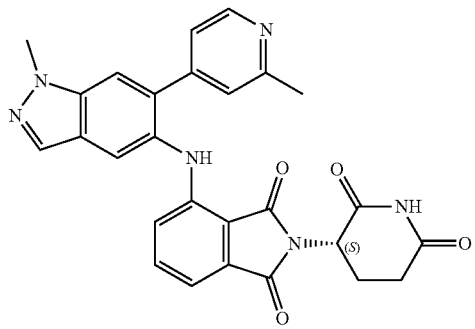

To a solution of tert-butyl (S)-5-amino-4-(4-((1-methyl-6-(2-methylpyridin-4-yl)-1H-indazol-5-yl)amino)-1,3-dioxoisoindolin-2-yl)-5-oxopentanoate (2.83 g, 4.98 mmol) in acetonitrile (30 mL) was added benzenesulfonic acid (2.36 g, 14.93 mmol). The resulting mixture was stirred at 60° C. for 12 hours. The reaction mixture was concentrated under reduced pressure. The residue was extracted with dichloromethane (200 mL×3) and sodium bicarbonate (200 mL). The combined organic layer was dried with anhydrous sodium sulfate and then filtered, and the filtrate was concentrated under reduced pressure. The crude product was purified by prep-HPLC and lyophilized to give (S)-2-(2,6-dioxopiperidin-3-yl)-4-((1-methyl-6-(2-methylpyridin-4-yl)-1H-indazol-5-yl)amino)isoindoline-1,3-dione (1.80 g, 3.64 mmol, 73% yield) as a yellow solid. $^1$H NMR (400 MHz, DMSO-$d_6$) δ 11.13 (s, 1H), 8.68-8.64 (m, 1H), 8.46 (s, 1H), 8.17 (s, 1H), 8.00-7.94 (m, 2H), 7.93 (s, 1H), 7.84 (s, 1H), 7.42-7.38 (m, 1H), 7.08 (d, J=7.2 Hz, 1H), 6.70-6.66 (m, 1H), 5.09 (dd, J=5.2, 12.8 Hz, 1H), 4.15 (s, 3H), 2.94-2.87 (m, 1H), 2.64 (s, 1H), 2.60 (d, J=2.0 Hz, 3H), 2.60-2.58 (m, 1H), 2.08-2.01 (m, 1H); MS (ESI) m/z: 495.2 [M+1]$^+$.

In Vitro Assays

HbF Induction Assay

The expansion, differentiation, and maturation of GCSF-mobilized human CD34+(STEMCELL Technologies Inc.) cells towards erythroid lineage cells were performed using a two-phase liquid culture model (Moutouhi-de Parseval L A, et al. Pomalidomide and lenalidomide regulate erythropoiesis and fetal hemoglobin production in human CD34+ cells. J Clin Invest. 2008 January; 118(1):248-58). In the first phase, GCSF-mobilized human CD34+ cells were cultured using StemSpan™-XF (STEMCELL Technologies Inc.) media supplemented with 1×BIT 9500, Penicillin-Streptomycin (50 U/mL), 100 ng/mL recombinant human (rh) SCF, 100 ng/mL rh Flt3-L, 20 ng/mL rh IL-3 and 10 ng/mL rh EPO and the growth of cells maintained in exponential phase for 7 days at 37° c. with 5% CO2 to support expansion and progenitor differentiation prior the second phase and treatment with compounds. In the second phase, culture media was changed to StemSpan™-XF media supplemented with 1×BIT 9500, Penicillin-Streptomycin (50 U/mL), 50 ng/mL rh SCF and 40 ng/mL rh EPO to promote further differentiation and maturation of the erythrocytes and to initiate treatment with compounds. Compounds were dispensed in duplicate at a final concentration of 1 μM in a final DMSO amount of 0.1%. Fresh compound was reapplied, and cell density was kept constant every 2 days. After 7 days, the cells were assessed for viability and fetal hemoglobin expression using flow cytometry. For viability analysis, eBioscience™ Fixable Viability Dye eFluor™ 780 (1:1000, eBioscience; Cat #65-0865-14) was added to the cells and kept in the dark for 10 minutes. For analysis of fetal hemoglobin (HbF), cells were fixed and permeabilized using Fixation Buffer (BioLegend; Cat #420801 and Intracellular staining permeabilization buffer (BioLegend, Cat #420201) following manufacturer's instructions. During permeabilization step, cells were stained with PE-labelled Mouse Anti-Human Fetal Hemoglobin (1:10, clone 2D12; BD Biosciences, Cat #BDB560041) incubated at room temperature for 20 minutes and protected from light. PE-labelled Mouse anti-IgG k, (1:10 clone MOPC-21; BD Biosciences, Cat #BDB3551436) was used as an isotype control.

Viability, cell count, and fetal hemoglobin (HbF) levels were measured using an Attune NXT flow cytometer (Thermofisher) and the data analyzed using the FCS express software (De Novo Software). In Table 1 below, the effects of compounds of formula (I), formula (I'), formula (II), formula (II'), and formula (III) on % viable cells, viable cell count, on the % HbF positive cells and the median fluorescent intensity (MFI) of the HbF positive cell population compared to the DMSO controls can be viewed. All gates were set using the isotype negative control. The baseline % HbF positive cells for DMSO-treated control cells was 15%. Compounds of formula (I), formula (I'), formula (II), formula (II'), and formula (III) having HbF induction between 66% and 100% are level A. Compounds of formula (I), formula (I'), formula (II), formula (II'), and formula (III) having HbF induction between 33% and 66% are level B. Compounds of formula (I), formula (I'), formula (II), formula (II'), and formula (III) having HbF induction % less than 33% are level C. For certain compounds of formula (I), formula (I'), formula (II), formula (II'), and formula (III) % HbF induction values 0-33% (activity level C), between 33% and 66% (activity level B), and between 67% and 100% (activity level A) are shown in Table 2 below.

WIZ Assay and ZBTB7A EC50 Assays

The HiBiT degradation assay for WIZ and ZBTB7A in HUDEP-2 cells was performed as described below. HUDEP-2 cells engineered to express a HiBiT tag in either the WIZ (Widely interspaced zinc finger) or ZBTB7A (Zinc Finger And BTB Domain Containing 7A) proteins were maintained in low attachment flasks in StemSpan SFEM II media supplemented with Penicillin-Streptomycin (50 U/mL), rhSCF (50 ng/mL), rhEPO (3 IU/mL), dexamethasone (0.4 μg/mL) and doxycycline (1 ρg/mL). Prior to start of the assay, cell count and viability were measured by trypan blue exclusion using the Vi-cell XR cell viability analyzer. For the HUDEP-2 WIZ HiBiT assay, cells were transferred to a 50 mL conical and centrifuged at 500 g for five minutes. Cells were resuspended in fresh StemSpan SFEM II media supplemented with Penicillin-Streptomycin (50 U/mL), rhSCF (50 ng/mL), rhEPO (3 IU/mL), dexamethasone (0.4 ρg/mL) and doxycycline (1 ρg/mL) at a density of 1.0×10$^6$ cells/ml. Forty microliters of cell suspension was dispensed into 384-well Low Flange White Flat Bottom Polystyrene TC-treated Microplates containing pre-dispensed compounds, using a VIAFLO 384 liquid hander, and placed in a 37° C. incubator with 5% CO$_2$. Each compound was dispensed in duplicate and had a final DMSO concentration of 0.1%. After 24 hours of treatment, 40 μL Nano-Glo HiBiT Lytic Detection System reagent was dispensed into each well using a VIAFLO 384 liquid hander. Plates were incubated for 25 minutes at room temperature and the luminescence was read as relative luminescent units using the EnVision plate reader. EC50 and Y-min values were calculated using curves calculated from dotmatics software after the normalization to the DMSO control of 10 different concentrations: 10, 3.33, 1.11, 0.37, 0.12, 0.04 0.0137, 0.0046, 0.0015 and 0.0005 µM respectively.

For the HUDEP-2 ZBTB7A HiBiT assay, cell count and viability were measured by trypan blue exclusion using the Vi-cell XR cell viability analyzer and the cells were transferred to a 50 mL conical and centrifuged at 500 g for five minutes. Cells were resuspended in fresh IMIDM media supplemented with L-Glutamine (1×), Penicillin-Streptomycin (50 U/mL), holo-transferrin (330 ρg/mL), heparin (2 IU/mL), r-human Insulin (10 ρg/mL), rhEPO (3 IU/mL), rhSCF (100 ng/mL)+Dox (1 ρg/mL) and 5% human plasma in low attachment flasks, which were placed in a 37° C. incubator with 5% $CO_2$. After 48 hours, cell count and viability were measured by trypan blue exclusion using the Vi-cell XR cell viability analyzer. The HUDEP-2 ZBTB7A cells were transferred to a 50 mL conical, centrifuged at 500 g for five minutes and resuspended at a density of $1.0 \times 10^6$ cells/ml in IMIDM media supplemented with L-Glutamine (1×), Penicillin-Streptomycin (50 U/mL), holo-transferrin (330 ρg/mL), heparin (2 IU/mL), r-human Insulin (10 ρg/mL), rhEPO (3 IU/mL), rhSCF (100 ng/mL)+Dox (1 ρg/mL) and 5% human plasma. Forty microliters of cell suspension was dispensed into 384-well Low Flange White Flat Bottom Polystyrene TC-treated Microplates containing pre-dispensed compounds, using a VIAFLO 384 liquid hander, and placed in a 37° C. incubator with 5% $CO_2$. Each compound was dispensed in duplicate and had a final DMSO concentration of 0.1%. After 24 hours of treatment, 40 µL Nano-Glo HiBiT Lytic Detection System reagent was dispensed into each well using a VIAFLO 384 liquid hander. Plates were incubated for 25 minutes at room temperature and the luminescence was read as relative luminescent units using the EnVision plate reader. EC50 and Y-min values were calculated using curves calculated from dotmatics software after the normalization to the DMSO control of 10 different concentrations: 10, 3.33, 1.11, 0.37, 0.12, 0.04 0.0137, 0.0046, 0.0015 and 0.0005 µM respectively.

Compounds of formula (I), formula (I'), formula (II), formula (II'), and formula (III) having WIZ EC50<0.01 µM are level D. Compounds of formula (I), formula (I'), formula (II), formula (II'), and formula (III) having WIZ EC50>0.01 µM-0.1 µM are level E. Compounds of formula (I), formula (I'), formula (II), formula (II'), and formula (III) having WIZ EC50>0.1 µM are level F. For certain compounds of formula (I), formula (I'), formula (II), formula (II'), and formula (III) having WIZ EC50 values<0.01 µM (activity level D), WIZ EC50>0.01 µM-0.1 (activity level E), and <0.01 µM (activity level F) are shown in Table 2 below.

Compounds of formula (I), formula (I'), formula (II), formula (II'), and formula (III) having ZBTB7A EC50<0.03 µM are level G. Compounds of formula (I), formula (I'), formula (II), formula (II'), and formula (III) having ZBTB7A EC50>0.03 µM-0.1 µM are level H. Compounds of formula (I), formula (I'), formula (II), formula (II'), and formula (III) having ZBTB7A EC50>0.1 µM are level I. For certain compounds of formula (I), formula (I'), formula (II), formula (II'), and formula (III) having ZBTB7A EC50 values<0.01 µM (activity level G), ZBTB7A EC50>0.01 µM-0.1 (activity level H), and <0.01 µM (activity level I) are shown in Table 2 below.

TABLE 2

| Compound No. | HbF Induction (%) | WIZ EC50 (uM) | ZBTB7A EC50 (uM) |
|---|---|---|---|
| 1 | A | E | G |
| 2 | A | D | G |
| 3 | A | E | G |
| 4 | A | E | H |
| 5 | A | E | H |
| 6 | A | D | H |
| 7 | A | E | H |
| 8 | A | E | H |
| 9 | A | D | H |
| 10 | A | D | I |
| 11 | A | F | I |
| 12 | A | D | H |
| 13 | A | E | H |
| 14 | A | F | I |
| 15 | A | D | H |
| 16 | A | D | I |
| 17 | A | E | H |
| 18 | A | D | H |
| 19 | A | F | I |
| 20 | B | D | I |
| 21 | B | D | H |
| 22 | B | E | I |
| 23 | B | F | I |
| 24 | B | F | I |
| 25 | B | E | I |
| 26 | C | E | I |
| 27 | C | E | I |
| 28 | C | F | I |
| 29 | C | E | I |
| 30 | C | E | H |
| 31 | B | E | I |
| 32 | A | D | H |
| 33 |   | E | H |
| 34 |   | E | G |
| 35 |   | E | H |
| 36 |   | E | G |
| 37 |   | D | G |
| 38 |   | E | G |
| 39 | B | E | H |
| 40 | A | D | G |
| 41 | A | D | G |
| 42 | B | F | H |
| 43 | A | D | G |
| 44 | A | E | H |
| 45 | A | D | G |
| 46 | A | D | G |
| 47 | A | D | G |
| 48 | A | D | G |
| 49 |   | D | G |
| 50 |   | E | G |
| 51 |   | E | H |
| 52 | A | D | I |
| 53 |   | F | I |
| 54 |   | F | I |

A number of references have been cited, the disclosures of which are incorporated herein by reference in their entirety.

What is claimed is:

1. A compound according to Formula (III):

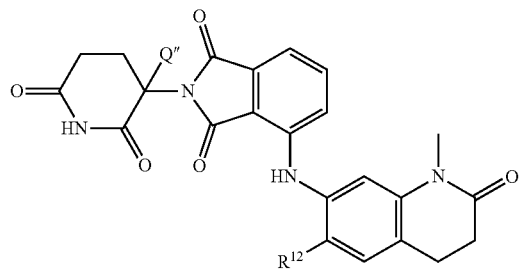

or a pharmaceutically acceptable salt thereof,
wherein:
Q'' is H or CH$_3$,
R$^{12}$ is

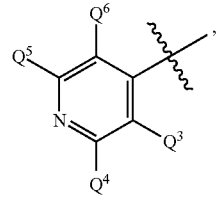

wherein
Q$^3$ is selected from H, Cl, or F;
Q$^4$ is selected from H, CH$_3$, or CH(F)$_2$;
Q$^5$ is selected from H, CH$_3$, or OCH$_3$; and
Q$^6$ is selected from H or F.

2. The compound of claim 1, wherein Q'' is H.
3. The compound of claim 1, wherein Q$^3$ is F.
4. The compound of claim 1, wherein Q$^5$ is OCH$_3$ or CH$_3$.
5. A compound selected from the group consisting of:

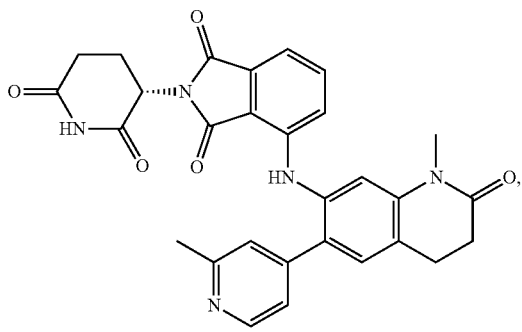 [SMILES: Cc1cc(-c2cc3c(cc2Nc2cccc4c2C(=O)N([C@H]2CCC(=O)NC2=O)C4=O)N(C)C(=O)CC3)ccn1]

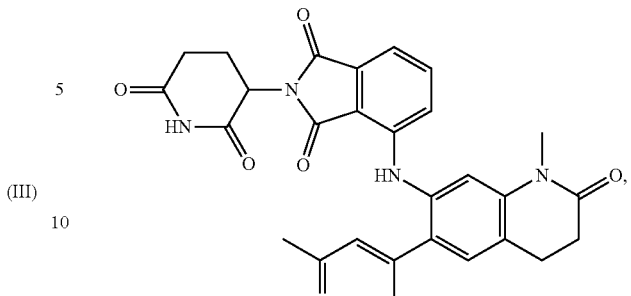

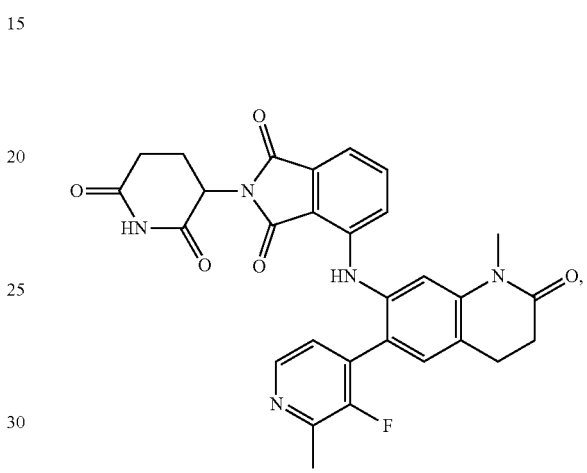

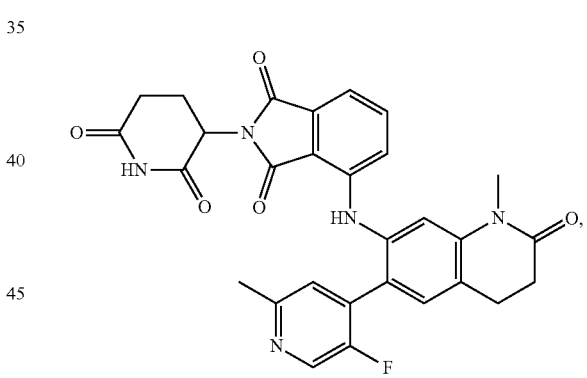

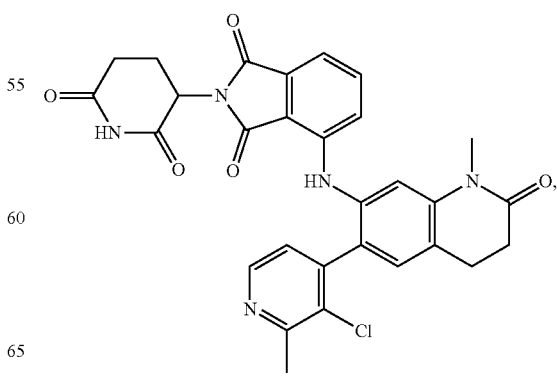

-continued

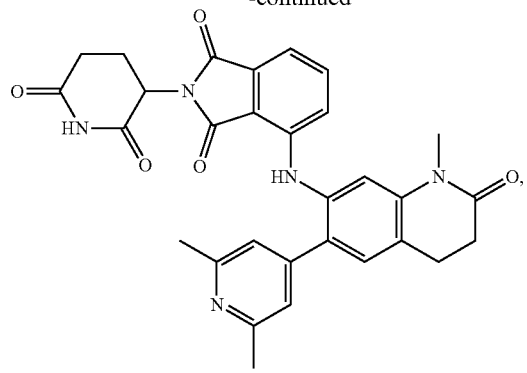

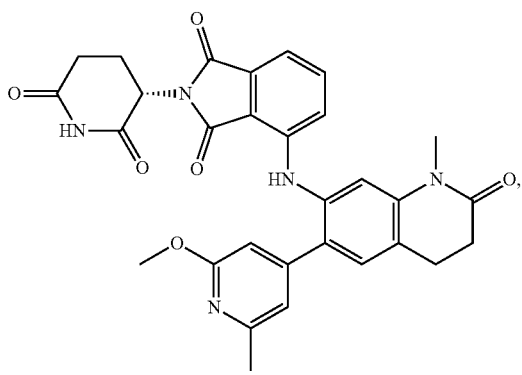

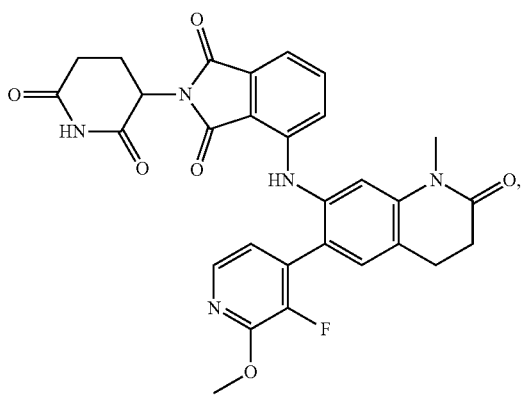

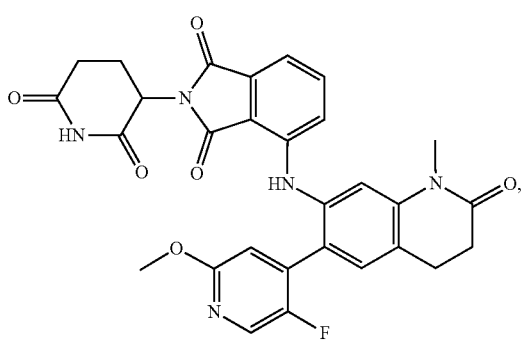

-continued

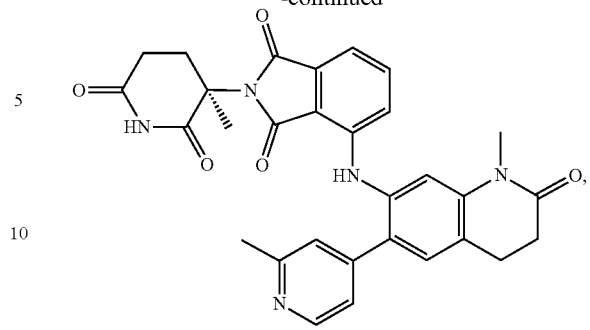

and pharmaceutically acceptable salts thereof.

6. A pharmaceutical composition comprising a compound of claim 1 or a pharmaceutically acceptable salt thereof, and a pharmaceutically acceptable carrier.

7. A compound of the following structure:

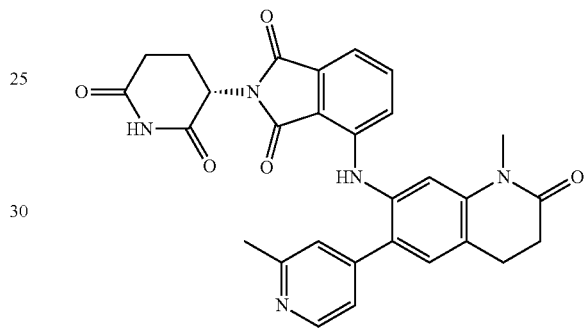

or a pharmaceutically acceptable salt thereof.

8. The compound of claim 7, wherein the compound is a pharmaceutically acceptable salt of the structure.

9. The compound of claim 7, wherein the compound is

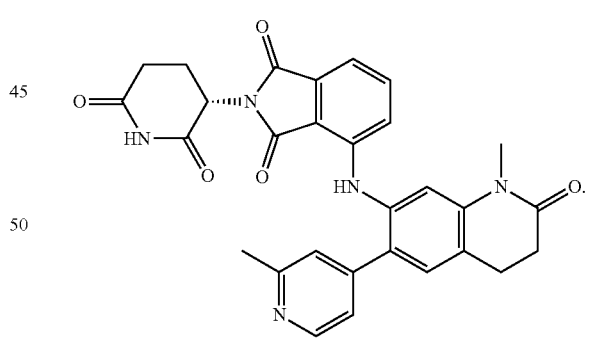

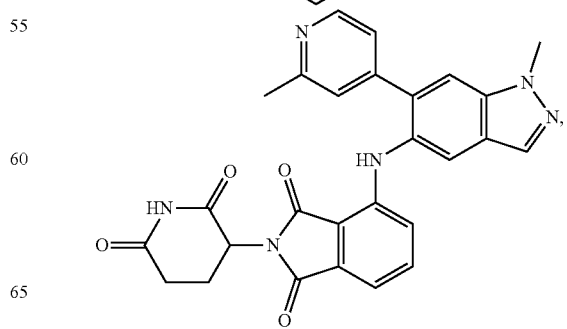

167
-continued
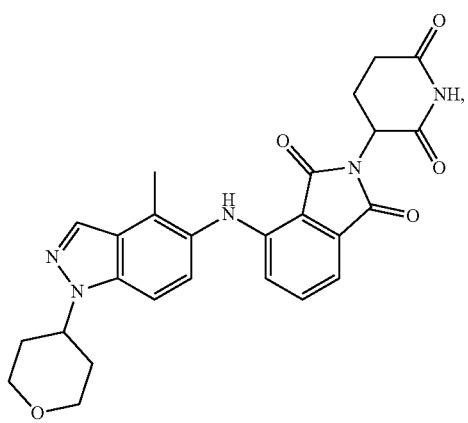
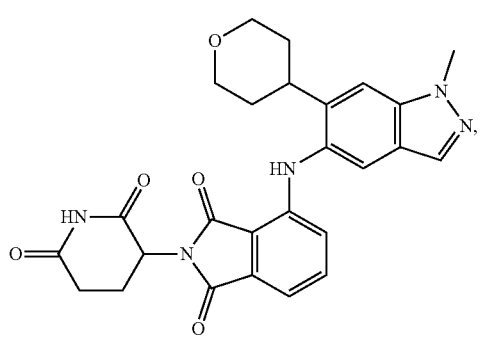
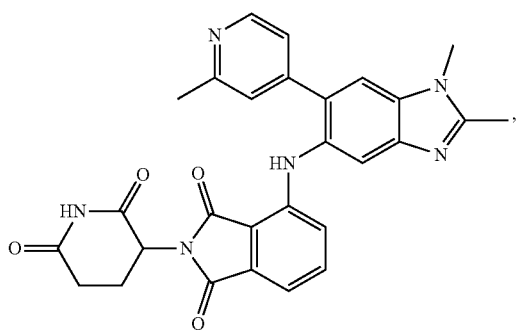
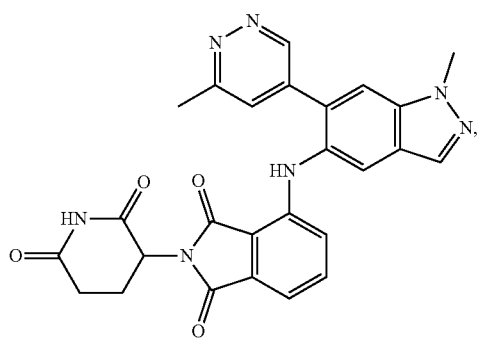
168
-continued
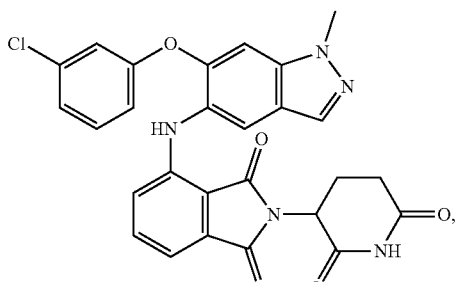
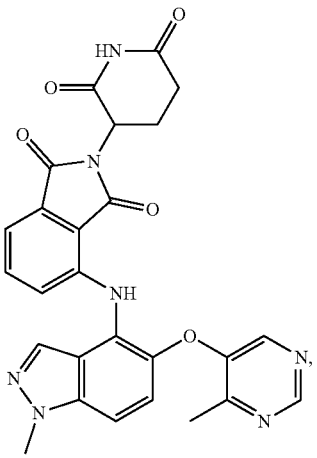
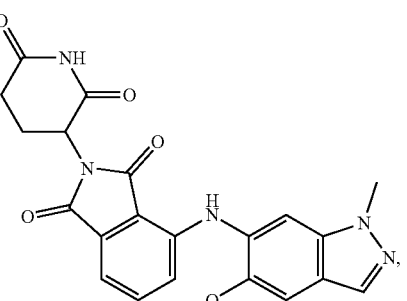
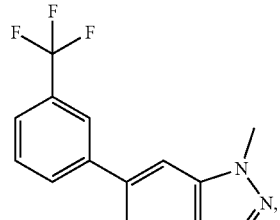
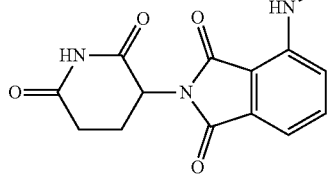

-continued

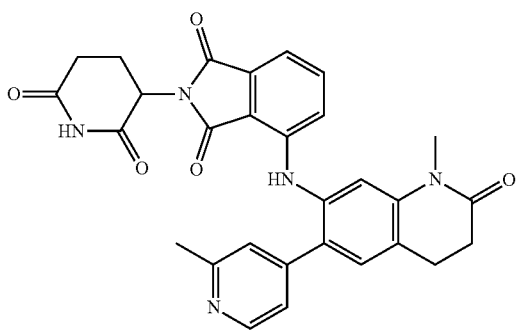 [SMILES: Cc1cc(-c2cc3c(cc2Nc2cccc4c2C(=O)N([C@H]2CCC(=O)NC2=O)C4=O)N(C)C(=O)CC3)ccn1]

10. A compound of the following structure:

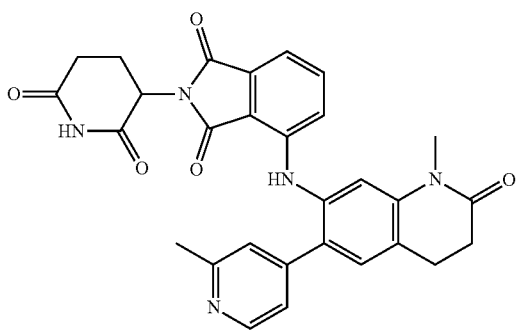 [SMILES: Cc1cc(-c2cc3c(cc2Nc2cccc4c2C(=O)N([C@H]2CCC(=O)NC2=O)C4=O)N(C)C(=O)CC3)ccn1]

or a pharmaceutically acceptable salt thereof.

11. The compound of claim 10, wherein the compound is a pharmaceutically acceptable salt of the structure.

12. The compound of claim 10, wherein the compound is

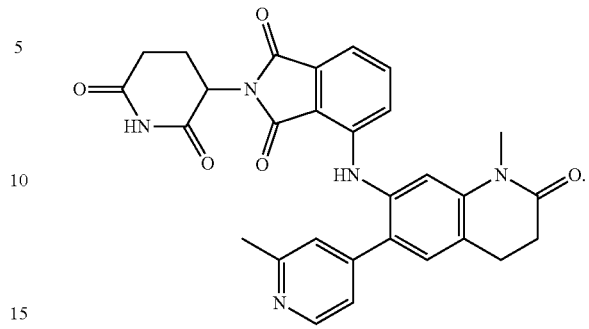

13. A pharmaceutical composition comprising a compound of claim 5 or a pharmaceutically acceptable salt thereof, and a pharmaceutically acceptable carrier.

14. A pharmaceutical composition comprising the compound of claim 7 or a pharmaceutically acceptable salt thereof, and a pharmaceutically acceptable carrier.

15. A pharmaceutical composition comprising the compound of claim 8, and a pharmaceutically acceptable carrier.

16. A pharmaceutical composition comprising the compound of claim 9, and a pharmaceutically acceptable carrier.

17. A pharmaceutical composition comprising the compound of claim 10 or a pharmaceutically acceptable salt thereof, and a pharmaceutically acceptable carrier.

18. A pharmaceutical composition comprising the compound of claim 11, and a pharmaceutically acceptable carrier.

19. A pharmaceutical composition comprising the compound of claim 12, and a pharmaceutically acceptable carrier.

* * * * *

UNITED STATES PATENT AND TRADEMARK OFFICE
CERTIFICATE OF CORRECTION

| | | |
|---|---|---|
| PATENT NO. | : 12,441,711 B2 | Page 1 of 1 |
| APPLICATION NO. | : 19/029638 | |
| DATED | : October 14, 2025 | |
| INVENTOR(S) | : Thomas J. Cummins et al. | |

It is certified that error appears in the above-identified patent and that said Letters Patent is hereby corrected as shown below:

In the Claims

Claim 9 should read:
The compound of claim 7, wherein the compound is

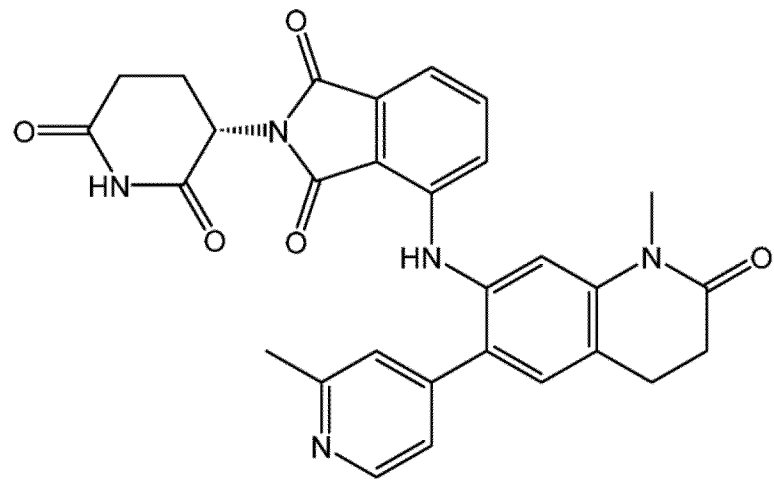

.

Signed and Sealed this
Thirtieth Day of December, 2025

John A. Squires
*Director of the United States Patent and Trademark Office*